United States Patent [19]

Agnew et al.

[11] Patent Number: 4,503,516

[45] Date of Patent: Mar. 5, 1985

[54] METHODOLOGY FOR TRANSFORMING A FIRST EDITABLE DOCUMENT FORM PREPARED BY AN INTERACTIVE TEXT PROCESSING SYSTEM TO A SECOND EDITABLE DOCUMENT FORM USABLE BY AN INTERACTIVE OR BATCH TEXT PROCESSING SYSTEM

[75] Inventors: Palmer W. Agnew, Owego; John J. Erhard, Binghamton; Anne S. Kellerman, Endicott, all of N.Y.

[73] Assignee: International Business Machines Corporation, Armonk, N.Y.

[21] Appl. No.: 442,827

[22] Filed: Nov. 18, 1982

[51] Int. Cl.[3] ........................ G06F 15/38; G06F 15/21

[52] U.S. Cl. ........................................ 364/900

[58] Field of Search ... 364/200 MS File, 900 MS File, 364/413, 513; 381/44, 51, 52, 53

[56] References Cited

U.S. PATENT DOCUMENTS

| | | | |
|---|---|---|---|
| 3,846,763 | 11/1974 | Rükonen | 364/200 |
| 4,210,962 | 7/1980 | March et al. | 364/402 |
| 4,330,847 | 5/1982 | Kuseki | 364/900 |

*Primary Examiner*—James D. Thomas
*Assistant Examiner*—Thomas Lee
*Attorney, Agent, or Firm*—Saul A. Seinberg

[57] ABSTRACT

A method of transforming a first editable form of a document prepared by an interactive text processing system into a second and incompatible editable form for use in another interactive or batch text processing system through the use of a transform mechanism is described. A significant step of this method requires the identification of a limited number of key state variables, whose values collectively identify the necessary state information for transforming the first document form to the second. After the key state variables have been identified, the actual number of combinations thereof is determined. For each first document form input item encountered by the transform mechanism, and for each combination of key state variables in which that input item can be encountered, one or more output items for the second document form is explicitly defined as the transform thereof. In addition, the state of the transform mechanism after each such transform has occurred, must also be specified. The described method is also to resolve the actual state that exists at the start of each document. It is also adapted to handle sub-documents, such as margin text, existing within a document to be transformed.

5 Claims, 25 Drawing Figures

| EXAMPLE DECISION TABLE FOR ONE INPUT ITEM | | | | |
|---|---|---|---|---|
| | 1 | 2 | 3 | 4 |
| PRIOR STATE: | | | | |
| STATE VARIABLE A | N | Y | - | - |
| STATE VARIABLE B | - | - | - | - |
| STATE VARIABLE C | - | N | Y | - |
| STATE VARIABLE D | - | - | - | - |
| OUTPUT: | | | | |
| OUTPUT ITEM U | 1 | - | - | - |
| OUTPUT ITEM V | - | - | - | - |
| OUTPUT ITEM W | - | - | - | - |
| OUTPUT ITEM X | 2 | 1 | - | - |
| OUTPUT ITEM Y | 3 | 2 | 1 | - |
| OUTPUT ITEM Z | - | - | - | - |
| NEXT STATE: | | | | |
| STATE VARIABLE A | Y | - | - | - |
| STATE VARIABLE B | Y | Y | - | - |
| STATE VARIABLE C | Y | Y | - | - |
| STATE VARIABLE D | Y | Y | Y | - |

FIG. 1

| STATE BIT | INIT. VALUE | W.D. VALUE | N.W.D. VALUE |
|---|---|---|---|
| ENDED DCF RECORD | Y | N | N |
| ENDED PARAGRAPH | Y | N | N |
| UNINDENTED | Y | N | N |
| ENDED PAGE | Y | N | N |
| LAST WAS CRE | N | N | N |
| LAST WAS PE | N | N | N |
| ENDED WORD | Y | Y | N |

FIG. 4

| IMPLICATIONS | 1 | 2 | 3 | 4 | 5 | 6' | 6" | 7 | 8 | 9 |
|---|---|---|---|---|---|---|---|---|---|---|
| ENDED DCF RECORD | -Y | -Y | -Y | -Y | -Y | - | - | N | - | - |
| ENDED PARAGRAPH | -Y | -Y | Y | - | - | - | - | -N | N | - |
| UNINDENTED | -Y | Y | - | - | - | - | - | -N | -N | N |
| ENDED PAGE | Y | - | - | - | - | - | - | -N | -N | -N |
| LAST WAS CRE | - | - | - | Y | - | Y | -N | -N | - | - |
| LAST WAS PE | - | - | - | - | Y | -N | Y | -N | - | - |
| ENDED WORD | -Y | -Y | -Y | -Y | -Y | - | - | - | - | - |

FIG. 5

| POSSIBLE STATES | 1 | 2 | 3 | 4 | 5 | 6 | 7 | 8 | 9 | 10 | 11 |
|---|---|---|---|---|---|---|---|---|---|---|---|
| ENDED DCF RECORD | N | N | Y | Y | Y | Y | Y | Y | Y | Y | Y |
| ENDED PARAGRAPH | N | N | N | N | N | Y | Y | Y | Y | Y | Y |
| UNINDENTED | N | N | N | N | N | N | N | Y | Y | Y | Y |
| ENDED PAGE | N | N | N | N | N | N | N | N | N | Y | Y |
| LAST WAS CRE | N | N | * | N | * | N | * | N | * | N | * |
| LAST WAS PE | N | N | * | N | * | N | * | N | * | N | * |
| ENDED WORD | Y | N | N | Y | Y | Y | Y | Y | Y | Y | Y |

* EITHER OR BOTH OF THESE MUST BY "Y"

FIG. 6

| L3 INPUT: CRE | | | | |
|---|---|---|---|---|
| | 1 | 2 | 3 | 4 |
| PRIOR STATE: | | | | |
| ENDED DCF RECORD | N | Y | - | - |
| ENDED PARAGRAPH | -N | - | - | - |
| UNINDENTED | -N | - | - | - |
| ENDED PAGE | -N | - | - | - |
| LAST WAS CRE | -N | - | - | - |
| LAST WAS PE | -N | - | - | - |
| ENDED WORD | - | - | - | - |
| DCF OUTPUT: | | | | |
| EOR (END OF RECORD) | 1 | - | - | - |
| ONE SPACE + EOR | - | 1 | - | - |
| .BR + EOR | - | - | - | - |
| .IN 0 + EOR | - | - | - | - |
| .PA + EOR | - | - | - | - |
| PE BYTE | - | - | - | - |
| NEXT STATE: | | | | |
| ENDED DCF RECORD | Y | -Y | - | - |
| ENDED PARAGRAPH | -N | Y | - | - |
| UNINDENTED | -N | - | - | - |
| ENDED PAGE | -N | N | - | - |
| LAST WAS CRE | Y | Y | - | - |
| LAST WAS PE | N | N | - | - |
| ENDED WORD | - | - | - | - |

NOTE: Transformation does not depend on the prior state's LAST WAS CRE or LAST WAS PE or ENDED WORD. The next state always resets LAST WAS CRE, resets last was PE, and sets ENDED WORD. Hence, for clarity, these states are not shown.

| L3 INPUT: RCR or IRT | 1 | 2 | 3 | 4 |
|---|---|---|---|---|
| **PRIOR STATE:** | | | | |
| ENDED DCF RECORD | N | Y | -Y | - |
| ENDED PARAGRAPH | -N | - | -Y | - |
| UNINDENTED | -N | N | Y | - |
| ENDED PAGE | -N | -N | - | - |
| LAST WAS CRE | -N | - | - | - |
| LAST WAS PE | -N | - | - | - |
| ENDED WORD | - | - | -Y | - |
| **DCF OUTPUT:** | | | | |
| EOR (END OF RECORD) | 1 | - | - | - |
| ONE SPACE + EOR | - | 1 | 1 | - |
| .BR + EOR | - | - | - | - |
| .IN 0 + EOR | 2 | 2 | - | - |
| .PA + EOR | - | - | - | - |
| PE BYTE | - | - | - | - |
| **NEXT STATE:** | | | | |
| ENDED DCF RECORD | Y | -Y | -Y | - |
| ENDED PARAGRAPH | Y | Y | -Y | - |
| UNINDENTED | Y | Y | -Y | - |
| ENDED PAGE | -N | -N | N | - |
| LAST WAS CRE | N | N | N | - |
| LAST WAS PE | N | N | N | - |
| ENDED WORD | Y | Y | -Y | - |

FIG. 10

| L3 INPUT: ZICR | 1 | 2' | 2" | 3 | 4 |
|---|---|---|---|---|---|
| **PRIOR STATE:** | | | | | |
| ENDED DCF RECORD | N | -Y | -Y | -Y | Y |
| ENDED PARAGRAPH | -N | N | N | Y | N |
| UNINDENTED | -N | -N | -N | - | - |
| ENDED PAGE | -N | -N | -N | - | - |
| LAST WAS CRE | -N | Y | -N | - | N |
| LAST WAS PE | -N | -N | Y | - | N |
| ENDED WORD | - | - | -Y | -Y | - |
| **DCF OUTPUT:** | | | | | |
| EOR (END OF RECORD) | 1 | - | - | - | - |
| ONE SPACE + EOR | - | - | - | - | - |
| .BR + EOR | - | 1 | 1 | - | - |
| .IN 0 + EOR | - | - | - | - | - |
| .PA + EOR | - | - | - | - | - |
| PE BYTE | - | - | - | - | - |
| **NEXT STATE:** | | | | | |
| ENDED DCF RECORD | Y | -Y | -Y | -Y | -Y |
| ENDED PARAGRAPH | -N | Y | Y | -Y | -N |
| UNINDENTED | -N | -N | -N | - | - |
| ENDED PAGE | -N | -N | -N | N | N |
| LAST WAS CRE | -N | N | N | - | -N |
| LAST WAS PE | -N | -N | N | - | -N |
| ENDED WORD | Y | Y | -Y | -Y | -Y |

FIG. 12

NOTE: Transformation does not depend on the prior state's LAST WAS CRE or LAST WAS PE or ENDED WORD. The next state always resets LAST WAS CRE, resets last was PE, and sets ENDED WORD. Hence, for clarity, these states are not shown.

| L3 INPUT: PE | | | | |
|---|---|---|---|---|
| | 1 | 2 | 3 | 4 |
| PRIOR STATE: | | | | |
| ENDED DCF RECORD | - | - | - | - |
| ENDED PARAGRDAPH | - | - | - | - |
| UNINTENDED | - | - | - | - |
| ENDED PAGE | - | - | - | - |
| LAST WAS CRE | - | - | - | - |
| LAST WAS PE | - | - | - | - |
| ENDED WORD | - | - | - | - |
| DCF OUTPUT: | | | | |
| EOR (END OF RECORD) | - | - | - | - |
| ONE SPACE + EOR | - | - | - | - |
| .BR + EOR | - | - | - | - |
| .IN 0 + EOR | - | - | - | - |
| .PA + EOR | - | - | - | - |
| PE BYTE | 1 | - | - | - |
| NEXT STATE: | | | | |
| ENDED DCF RECORD | - | - | - | - |
| ENDED PARAGRAPH | - | - | - | - |
| UNINDENTED | - | - | - | - |
| ENDED PAGE | - | - | - | - |
| LAST WAS CRE | - | - | - | - |
| LAST WAS PE | Y | - | - | - |
| ENDED WORD | Y | - | - | - |

FIG. 14

| L3 INPUT: RPE | | | | |
|---|---|---|---|---|
| | 1 | 2 | 3 | 4 |
| PRIOR STATE: | | | | |
| ENDED DCF RECORD | N | Y | -Y | - |
| ENDED PARAGRAPH | -N | - | -Y | - |
| UNINDENTED | -N | N | Y | - |
| ENDED PAGE | -N | -N | - | - |
| LAST WAS CRE | -N | - | - | - |
| LAST WAS PE | -N | - | - | - |
| ENDED WORD | - | - | - | - |
| DCF OUTPUT: | | | | |
| EOR (END OF RECORD) | 1 | - | - | - |
| ONE SPACE + EOR | - | - | - | - |
| .BR + EOR | - | - | - | - |
| .IN 0 + EOR | 2 | 1 | - | - |
| .PA + EOR | 3 | 2 | 1 | - |
| PE BYTE | - | - | - | - |
| NEXT STATE: | | | | |
| ENDED DCF RECORD | Y | -Y | -Y | - |
| ENDED PARAGRAPH | Y | Y | -Y | - |
| UNINDENTED | Y | Y | -Y | - |
| ENDED PAGE | Y | Y | Y | - |
| LAST WAS CRE | N | N | N | - |
| LAST WAS PE | N | N | N | - |
| ENDED WORD | Y | Y | Y | - |

FIG. 15

NOTE: See Fig. 16

NOTE: See Fig. 16

NOTE: Transformation does not depend on the prior state's LAST WAS CRE or LAST WAS PE or ENDED WORD. The next state always resets LAST WAS CRE, resets last was PE, and sets ENDED WORD. Hence, for clarity, these states are not shown.

| L3 INPUT: LFC or RMLF | | | | |
|---|---|---|---|---|
| | 1 | 2 | 3 | 4 |
| PRIOR STATE: | | | | |
| ENDED DCF RECORD | N | Y | -Y | - |
| ENDED PARAGRDAPH | -N | - | -Y | - |
| UNINTENDED | -N | N | Y | - |
| ENDED PAGE | -N | -N | - | - |
| LAST WAS CRE | -N | - | - | - |
| LAST WAS PE | -N | - | - | - |
| ENDED WORD | - | - | -Y | - |
| DCF OUTPUT: | | | | |
| EOR (END OF RECORD) | 1 | - | - | - |
| ONE SPACE + EOR | - | - | - | - |
| .BR + EOR | - | - | - | - |
| .IN 0 + EOR | 2 | 1 | - | - |
| .PA + EOR | - | - | - | - |
| PE BYTE | - | - | - | - |
| OTHERS REQUIRED | 3 | 2 | 1 | - |
| NEXT STATE: | | | | |
| ENDED DCF RECORD | Y | -Y | -Y | - |
| ENDED PARAGRAPH | Y | Y | -Y | - |
| UNINDENTED | Y | Y | -Y | - |
| ENDED PAGE | N | N | N | - |
| LAST WAS CRE | N | N | N | - |
| LAST WAS PE | N | N | N | - |
| ENDED WORD | Y | Y | -Y | - |

FIG. 17

NOTE: Transformation does not depend on the prior state's LAST WAS CRE or LAST WAS PE or ENDED WORD. The next state always resets LAST WAS CRE, resets last was PE, and sets ENDED WORD. Hence, for clarity, these states are not shown.

| L3 INPUT: RSP, UBS, NBS, OR BS | | | | |
|---|---|---|---|---|
| | 1' | 1" | 2' | 2" |
| PRIOR STATE: | | | | |
| ENDED DCF RECORD | -Y | -N | - | -Y |
| ENDED PARAGRAPH | N | N | N | Y |
| UNINDENTED | -N | -N | -N | - |
| ENDED PAGE | -N | -N | -N | - |
| LAST WAS CRE | Y | -N | N | - |
| LAST WAS PE | -N | Y | N | - |
| ENDED WORD | - | - | - | - |
| DCF OUTPUT: | | | | |
| EOR (END OF RECORD) | - | - | - | - |
| ONE SPACE + EOR | - | - | - | - |
| .BR + EOR | 1 | 1 | - | - |
| .IN 0 + EOR | - | - | - | - |
| .PA + EOR | - | - | - | - |
| PE BYTE | - | - | - | - |
| UNIQUE CHARACTER | 2 | 2 | 1 | 1 |
| NEXT STATE: | | | | |
| ENDED DCF RECORD | N | N | N | N |
| ENDED PARAGRAPH | N | N | N | N |
| UNINDENTED | -N | -N | N | N |
| ENDED PAGE | -N | -N | N | N |
| LAST WAS CRE | N | N | N | N |
| LAST WAS PE | N | N | N | N |
| ENDED WORD | N | N | N | N |

FIG. 19

| L3 INPUT: APM, AAM, TUFC, AND RTMF | | | | |
|---|---|---|---|---|
| | 1 | 2 | 3 | 4 |
| PRIOR STATE: | | | | |
| ENDED DCF RECORD | -Y | -Y | -Y | - |
| ENDED PARAGRAPH | - | -Y | -Y | - |
| UNINDENTED | N | Y | -Y | - |
| ENDED PAGE | -N | N | Y | - |
| LAST WAS CRE | -N | - | -N | - |
| LAST WAS PE | - | - | - | - |
| ENDED WORD | -Y | -Y | -Y | - |
| DCF OUTPUT: | | | | |
| EOR (END OF RECORD) | - | - | - | - |
| ONE SPACE + EOR | - | - | - | - |
| .BR + EOR | - | - | - | - |
| .IN 0 + EOR | 1 | - | - | - |
| .PA + EOR | 2 | 1 | - | - |
| PE BYTE | - | - | - | - |
| NEXT STATE: | | | | |
| ENDED DCF RECORD | -Y | -Y | -Y | - |
| ENDED PARAGRAPH | Y | -Y | -Y | - |
| UNINDENTED | Y | Y | -Y | - |
| ENDED PAGE | Y | Y | -Y | - |
| LAST WAS CRE | N | N | -N | - |
| LAST WAS PE | - | - | - | - |
| ENDED WORD | -Y | -Y | -Y | - |

FIG. 21

NOTE: Transformation does not depend on the prior state's LAST WAS CRE or LAST WAS PE or ENDED WORD. The next state always resets LAST WAS CRE, resets last was PE, and sets ENDED WORD. Hence, for clarity, these states are not shown.

| STATE AT END OF MARGIN TEXT DEFINITION | |
|---|---|
| ENDED DCF RECORD | Y |
| ENDED PARAGRAPH | Y |
| UNINDENTED | Y |
| ENDED PAGE | * |
| LAST WAS CRE | N |
| LAST WAS PE | * |
| ENDED WORD | Y |

*SET TO STATE EXISTING BEFORE MARGIN TEST DEFINITION

FIG. 23

| L3 INPUT: ATF | | | | | |
|---|---|---|---|---|---|
| | 1 | 2 | 3' | 3" | 4 |
| PRIOR STATE: | | | | | |
| ALL-BLANK RECORD | Y | -Y | -Y | -Y | N |
| ENDED DCF RECORD | N | Y | -Y | -Y | -N |
| ENDED PARAGRAPH | -N | - | N | N | -N |
| UNINDENTED | -N | - | -N | -N | -N |
| ENDED PAGE | -N | - | -N | -N | -N |
| LAST WAS CRE | -N | N | Y | -N | -N |
| LAST WAS PE | -N | N | -N | Y | -N |
| ENDED WORD | - | - | - | - | - |
| DCF OUTPUT: | | | | | |
| ERASE RECORD SO FAR | 1 | - | - | - | - |
| .CE | 2 | - | - | - | 2 |
| EOR (END OF RECORD) | - | - | - | - | 1 |
| ONE SPACE + EOR | - | - | - | - | - |
| .BR + EOR | - | - | 1 | 1 | - |
| .IN 0 + EOR | - | - | - | - | - |
| .PA + EOR | - | - | - | - | - |
| PE BYTE | - | - | - | - | - |
| NEXT STATE: | | | | | |
| ERROR WARNING | - | Y | Y | Y | Y |
| ENDED DCF RECORD | -N | -Y | -Y | -Y | -N |
| ENDED PARAGRAPH | -N | - | Y | Y | -N |
| UNINDENTED | -N | - | - | - | -N |
| ENDED PAGE | -N | -N | -N | N | -N |
| LAST WAS CRE | -N | -N | N | N | -N |
| LAST WAS PE | -N | -N | N | N | -N |
| ENDED WORD | Y | Y | Y | Y | Y |

FIG. 24

METHODOLOGY FOR TRANSFORMING A FIRST EDITABLE DOCUMENT FORM PREPARED BY AN INTERACTIVE TEXT PROCESSING SYSTEM TO A SECOND EDITABLE DOCUMENT FORM USABLE BY AN INTERACTIVE OR BATCH TEXT PROCESSING SYSTEM

BACKGROUND OF THE INVENTION

1. Field of the Invention

This invention is concerned with a methodology for transforming editable documents cast in a first form by and for use in an interactive text processing system into a second editable form for use in and by another text processing system, either of the interactive or batch type, in which said first form is otherwise incompatible. More particularly, this invention is directed to achieving the requisite transformation between dissimilar forms of an editable document by utilizing methodology that effects the transform of an input item from the interactive source form to an explicit set of output items for the editable target document form based on suitably selected state variables representing conditions of the source document form at the point of transformation.

2. Description of the Prior Art

Several different forms are known and commonly used for representing editable or revisable documents in information handling systems. Some examples are OIIA L3 used by Displaywriter and 5520 Systems, a form often called "Two-Baker" used by 3790 and DOSF/DPCX/8100, and the DCF input form used by Document Composition Facility and Professional Office System. Displaywriter is a word processor, capable of and primarily intended for stand-alone operation, manufactured and sold by International Business Machines Corporation (IBM Corporation). It is a type of text processor commonly known as a "what you see is what you get" or interactive system. The 5520 is a shared logic, multi-station text processing and office communication system that is also sold by IBM Corporation. The 3790, classifiable as a minicomputer, is an intelligent text processing system. The 8100, which is also classifiable as a minicomputer, is adapted using DOSF, a text processing package, and DPCX, a special operating system, as a text processing system. Both the 3790 and 8100 are manufactured and sold by IBM Corporation. Document Composition Facility (DCF) or SCRIPT/VS is a text processing program product sold by IBM Corporation. The Professional Office System or PROFS is a menu driven program product sold by IBM Corporation that is designed and particularly suitable for handling and managing a wide spectrum of office related tasks. It includes text processing capabilities that utilize the DCF form of editable text representation. In this type of text processing system, the operator imbeds textual matter in the document that is subsequently interpreted as one or more formatting commands and is retained in the editable document form as textual matter. This document form, when subsequently interpreted, is formatted as a whole document or batch processed.

These are several of the available text processing systems from IBM Corporation that can be employed to create, manipulate and format editable documents. There are also many other fine text processing systems and software support therefor available from other suppliers. Due to the overwhelming number of text processing systems now available, it is not uncommon to have a diverse mix of different text processors at any particular installation. However, due to incompatibility in and between the editable documents produced by the various text processing systems, it has been extremely difficult to provide a document form transformation capability for different people who need to cooperate in creating and editing a given document. Further, that need contemplates that each party involved in editing the document be provided with several opportunities to do so. This need cannot be efficiently or effectively supported in an operating environment that uses text processors having impenetrable system boundaries.

There are obvious and important benefits to be derived from transforming documents generated in a known form by a first text processing system, into another form that is useable and fully editable on a different text processing system. Without such transformation capability, documents prepared on any one of the known systems are meaningless to and unmodifiable by users of other systems. However, the provision of a transformation capability is not a straightforward or simple endeavor. It will be understood by those having skill in this art that the required transformation facility necessary to permit a first form document to be converted into a second form document that can be edited on a different and otherwise incompatible text processing system involves more than just a mere one-for-one replacement or substitution formula.

One known prior art example of a transformation methodology is provided by the Document Interchange Facility or DIF. This IBM Corporation program product is provided to convert "Two-Baker" form editable files into DCF form files by using uniquely defined SCRIPT macros. These macros essentially invoke a block of information for each of the "Two-Baker" commands encountered, but the substituted material is not an equivalent DCF command. While it does permit a final formatted version of the original "Two-Baker" document to be produced by a DCF based text processing system using the translated file containing these macros, this DIF converted data stream cannot be easily edited or effectively manipulated because that data stream is atypical, it is not a normal DCF file. This approach permits the formatting of a document cast in a first editable form in a text processor designed for documents of a second form, but does not allow for editing of the "transformed" document at any point prior thereto.

OBJECTS AND SUMMARY OF THE INVENTION

Accordingly, it is a principal object of the present invention to provide a methodology for transforming a document cast in a source editable form by an interactive text processing system, which form is suitable for editing or formatting only in said interactive text processing system, into another editable or target form that is fully suitable for editing and formatting in any other type of targeted text processing system.

It is also a principal object of the present invention to provide such a methodology wherein said transformation is transparent to the users of said text processing systems and does not require their intervention to effect the transformation.

It is another object of the present invention to provide methods of transforming a data stream from one document form to another in a quick and efficient manner that does not unnecessarily tie up system resources.

It is yet another object of the present invention to provide such methods wherein the second document form produced by said transformation is explicit and clear, having no impediments to editability thereof by a user of said targeted text processing system.

These and other objects of the present invention are achieved by a methodology of transformation wherein a fixed number of key state variables are identified. These key state variables refer to and collectively identify the status of a source document as represented by its data stream at any given point in the transformation process. The actual number of possible states or key variable combinations is then determined. Thereafter, for each possible state and for each possible source input item, an explicit set of output items and the next state is defined. It will also be necessary to determine, at some point, the actual state that exists at the start of each source document prior to enabling transformation. Finally, if appropriate, the handling of sub-documents, such as margin text, is specified for transformation purposes including, but not limited to the pre-sub-document text variable information to be preserved for use after its transformation has taken place.

BRIEF DESCRIPTION OF THE DRAWINGS

The invention will be described further, by way of a preferred example thereof, with reference to the accompanying drawings wherein like reference numerals have been used in the several views to depict like elements, in which:

FIG. 1 depicts a generalized decision table showing a tabulated summary of the transformation resulting from the presence of a particular input item in a first editable document form, as said transformation is made to a second such form pursuant to a set of rules therefor, set out in the table's columns, all in accordance with the methodology of the present invention;

FIG. 4 illustrates a table showing a tabulated summary of the states of several key state variables which are utilized in concert to define the necessary state information that is then employed to effect transformation from a first form of an editable document to a second form and independent editable form, showing initial values and values after a word delimiter (WD) and after a non-word delimiter (NWD), all in accordance with the methodology of the present invention;

FIGS. 5 and 6 show, in tabular form, the various implications and relations arising out of the presence and role of the FIG. 4 state variables;

FIG. 10 illustrates a decision table showing a tabulated summary of the transformation resulting from the presence of the RCR or IRT input items in the first editable document form, as said transformation is made to a second form of an editable document, pursuant to the set of rules in the table's columns;

FIG. 12 illustrates a decision table showing a tabulated summary of the transformation resulting from the presence of the ZICR input item in the first editable document form, as said transformation is made to a second form of an editable document, pursuant to the set of rules in the table's columns;

FIG. 14 illustrates a decision table showing a tabulated summary of the transformation resulting from the presence of the PE input item in the first editable document form, as said transformation is made to a second form of an editable document, pursuant to the set of rules in the table's columns;

FIG. 15 illustrates a decision table showing a tabulated summary of the transformation resulting from the presence of the RPE input item in the first editable document form, as said transformation is made to a second form of an editable document, pursuant to the set of rules in the table's columns;

FIG. 17 illustrates a decision table showing a tabulated summary of the transformation resulting from the presence of the LFC or RMLF input items in the first editable document form, as said transformation is made to a second form of an editable document, pursuant to the set of rules in the table's columns;

FIG. 19 illustrates a decision table showing a tabulated summary of the transformation resulting from the presence of the RSP, UBS, NBS or BS input items in the first editable document form, as said transformation is made to a second form of an editable document, pursuant to the set of rules in the table's columns;

FIG. 21 illustrates a decision table showing a tabulated summary of the transformation resulting from the presence of the APM, AAM, TUFC or RTMF input items in the first editable document form, as said transformation is made to a second form of an editable document, pursuant to the set of rules in the table's columns;

FIG. 23 sets forth a table showing a tabulated summary of certain state variables at the conclusion of margin text definition;

FIG. 24 illustrates a decision table showing a tabulated summary of the transformation resulting from the presence of the ATF input item in the first editable document form, as said transformation is made to a second form of an editable document, pursuant to the set of rules in the table's columns.

DESCRIPTION OF THE PREFERRED EMBODIMENT

Figure 2:
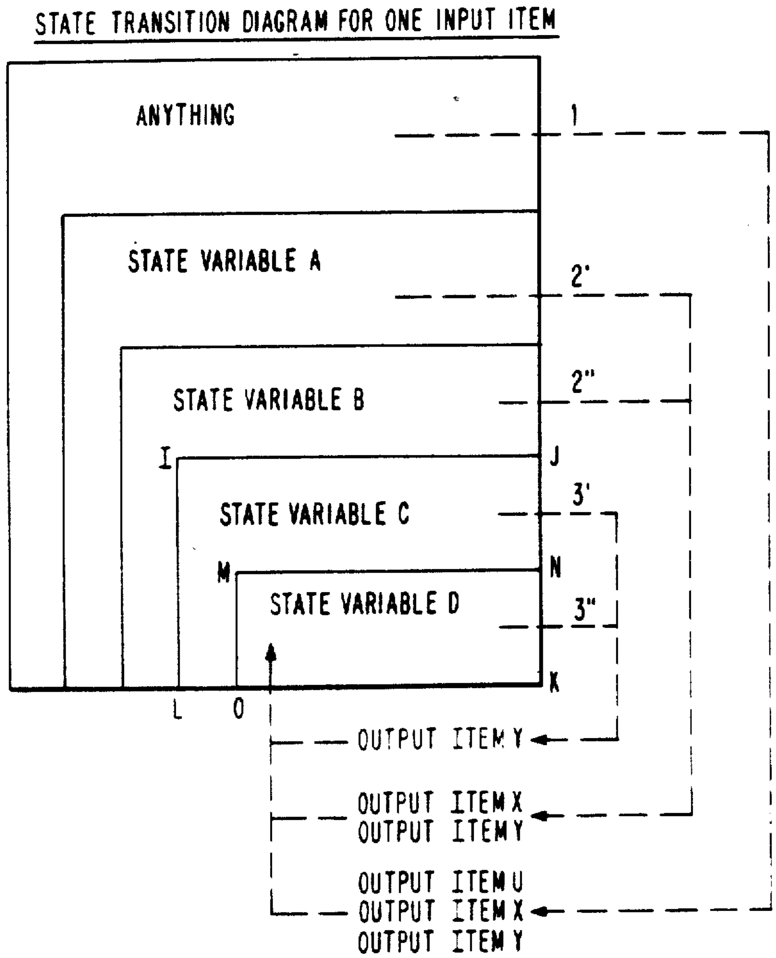
FIG. 2 schematically illustrates a generalized representation of the table shown in FIG. 1 and constitutes a state transition diagram for the input item summarized therein.

As used herein, the term "transform mechanism" refers to a collection of software and hardware which in its entirety represents a state machine that takes its input from a source document form and transforms that input in accordance with predefined state transition diagrams and tables into an explicit target document form. Both the source and target document forms are fully editable, although incompatible, hence the need for transformation. In addition, the phrases "editable document form", "DCF document form", "L3 document form" and "document data stream" are all intended to be and are used herein as equivalent descriptors for the editable version of a particular document, in the indicated form, as it exists on a user's disk or diskette or in transfer between two text processing systems.

As previously noted, there are several different and incompatible forms used in which an editable document can be represented. However, due to inherent disparities between forms, it is impossible to readily move editable document data streams from one text processor to another for editing purposes although the advantages to be gleaned thereby would be significant. The typical mix of incompatible text processing systems, in even a modest installation and the investment they represent, renders such a capability important. It would be particularly advantageous to be able to move a document from a first text processing system to a second and back again, or even to a third or fourth type text processor, as many times as would be needed, to effect creation and complete editing of the document, without concern for the incompatibility of the respective document forms.

The generalized aspects of the methodology utilized to achieve such benefits and advantages in accordance with the present invention contemplates that each input item, such as a text character or a formatting control, from the source document form be transformed into one or more output items based on both the nature of the input item itself and on the "state" of the transform mechanism that exist when the input item is encountered therein. The methodology used additionally changes the state of the transform mechanism to a new state as a result of each input item encountered, depending also on the state that existed when a particular input item was transformed. One particular application of the present invention relies on selecting a sufficient set of state variables to represent the state of the source document at any point; i.e., before any input item in the document. The transformation of each input item must depend on nothing other than the identity of that item and the values of these state variables at the time the input item is encountered. Moreover, there must be a uniquely defined value for each of these state variables after each input item is transformed into one or more output items. This method allows a transform to be described by one decision table for each input item. In addition, each decision table can correspond to a state transition diagram, which represents the same information in a form that is easier to check for correctness. This concept of selecting only a few key variables from amongst the many available makes the entire methodology tenable. Without that strategy, a transform mechanism would have to keep track of all preceding characters in the data stream, an awesome task.

The general layout of a decision table and a state transition diagram suitable for use with the disclosed methodology is illustrated in FIGS. 1 and 2. As shown therein, it is possible to describe the transformation of a given input item into one, two, or three output items, the number and nature of output items depending on the values of the state variables when the input item is encountered. In the example decision table of FIG. 1, each of the numbered columns is a "rule". A rule is "satisfied" if the values of the state variables match the letters in the "prior state" portion of the table; i.e., if each variable having a letter "Y" associated therewith is true and each variable having a letter "N" associated therewith is false. A variable having the symbol "-" (a dash) associated therewith in the proper column may be either true or false. This does not affect satisfaction of the column rule in which this symbol appears. The rest of the decision table indicates what is to be done when a given rule is satisfied; i.e., what output items are to be written (in the order given by the numerals 1, 2, 3, etc.) and which state variables to set (Y) or reset (N).

In the state transition diagram shown in FIG. 2, a given state variable is true inside its own rectangle and false outside that rectangle. For example, STATE VARIABLE C, defined by the rectangle IJKL, is true whenever STATE VARIABLE D, defined by rectangle KOMN, is true. However, the converse is not always true since C may be true outside of rectangle KOMN, where D is not. Further, exiting from the rectangle defining any one of the given variables requires the implemented system to follow the indicated transformation paths. For example, the path from STATE VARIABLE A takes one, via rule or condition 2' through the transform yielding output items X and Y to STATE VARIABLE D. This means that the presence of a given input item in a first editable form of a document, given that A is true, that B, C and D are false, and that condition 2' is followed, leads to an explicit transformation and another specific state.

In the state transition diagram of FIG. 2, each possible transformation of the given input item is represented by a cuneiformed line. This line starts at a possible prior state, passes through a list of output items to be written to the target form when the given input item is encountered in that state, and ends at the required next state. By use of the disclosed transformation method, the main part of a transformation can be described in a decision table and/or a state transition diagram for each input item. In practice, the transformations are so complicated that both forms of description are necessary to understand the transformation well enough to check it, even though the decision table alone is sufficient for a programmer to program the transformation.

This method has been applied successfully to the transformation of an editable document from OIIA L3 form to DCF form. The present invention shall therefore be described herein using both the general and related specific aspects of this transformation as an explanatory vehicle. OIIA L3, or Office Information Interchange Architecture Level 3, and IBM Corporation designation, is one document data stream form previously mentioned. It shall hereinafter be referred to as L3. It is the form used in IBM Corporation's Displaywriter. DCF, or Document Composition Facility, another IBM Corporation designation, is another document data stream form that was also previously mentioned. This is the form used for representing editable documents using SCRIPT/VS, for example, in a VM environment on an IBM Corporation System 370 data processor. The actual state variables, decision tables and state transition diagrams for this particular transform are hereinafter separately described.

Figure 3:
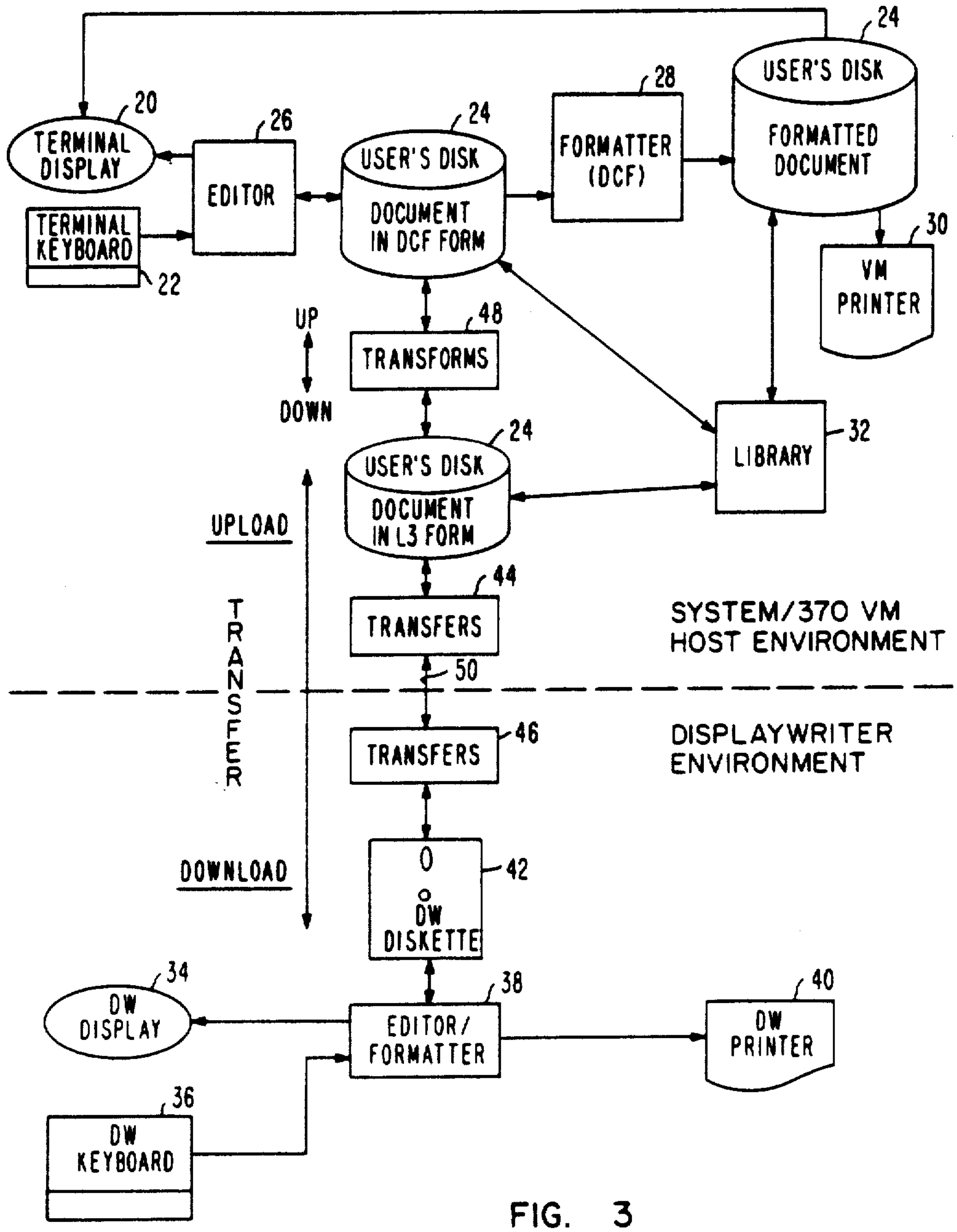
FIG. 3 schematically illustrates a simplified representation of a unified but separable configuration of two text processing systems adapted to transfer and then transform editable documents from one text processing system to the other in accordance with the subject invention.

One possible interconnection arrangement that can be used to couple a host processor, a System/370 operating in a VM environment, and a stand-alone Displaywriter (DW) is shown in FIG. 3. In the typical situation, a principal is provided with a terminal 20, which includes a keyboard 22, both of which are coupled, as shown, to the host processor. In this example environment, the principal is also provided with other system capabilities, such as a disk 24, an editor 26 and, in this instance, a DCF (SCRIPT/VS) based formatter 28. Hard copy can be produced by spooling files to the system printer 30. In addition, if the need arises, the principal can access the system library 32 and download any appropriate file therefrom to their user disk 24. The library 32 is also available to the principal for archival storage purposes. The principal would create or edit a document by interacting with terminal 20 and keyboard 22, using any additional tools as needed.

The secretary, on the other hand, employs a Displaywriter to create and edit textual matter or documents. DW provides its own display 34 and keyboard 36. It is very easy to use because you see on the display screen what you will get on the printer. A principal, on the other hand, is well served by the less expensive terminal 20, which is connected to the host data processing system. The principal has access to, among other host programs, the above-noted editor 26, DCF formatter 28 and other system supported premiums that can aid performance, such as PROFS (the Professional Office System). The L3 to DCF transform capability allows both secretaries and professionals to utilize their respective text processing and editing capabilities in a fully cooperative manner. It allows a professional to view and edit documents entered or edited by his or her secretary. A related DCF to L3 transform, which uses very different methods, and a facility for host control of the DW diskette files permits the secretary to view and edit documents entered or edited by the professional. In referring to the transfer of documents and the transformation of document files, UP will be used herein to indicate a transform from L3 to DCF and DOWN will be used to indicate a transform from DCF to L3. The term "upload" will be used to signify that the direction of information transfer is from DW to the host. The term "download" will be employed to signify that the direction of information transfer is from the host to DW. Further details of the DCF to L3 transform and the DW diskette control facility can be found respectively in commonly assigned and copending patent application by Agnew et al, U.S. patent application Ser. Nos. 442,927 and 442,817.

The L3 to DCF transform is a difficult one because the two forms for representing an editable document are very different. While both forms represent letters, numbers, and symbols, in similar ways, although with some differences in code points, they also represent information about how these characters are to be formatted for printing on a page. However, the manner in these two forms represent this formatting information differs in almost every possible respect. An L3 document, for example, encodes formatting information into approximately 200 different kinds of items, where an item is a first level structure, a second level structure, a parameter of one of these structures, a multi-byte control, a parameter of a multi-byte control, or a single byte control. One specific example of an item is the single-byte control equal to hexadecimal '3A' which is a Required Page End or RPE. This control tells the DW formatter to end a paragraph, to end indentation, and to put following text on the next page. A DCF document can contain about 120 different types of formatting controls. One such is ".PA" which tells the DCF formatter to end a paragraph and to put following text on a new page. Note that an RPE can not be transformed into a .PA because that does not end indentation. This illustrates the general fact that none of the most important L3 items have direct transformations into DCF. In this case, the transformation requires the simple addition of another DCF control ".IN 0" to end indentation. In most cases, the transformation of a given L3 item is much more complex because it depends strongly on what L3 items came before the given item.

It is technically impossible to define a separate transformation of each L3 item for each possible set of items that came before it. Suppose the transformation of an L3 item could depend only on the last 6 items and that there were only 20 different kinds of items, which is a gross oversimplification. The number of possibilities for even the last 6 items, where each item can be one of 20 different types, is 64,000,000. Defining a correct transformation for each of 20 types of item, for each of these possible prior states, is out of the question. An actual L3 document has far more than that number of possible states that can exist at the time each item is encountered and is to be transformed.

The transformation method disclosed here identifies seven binary state variables whose values, taken together, define the necessary state information for transforming the document. That is, the values of these seven state variables contain all of the information, about what has come before an L3 item, that is necessary to transform the item into one or more DCF controls, and to set the next state. This next state is the state used by the transform mechanism to transform the next input item. Identifying these seven variables reduces the number of possible states to only the number of possible states of the seven binary variables, namely 128. The method disclosed here further identifies relations among the seven binary variables, see FIG. 5. Existence of these relations reduces the number of possible states to 11. This fact is illustrated in FIG. 6. Thus, the state at the beginning of a document is one of these 11 and any L3 item that occurs in one of these 11 states creates one of these 11 states as "prior state" for the next L3 item. These relationships mean that the document can never reach the other 128 minus 11 or 117 states. Therefore, it is not necessary to specify how each L3 item would be transformed if it were encountered in any of the 117 impossible states.

The transformation of an L3 document into a DCF document is implemented by specifying the transformation that is to be applied to each L3 item in each of 11 states, and by specifying the state change that is to take place when each item is encountered in each of the possible 11 states. It must be emphasized that nothing in an L3 document itself necessarily identifies these state variables which were defined in an iterative fashion. Preliminary definitions had too few state variables and, hence, contained too little information about the prior state to allow transformation of some L3 items. Moreover, some unnecessary state variables were included at the start and had to be discarded later.

Each stage in the iterative definition proceeds as follows. A useful-looking set of variables was selected, based on knowledge of the syntax and semantics of the input form, L3, and the output form, DCF. Then, the initial values of the variables to be assumed at the start of every document were defined and relations among the selected variables were discovered. Finally, an attempt was made to define the output item or items to be produced as the transformation of each L3 item occurring in each possible state and to also define the new state to be produced in each such case. When this proved impossible, another selection of state variables was made and the iteration was repeated until a completeable design was found.

The seven binary variables that define the state of an L3 document at any point, are set forth in the table shown in FIG. 4, along with their values at the start of any document (INIT.), after any word delimiter character (W.D.), and after any non-word delimiter character (N.W.D.). The relations among these variables take the form of implications. A value for one variable (yes or no) implies values of some other variables. The implications are given in the FIG. 5 table, wherein a value preceded by a dash is implied by another value, shown without a dash, in the same column. The eleven states that are possible in the light of the above relations are represented by the eleven columns in the table depicted in FIG. 6. The same information is contained in the overlapping of the rectangles in the state diagram illustrated in FIG. 7. One overlap represents an impossible twelfth state. It is indicated by the crosshatched section 50. The numbers in the other overlaps correspond to column numbers in the above table. The state variables and relations disclosed herein, as previously noted, have been used to define the transformation from an L3 document to a DCF document. This transformation is described below and illustrated in the accompanying decision tables and state transition diagrams, which together constitute a preferred embodiment of the present invention.

A Carrier REturn or CRE moves the current position of the next printable character to be printed in the formatted document down one line and leftward to the temporary left margin. For condition 1, when CRE is not present after a line ender, an indication that the end of a line in the document to be formatted has been reached, the DCF output file is not at the start of a record. The DCF output that UP writes in response to a CRE in this case consists entirely of an End Of Record or EOR, that is, UP ends the current DCF record. Since this CRE is not after a line ender, it is not after a CRE or a PE and therefore does not end a paragraph.

In the event of condition 2, when CRE is present after a line ender, the DCF output file is at the start of a new record. When that occurs, a CRE always causes a blank line; i.e., a DCF record containing one space character. This blank line is an implied paragraph ender or PE in DCF, whether or not this CRE followed a previously encountered CRE. Therefore, astonishingly, it is not necessary to use the LAST WAS CRE state bit in this case to determine whether to end a paragraph, even though the rule that "a CRE that follows another CRE ends a paragraph" is an important true statement about L3. A CRE after any line ender ends a paragraph. Each PE follows a line ender, so this applies to the PE+CRE case as well.

Figures 7, 8:
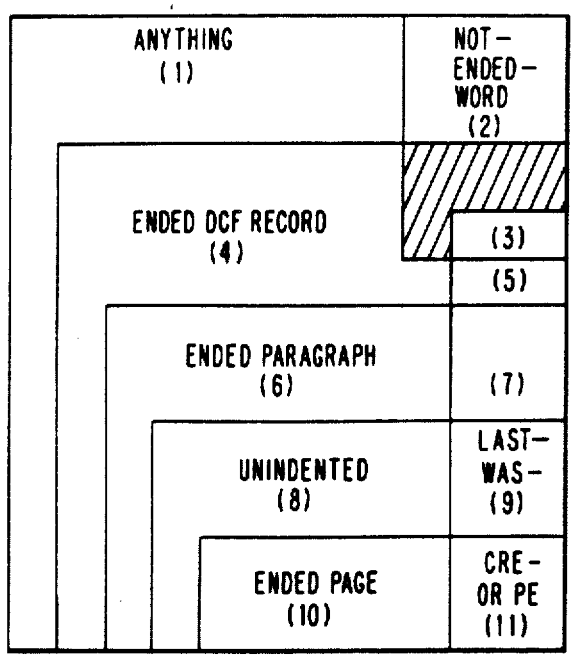
FIG. 7 schematically illustrates a state transition diagram for the tables shown in FIGS. 5 and 6.
FIG. 8 illustrates a decision table showing a tabulated summary of the transformation resulting from the presence of the CRE input item in the first editable document form, as said transformation is made to a second form of an editable document, pursuant to the set of rules in the table's columns.
Figure 9:
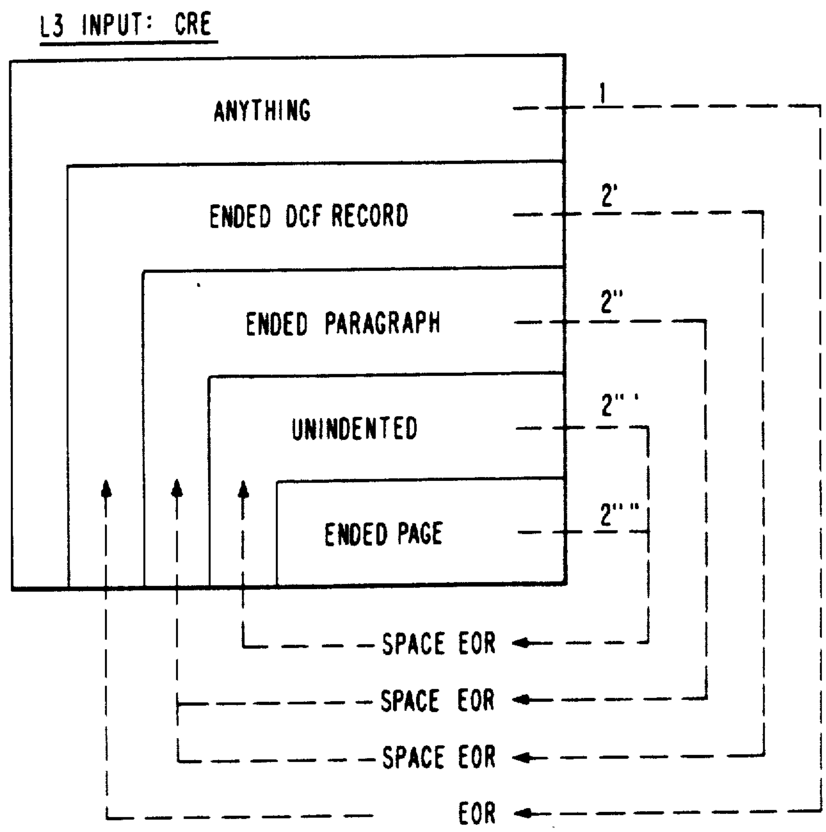
FIG. 9 schematically depicts the transformation that is described in the table shown in FIG. 8 and constitutes a state transition diagram for the CRE input item summarized therein.

A CRE resets ENDED PAGE. This is because appearance of anything except Page End in a Body Text vector, even a CRE, means that we are no longer immediately after a Required Page End. For example, the purpose of ENDED PAGE is to prevent the APM in the L3 sequence " . . . RPE PE TUP APM . . . " from generating a second .Pa control, a new page, and thereby producing the error of a blank page. However, the L3 sequence " . . . RPE CRE PE TUP APM . . . " has a BLANK line after the RPE. Paginating on DW would put a PE between the RPE and the CRE. That would yield a blank page on a DW printer. Therefore, the correct transform of the L3 sequence " . . . RPE CRE PE TUP APM . . . " has two .PA controls. The APM must imply that the last Text Unit meant to end with a RPE, whether it had one explicitly or not. This, the transformation of the APM must include a .PA control. This is assured if CRE resets the ENDED PAGE status bit. In fact, any of the controls whose algorithms follow, with the exception of ENDED PAGE, must reset the ENDED PAGE state bit for the same reason. The decision table for the L3 input CRE is shown in FIG. 8. The state diagram for this decision table is illustrated in FIG. 9.

Figure 11:
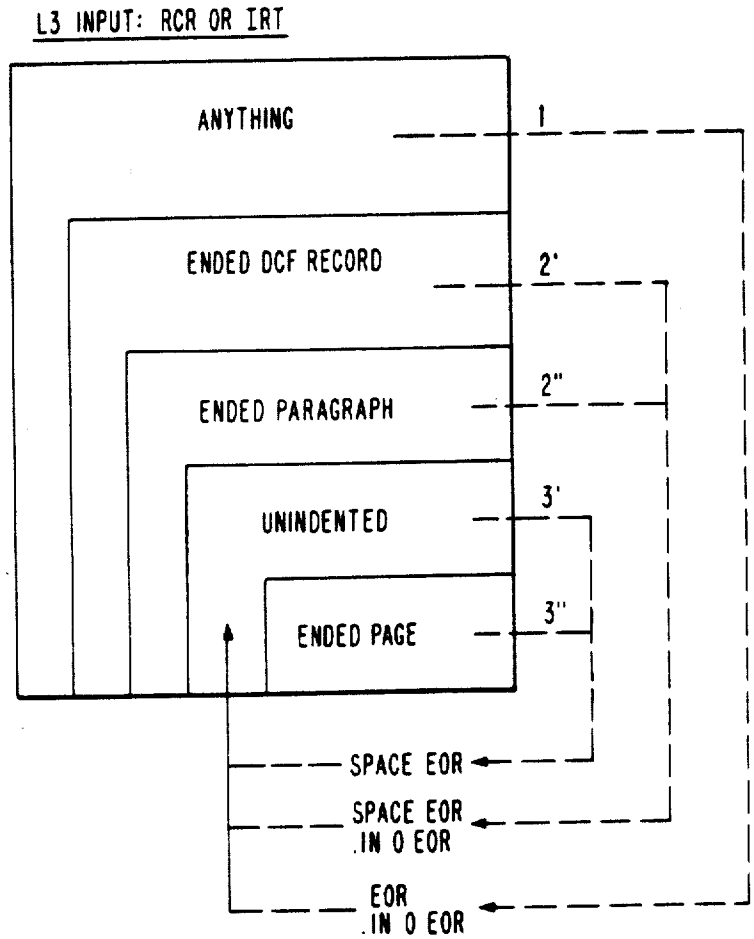
FIG. 11 schematically depicts the transformation that is described in the table shown in FIG. 10 and constitutes a state transition diagram for the RCR or IRT input items summarized therein.

Either Required Carrier Return (RCR) or Index ReTurn (IRT) moves down one line and then left to the permanent left margin. That is, it ends a line, causes an EOR in DCF, ends a paragraph, causes a break, and unindents, causes a .IN 0. If one or more of these are already done, RCR or IRT refrains from writing redundant or incorrect duplicate controls. If they come after a line ender, then they leave a blank line by inserting a space before the EOR. For condition 1, if RCR or IRT are not after a line ender, the transform must end the DCF record, must end the paragraph and unindent, because these would not have been done if a record had not been ended. In the case of condition 2', if RCR or IRT occur after another line ender but not after a paragraph ender, that transform must leave a blank line, end a paragraph, and unindent. For condition 2", the occurrence of RCR or IRT when a paragraph has been ended and hence after a line has been ended, but not after an unindent, the transform must leave a blank line and also unindent. Note that the .IN 0 control that unindents also ends a paragraph or causes a break. Hence, condition 2" cannot write any fewer DCF controls then condition 2' needs, and the same decision table rule can handle both of these cases. However, if RCR or IRT occurs after an unindent, the transform need only leave a blank line, whether or not RCR or IRT occur after a required page end. The decision table for the L3 inputs RCR or IRT is shown in FIG. 10. The state diagram for this decision table is illustrated in FIG. 11.

A Zero Index Carrier Return (ZICR) moves the current position straight left to the temporary left margin. This motion is supported in DCF if, and only if, the current position is already at the temporary left margin, in which case the ZICR causes no motion at all. For condition 1, if ZICR occurs other than at the end of a record, it is transformed by default, like a CRE, that is, by ending a DCF record. However, ZICR is not treated as a CRE so far as to let ZICR+ZICR end a paragraph. In instances of condition 2, the special cases of a ZICR following either a CRE or a PE, the transform causes a paragraph end without unindenting. This is supported for both cases. It is supported for the CRE+ZICR case because the CRE moves down and left and the ZICR therefore causes no further motion. It is supported for the PE+ZICR case because any PE must follow a valid single-byte line ending control, the PE does not move the current position, and therefore the ZICR does not move the current position. The pair of controls CRE+-ZICR or the pair of controls PE+ZICR transforms to .BR if the last paragraph has not already ended, in which case there will not have been an unindent. In this case, the transform sets ENDED PARAGRAPH and resets LAST WAS CRE or LAST WAS PE. It would be equally correct to leave LAST WAS CRE or LAST WAS PE set, because each of several ZICRs that happen to follow one of these can be thought of as ending a paragraph. This does not matter because the transform does not write redundant controls.

Figure 13:
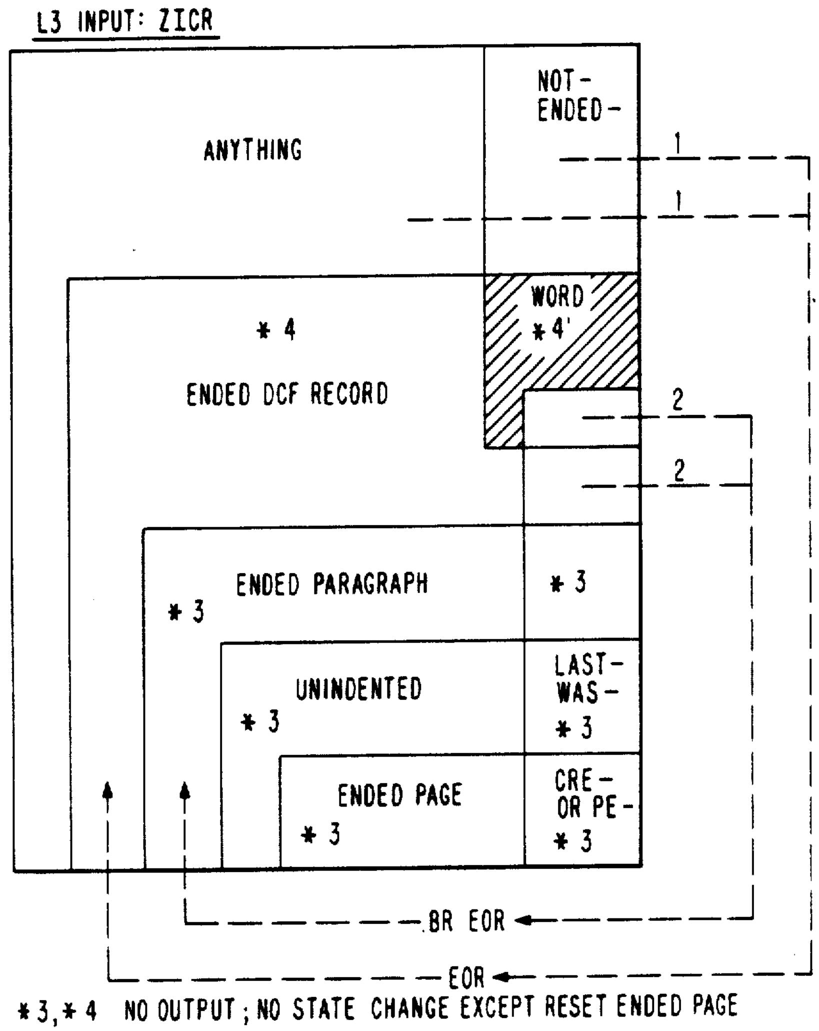
FIG. 13 schematically depicts the transformation that is described in the table shown in FIG. 12 and constitutes a state transition diagram for the ZICR input item summarized therein.

If ZICR occurs in any other situation, its only transformation is to reset ENDED PAGE. The other situations are as follows. Their completeness and consistency can be seen by noting that each region in the following state diagram is covered by one and only one rule number (colored pencils help) or by giving the decision table to an analysis program. The transform for condition 3 is responsive to the case where ZICR comes after the end of a paragraph. If this occurs, whether or not ZICR comes after a CRE, nothing is done except reset ENDED PAGE. For condition 4, if ZICR comes after a record has been ended, but the last L3 is not a CRE or PE, do nothing except reset ENDED PAGE. Note that the case consisting of ENDED RECORD, not LAST WAS CRE and NOT ENDED WORD is impossible. To see this, first note that NOT ENDED WORD implies not ENDED PARAGRAPH. The only things that end a record without also ending a paragraph are CRE and ZICR. A PE looks as if it can do this; but, in fact, a PE itself must follow a line ender. Hence, the only L3 code that gives ENDED DCF RECORD, not ENDED PARAGRAPH, and not LAST WAS CRE is ZICR. However, ZICR does end a word. Therefore, NOT ENDED WORD is impossible along with ENDED DCF RECORD, not ENDED PARAGRAPH, and not LAST WAS CRE. Thus, many of the state diagrams, the state diagram of FIG. 13 for example, contain a "P" shaped region that should be empty. It is labeled '*4' and is shown cross-hatched in the ZICR state diagram. If this region were not empty, then ZICR would need a rule for handling that case by setting ENDED WORD. Since it is empty, its treatment is a "don't care" condition and it can be allowed to go along with the rest of rule 4. That is, the lower right entry in the decision table can be "−Y" instead of "Y". This relation among state variables looks just slightly accidental, so the possibility of this region's being non-empty is left in the state diagrams. None of the other algorithms are sensitive to whether or not this region is empty. The ZICR decision table is depicted in FIG. 12.

The Page End (PE) single-byte control in L3, signals the end of a Text Unit and an optical end of a printed page. It is "optional" because, in general, the paginator can move PEs to move page boundaries. DW processes a PE as if it were a CRE, except that a PE never leaves a blank line, although a PE always follows a valid single-byte control line ender. In L3, a PE is always followed by the end of the current Body Text vector. Unless this is the last Body Text vector, a Text Unit Prefix comes next followed by zero or more format-changing structures which can transform to several DCF controls.

When the transform mechanism receives a PE, hex '0C', from the L3 data stream, it places a hex '0C' into the DCF data stream, so that any subsequent DOWN transform can preserve preexisting pagination. This transformation is independent of the initial state. UP does not end a record after the PE byte. Doing so would give the DCF formatter a null record. This is because the '0C' always goes at the start of a record, since the PE must follow a line ender in L3 and, in addition, because the DCF formatter ignores the 0C byte altogether, since an implicit .TS 0C // control is at the start of every document produced by UP.

Writing a PE byte into the DCF data stream begins a DCF record with a byte that the DCF formatter is told to ignore. The ENDED DCF RECORD state bit therefore need not be reset. If it had to be reset, then so would ENDED PARAGRAPH, UNINDENTED, and ENDED PAGE. In fact, RPE sets all of these. The PE that follows the RPE absolutely must not reset them. The new state remembers that the last item in L3 was a PE so that the first character in the next Text Unit's Body Text can begin a new paragraph if necessary. The new state also remembers that the PE ended a word. The inability to hyphenate a word across a physical page boundary helps both text readers and text processing programmers. A PE does not cause a .PA because it does not imply an author's requirements to start a new page. Therefore, PE does not set ENDED PAGE, which refers to a required page end. However, PE is the one thing in a Body Text vector that does not reset ENDED PAGE. In a paginated document, an RPE is always followed by a PE. Having PE rest ENDED PAGE would defeat the goal of remembering that a RPE was the last thing in a Body Text vector, so an AAM, for example, must not write out a .PA control. No state diagram is given for PE because a state diagram makes the transformation look must more complex than the decision table does. The decision table is illustrated in FIG. 14.

A Required Page End (RPE) signifies an author's intent to begin a new page. It also ends a record, ends a paragraph, and causes unindenting, if these are not already done. DW processes an RPE like an RCR except that an RPE does not normally cause a blank line, even after a line ender. UP transforms RPEs into DCF's .PA control to preserve author's intent, even though DW does not start a new page at an RPE unless the DW operator has requested pagination. The paginator puts a PE after each RPE, and the PE causes a new page.

The UP transformation depends on prior state only to determine which of the possible outputs would be redundant and are therefore not to be put into the DCF data stream. In particular, an RPE results in a .PA, even if the ENDED PAGE state bit is already set. This state bit is used to suppress generation of an erroneous, not just redundant .PA control, in response to APM or other structure that implies an RPE, but never generates a blank page. Several successive RPEs do express an author's intent to leave blank pages.

Figure 16:
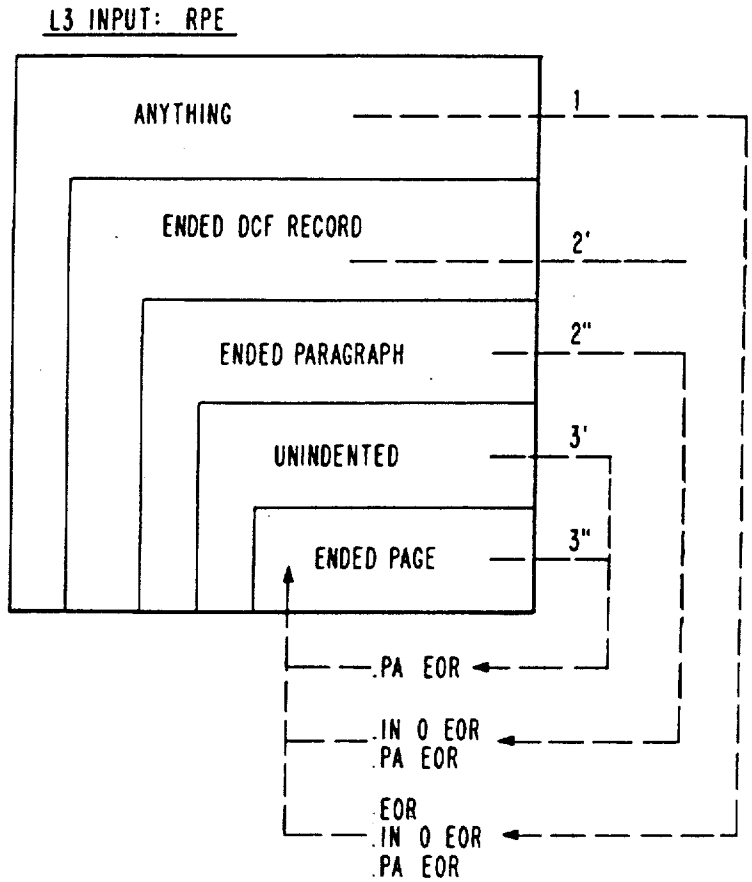
FIG. 16 schematically depicts the transformation that is described in the table shown in FIG. 15 and constitutes a state transition diagram for the RPE input item summarized therein.

Note that the L3 sequence "Line ending control, RPE, no PE" will cause a blank line in L3 but not in the transformed document produced by UP. This will occur only in an unpaginated L3 document and is not considered to be an error in transformation. The decision table for the L3 input RPE is shown in FIG. 15 and its related state diagram is illustrated in FIG. 16.

Either the Line Format Change (LFC) sequence of multi-byte controls, i.e., BLFC, SLP, STAB, and ELFC, or the Return to Master Line Format (RMLF) multi-byte control, should follow a line ender. In the UP transform, either of these L3 codes ends a DCF record, if it does not, for some reason, follow a line ender. It ends a paragraph, causes unindent, and ends a word, if any of these are necessary. However, the transform for LFC or RMLF never causes a blank line, even when it follows a line ender control.

Figure 18:
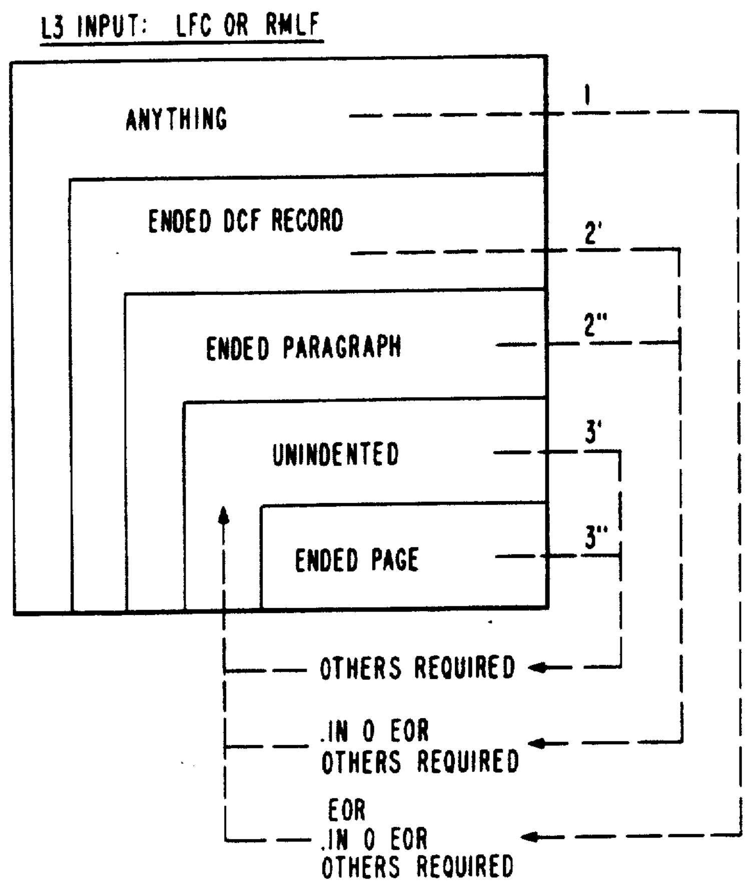
FIG. 18 schematically depicts the transformation that is described in the table shown in FIG. 17 and constitutes a state transition diagram for the LFC or RMLF input items summarized therein.

Note that the SLP and STAB multi-byte controls in a LFC sequence, or the RTMF itself, can cause generation of several DCF controls. The break control, unindent control, or end of record generated for the LFC or RTMF as a whole, precede these OTHERS REQUIRED, as shown in the decision table and state diagram of FIGS. 17 and 18, respectively.

A reasonable argument could be made for the idea that either LFC or RTMF could leave ENDED PAGE set, if either of these is the last code item in a Text Unit that otherwise ends with RPE and, if paginated, PE. However, this case makes no sense, because APM and the other structures that pay attention to ENDED PAGE all override the changes that an LFC or a RMLF makes. Hence, for simplicity, LFC and RTMF will reset the ENDED PAGE STATE BIT.

Any of the Required SPace, Unit BackSpace, Numeric BackSpace and BackSpace single byte-controls in L3 (RSP, UBS, NBS or BS) starts a new paragraph when it follows a CRE or a PE. Otherwise, it does not even cause a line end or a word end. This is very different from other paragraph delimiters. Any other paragraph delimiter ends the old paragraph. Any one of RSP, UBS, NBS, or BS, if it follows CRE or PE and if a paragraph has not just ended, begins a new paragraph.

The difference is that the next state produced by one of these has all of the state bits reset. After one of these L3 codes has been transformed into the output DCF data stream, we are not at the end of a DCF record, because this character is in the record, we are not at the end of a paragraph (instead, we are one character into the new paragraph), we are not necessarily unindented because a user is free to edit in an indentation here and we cannot be at the required end of a page. There is one unusual case that does occur here. A UBS is ignored by the DCF formatter. It is possible to generate a record containing just a UBS byte which will be treated as a null record.

UP transforms each of RSP, UBS, NBS, and BS into its corresponding character in DCF. That is, in DCF, the byte is equal to the single-byte control in L3. For condition 1, if one of these follows a CRE or a PE, but ENDED PARAGRAPH is not already set, then UP writes out a .BR control, ends that record, puts the corresponding character in the new record, and resets all of the state bits. For condition 2, if one of these follows neither a CRE nor a PE, or if ENDED PARAGRAPH is already set, then UP just writes the corresponding character and resets all of the state bits. The fact that UP can write the same simple output for conditions or rules 1 and 2 below, results from the following line of reasoning.

It should be noted that one of RSP, UBS, NBS, and BS that "follows" a PE may follow the PE at a considerable distance. Any PE ends a Text Unit (TU). The new TU may have an APM, TUFC, MT, MP, or other format-setter before its Body Text vector. Any format-setter always ends a line, ends a paragraph, unindents and, by implication, ends a page. Hence, the case where RSP, UBS, NBS, or BS follows a PE and yet ENDED PARAGRAPH is false, can occur only when the Text Unit's BT vector started without a format-setter. In this case, the DCF output is left with a record that contains only a PE byte.

A .TS 0C // control is implied at the start of any document UP generates. This control tells the DCF formatter to ignore a PE byte, hex'0C'. If UP wrote out an EOR and then a .BR, it would leave the DCF formatter with a record containing only the PE byte. The DCF formatter would treat that as a null record with undesirable results. At the start of a new Body Text vector, UP transforms graphic characters without first ending a record. It must, however, refrain from starting with an EOR for RLM, RSP, UBS, NBS, or BS, even though what it writes out first in response to the new Body Text vector is a control. The DCF formatter will recognize the control as a control because the DCF formatter ignores the PE byte that is in "column" one and sees the .BR as starting in "column" one.

Figure 20:
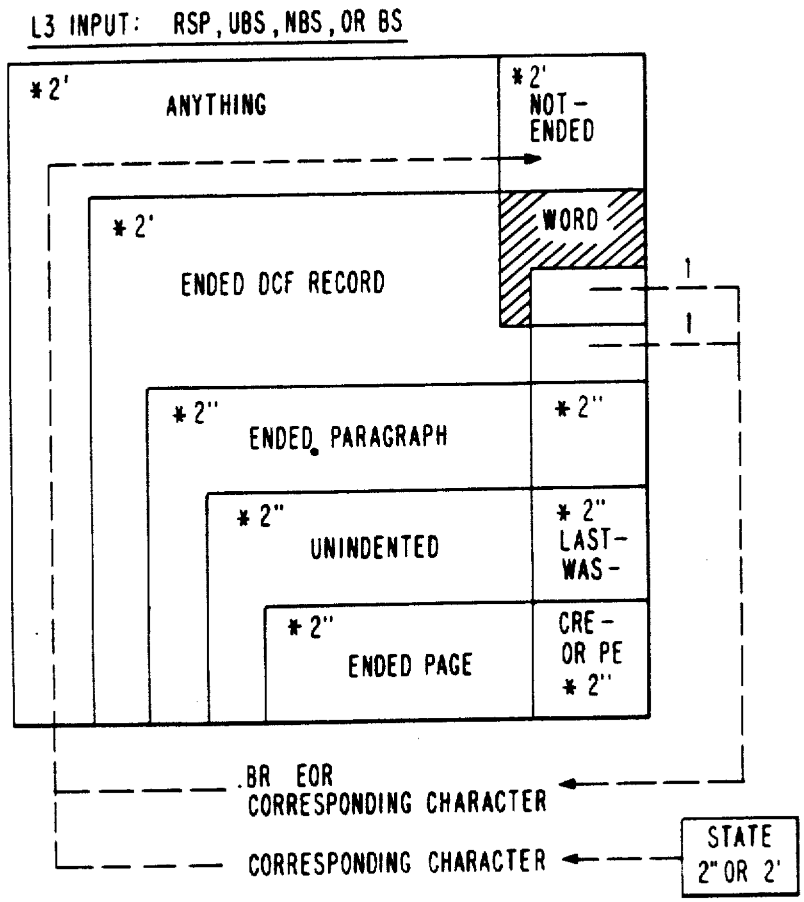
FIG. 20 schematically depicts the transformation that is described in the table shown in FIG. 19 and constitutes a state transition diagram for the RSP, UBS, NBS or BS input items summarized therein.

Any of several other codes in L3 also ends a paragraph when it follows a CRE or a PE, but does not require a special transformation. Any of IT, SP, HT, or NSP also ends a paragraph when it follows CRE or PE, but it needs no special transformation. An IT transforms into a .IN h control when the IT follows a CRE. Any of the others, transforms into a SPACE or a TAB in DCF, and a DCF record that starts with a SPACE or a TAB is treated as an automatic break. An ATF also ends a paragraph when it follows a CRE or a PE, but it has its own, albeit imperfect, transformation for this case. Either of CRE or ZICR also ends a paragraph when it follows a CRE or PE, but CRE and ZICR are delimiters in their own right and have separate algorithms. Release Left Margin (RLM) also ends a paragraph when it follows CRE or PE, but it can not be generated in DW. The decision table for L3 inputs RSP, UBS, NBS or BS are shown in FIG. 19. The related state diagram is depicted in FIG. 20.

Any of the first level structures Activate Primary Master (APM), i.e., use the PMF, Activate Alternate Master (AAM), i.e., use the AMF, Text Unit Format Change (TUFC), i.e., use format given in the structure itself, and Return To Master Format (RMF), i.e., use whichever of PMF and AMF was in use most recently, implies a Required Page End (RPE) in the preceding Text Unit, whether an RPE was actually there or not. If not, and if this is not the start of the document, then the UP transform has not already written a .PA control into the DCF data stream and UP must do so in response to this structure.

These structures can not occur in a Body Text vector. They must occur after a PE or at the start of a document. L3 architecture says that they end a paragraph when they follow a PE. This is uninteresting because requiring a page end implies requiring unindenting, ending a paragraph, and ending a record. UP need not test whether one of these structures follows a PE, because it always either follows a PE or is at the start of a document. However, UP must known the prior state to avoid writing out redundant or wrong controls.

In particular, writing out a second successive .PA in response to one of these structures that follows a PRE control is wrong because that would leave a blank page in the DCF document that was not present in the L3 document. Moreover, two of these structures can occur together. No more than one of them must transform to a .PA control, for the same reason. The mechanism for accomplishing this uses the ENDED PAGE state bit. RPE and these structures set this bit. Whenever it is set, it prevents these structures, but not RPE, from writing .PA.

Figure 22:
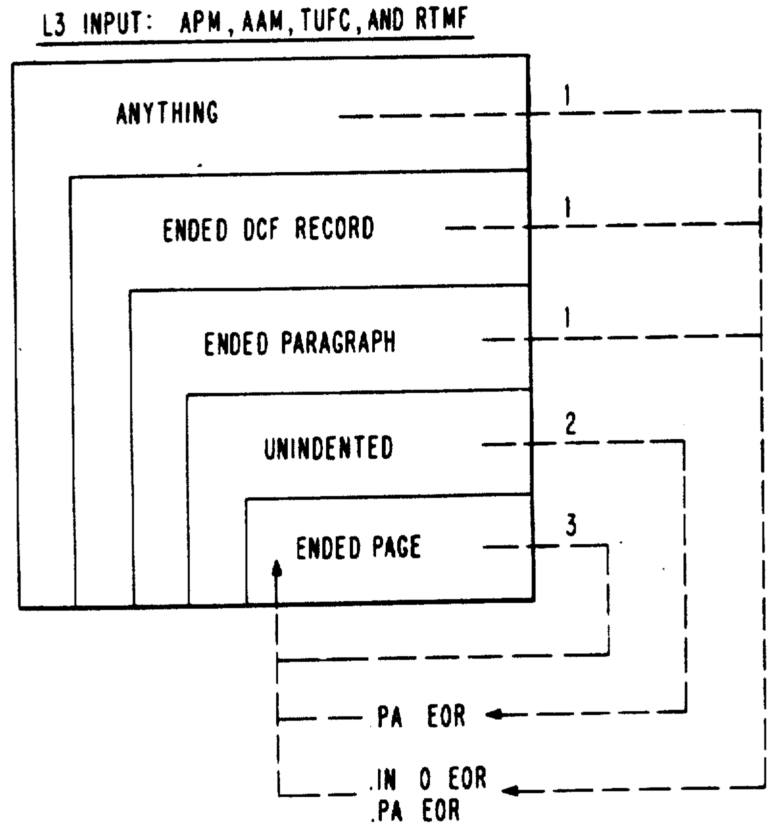
FIG. 22 schematically depicts the transformation that is described in the table shown in FIG. 21 and constitutes a state transition diagram for the APM, AAM, TUFC or RTMF input items summarized therein.

Writing .IN 0 is redundant if, at the point where this control appears, we have already ended a paragraph and unindented. Ending a record is wrong if we have already ended a record, because that causes a null record and perhaps a blank line. This structure may appear right after a PE control, which is then the only item in the DCF record, because a PE must follow a line ending control, which leaves ENDED DCF RECORD set or after DCF controls written into the data stream in response to another one of these structures. Each such DCF control is followed by an EOR, leaves ENDED DCF RECORD reset, and leaves others as is. This structure must not cause a blank line or a null record. Therefore, after a PE, this structure's resultant DCF controls must go in the same record as the PE itself. This is normal. The controls in the decision tables show where EORs go, and the EORs tend to go at the end of controls, not before them. The decision table for L3 inputs APM, AAM, TUFC and TRMF are depicted in FIG. 21. The related state diagram is illustrated in FIG. 22.

UP transforms the other L3 items (single-byte controls, multi-byte controls, second level structures, first level structures, and parameters of these structures, independently of these state bits. However, many L3 items must reset these state bits. For example, the first graphic character after an RPE control must reset all of the state bits because we are no longer at the end of a record, we are no longer at the end of a paragraph, we are no longer at the required end of a page, the last control was not CRE, the last control was not PE, and, after editing, there can be non-zero indent tab level.

Multi-byte controls not mentioned above do not set or reset the state bits, single-byte controls exceeding x'41' do not set or reset the state bits, and structures not mentioned do not set or reset the state bits. Note that NSP (X'E1') and SHY (X'CA') are treated separately.

Redefinition of margin text can occur only after a TUFC, APM, AAM, or RTMF first level structure, between a PE and the next Text Unit's Body Text vector. The APM, AAM and RTMF structures define a return to margin text that was transformed from L3 to DCF previously, so no text transformation is done in the middle of the document in response to one of these structures. Very little information about the state left by the preceding Body Text needs to be preserved across transformation of the L3 that redefines margin text. This is because the TUFC, APM, AAM, or RTMF implies a required page end and hence implies the value of all of the state bits.

The transformation of text at the start of the next Body Text vector depends on the fact that it is the first text in a Text Unit, but that this is not the first text unit of the document. This is signified by the LAST WAS PE bit's being on. UP saves LAST WAS PE before it starts transforming margin text, and restores the initial value afterward.

The presence or absence of an RPE at the end of the prior Text Unit's Body Text vector, just before the PE that ended that Text Unit, affects the transformation of margin text and would affect the transformation of one of APM, AAM, RTMF, or TUFC if that could follow the definition of margin text. The information about whether or not there was a final RPE is contained in the ENDED PAGE bit. Again, UP saves the value of ENDED PAGE before starting to transform margin text. With these exceptions, UP can simply set all state bits to a given state after transforming margin text. That given state is the same as the initial state for a document and is tabulated in FIG. 23.

Thus, UP can use the same state bits for transforming Margin Text vectors that it uses for transforming Body Text vectors. Before starting to transform a Margin Text vector, UP simply resets each state bit to its initial value. The transformations of delimiters are the same. UP need not even check for the few controls that are not allowed in margin text since they won't be there.

Two situations require UP to back up and change DCF it has already generated. Neither of these situations require UP to back up beyond the record that it is preparing, so a reasonable implementation uses the fact that UP buffers the last record in main store before before writing it out on a disk. The two situations that require backing up are Word UnderScore or WUS and Align Text Field or ATF.

WUS is a single-byte control that appears in Body Text to cause underscoring of the previous word. UP has no precognition that this will be necessary when UP starts processing the word that is to be understood. UP transforms the WUS itself into the DCF control .US OFF to end underscoring at the end of the word. That is easy. The most difficult aspect of this task is to start the underscoring at the start of the preceding word.

There are two reasonable approaches to starting underscoring. In the first, UP keeps each word in a separate buffer until it sees whether a WUS follows the word. If so, UP writes .US ON into the DCF data stream before writing the word into the DCF data stream. UP could perform this word buffering in either the input L3 data stream or the output DCF data stream. UP keeps the entire last record of DCF output available and is always prepared to go back and insert a .US ON just after the most recent WUS delimiter. UP saves a pointer to the position in the buffer of the most recent WUS delimiter, to avoid the necessity to scan back for it.

ATF is a multi-byte L3 control that can center any field about the point of the AFT control, whereas all that DCF's .CE control can do is center an entire line about the middle of the current typing area. As a result, the only use of ATF that UP can transform correctly is the case where L3 contains a line ender, roughly 33 SP (space) characters, RSP (Required SPace) characters, or the equivalent HT (Horizontal Tab) characters, and then the ATF. The text that is to be centered follows the ATF and ends at the next line ender.

The transform mechanism handles this L3 sequence by discarding the record that contains only blank text and beginning the record over again with a .CE control and no additional EOR. The end of the text to be centered takes care of itself at the next line ender.

Figure 25:
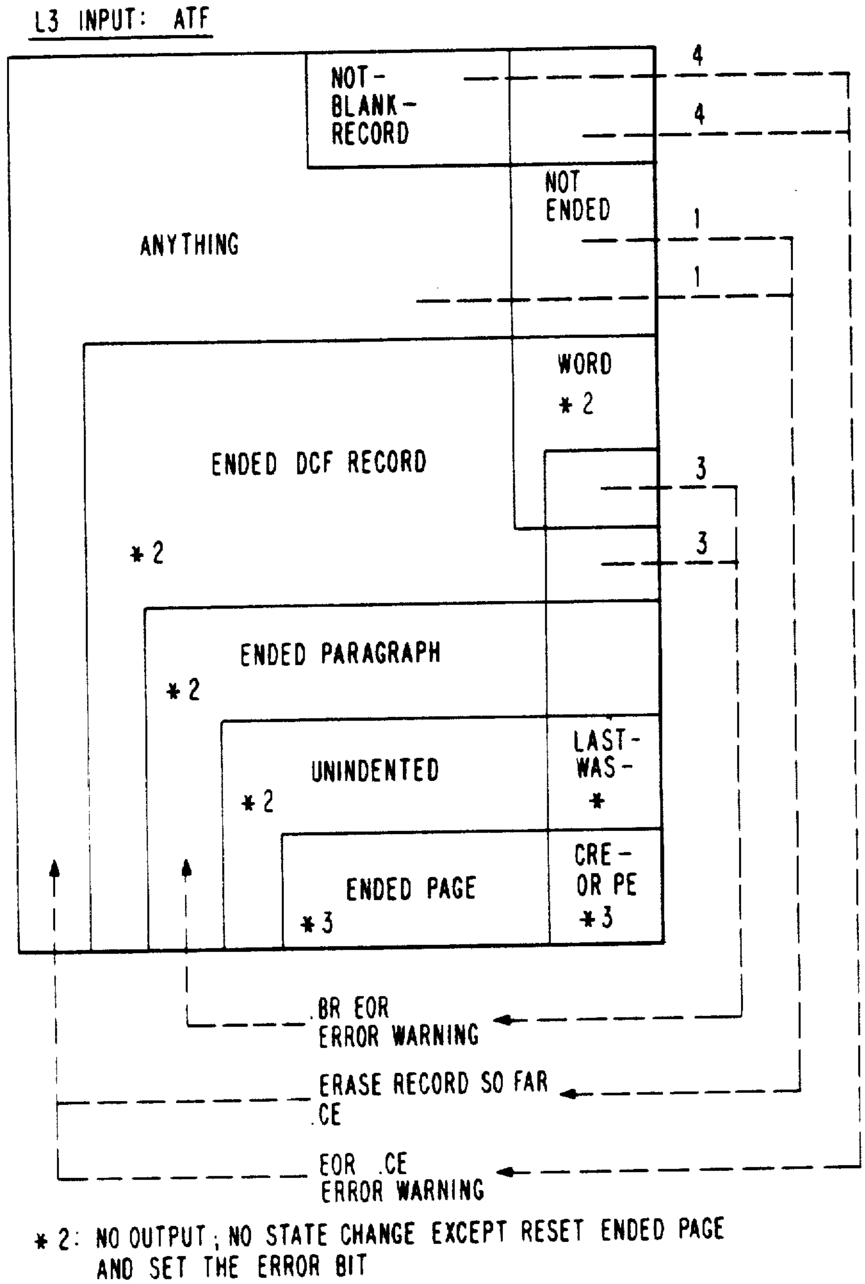
FIG. 25 schematically depicts the transformation that is described in the table shown in FIG. 24 and constitutes a state transition diagram for the ATF input item summarized therein.

This requirement has only one reasonable solution which is implemented as rule 1, see the state transform diagram of FIG. 25. UP keeps each output DCF record until something in L3 transforms to an End of Record in DCF, then commits the record. When UP gets an ATF, it looks to see whether the record it has been building up contains at least one space and nothing other than spaces, required spaces and tab characters. If both of these conditions are satisfied, then UP returns to the start of that record, puts in .CE, and proceeds with ordinary transformation. UP could avoid scanning by keeping track of whether it has put anything except spaces, required spaces and tab characters in the current record. Any other transformation of ATF sets the bit that warns an operator that transformation was not perfect.

The second condition concerning text field alignment is handled in a similar manner. If UP gets an ATF when it has just ended a DCF record, UP notes that the operator is trying to center text around the left margin and therefore does not try to center anything. This is what DW does. Condition 3, however, requires awareness of whether a DCF record has ended. As a special case of an ATF when UP has just ended a DCF record, UP does obey the rule that an ATF after a CRE or a PE ends a paragraph. UP always obeys the rule that ATF ends a word.

If UP gets an ATF when it has put non-blank characters in the current output DCF record, a condition 4 case, UP ends the record, it generates an EOR, starts the new record with a .CW control, sets a severe warning bit, and proceeds. This is as effective a transformation of L3's centering a field that is only part of a line, as DCF is capable of.

The latter algorithm also handles the fact that a second ATF is, itself, a delimiter for the field centered by a previous ATF. The second ATF appears when a record contains the previous ATF and its text. Therefore, UP transforms the second ATF to an EOR and a .CE that starts the next record. That EOR ends the text centered by the previous ATF.

Many specific details of the implementation of the present invention, as set forth generally in this description of an embodiment thereof, will be found in Appendix A hereto. These details may be therefore be easily referred to by those desiring that capability without unnecessarily clouding this description of the present invention for those having no need of such particulars.

Although the present invention has been described in the context of a preferred embodiment thereof, it will be readily apparent to those skilled in the appertaining art, that modifications and variations can be made therein without departing from its spirit and scope. Accordingly, it is not intended that the present invention be limited to the specifics of the foregoing description of the preferred embodiment. Instead, the present invention should be considered as being limited solely by the appended claims, which alone are intended to define its scope.

APPENDIXE A

DISPLAYWRITER - ANR - HOST (System / 370)

FINAL PROGRAMMING FUNCTIONAL SPECIFICATION

AND

LOGIC SPECIFICATIONS

A. S. Kellerman
P. W. Agnew
J. J. Erhard
L. S. Green
G. W. Randall
J. S. Coviello Systems Products Division Headquarters
ENDICOTT

PRINTED ON
11/15/82

CONTENTS

1. OVERVIEW . . . 25

2. PROGRAM DETAILS . . . 37
NON-ERROR FLOW OF THE HOST CODE COMPONENT . . . 37
MODULE DESCRIPTION . . . 37
PROGRAM DESCRIPTIONS FOR CONTROL, DOWN, AND UP . . . 45
PROGRAM DESCRIPTION FOR CONTROL HOST CODE . . . 45
INTRODUCTION . . . 45
A Working DW-ANR PROFS Host Vocabulary . . . 45
DHIHOST COMMAND INTERFACE IMPLEMENTATION . . . 47
COMMAND DESCRIPTION IMPLEMENTATION . . . 47
PARAMETER HANDLING DESIGN . . . 47
General . . . 47
RETURN CODE IMPLEMENTATION . . . 51
DHIMAIN MAIN ROUTINE . . . 51
DESCRIPTION . . . 51
DESIGN . . . 51
DHIASM ASSEMBLER SUBROUTINE . . . 59
DESCRIPTION . . . 59
DESIGN . . . 61
ERROR CONDITIONS . . . 61
ERROR HANDLING in subroutine ERROR_HANDLE . . . 61
ERROR MESSAGES . . . 65
FILE TRANSFER . . . 95
PROGRAM DESCRIPTION FOR DOWN (DHIDOWN) . . . 109
HOW DOWN FITS INTO THE DW-ANR-HOST SYSTEM . . . 109
WHAT IS L3/L3P . . . 109
L3 . . . 109
L3P . . . 111
EXAMPLES OF L3 . . . 111
DECISION TABLES . . . 111
INTRODUCTION . . . 111
INPUT AND OUTPUT REQUIREMENTS FOR DOWN . . . 113
I/O FLOWCHART . . . 113
SUMMARY OF DOWN . . . 113
PROGRAM FLOWCHART . . . 115
PROGRAM OVERVIEW . . . 115
DOWN'S SUBROUTINES WITH PROGRAM LOGIC . . . 115
DHIDOWN -- main routine . . . 115
ROUTINE INIT_STATE_VAR_PERSISTENT . . . 117
ROUTINE INIT_STATE_VAR_CONDITIONAL . . . 117
ROUTINE INIT_STATE_VAR_TRANSIENT . . . 117
ROUTINE TEXT . . . 117
ROUTINE CONT . . . 117
ROUTINE UNSUPPORTED . . . 117
ROUTINE SEQUENCE_COMPLETE . . . 117
ROUTINE SAVE_TEXT . . . 119
ROUTINE WRITE_TRACE . . . 119
ROUTINE WRITE_L3 . . . 119
ROUTINE ERROR_CONTROL . . . 119
ROUTINE HEX . . . 119
ROUTINE GET_NUMBER . . . 119
EXAMPLES OF SYSTEM FLOW . . . 119
SCAN'S CALL PARAMETERS & SCAN'S STATE BIT . . . 121
EXAMPLE OF PROCESSING BY SCAN & CONT . . . 123
EXCEPTION CONDITIONS FOR DOWN . . . 127
PROGRAM DESCRIPTION FOR UP (DHIUP) . . . 129
HOW UP FITS INTO THE DW-ANR SYSTEM . . . 129
SUMMARY . . . 129
TRANSFORM DIRECTION . . . 129
INPUT AND OUTPUT REQUIREMENTS FOR UP . . . 131
I/O FLOWCHART . . . 131
L3 INPUT FILE EXAMPLE . . . 133
DCF OUTPUT EXAMPLE . . . 135
TRACE OUTPUT EXAMPLE . . . 135
POINTER AND RETURN CODE . . . 137
SUMMARY OF UP . . . 139
PROGRAM OVERVIEW . . . 139
PROGRAM FLOWCHART . . . 141

UP'S MAIN SUBROUTINES WITH PROGRAM LOGIC . . . . . . . . 141
INITIALIZE SUBROUTINE . . . . . . . . . . . . . . . . 141
READ VECTORS SUBROUTINE . . . . . . . . . . . . . . 143
TERMINATE SUBROUTINE . . . . . . . . . . . . . . . . 151
INTERNAL SUBROUTINE DESCRIPTIONS . . . . . . . . . . 151
PRIMARY SUBROUTINES . . . . . . . . . . . . . . . . 151
SECONDARY SUBROUTINES . . . . . . . . . . . . . . . 153
EXCEPTION CONDITIONS FOR UP . . . . . . . . . . . . 163
USER MODIFIABILITY OF HOST DW ANR CODE . . . . . . . . 165
DCF SUPPORT SCHEDULE . . . . . . . . . . . . . . . . . 165
L3P SUPPORTED IN PROTOTYPE . . . . . . . . . . . . . . 173
SUPPORTED L3 ITEMS AND THEIR GENERATION ON DW . . . . . . . 185

3. TRANSFORMATION ALGORITHMS, SUMMARY & VECTORS . . . . . 199
FUNCTIONS SUPPORTED IN THE TRANSFORMS . . . . . . . . . 199
L3P's DELIMITERS (INSIDE DW) . . . . . . . . . . . . . 203
L3's DELIMITERS . . . . . . . . . . . . . . . . . . . 205.
ADJUST, ALIGN, FORMAT, AND JUSTIFY . . . . . . . . . . 207
COLUMNS USED FOR TABS AND INDENTS . . . . . . . . . . . 209
TABS . . . . . . . . . . . . . . . . . . . . . . . . 213
UNDERSCORE . . . . . . . . . . . . . . . . . . . . . 215
CENTERING AND ALIGN TEXT FIELD . . . . . . . . . . . . 219
DOUBLE SPACE AND SINGLE SPACE . . . . . . . . . . . . 221
MARGIN TEXT . . . . . . . . . . . . . . . . . . . . . 223
UP TRANSFORMS MP AND MT . . . . . . . . . . . . . . 223
DOWN TRANSFORMS .RH AND .RF . . . . . . . . . . . . 227
TRANSFORMATIONS OF MARGIN TEXT PAGE NUMBERS . . . . . . . 229
FORMATTING MARGIN TEXT . . . . . . . . . . . . . . 231
COMMENT USED TO PASS SOURCE DRAWER INFORMATION . . . . . . 233
PARAGRAPH . . . . . . . . . . . . . . . . . . . . . . 237

4. TRANSFORMATIONS, SINGLE-BYTE CONTROLS . . . . . . . . . 237
PAIRED SINGLE-BYTE CONTROLS . . . . . . . . . . . . . 237
INVALID SINGLE-BYTE CONTROLS . . . . . . . . . . . . 239
SIMPLE SINGLE-BYTE CONTROLS . . . . . . . . . . . . . 241
SP AND HYP . . . . . . . . . . . . . . . . . . . . 241
HT, BS, AND RSP . . . . . . . . . . . . . . . . . . 241
SBS, SPS, UBS, and PE . . . . . . . . . . . . . . . 243
SUB AND NUL . . . . . . . . . . . . . . . . . . . . 245
NBS AND NSP . . . . . . . . . . . . . . . . . . . . 245
PARTIAL SUPPORT OF PE AND INX . . . . . . . . . . . 247
WHY THE REST ARE MORE COMPLICATED . . . . . . . . . . 249
TRANSFORMATIONS OF L3 SINGLE-BYTE CONTROLS TO DCF . . . . 249
INDENT AND INDENT TAB . . . . . . . . . . . . . . . . 251
DISCUSSION . . . . . . . . . . . . . . . . . . . . 255
UP's TRANSFORMATION OF INDENT TAB . . . . . . . . . . 256
UP's CALCULATION OF THE NEW TEMPORARY LEFT MARGIN . . . . 259
DOWN's REJECTED ASSUMPTION ABOUT INDENT . . . . . . . 261
DOWN's REJECTED TRANSFORMATION OF INDENT . . . . . . . 263
DOWN's IMPLEMENTED TRANSFORMATION OF INDENT . . . . . . 263
DOWN's REESTABLISHMENT OF INDENT LEVEL . . . . . . . . 275
DOWN'S TRANSFORMATION OF TABS AFTER HANGING INDENT . . . 277
DOWN's POSSIBLE EXTENSION OF INDENT . . . . . . . . . 277
HYPHEN . . . . . . . . . . . . . . . . . . . . . . . 279
DISCUSSION . . . . . . . . . . . . . . . . . . . . 279
UP'S TRANSFORMATION OF SHY . . . . . . . . . . . . . 281
DOWN'S TRANSFORMATION OF .HW . . . . . . . . . . . . 283
SIMPLE BUT WRONG TRANSFORMATIONS OF SHY . . . . . . . . 285
LINE ENDERS AND PARAGRAPH ENDERS . . . . . . . . . . . 287
AVAILABLE CONTROLS . . . . . . . . . . . . . . . . . 287
RELATIONS OF LINE AND PARAGRAPH ENDERS TO KEYS . . . . . 289
DOWN'S TRANSFORMATIONS OF LINE AND PARAGRAPH ENDERS . . . 291
UP'S TRANSFORMATIONS OF LINE AND PARAGRAPH ENDERS . . . . 293
PAGE ENDERS . . . . . . . . . . . . . . . . . . . . . 297
DISCUSSION . . . . . . . . . . . . . . . . . . . . 297
UP'S TRANSFORMATION OF RPE AND PE . . . . . . . . . . 297
UP's TRANSFORMATION OF L3 STRUCTURES THAT IMPLY RPE . . . 299
DOWN'S TRANSFORMATION OF .PA AND THE PE BYTE . . . . . . 301
DEFAULTS USED IN DOWN . . . . . . . . . . . . . . . . 303

RECORD FORMAT OF L3 . . . . . . . . . . . . . . . . . . . . . 305
RECORD PROPERTIES OF L3P FOR PROTOTYPE . . . . . . . . . . 305
RECORD PROPERTIES OF L3 FOR SHIPMENT . . . . . . . . . . 307

5. UP's ALGORITHMS FOR DELIMITERS . . . . . . . . . . . . 307
SUMMARY OF L3 AND DCF DELIMITERS . . . . . . . . . . . . 307
UP'S SEQUENCE DEPENDENCY AND STATE MACHINE . . . . . . . . 309
DEFINITIONS OF THE STATE VARIABLES . . . . . . . . . . . 309
DECISION TABLES . . . . . . . . . . . . . . . . . . . . . 313
INITIAL STATE . . . . . . . . . . . . . . . . . . . . . . 317
STATES SET BY CHARACTERS . . . . . . . . . . . . . . . . 319
RELATIONS AMONG STATE VARIABLES . . . . . . . . . . . . . 321
CRE . . . . . . . . . . . . . . . . . . . . . . . . . . . 327
RCR or IRT . . . . . . . . . . . . . . . . . . . . . . . 331
ZICR . . . . . . . . . . . . . . . . . . . . . . . . . . 335
PE . . . . . . . . . . . . . . . . . . . . . . . . . . . 341
RPE . . . . . . . . . . . . . . . . . . . . . . . . . . . 343
LFC or RMLF . . . . . . . . . . . . . . . . . . . . . . . 347
PARAGRAPHERS: RSP, UBS, NBS, OR BS . . . . . . . . . . . 349
PAGERS: APM, AAM, TUFC, AND RTMF . . . . . . . . . . . . 355
OTHER CONTROLS AND STRUCTURES . . . . . . . . . . . . . . 359
STATE BIT USAGE IN TRANSFORMING MARGIN TEXT . . . . . . . 361
UP'S BACKING UP FOR WUS AMD ATF . . . . . . . . . . . . . 363
WORD UNDERSCORE . . . . . . . . . . . . . . . . . . . . . 363
ALIGN TEXT FIELD . . . . . . . . . . . . . . . . . . . . 363

6. DOWN's ALGORITHMS FOR USE DURING A SEQUENCE . . . . . . 367
DOWN's TRANSFORMATIONS OF SHORT SEQUENCES . . . . . . . . 367
DOWN's PARSING OF DCF . . . . . . . . . . . . . . . . . . 373
SCAN'S SPECIAL PROCESSING . . . . . . . . . . . . . . . . 377
EXAMPLES OF DOWN's TRANSFORMATION OF SEQUENCES . . . . . . 377
DOWN's TRANSFORMATION OF SEQUENCES GENERATED BY UP . . . . 383
DOWN's PERSISTENT STATE VARIABLES . . . . . . . . . . . . 385
DOWN'S TRANSIENT STATE VARIABLES . . . . . . . . . . . . 389
DOWN's PROCESSING WITHIN A SEQUENCE OF CONTROLS . . . . . 395

7. DOWN's ALGORITHM FOR USE AT THE END OF A SEQUENCE . . . 399
DOWN's TRANSFORMATION OF SEQUENCES . . . . . . . . . . . 399
WHY TRANSFORM AN ENTIRE SEQUENCE? . . . . . . . . . . . . 399
DOWN'S TREATMENT OF SEQUENCE ORDER . . . . . . . . . . . 401
ORDER OF OVERRIDES: LAST ONE WINS . . . . . . . . . . . . 401
ORDER OF .HW AND ANYTHING (AND .CE'S TOLERANCE) . . . . . 403
ORDER OF INDENT AND TAB SETTING CHANGES . . . . . . . . . 403
ORDER OF CENTER AND INDENT . . . . . . . . . . . . . . . 403
ORDER OF PAGE END AND MARGIN TEXT . . . . . . . . . . . . 403
HANDLING ORDER BY ENDING THE SEQUENCE . . . . . . . . . . 405
DOWN'S SEQUENCE ENDERS . . . . . . . . . . . . . . . . . 405
GENERAL DECISION TABLE FOR USE AT END OF A SEQUENCE . . . 407
ONE-CONTROL SEQUENCE TRANSFORMATIONS . . . . . . . . . . 411
DOWN's TRANSFORMATION OF A GENERAL SEQUENCE . . . . . . . 415
ORDERING OF L3 ITEMS TO BE WRITTEN OUT . . . . . . . . . 415
PROCESSING OF INDIVIDUAL OUTPUT DECISION TABLES . . . . . 425
DECISION TABLE FOR OUTPUT EUS . . . . . . . . . . . . . . 425
DECISION TABLE FOR OUTPUT CRE . . . . . . . . . . . . . . 425
DECISION TABLE FOR OUTPUT RCR . . . . . . . . . . . . . . 433
DECISION TABLE FOR OUTPUT CREs . . . . . . . . . . . . . 437
DECISION TABLE FOR OUTPUT (RSP CRE ZICR) s . . . . . . . 439
DECISION TABLE FOR OUTPUT (CRE ZICR RSP) s . . . . . . . 441
DECISION TABLE FOR OUTPUT RPE . . . . . . . . . . . . . . 443
DECISION TABLE FOR OUTPUT LFC . . . . . . . . . . . . . . 445
DECISION TABLE FOR OUTPUT ZICR . . . . . . . . . . . . . 447

1. OVERVIEW

The Displaywriter(DW) ANR support provided with the Displaywriter ANR announcement, DW emulation of 3277, DW file transfer interface to 370, , and DW 'Alternate Task Key' for mode switch; together with the announcement for VM DW/ANR Support, file transfer support of DW to host and host to DW, and document transform (including complex documents subject to limitations described in this document) to and from DW editable documents (OIIA L3) to host editable documents (DCF/SCRIPT input) , will be used for the following purpose (See Figure 1):

To allow a Displaywriter (DW) operator to:

Enter and edit a document
Save the document on a DW diskette
Transfer a document to a VM user's disk
Invoke optionally a transform from the Displaywriter's editable data stream (OIIA L3) to DCF's input datastream so a professional using a 327x can review it and change it
Interact with VM to file the document and distribute it
Interact with other VM functions such as PROF's calendar with full screen support
Retrieve documents from a VM file to the Displaywriter's diskette with an optional transform from DCF input datastream to OIIA L3 datastream.( GML tags and untransformed DCF commands , if any, are carried as text if desired in the document. No expansion of GML tags takes place on Displaywriter.)

In this manner, the following scenarios will be supported (See Figure 3):

A professional creates a rough draft memo on a 3277 or 3278. The secretary makes it formal on a Displaywriter then sends it back to the professional for viewing, revising, or mailing via VM.

The secretary types from dictation or handwriting on Displaywriter initially. The professional checks the document on a 3277 or 3278 and revises it if necessary. Otherwise the document can be mailed.

The secretary interacts with VM from his or her Displaywriter.

The typing pool files Displaywriter documents directly in Displaywriter editable format without transforming to DCF editable format instead of using diskettes.

( See figures 1-4 at the end of this section)

The technical approach follows:

- There is a two-key changeover between Displaywriter mode and 3277 mode with suspend/resume both ways (See Figure 2).
- The ANR connection, via suitable controller, is continuous.
- The 3277 screen is invisible in Displaywriter mode but can receive messages. The operator is notified when the host changes the invisible 3277 screen.
- The operator initiates document transfers and transforms in both directions, in 3277 mode by either filling in screens controlled by the host application and supplied by Toronto or by directly specifying options in a PARM input file then executing the application on VM running on the host. (Regardless of whether a host transform is requested between DW OIIA-L3 and DCF, before documents are transferred to the host they are transformed from DW's internal representation, L3P to L3 in DW. Similarly, on the transfer back to DW, documents are transformed in DW from L3 to L3P. See Figure 4.)
- The host commands Displaywriter to send or receive documents using ANR blocks. (For further details see Displaywriter File Transfer Programming Interface Specifications, San Jose Research, 7/27/82, Hildebrand et.al)
- An unused attribute byte distinguishes file transfer records from 3277 screen change records and keyboard entry records.

No diskette swapping is necessary to establish and maintain this communication session even when reverting back to Displaywriter's text operation. The mode the Displaywriter user is actually working on is referred to as running in the active or current partition. The other mode is referred to as running in the alternate partition.

The support is based on Displaywriter's TEXTPACK 4 IPL and OIIA LV3 Specifications dated 12/81. An additional 32K bytes (available in 64K byte increments) of memory is required. The Displaywriter requires the ANR card, RPQ 8D0098. The Displaywriter/Host local connection is via an ANR coax connection to either a 3271, a 3272, or a 3274 with a type B terminal adapter. Also required are diskettes, PRPQ P10034, that contain the Displaywriter code necessary to achieve the 3277 emulation and the file transfer capability on Displaywriter. (For further information on the Displaywriter ANR announcement part of the support see the 3277 Emulation (ANR) PRPQ Program System Design Document, September 1,1982 by Komaromy and Tam of Toronto. The host code will require the Pl/1 Optimizing Transient Library (IBM PP 5734-LM5). If the customer desires to change the transforms, the user will require access to the Pl/1 compiler, this specification, and the OIIA LV 3 specifications. There is no plan to distribute source code to the user. In addition to Pl/1, part of the host code is implemented in assembler and PL/S. CMS system services are used.

The host code is implemented and tested on VM/SP Release 1.

FIGURE 1: S Y S T E M   C O N F I G U R A T I O N

```
                  ______________________________
                 :         VM/370               :
                 :         HOST                 :
                 :         SUPPORT FOR          :
                 :         TRANSFER AND         :
                 :         TRANSFORM            :
                 :______________________________:
                              '
                              '
                              '
                     _______________________
                    :         3272          :
                    :       TERMINAL        :
                    :    CONTROLLER OR      :
                    :         OTHER         :
                    :_______________________:
                     ANR '          ' ANR
        _________________'          '_______________
        '                                          '
        '                                          '
        '                                          '
 ___________________________          __________________________
: DISPLAYWRITER (DW):       :        :                          :
:  o  Typing                :        :          3277            :
:  o  3277 Emulation        :        :        TERMINAL          :
:  o  File Transfer         :        :                          :
:___________________________:        :__________________________:
```

FIGURE 2: 3 ROLES OF DISPLAYWRITER:
* DW NORMAL
* 3277 EMULATION
* DOCUMENT TRANSFER

```
   ______________________________________________________
  :       370 OR 4300  WITH VM                           :
  :                                                      :
  :  ADDED FUNCTIONS:                                    :
  :    DOCUMENT TRANSFERS                                :
  :    DOCUMENT TRANSFORMS                               :
  :______________________________________________________:
                                                ' CHAN OR BSC
                                                '
                                       _______________________
                                      : 3274  CONTROLLER:
                                      : OR OTHER              :
                                      :_______________________:
                                                '
                                                ' ANR
 ________________                      ________________
: DW SCREEN      :=================: 3277 SCREEN    :
:                :   2-KEY           : (& TO/FROM     :
:--->MESSAGES    :   EXCHANGE:       : DISKETTE       :
:________________:   SUSPEND         :________________:
: DW KBD         :   RESUME          : 3277 KBD       :
:________________:                   :________________:

  NORMAL                               DW EMULATION
  DW MODE                              OF 3277
```

FIGURE 3: TRANSFER AND TRANSFORMS
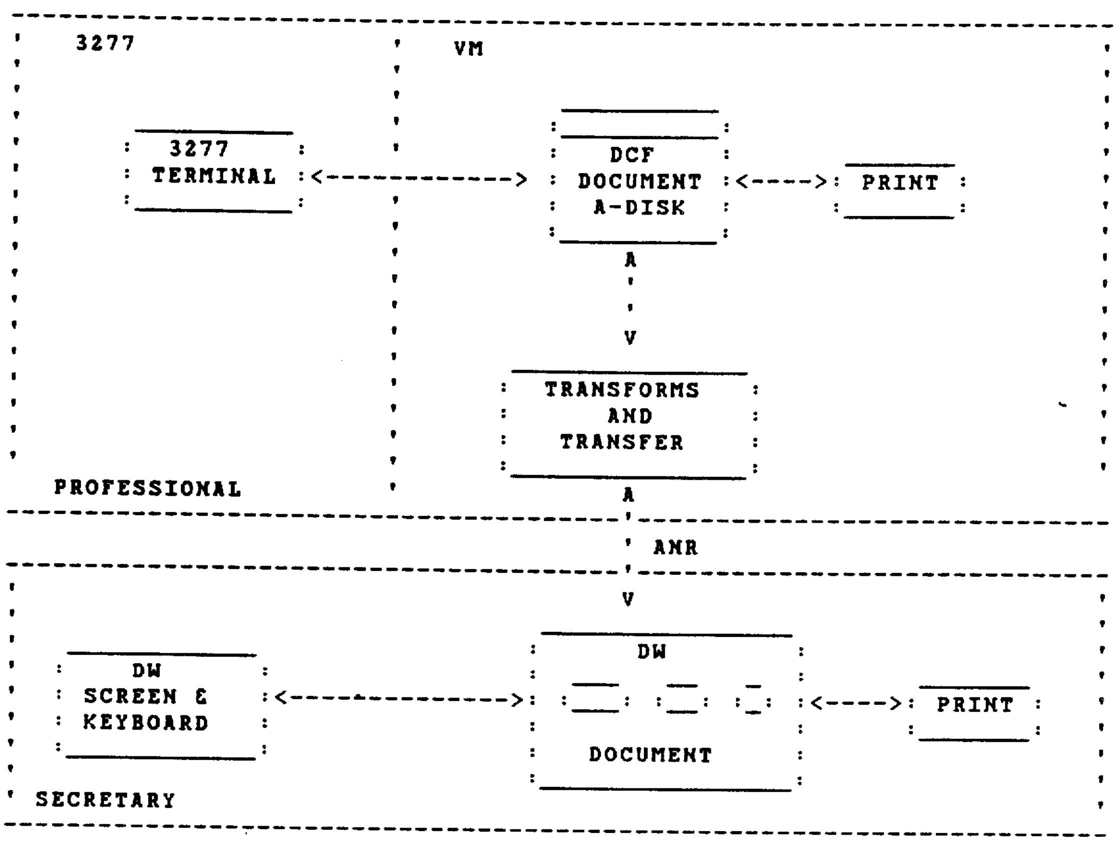
FIGURE 4: DW ANR VM TRANSFER AND TRANSFORM SYSTEM DATAFLOW
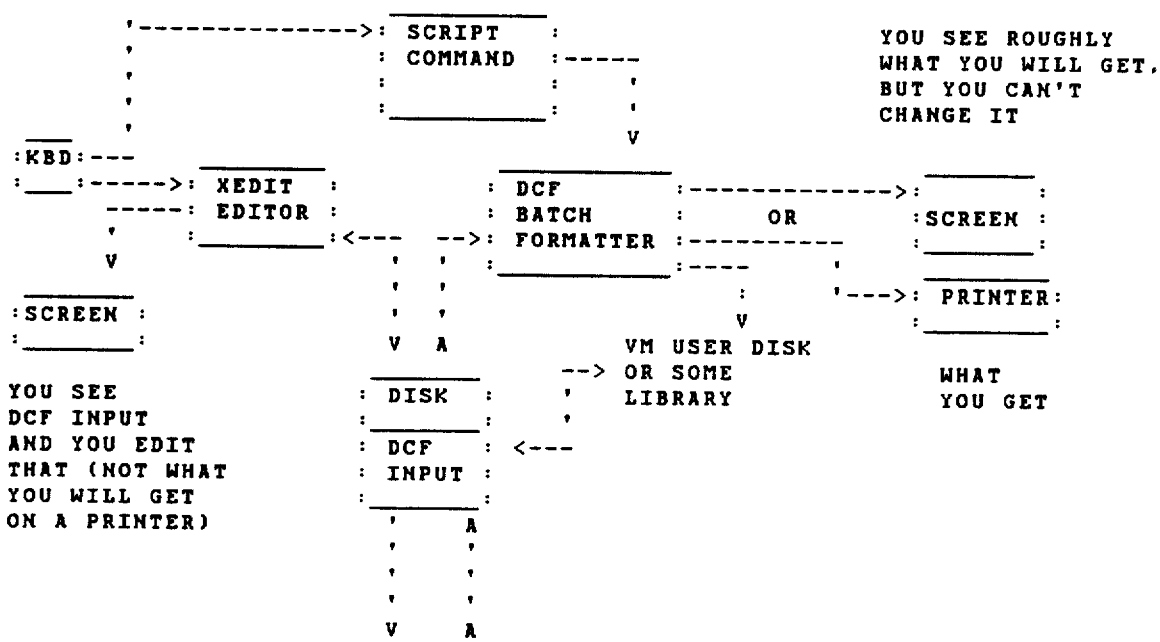
FIGURE 4 CONTINUES ON NEXT PAGE FIGURE 4 CONTINUED FROM LAST PAGE
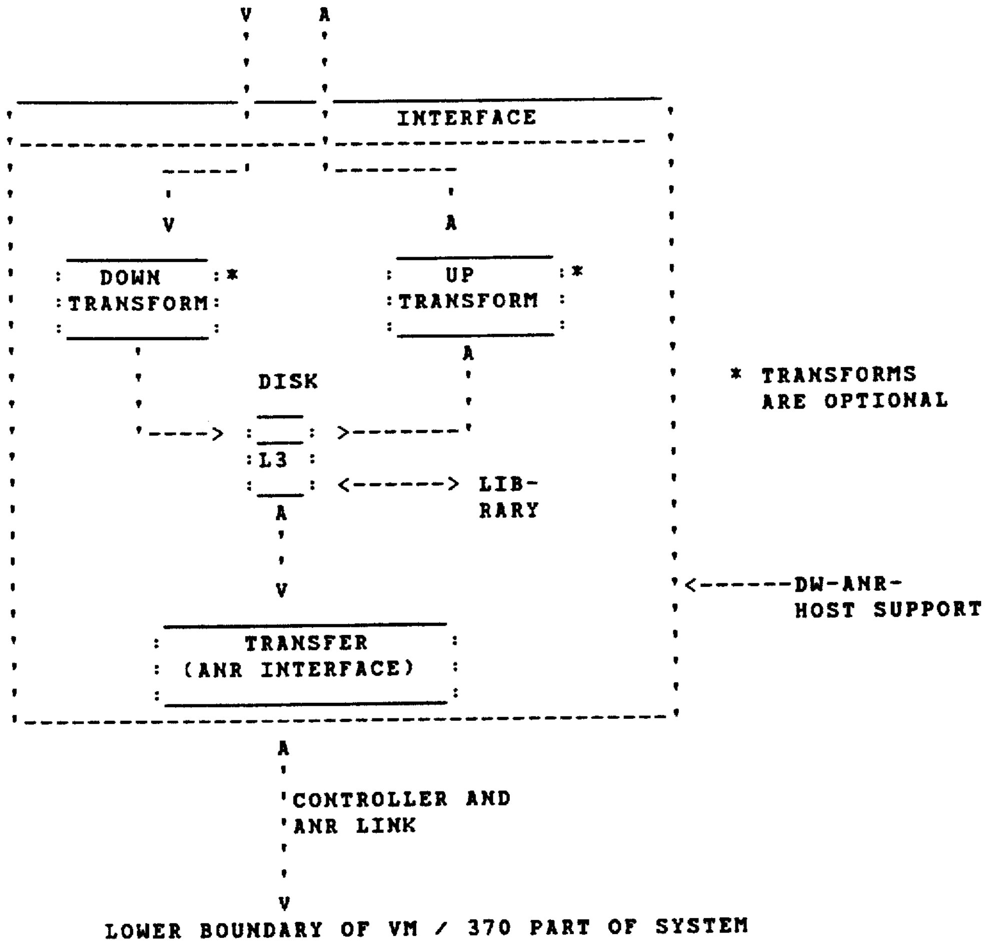
LOWER BOUNDARY OF VM / 370 PART OF SYSTEM
FIGURE 4 CONTINUES ON NEXT PAGE

FIGURE 4 CONTINUED FROM LAST PAGE

```
UPPER BOUNDARY OF DISPLAYWRITER PART OF SYSTEM

                         A
                         '
                         '   ANR LINK
                         '
                         '
DW      -----------------V--------------------------
        '                                          '
        '            __________                    '
        '           :TRANSFER :<------------       '
        '       ----:__________:            '      '
        '       '                           '      '
        '       '                           '      '
        '       '                           '      '
        '       V                           '      '
        '   __________                __________   '     DW ANR SUPPORT
        '  :L3 TO L3P:               :L3P TO L3:   '
        '  :__________:              :__________:  '
        '-------'-------------------------A---------'
                '                         '
                '      ___________        '
                '--->:    L3P     :-------'
                     : DISKETTE   :
                     :____________:
                           A
                           '
                           '
                           V
 _____               _______________
:KBD  :
:_____:---------->:       DW         :
                  :  INTERACTIVE     :------->:  PRINTER  :
 _______          :  EDITOR AND      :        :___________:
:SCREEN :<--------:  FORMATTER       :
:_______:         :__________________:          WHAT
                                                YOU GET
YOU SEE WHAT YOU WILL
GET AND YOU EDIT THAT
```

2. PROGRAM DETAILS

NON-ERROR FLOW OF THE HOST CODE COMPONENT

| | ENTRY_NAME | MAIN ENTRY | CALLS | CALLS |
|---|---|---|---|---|
| Transfer From A disk | DOWNLOAD | DHIMAIN | STATEA | |
| | | | CMSCMD | |
| | | | DWWOPEN | DHIDISP |
| | | | DWWRITE | DHIDISP |
| | | | DWWCLSE | DHIDISP |
| Transfer To A disk | UPLOAD | DHIMAIN | STATEA | |
| | | | CMSCMD | |
| | | | DWROPEN | DHIDISP |
| | | | DWREAD | DHIDISP |
| | | | DWRCLSE | DHIDISP |
| Transform SCRIPT to L3 | DOWN | DHIMAIN | STATEA | |
| | | | CMSCMD | |
| | | | DHIDOWN | |
| Transform L3 to SCRIPT | UP | DHIMAIN | STATEA | |
| | | | CMSCMD | |
| | | | DHIUP | |

MODULE DESCRIPTION

| ROUTINE NAME | ENTRY POINTS | INPUTS | CALLS | OUTPUT | PURPOSE/TRANSFORM |
|---|---|---|---|---|---|
| DHIMAIN (PL/I) | same | parm file (PRMFILE) | DHIUP | debug file (ADWVMC) | This entry is used when a DHIRUN operator wants to do a transfer/ transform between DW and VM and SCRIPT and L3. |
| | | L3 file (TODW) | DHIDOWN | L3 file (FROMDW) | |
| | | | DWROPEN | | |
| | | | DWREAD | | |
| | | | DWRCLOSE | | |
| | | | DWRRST | | |

| | | | | | |
|---|---|---|---|---|---|
| | | | DWRQRY<br>DWWOPEN<br>DWWRITE<br>DWWCLOSE<br>DWWRST<br>DWWQRY<br>CMSCMD<br>STATEA | | |
| DHIDOWN (PL/I) | same | DCF file (DCFIN)<br>trace desired switch<br>format unit switch (FORMATI)<br>conversion table switch (CONVERT)<br>keep script control words switch | none | L3 file (L3OUT)<br>trace file (AL3OUT)<br>return code | This subroutine reads DCF text and converts to L3 text adding to the debug file as it goes along. The annotated file contains error and debug information if its requested. Other parameters alter the type of output received. |
| DHIUP (PL/I) | same | L3 file (L3IN)<br>conversion table switch (CONVERT)<br>trace switch<br>write format unit switch | none | DCF file (DCFOUT)<br>trace file (ADCFOUT)<br>return code<br>Format unit (FORMATO) | This subroutine reads L3 and converts it to DCF text, adding to the annotated file as it goes along. The annotated file contains both error and debug information. Other parameters alter the type of output received. |
| DHIASM (ASM) | CMSCMD | pointer to the formatted CMS command | SVC202 | return code | This subroutine issues CMS commands that have been formatted by the calling routine. |

| | | | | | |
|---|---|---|---|---|---|
| | STATEA | file name<br>file type<br>file mode | SVC202 | file status<br>file lrecl<br>file recfm<br>return code | This subroutine issues the STATE CMS command and analyzes its results using macros so that if CMS changes the program just needs to be recompiled not recoded. |
| DHIREAD (PLS, ASM) | DWROPEN | READ_OPEN_PARM<br>READ_SCREEN | DWDISPIO | READ_OPEN_RETURN | This subroutine opens the DW diskette and readies it for reading. READ_OPEN_PARAM gives open information and READ_SCREEN indicates what the operator will see while the open take place. READ_OPEN_RETURN indicates the status of the open operation. |
| | DWREAD | READ_SCREEN<br>READ_RECORD | DWDISPIO | READ_RETURN | This subroutine reads one 2k record from the diskette and stores it in RECORD. The output structure READ_RETURN gives a return code indicating success or failure and a reason code which explains a failure if it occurs. The READ_SCREEN structure indicates what the operator will see while the transfer takes place. |
| | DWRCLSE | READ_CLOSE_PARM<br>READ_SCREEN | DWDISPIO | READ_CLOSE_RETURN | This subroutine closes the DW diskette after reading from it. CLOSE_PARM gives the type of close information and READ_SCREEN indicates what the operator will see while the close takes place. READ_CLOSE_RETURN indicates the status of the close operation. |
| | DWRRST | RESET_PARM<br>RESET_SCREEN | DWDISPIO | RESET_RETURN | This subroutine issues the RESET command which, upon an error condition, will close open documents on DW and delete any partial documents. If a screen change is desired, RESET_SCREEN will accomplish it. |
| | DWRQRY | QUERY_PARM<br>QUERY_SCREEN | DWDISPIO | QUERY_RETURN | This subroutine gets data that elaborates on any L3-L3P transform fatal or non-fatal problems. It is for debug purposes only. If a screen change is desired, QUERY_SCREEN will accomplish it. |

| | | | | | |
|---|---|---|---|---|---|
| DHIWRT (PLS, ASM) | DWWOPEN | WRITE_ OPEN_ PARM<br>WRITE_ SCREEN | DWDISPIO | WRITE_ OPEN_ RETURN | This subroutine opens the DW diskette and readies it for being written to. WRITE_OPEN _PARM gives the type of open information and WRITE_ _SCREEN indicates what the operator will see while the open takes place. WRITE_ OPEN_RETURN indicates the status of the open operation |
| | DWWRITE | WRITE_ RECORD<br>WRITE_ SCREEN | DWDISPIO | WRITE_ RETURN | This subroutine takes the WRITE_RECORD and puts it onto the DW diskette. WRITE_ SCREEN indicates what the operator will see while the transfer takes place. WRITE_ RETURN indicates the status of the transfer operation. |
| | DWWCLSE | WRITE_ CLOSE_ PARM<br>WRITE_ SCREEN | DWDISPIO | WRITE_ CLOSE_ RETURN | This subroutine closes the DW diskette after a file has been written. WRITE_CLOSE_ PARM indicates the type of close to do and WRITE_SCREEN indicates what the operator will see while the close takes place. WRITE_ CLOSE_RETURN indicates the status of the close operation. |
| | DWWRST | RESET_ PARM<br>RESET_ SCREEN | DWDISPIO | RESET_ RETURN | This subroutine issues the RESET command which, upon an error condition, will close open documents on DW and delete any partial documents. If a screen change is desired, RESET_ SCREEN will accomplish it. |
| | DWWQRY | QUERY_ PARM<br>QUERY_ SCREEN | DWDISPIO | QUERY_ RETURN | This subroutine gets data that elaborates on any L3-L3P transform fatal or non-fatal problems. It is for debug purposes only. If a screen change is desired, QUERY_SCREEN will accomplish it. |
| DHIDISP (PLS, ASM) | DWDISPIO | INPUT<br>DISPLAY<br>DWHWINT | DISPAX<br>DISPIO<br>SVC202 | OUTPUT | This subroutine handles the actual input/output with the DW. It handles the timing between DW and the host. It builds, transmits, and receives a request/data block for transfer to/from Displaywriter. |
| DISPIO (ASM) | same | see their spec | see their spec | see their spec | Handles 3270 DIAGNOSE support by building CCW's. |
| DISPAX (ASM) | same | see their spec | see their spec | see their spec | Handles and sets up Attention interrupts. |

PROGRAM DESCRIPTIONS FOR CONTROL, DOWN, AND UP

The following sections describe the three main units in the DW-ANR-HOST system's HOST CODE component.

PROGRAM DESCRIPTION FOR CONTROL HOST CODE

INTRODUCTION

This section explains the command processor which is the controller of the HOST code. In this subsection, vocabulary will be introduced as well as other background material needed to understand this design and this system.

The following is a list of general design considerations that were taken into account when doing our design. They are:

- code must be easily modifiable
- code must be re-enterable wherever possible
- code must be always resident in core
- code must be segmented with any external messages separated (such as error messages) for future translation into languages other than English.
- files can be on any disk linked at run time provided it has the appropriate access type (ie read/write for output files)
- as the files are being created, they are put into temporary files. These files will have standard names beginning with the system prefix "DHI". When the file is complete, it will be copied to its final file. If there is an error before completion, the file will be destroyed. unless the trace_desired parameter is "DBG".

A WORKING DW-ANR PROFS HOST VOCABULARY

Below is a vocabulary list that may aid in understanding the design of the command processor and the whole host system.

. TRANSFORM - refers to the process of changing a file from one representation to another . TRANSFER - refers to the process of moving a file from one place to another . DCF - describes a formal language called Document Composition Facility; otherwise known as SCRIPT. This language is used to represent documents.

. "L3" - describes the language which the DW uses to represent the documents that are on DW. "L3" is short for OIIA-L3.

. UP - refers to the transform process going from "L3" to DCF This is coded in subroutine DHIUP.

. UPLOAD - refers to the transfer going from Displaywriter to VM

. DOWN - refers to the transform process going from DCF to "L3". This is coded in subroutine DHIDWN.

. DOWNLOAD - refers to the transfer going from VM to Displaywriter

. DW - abbreviation for Displaywriter

. PROFS - refers to the Professional Office System. Two versions exist: one has been released, the PRPQ, and the other, the PP is planned.

. "ANR" - refers to the hardware card and protocol that allows the DW to look like a 3277 or allows it to run VM . HOST - refers generally to the code on VM that allows the DW to look like a 3277 and does the transform and the transfer . Editable Document - Representation of a document that can be changed. The transform that is described is between one editable form of the document, "L3" on DW and another editable form DCF input on the VM system.

DHIHOST COMMAND INTERFACE IMPLEMENTATION

When reading this section, the reader must remember that the command can be issued from one of three places. They are:

- a CMS EXEC
- XEDIT a parameter file
- DHISCR or user written routine like DHISCR Therefore, no design should be done assuming where the input came from. We have added one parameter that identifies where the call comes from to allow us to know during debugging of a problem where the information came from. This parameter is never error checked.

COMMAND DESCRIPTION IMPLEMENTATION

The command DHIRUN will cause execution of the DHIHOST module which is stored on a VM disk. The first thing in that module will be DHIMAIN. The first thing DHIMAIN will do is to check the parameters for validity, particularly the first one which identifies which operation the caller desires to be done. All other action is keyed to that first parameter.

PARAMETER HANDLING DESIGN

General

Parameters will be checked for validity as soon as DHIMAIN is entered. If even one parameter is not correct, DHIMAIN will end, sending a return code back to the caller. The types of error checking can be seen by looking at the errors generated and listed in the error checking section of this document.

The general format of the parameter checking is as follows:

```
step one - Check that the parameter has the correct length.
           ie. not too long and not too short

step two - Assign the input field to its given variable

step three - if parameter is not a file
               then check it for correctness.
                    ie exactly the right combination of characters
               else issue a state command and check the results
                    (ie to see if file exists, if is correctly
                     stated, has the right attributes)
```

Since the order of parameter checking determines what error the user will get if there are two errors, I will give a flow of what parameters are checked in what order. Numbers refer to the parameter chart already given.

```
                         :-----:
                         : 21  :
                         :_____:
                            :
                         :-----:
                         : 14  :
                         :_____:
                            :
                         :-----:
                         : 20  :
                         :_____:
                            :
                         :-----:
                         :  1  :
                         :_____:
                            :
          __________________:__________________
          :                                   :
   UP,    :   DOWN                 UPLOAD,    :   DOWNLOAD
          :                                   :
      :--------:                           :-----:
      : 4,5,6  :                           : 2,3 :
      :________:                           :_____:
          :                                   :
      :--------:                      :------:---------:
      : 7,8,9  :             DOWNLOAD :           UPLOAD :
      :________:                 _____:_____       _____:_____
          :                     : 4,5,6 :         : 7,8,9 :
   :-----------:                :_______:         :_______:
   : 10,11,12  :                      :___________________:
   :___________:                                  :
          :                                    :-----:
       :-----:                                 : 13  :
       : 14  :                                 :_____:
       :_____:                                    :
          :                                    :-----:
  :--------------:                             : 14  :
  : 15,16,17,18  :                             :_____:
  :______________:                                :
          :                                   :-------:
       :-----:                                : 22,23 :
       : 19  :                                :_______:
       :_____:
```

Once the parameters are checked and declared OK, they are used first in determining the type of command desired and then as specific details in that particular command. See the parameter description for what each parameter indicates.

There are several rules that I have followed in regard to the parameters. They are:

- CMS FILEDEF's for any file used in the system are done by the program. The only exception to this is the FILEDEF for the PARM file itself. In a given execution you could have up to six FILEDEF's done. They are:
  1) from file
  2) to file
  3) convert file
  4) format file
  5) control debug file
  6) transform debug file

- The overwrite parameter deals only with 4 of the above files (to, from, convert, format) and not with any of the debug files.

- a check will be made to see if any of these four files are exactly equal. Note that if one of them has a file mode of "A" and one has "*", where the "*" implies A, this will NOT come up as being equal.

- The DHIRUN exec will pick up the first file (via a fm='*') that has the given file name and file type of the parameter file. What this means is that the FILEDEF in that EXEC has file mode (FM) equal to star (*).

- All the parameters except document_name will be capitalized upon entry to DHIMAIN. The reason for this is standardization besides, CMS does it to all files anyway. Document_name is not capitalized because it can be any mixture of capital and small letters.

RETURN CODE IMPLEMENTATION

The return code will be a three digit number. They will be ordered by severity with the lower numbers (0,1,2....) being the least disastrous and the higher ones (999, 998, 997 ....) being terminal. Somewhere in these numbers will be a number, such that above that number is terminal and below that number is non terminal.

The return code will always indicate the highest code of all the errors that occurred in that particular run. If two or more errors occurred, the return code will indicate the highest return code of the errors that occurred if some of the errors were non-terminal. The way this is implemented is that every time an error occurs, its number is checked against the current return code. If it is lower, it is logged into the debug file, if one was requested, and then its action is checked. If its terminal, the HOST will clean up and end. If its non-terminal, then the HOST will return to the calling routine. If the new error is equal or higher, then the current error is updated to reflect this new error. Then the action is checked as above yielding similar results.

It should be noted that a return code of non-zero does not indicate that no document was produced. The user must check the return code reason description to see when a document is produced and what limitations the document will have.

The return code will be returned in Register 15.

DHIMAIN MAIN ROUTINE

DESCRIPTION

Language: PL/I

Purpose: To error check the incoming parameters and to control the command execution Entry points: DHIMAIN Input: file containing the parameters in a specified order and sequence Output: - files listed below

- return code between 0 and 999 indicating success or not in register 15 (Note PL/I may add a digit in the thousandth position, if it too wants to signal an error)

Called By: execution of the DHIHOST module from DHIRUN exec

Calls: DHIASM (several entries)

```
DHIUP
DHIDOWN

DWWOPEN ------
DWWRITE       |
DWWCLSE       |---- DHIWRT  entry points
DWWQRY        |
DWWRST  ------

DWROPEN  -----
DWREAD        |
DWRCLSE       | ---- DHIREAD entry points
DWWQRY        |
DWWRST  ------
```

Subroutine Call Interface:

to DHIUP

. INPUT

- Convert Table file switch
- Trace desired switch
- Type Format File Desired Switch
- From File (Name,type,mode) fileid

. OUTPUT

- files listed below
- return code and reason code to DHIDOWN

. INPUT

- Convert Table file switch
- Trace desired switch
- Type Format File Desired Switch
- From File (Name,type,mode) fileid
- Keep script control words switch

. OUTPUT

- files listed below
- return code and reason code to DHIREAD,DHIWRT

. INPUT

- see section on file transfer for input

. OUTPUT

- see section on file transfer for output

Notes:

- switches are one character each.

- One pointer is passed to the transform subroutines. It points at a structure that contains the switches and the return code.

Files input:

. TRANSFORM (DHIUP, DHIDOWN)

- file containing L3 (UP) or DCF (DOWN)
  (L3IN) (DCFIN)

- convert table file used to convert between MLP and EBCDIC (optional)
  (CONVERT)

- format file (optional)
  (FORMATI)

. TRANSFER (DHIREAD, DHIWRT)

- file containing L3 (DOWNLOAD)
  (TODW)

Files Ouput:

. TRANSFORM (DHIUP, DHIDOWN)

- file containing L3 (DOWN) or DCF (UP)
  (L3OUT) (DCFOUT)

- trace file with ft=AL3 (DOWN) or ft=ADCF (UP) (optional)
  (AL3OUT, ADCFOUT, ADWVMC)

- format file (optional)
  (FORMATO)

. TRANSFER (DHIREAD,DHIWRT)

- file containing L3 (UPLOAD)
  (FROMDW)

- trace file (optional)
  (ADWVMC)

Exit Data conditions: A resultant DW document or VM file(s) will be created if the return code indicates that they were done. Specific limitations on the output are also indicated by this return code.

Exit conditions (normal): Operation Requested being complete with any minor problems being described by the return code.

Exit conditions (abnormal): Any terminal error listed in the error section will cause abnormal exit with all partial files being erased before exiting and if possible, the DW document, if in use, being closed.
Partial files (but not documents) will be kept, if trace_desired parameter is "dbg".

Comments: - one command is handled per call

DESIGN

Logic Flow Diagram:

The following figure is the logic flow diagram for DHIMAIN. Note that it does not show most error checking and intermediate return code checking.

DHIMAIN CONTROL FLOW

```
   _______________________________________________________
  :   Read and Check parameters for correctness          :
  :______________________________________________________:
   ___________________________:___________________________
  :      Decide what command has been requested          :
  :______________________________________________________:
                              :
     :------------:------------------------:-----------
   UP :        DOWN :                  UPLOAD :   DOWNLOAD :
  _____:_____   _____:_____          _____:_____   _____:_____
 : Set up    : :  Set up   :        : set up    : : set up    :
 : the UP    : : the DOWN  :        : upload    : : download  :
 : files via : : files via :        : files via : : files via :
 : DHIASM    : : DHIASM    :        : DHIASM    : : DHIASM    :
 :   call    : :   call    :        :   call    : :   call    :
 :___________: :___________:        :___________: :___________:
  _____:_____   _____:_____          _____:_____   _____:_____
 :call up    : :call down  :        :  call     : :  call     :
 :transform  : :transform  :        : DWROPEN   : : DWWOPEN   :
 :  DHIUP    : : DHIDOWN   :        :___________: :___________:
 :___________: :___________:              :             :
       :             :            :------>:             :<------:
       :             :            :  _____:_____   _____:_____  :
       :             :            : :  call     : :  call     : :
       :             :            : : DWREAD    : : DWWRITE   : :
       :             :            : : till file : : till file : :
       :             :            : :transfered : :transfered : :
       :             :            : :___________: :___________: :
       :             :            :_______:             :_______:
       :             :             _____:_____   _____:_____
       :             :            :  call     : :  call     :
       :             :            : DWRCLSE   : : DWWCLSE   :
       :             :            :___________: :___________:
  _____:_____   _____:_____        _____:_____   _____:_____
 : Clean up  : : Clean up  :      : Clean up  : : Clean up  :
 : & close   : : & close   :      : & close   : : & close   :
 : files     : : files     :      : files     : : files     :
 :___________: :___________:      :___________: :___________:
       :_____________:_________________:_____________:
   ___________________________:___________________________
  :     Clean up command interface and determine RC      :
  :______________________________________________________:
                  ____________:____________
                 :        RETURN           :
                 :_________________________:
```

Process:

Step One - Read in and check parameter validity.
If OK, continue.
If parameters not OK, terminate.

Step Two - Set up appropriate requested command

Step Three - Control the command Execution:

Transform: call DHIUP or DHIDOWN or user transform

Transfer: call DHIREAD/DHIWRT to open the DW file
pace read/write calls to DHIREAD/DHIWRT
call DHIREAD/DHIWRT to close the DW file Step Four - Clean up after the command is complete Step Five - Return with the appropriate return code.

Note that at any time during this processing, we could stop because of a terminal error or at the instruction of the user via the PA1 key in VM mode or the DW cancel operation in DW mode.

DHIASM ASSEMBLER SUBROUTINE

DESCRIPTION

Language: Assembler Language

Purpose: supplement DHIMAIN by doing things that can not be done in PL/I such as issuing CMS commands Entry Points: CMSCMD - handles an already formatted CMS command. The command is issued via an SVC202 call.

STATEA - issues a STATE command and interrpts the results using system macros. It returns information to the calling program based on the results.

Called By: DHIMAIN

Calls: SVC202

Files Input: CMSCMD - pointer to the structured CMS command

STATEA - file id information

Files Output: CMSCMD - none

STATEA - file information, specifically
- disk access type for that file
- if file is fixed or variable format
- logical record length
- return code from state issue Exit Data Conditions: with a return code indicating the result of the CMS command and from STATEA the command information listed above Exit Conditions (normal): at the end of the SVC202 call Exit Conditions (abnormal): none

DESIGN

Logic Flow Diagram:

```
            CMSCMD                         STATEA
              :                              :
     _________:_________          ___________:___________
     : set up entry    :          : set up entry and    :
     : and get com-    :          : get file id addr    :
     : mand address    :          :_____________________:
     :_________________:                     :
              :                   ___________:___________
     _________:_________          : issue FSSTATE to    :
     : issue SVC202    :          : do a CMS STATE      :
     : to execute      :          :_____________________:
     : CMS command     :                     :
     :_________________:          ___________:______________
              :                   : analyze the re-        :
     _________:_________          : sults in the file      :
     : clean up        :          : status table set-      :
     :after command    :          : ting up the return     :
     :_________________:          :    information         :
              :                   :________________________:
            return                           :
                                           return
```

Process:

Step One: Set up information

Step Two: Issue the CMS command via an SVC202 or macro call

Step Three: Return the return code to the caller from the SVC call (entry CMSCMD) or return analyzed command results (entry STATEA)

ERROR CONDITIONS

ERROR HANDLING IN SUBROUTINE ERROR HANDLE

There will be an error handling subroutine, called ERROR_HANDLE which is internal to DHIMAIN. It will decide if the current return code needs updating because the new error is equal or larger than the current return code being saved. Then this subroutine will decide what action needs to be taken due to this error and finally if the error is terminal. If it is terminal, the routine will clean up the files as best it can before returning to the HOST caller. If the error is nonterminal, the action specified will be performed before returning control to the internal HOST calling point.

DHIUP and DHIDOWN will do their own error handling and only return a final return code to DHIMAIN.

DHIREAD, DHIWRT, and DHIDISP will also do their own error handling and error number conversion. What they return to DHIMAIN is a unique return code, reason code pair that reflect their final error status.

Error recovery takes on different forms depending on the error. Usually, partial CMS files will be erased (unless trace_desired is equal to "DBG"). If a displaywriter document is involved, when a transform is being done, the control code will issue the RESET command which will erase partial documents and close open documents among other things. If the error dealt with a L3 to/from L3P transform problem, the control code will issue the QUERY command if debug was requested. The data returned from the QUERY will be put into the trace file for the operator to analyze.

System Error Handling

The chart below attempts to show how errors flow thru the HOST part of this system. Codes usually change as they go thru the system. In general, they start out out as a return code, reason code pair and, if they are to be returned to the operator, they end up as a single digit between 0 and 999. (This is a limitation imposed by PL/I.)

```
                                  :----------:         -------
                                  :          :         :     :
                             ---->:  DHIUP   :--------->:     :
                                  :          :         :     :
                                  :__________:         :     :
                                                       :  D  :
                                  :----------:         :  H  :       Single
RETURN,                           :          :         :  I  :       Return
REASON                       ---->:  DHIDOWN :--------->:  M  :------> Code
 CODE                             :          :         :  A  :         of
 PAIR                             :__________:         :  I  :      0 to 999
                                                       :  N  :
        Emulator Code---->:----------:                 :     :
                                  :          :         :     :
        Displaywriter---->:  DHIREAD,:--------->:     :
                _________         :  DHIWRT  :         :     :
   ----->: DHIDISP: ---->:          :         :     :
         :_________:              :          :         :     :
                                  :          :    ---->:     :
                             ---->:__________:         :_____:
```

NOTES:

- Codes originating in an area are indicated by left arrows.
- Codes not originating in a given area are remapped into that areas scheme.
- some codes will never be seen by the user since they can be handled internal to the given area or internally to the next area above.

ACTION TAKEN DUE TO ERROR:

The following are a list of responses to errors that may occur:

1) Handle the error internally and never inform the user
   The user will never know about it. If our handling of the error internally doesn't work, the user will get another type of error described below.

2) Inform the user, clean up files, and quit. Note that in the case of screens or other types of interfaces, we will clean up and quit before the user is informed of the error.

* the Users Manual would inform the user, if the return code is not zero, then an error of some form has occurred. The user should receive an indication of the highest error.

ERROR MESSAGES

The following list represents all the error messages that have been identified to date. The return code, reason code pairs given are just temporary and will be remapped into three digit numbers between one and 999. There are two sections of errors given. The first are errors that are found by the control routines (DHIMAIN,DHIASM) and by the transform routines (DHIDOWN, DHIUP). The second set are taken from the transfer specifications and are given to the control routine from DHIREAD or DHIWRT.

In generating these errors certain things should be noted.

1 - For the parameter checking related errors, an order was picked that seemed to make sense to the programmer. Another order could have been chosen. Where this matters, is when there is more than one error; the order of checking determines which error will be returned.

2 - Some errors will never be returned to the user. They will be handled internal to the code.

3 - Some errors are not "ERRORS" rather they are warnings or give information that may be of use to the system user.

CONTROL ERRORS

These errors represent the control errors and are mostly obtained at parameter checking. Remember, the numbers are only temporary.

99 99 The entry_type is not known. Valid entry_types are "UP", "DOWN", "DOWNLOAD", and "UPLOAD" and represent those operations.

99 97 Parameter file has too many entries; there should be 23.

99 -- Parameter file has too few entries; there should be 23.

99 96 The Trace_desired parameter is either too big or too small to be an expectable answer.

99 95 Trace_desired is the correct size but does not have a valid answer. Acceptable answers are ...

99 94 Overwrite_file_or_document is either too big or too small to be an acceptable answer 99 93 Overwrite_file_or_document is the correct size but does not have a valid answer. Valid answers are 'YES' or 'NO'.

99 92 entry_name is either too big or too small to be an acceptable answer.

99 91 From_file_name is either too big or too small to be an acceptable answer. Valid answers are between one and 8 characters.

99 90 From_file_type is either too big or too small to be an acceptable answer. Valid answers are between one and 8 characters.

99 89 From_file_mode is either too big or too small to be an acceptable answer. Valid answers are between one and 2 characters.

99 88 From_file is fixed and needs to be variable so we will do a copy to a temporary file. (Warning- down)

99 -- Not enough room on the disk to do a copy to a temporary file of the from_file which was fixed not variable as required.

99 87 From_file attributes are too long. It should be variable 136. (terminal)

99 86 From_file is fixed and needs to be variable so we will do a copy to a temporary file. (Warning- up)

99 85 From_file attributes are too long. It should be variable 2048. (terminal)

99 84 From_file has an invalid character in the fileid.

99 83 From_file has an incomplete or incorrect fileid.

99 82 From_file does not exist.

99 81 From_file disk mode is not accessed.

99 80 Unknown return code gotten on a CMS STATE command which was using the From_file information.

99 79 To_file_name is either too big or too small to be an acceptable answer. Valid answers are between one and 8 characters.

99 78 To_file_type is either too big or too small to be an acceptable answer. Valid answers are between one and 8 characters.

99 77 To_file_mode is either too big or too small to be an acceptable answer. Valid answers are between one and 2 characters.

99 76 To_file exists and you said do not overwrite document.

99 75 To_file is currently being written to so we can not use it.

99 74 To_file_mode is accessed read only so we can not write to it.

99 73 To_file has an invalid character in the fileid.

99 72 To_file has an incomplete or incorrect fileid.

99 71 To_file disk mode is not accessed.

99 70 Unknown return code gotten on a CMS STATE command which was using the To_file information.

99 69 Convert_table_file_name is either too big or too small to be an acceptable answer. Valid answers are between one and 8 characters.

99 68 convert_table_file_type is either too big or too small to be an acceptable answer. Valid answers are between one and 8 characters.

99 67 convert_table_file_mode is either too big or too small to be an acceptable answer. Valid answers are between one and 2 characters.

99 66 convert_table_file is fixed and needs to be variable so we will do a copy to a temporary file. (Warning- down)

99 -- Not enough room on the disk to do a copy to a temporary file of the convert_table_file which was fixed not variable as required.

99 65 convert_table_file attributes are too long. It should be variable 136. (terminal)

99 64 convert_table_file has an invalid character in the fileid.

99 63 convert_table_file has an incomplete or incorrect fileid.

99 62 convert_table_file does not exist.

99 61 convert_table_file disk mode is not accessed.

99 60 Unknown return code gotten on a CMS STATE command which was using the convert_table_file information.

99 59 This is a transform operation but you specified "TFR" meaning transfer debug. No debug will be given. (warning)

99 58 type_format_file is either too big or too small to be an acceptable answer. Valid answers are between one and 4 characters.

99 57 format_file_name is either too big or too small to be an acceptable answer. Valid answers are between one and 8 characters.

99 56 format_file_type is either too big or too small to be an acceptable answer. Valid answers are between one and 8 characters.

99 55 format_file_mode is either too big or too small to be an acceptable answer. Valid answers are between one and 2 characters.

99 54 format_file exists and you said do not overwrite document.

99 53 format_file is currently being written to so we can not use.

99 52 format_file_mode is accessed read only so we can not write to it.

99 51 Format_file is fixed and needs to be variable so we will do a copy to a temporary file. (Warning- down)

99 -- Not enough room on the disk to do a copy to a temporary file of the format_file which was fixed not variable as required.

99 50 Format_file attributes are too long. It should be variable 2048. (terminal)

99 49 format_file has an invalid character in the fileid.

99 48 format_file has an incomplete or incorrect fileid.

99 47 format_file does not exist. (UP only)

99 46 format_file disk mode is not accessed.

99 45 Unknown return code gotten on a CMS STATE command which was using the format_file information.

99 44 Option "DEF" as a format file type is meaningless for the DOWN operation.

99 43 Option "CMT" as a format file type is not supported for this release of the system.

99 42 The answer to format_file_type is unrecognized and invalid.

99 41 Keep_script_control_words is either too big or too small to be an acceptable answer 99 40 The operation is down and keep_script_control_words is not a recognizable answer.

99 39 Diskette_name is either too big or too small to be an acceptable answer 99 38 Document_name is either too big or too small to be an acceptable answer 99 37 Diskette_name is not made up of all alpha-numeric characters, therefore it it not a valid diskette_name.

99 36 From_file_name is either too big or too small to be an acceptable answer. Valid answers are between one and 8 characters.

99 35 From_file_type is either too big or too small to be an acceptable answer. Valid answers are between one and 8 characters.

99 34 From_file_mode is either too big or too small to be an acceptable answer. Valid answers are between one and 2 characters.

99 33 From_file is fixed and needs to be variable so we will do a copy to a temporary file. (Warning- down)

99 -- Not enough room on the disk to do a copy to a temporary file of the from_file which was fixed not variable as required.

99 32 From_file attributes are too long. It should be variable 2048. (terminal)

99 31 From_file has an invalid character in the fileid.

99 30 From_file has an incomplete or incorrect fileid.

99 29 From_file does not exist.

99 28 From_file disk mode is not accessed.

99 27 Unknown return code gotten on a CMS STATE command which was using the From_file information.

99 26 To_file_name is either too big or too small to be an acceptable answer. Valid answers are between one and 8 characters.

99 25 to_file_type is either too big or too small to be an acceptable answer. Valid answers are between one and 8 characters.

99 24 to_file_mode is either too big or too small to be an acceptable answer. Valid answers are between one and 2 characters.

99 23 To_file exists and you said do not overwrite document.

99 22 To_file is currently being written to so we can not use it.

99 21 To_file_mode is accessed read only so we can not write to it.

99 20 To_file has an invalid character in the fileid.

99 19 To_file has an incomplete or incorrect fileid.

99 18 To_file disk mode is not accessed.

99 17 Unknown return code gotten on a CMS STATE command which was using the To_file information.

99 16 Data_type is either too big or too small to be an acceptable answer 99 15 Data_type of "FF", "DP", and "PG" are currently unsupported is this release. Please use data_type of "DOC".

99 14 Data_type is an unrecognizable answer and therefore is unsupported.

99 13 This is a transfer operation but you specified "TFM" meaning transform debug. No debug will be given. (warning)

99 12 Wack_interval is either too big or too small to be an acceptable answer 99 11 The Wack_interval is not all numeric characters and therefore is invalid.

99 -- The wack_interval is not within the required limits between 0 and 255 inclusive.

99 10 Host_timer is either too big or too small to be an acceptable answer 99 09 The Host_timer is not all numeric characters and therefore is invalid.

99 -- The host_timer is not within the required limits between 0 and 65535 inclusive.

99 08 The entry_type is not known. Valid entry_types are "UP", "DOWN", "DOWNLOAD", and "UPLOAD" and represent those operations.

DOWN TRANSFORM ERRORS

These errors are generated by DHIDOWN and are returned to the control program to decide what to do next. See the section in this manual for details on DHIDOWN's internal error handling. Again remember that these numbers are just temporary.

70 01 There was an ERROR in the down SCAN DECISION TABLE.

71 01 Down got a script control that the transform does not support. The control may be ignored depending on the setting of the keep_script_control_word parameter.

71 02 Down got an unsupported parameter to a script control that the transform does support. This will cause it to act like an unsupported control.

| | | |
|---|---|---|
| 72 | 01 | The script tabs received as input are not in ascending order. This becomes an unsupported parameter. |
| 72 | 02 | The script tabs received contained a number higher than 255. The resultant tab rack will be truncated after 255. |
| 74 | 01 | A hanging indent caused a break. |
| 74 | 02 | Insufficient tabs were found following a hanging indent. |
| 75 | 01 | There was no tab position to the right of the current position to indent to. |
| 76 | 01 | The margin text was truncated because it exceeded 2K bytes. |

/***************** TERMINAL ERRORS ****************************/

| | | |
|---|---|---|
| 79 | 01 | We do not support format type of "CMT". |
| 79 | 02 | The format unit contains unrecognizable 13. |
| 79 | 03 | The format unit does not have all the required vectors; specifically, one or more of the required PMF vectors was not found. |
| 79 | 04 | The user format unit contained an invalid tab rack. |
| 79 | 05 | The format unit vector exceeds 2048 bytes. |
| 79 | 06 | The associated PMF margin text vector contains a margin text vector format that is unsupported. We only support format '00'. |
| 79 | 07 | The associated PMF margin text vector contains a margin text vector type that is unsupported. We only support types '1' thru '6'. |
| 79 | -- | DOWN error routine got an error that it does not understand. |

UP TRANSFORM ERRORS

These errors are generated by DHIUP and are returned to the control program to decide what to do next. See the section in this manual for details on DHIUP's internal error handling. Again remember that these numbers are just temporary.

| | | |
|---|---|---|
| 51 | -- | The L3 vector has an invalid length field and can not be handled. (terminal) |
| 52 | -- | There is no space to center (before ATF). |
| 53 | -- | We do not support centering of a field within a line so we will center the field on the next line. |
| 54 | -- | There are not enough tabs for the required indents. |
| 55 | -- | The margin text vector is greater than the expected 2048 bytes. |

UPLOAD TRANSFER ERRORS

These errors are generated by DHIREAD and are returned to the control program to decide what to do next. See the section in their specifications dated September 1, 1982 for details on their internal handling. These numbers are the numbers that DHIMAIN expects back from a DHIREAD call but they are not the final numbers that the system user will see. These have not been determined yet.

READ OPEN ERRORS

| | | |
|---|---|---|
| 00 | -- | Document open for read |
| 02 | -- | Host Wait interval expired without DW response |
| 04 | -- | not used |
| 06 | 00 | document already open |
| 06 | 01 | Volume I/O error |
| 06 | 02 | Document needs recovery |
| 06 | 03 | document not found |
| 06 | 04 | document not requested type |
| 06 | 05 | not used |
| 06 | 06 | diskette not work diskette |
| 06 | 07 | diskette I/O error |
| 06 | 08 | open mode not input or output |
| 06 | 09 | diskette or document password protected |
| 06 | 10 | unsupported diskette type |
| 06 | 11 | not used |
| 06 | 12 | unable to initialize L3 conversion |
| 06 | 13 | No drive available |
| 06 | 14 | Invalid diskette volid, not A-Z, 0-9 |
| 06 | 15 | DW Operator rejected diskette mount |
| 06 | 16 | Not used |
| 06 | 17 | Not used |
| 06 | 18 | Not used |
| 06 | 19 | Not used |
| 06 | 20 | document type invalid |
| 06 | 21 | attempt to open second document without closing the first document |
| 08 | 00 | Operator canceled - reset required |
| 08 | 01 | control block id invalid |
| 08 | 02 | invalid return/reason code from DW |
| 08 | 03 | document transfer not available |
| 08 | 04 | DW timeout cancel. Reset required |

| | | |
|---|---|---|
| 08 | 05 | not used |
| 08 | 06 | not enough space for data block at destination |
| 08 | 07 | invalid return code from DWDISPIO |
| 08 | 08 | not used |
| 08 | 09 | unrecoverable 3277 I/O error |
| 08 | 10 | invalid response block from Displaywriter |

READ ERRORS

| | | |
|---|---|---|
| 00 | -- | Record data in data area |
| 02 | -- | Host Wait interval expired without DW response |
| 04 | 00 | End of document processed. This is last data. |
| 04 | 01 | L3 transform warning. Do query. |
| 04 | 02 | End of document processed - errors in buffer. This is the last data block. |
| 06 | 00 | no document open |
| 06 | 01 | Volume I/O error |
| 06 | 02 | not used |
| 06 | 03 | not used |
| 06 | 04 | not used |
| 06 | 05 | not used |
| 06 | 06 | not used |
| 06 | 07 | diskette I/O error |
| 06 | 08 | not used |
| 06 | 09 | not used |
| 06 | 10 | not used |
| 06 | 11 | not used |
| 06 | 12 | not used |
| 06 | 13 | not used |
| 06 | 14 | not used |
| 06 | 15 | not used |
| 06 | 16 | L3 transform fatal error - do query. |
| 06 | 17 | Not used |
| 06 | 18 | Not used |
| 06 | 19 | Attempt to read after end of document |
| 06 | 20 | not used |

| | | |
|---|---|---|
| 06 | 21 | not used |
| 08 | 00 | Operator canceled - reset required |
| 08 | 01 | control block id invalid |
| 08 | 02 | invalid return/reason code from DW |
| 08 | 03 | document transfer not available |
| 08 | 04 | DW timeout cancel. Reset required |
| 08 | 05 | not used |
| 08 | 06 | not enough space for data block at destination |
| 08 | 07 | invalid return code from DWDISPIO |
| 08 | 08 | not used |
| 08 | 09 | unrecoverable 3277 I/O error |
| 08 | 10 | invalid response block from Displaywriter |

READ CLOSE ERRORS

| | | |
|---|---|---|
| 00 | -- | Success - document closed |
| 02 | -- | Host Wait interval expired without DW response |
| 04 | 00 | not used |
| 06 | 00 | no document open |
| 06 | 01 | Volume I/O error |
| 06 | 02 | not used |
| 06 | 03 | not used |
| 06 | 04 | not used |
| 06 | 05 | not used |
| 06 | 06 | not used |
| 06 | 07 | diskette I/O error |
| 06 | 08 | not used |
| 06 | 09 | not used |
| 06 | 10 | not used |
| 06 | 11 | not used |
| 06 | 12 | not used |
| 06 | 13 | not used |
| 06 | 14 | not used |
| 06 | 15 | not used |
| 06 | 16 | not used |

| | | |
|---|---|---|
| 06 | 17 | Not used |
| 06 | 18 | Not used |
| 06 | 19 | not used |
| 06 | 20 | not used |
| 06 | 21 | not used |
| 08 | 00 | Operator canceled - reset required |
| 08 | 01 | control block id invalid |
| 08 | 02 | invalid return/reason code from DW |
| 08 | 03 | document transfer not available |
| 08 | 04 | DW timeout cancel. Reset required |
| 08 | 05 | not used |
| 08 | 06 | not enough space for data block at destination |
| 08 | 07 | invalid return code from DWDISPIO |
| 08 | 08 | not used |
| 08 | 09 | unrecoverable 3277 I/O error |
| 08 | 10 | invalid response block from Displaywriter |

READ RESET ERRORS

| | | |
|---|---|---|
| 00 | -- | Reset complete, no document was open |
| 02 | -- | Host Wait interval expired without DW response |
| 04 | 00 | Reset complete, open data set closed |
| 06 | -- | not used |
| 08 | 00 | not used |
| 08 | 01 | control block id invalid |
| 08 | 02 | invalid return/reason code from DW |
| 08 | 03 | document transfer not available |
| 08 | 04 | not used |
| 08 | 05 | unable to close or delete open doc |
| 08 | 06 | not enough space for data block at destination |
| 08 | 07 | invalid return code from DWDISPIO |
| 08 | 08 | not used |
| 08 | 09 | unrecoverable 3277 I/O error |
| 08 | 10 | invalid response block from Displaywriter |

READ QUERY ERRORS

| | | |
|---|---|---|
| 00 | -- | Query complete, data returned |
| 02 | -- | Host Wait interval expired without DW response |
| 04 | 00 | No data to return |
| 06 | -- | not used |
| 08 | 00 | Operator cancel. Do reset |
| 08 | 01 | control block id invalid |
| 08 | 02 | invalid return/reason code from DW |
| 08 | 03 | document transfer not available |
| 08 | 04 | DW timeout cancel. Reset required. |
| 08 | 05 | not used. |
| 08 | 06 | not enough space for data block at destination |
| 08 | 07 | invalid return code from DWDISPIO |
| 08 | 08 | invalid query type |
| 08 | 09 | unrecoverable 3277 I/O error |
| 08 | 10 | invalid response block from Displaywriter |

DOWNLOAD TRANSFORM ERRORS

These errors are generated by DHIWRT and are returned to the control program to decide what to do next. See the section in their specifications dated September 1, 1982 for details on their internal handling. These numbers are the numbers that DHIMAIN expects back from a DHIWRT call but they are not the final numbers that the system user will see. These have not been determined yet.

WRITE OPEN ERRORS

| | | |
|---|---|---|
| 00 | -- | Document open for read |
| 02 | -- | Host Wait interval expired without DW response |
| 04 | -- | not used |
| 06 | 00 | document already open |
| 06 | 01 | Volume I/O error |
| 06 | 02 | Document needs recovery (replace) |
| 06 | 03 | not used |
| 06 | 04 | document not requested type (replace) |
| 06 | 05 | document already exists (create) |
| 06 | 06 | diskette not work diskette |
| 06 | 07 | diskette I/O error |

| | | |
|---|---|---|
| 06 | 08 | open mode not input create, replace |
| 06 | 09 | data set or diskette PW protected or diskette write protected |
| 06 | 10 | unsupported diskette type |
| 06 | 11 | diskette full |
| 06 | 12 | unable to initialize L3 conversion |
| 06 | 13 | No drive available |
| 06 | 14 | Invalid diskette volid, not A-Z, 0-9 |
| 06 | 15 | DW Operator rejected diskette mount |
| 06 | 16 | Not used |
| 06 | 17 | Not used |
| 06 | 18 | Not used |
| 06 | 19 | Not used |
| 06 | 20 | document type invalid |
| 06 | 21 | attempt to open second document without closing the first document |
| 08 | 00 | Operator canceled - reset required |
| 08 | 01 | control block id invalid |
| 08 | 02 | invalid return/reason code from DW |
| 08 | 03 | document transfer not available |
| 08 | 04 | DW timeout cancel. Reset required |
| 08 | 05 | not used |
| 08 | 06 | not enough space for data block at destination |
| 08 | 07 | invalid return code from DWDISPIO |
| 08 | 08 | not used |
| 08 | 09 | unrecoverable 3277 I/O error |
| 08 | 10 | invalid response block from Displaywriter |

WRITE ERRORS

| | | |
|---|---|---|
| 00 | -- | Record data written to document |
| 02 | -- | Host Wait interval expired without DW response |
| 04 | 00 | End of document processed by transform. |
| 04 | 01 | L3 transform warning. Do query. |
| 04 | 02 | End of document processed - errors in buffer. |
| 06 | 00 | no document open |

| | | |
|---|---|---|
| 06 | 01 | Volume I/O error |
| 06 | 02 | not used |
| 06 | 03 | not used |
| 06 | 04 | not used |
| 06 | 05 | not used |
| 06 | 06 | not used |
| 06 | 07 | diskette I/O error |
| 06 | 08 | not used |
| 06 | 09 | not used |
| 06 | 10 | not used |
| 06 | 11 | diskette full |
| 06 | 12 | not used |
| 06 | 13 | not used |
| 06 | 14 | not used |
| 06 | 15 | not used |
| 06 | 16 | L3 transform fatal error - do query. |
| 06 | 17 | Not used |
| 06 | 18 | record length <= 0 or > than 2048 |
| 06 | 19 | not used |
| 06 | 20 | not used |
| 06 | 21 | not used |
| 08 | 00 | Operator canceled - reset required |
| 08 | 01 | control block id invalid |
| 08 | 02 | invalid return/reason code from DW |
| 08 | 03 | document transfer not available |
| 08 | 04 | DW timeout cancel. Reset required |
| 08 | 05 | not used |
| 08 | 06 | not enough space for data block at destination |
| 08 | 07 | invalid return code from DWDISPIO |
| 08 | 08 | not used |
| 08 | 09 | unrecoverable 3277 I/O error |
| 08 | 10 | invalid response block from Displaywriter |

<u>WRITE CLOSE ERRORS</u>

| | | |
|---|---|---|
| 00 | -- | Success - document closed |

| | | |
|---|---|---|
| 02 | -- | Host Wait interval expired without DW response |
| 04 | 00 | not used |
| 06 | 00 | no document open |
| 06 | 01 | Volume I/O error |
| 06 | 02 | not used |
| 06 | 03 | not used |
| 06 | 04 | not used |
| 06 | 05 | not used |
| 06 | 06 | not used |
| 06 | 07 | diskette I/O error |
| 06 | 08 | not used |
| 06 | 09 | not used |
| 06 | 10 | not used |
| 06 | 11 | not used |
| 06 | 12 | not used |
| 06 | 13 | not used |
| 06 | 14 | not used |
| 06 | 15 | not used |
| 06 | 16 | not used |
| 06 | 17 | close mode not keep (k) or delete(d) |
| 06 | 18 | Not used |
| 06 | 19 | not used |
| 06 | 20 | not used |
| 06 | 21 | not used |
| 08 | 00 | Operator canceled - reset required |
| 08 | 01 | control block id invalid |
| 08 | 02 | invalid return/reason code from DW |
| 08 | 03 | document transfer not available |
| 08 | 04 | DW timeout cancel. Reset required |
| 08 | 05 | close mode = D and unable to delete document |
| 08 | 06 | not enough space for data block at destination |
| 08 | 07 | invalid return code from DWDISPIO |
| 08 | 08 | not used |
| 08 | 09 | unrecoverable 3277 I/O error |
| 08 | 10 | invalid response block from Displaywriter |

WRITE RESET ERRORS

| | | |
|---|---|---|
| 00 | -- | Reset complete, no document was open |
| 02 | -- | Host Wait interval expired without DW response |
| 04 | 00 | Reset complete, open data set closed |
| 06 | -- | not used |
| 08 | 00 | not used |
| 08 | 01 | control block id invalid |
| 08 | 02 | invalid return/reason code from DW |
| 08 | 03 | document transfer not available |
| 08 | 04 | not used |
| 08 | 05 | unable to close or delete open doc |
| 08 | 06 | not enough space for data block at destination |
| 08 | 07 | invalid return code from DWDISPIO |
| 08 | 08 | not used |
| 08 | 09 | unrecoverable 3277 I/O error |
| 08 | 10 | invalid response block from Displaywriter |

WRITE QUERY ERRORS

| | | |
|---|---|---|
| 00 | -- | Query complete, data returned |
| 02 | -- | Host Wait interval expired without DW response |
| 04 | 00 | No data to return |
| 06 | -- | not used |
| 08 | 00 | Operator cancel. Do reset |
| 08 | 01 | control block id invalid |
| 08 | 02 | invalid return/reason code from DW |
| 08 | 03 | document transfer not available |
| 08 | 04 | DW timeout cancel. Reset required. |
| 08 | 05 | not used. |
| 08 | 06 | not enough space for data block at destination |
| 08 | 07 | invalid return code from DWDISPIO |
| 08 | 08 | invalid query type |
| 08 | 09 | unrecoverable 3277 I/O error |
| 08 | 10 | invalid response block from Displaywriter |

FILE TRANSFER

For further information on subroutines in DHIREAD and DHIWRT see the document, Displaywriter - VM/370 File Transfer, Programming Interface Specification San Jose, California dated September 1, 1982.

DHIREAD and DHIWRT call DHIDISP which is also described in the above document.

DHIDISP calls DISPIO and DISPAX. These two are subroutines written in Hursley, England for another project. See the References section.

What follows is a description and example of the interface to this subroutine:

Subroutine Call Interface to DHIREAD, DHIWRT, and DHIDISP

VOCABULARY

WACK Interval - A time period set by the caller of DHIREAD/DHIWRT to tell the time interval that DW should allow to elapse between sending WACK responses, when DW is working or waiting for the DW operator to insert a diskette.

It is used to detect a failure of the DW.

HOST timeout Interval - A time period set by the caller of DHIREAD/DHIWRT to tell the time interval that the HOST PL/S code is willing to wait for a response to a command or for the next WACK response.

It is used to detect a failure of the HOST system.

DW Timeout Interval - A time period hard coded in the Displaywriter micro code to tell the time interval that DW is willing to wait for the next command from the HOST, when the file transfer is in progress.

Screen Parameter - Tells what the caller would like to see on the screen during the file transfer. There is a spot to say leave the screen as is or only force a new screen when an error occurs.

DHIREAD DETAILS

- It is written in PL/S

- It has 5 entry points

- other design details given later

DHIWRT DETAILS
- It is written in PL/S
- It has 5 entry points
- other design details given later
DHIDISP DETAILS
- It is written in PL/S
- It has 1 entry points
- other design details given later
FIG 6: DW ANR PROFS FILE TRANSFER FLOW READ EXAMPLE
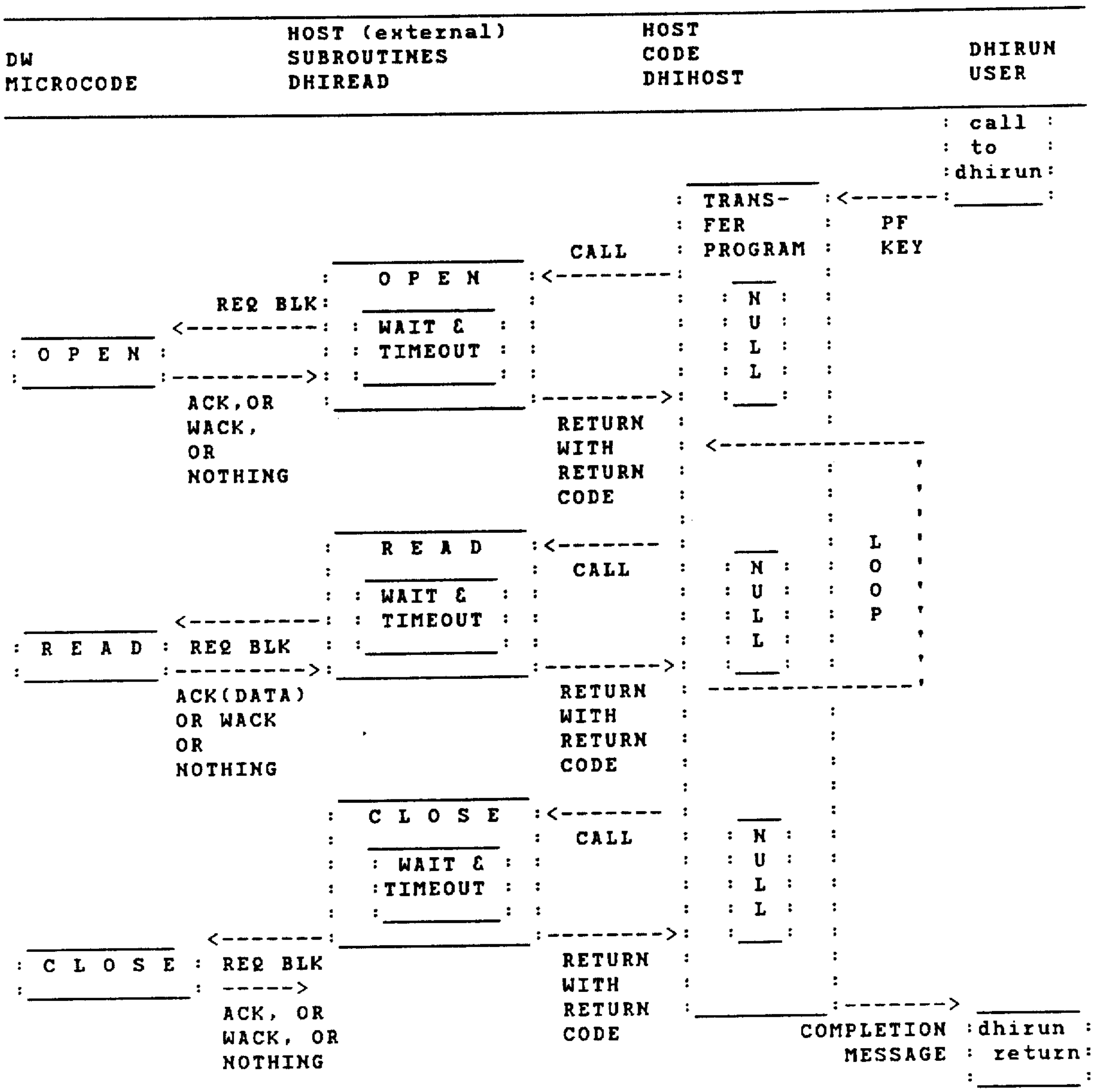

OPEN FOR READ PARAMETER STRUCTURE

```
DCL 1 READ_OPEN_PARM UNALIGNED,
      2 VOLID   CHAR(6)  INIT (' '),       /* VOLUME ID     */
      2 DOCNAME CHAR(44) INIT(' '),        /* DOCUMENT NAME */
      2 DOCTYPE CHAR(1),                   /* DOCUMENT TYPE */
      2 WACKINT FIXED BIN(15) INIT (0),    /* WACK INTERVAL */
      2 HOSTINT FIXED BIN(15) INIT (0);    /* HOST TIMER    */
```

READ SCREEN MESSAGE

Note this screen format is under discussion. Currently the transfer screen reads "FILE TRANSFER" in big block letters. Its final format is TBD.

```
        DCL 1 READ_SCREEN UNALIGNED,
              2 SCREEN_LENGTH FIXED BIN(15) INIT(1836),   /* 1840 */
                              /* LENGTH OF SCREEN DATA     */
              2 SCREEN_OPTION CHAR(1) INIT('F'),
                              /* FORCE SCREEN ONTO TUBE */
              2 SCREEN_ATTRIB CHAR(1) INIT('Y'),
                              /* CHAR HEX 'E8'              */
         /*   2 SCREEN_POSITION BIT(32)                     */
         /*     INIT('01000000000100010100000001000000'B),  */
                /* HEX   4    0    1    1    4    0    4    0    */
                /* CONTROL DATA FOR SCREEN PLACEMENT       */
              2 SCREEN_DATA,
                3 LINE1  CHAR(80) INIT((80)' '),
                3 LINE2  CHAR(80) INIT(
  ' DW TO VM '),
                3 LINE3  CHAR(80) INIT((80)' '),
                3 LINE4  CHAR(80) INIT(
  '                 FFFFFFFFF     II     LL           EEEEEEEE'),
                3 LINE5  CHAR(80) INIT(
  '                 FF            II     LL           EE'),
                3 LINE6  CHAR(80) INIT(
  '                 FF            II     LL           EE'),
                3 LINE7  CHAR(80) INIT(
  '                 FFFFFF        II     LL           EEEEEE'),
                3 LINE8  CHAR(80) INIT(
  '                 FF            II     LL           EE'),
                3 LINE9  CHAR(80) INIT(
  '                 FF            II     LL           EE'),
                3 LINE10 CHAR(80) INIT(
  '                 FF            II     LLLLLLLLL    EEEEEEEEE'),
                3 LINE11 CHAR(80) INIT((80)' '),
                3 LINE12 CHAR(80) INIT((80)' '),
                3 LINE13 CHAR(80) INIT((80)' '),
                3 LINE14A CHAR(40) INIT(
    '      TTTTTTT   RRR      A      N     N  '),
                3 LINE14B CHAR(40) INIT(
 '  SSSSS   FFFFFFFFF  EEEEEEEEE   RRR     '),
                3 LINE15A CHAR(40) INIT(
    '        TT      R  R     A A    NN    N  '),
                3 LINE15B CHAR(40) INIT(
    ' S     S  FF          E         R  R     '),
                3 LINE16A CHAR(40) INIT(
    '        TT      R   R   A   A   N N   N  '),
                3 LINE16B CHAR(40) INIT(
    'SS        FF          E         R   R    '),
                3 LINE17A CHAR(40) INIT(
    '        TT      R  R    A   A   N  N  N  '),
                3 LINE17B CHAR(40) INIT(
    '  SS      FFFFFF      EEEEE     R   R    '),
                3 LINE18A CHAR(40) INIT(
```

```
'      TT      RRRR    AAAAAAA   N    N N   '),
                3 LINE18B CHAR(40) INIT(
'    SSS    FF          E            RRRR     '),
                3 LINE19A CHAR(40) INIT(
'      TT      R    R    A      A   N     NN   '),
                3 LINE19B CHAR(40) INIT(
'S       S   FF          E            R    R    '),
                3 LINE20A CHAR(40) INIT(
'      TT      R     R  A      A   N      N   '),
                3 LINE20B CHAR(40) INIT(
' SSSSSS    FF          EEEEEEEEE  R      R   '),
                3 LINE21 CHAR(80) INIT((80)' '),
                3 LINE22 CHAR(80) INIT((80)' '),
                3 LINE23 CHAR(80) INIT((80)' ');
                              /* maximum is      1840 CHARS */
             /* screen_data must be fixed not varying */
```

RETURN STRUCTURE FOR READ OPEN

```
DCL 1 READ_OPEN_RETURN UNALIGNED,
      2 RETCODE  FIXED BIN(31) INIT(0), /* RETURN CODE     */
      2 REASCODE FIXED BIN(31) INIT(0), /* REASON CODE     */
      2 RECFMT   CHAR(1) INIT(' '),
                                        /* RECORD FORMAT F,V   */
      2 RECLEN   FIXED BIN(31) INIT(0); /* RECORD LENGTH   */
```

READ PARAMETER STRUCTURE

```
DCL 1 READ_RECORD UNALIGNED,
      2 RDWACK       FIXED BIN(15) INIT(10),
      2 RDHOST       FIXED BIN(15) INIT(10),
      2 RDNLR        FIXED BIN(31) INIT(1);
```

READ RETURN PARAMETER STRUCTURE

```
DCL 1 READ_RETURN UNALIGNED,
      2 RETCODE  FIXED BIN(31) INIT(0),      /* RETURN CODE */
      2 REASCODE FIXED BIN(31) INIT(0),      /* REASON CODE */
      2 RECORD   CHAR(2048) VAR;             /* DATA LENGTH */
                                             /* DATA        */
```

READ CLOSE PARAMETER STRUCTURE

```
DCL 1 READ_CLOSE_PARM UNALIGNED,
      2 CLWACK FIXED BIN(15) INIT(10),
      2 CLHOST FIXED BIN(15) INIT(10);
```

READ CLOSE RETURN PARAMETER STRUCTURE

```
DCL 1 READ_CLOSE_RETURN UNALIGNED,
      2 RETCODE  FIXED BIN(31) INIT(0),      /* RETURN CODE */
      2 REASCODE FIXED BIN(31) INIT(0);      /* REASON CODE */
```

WRITE OPEN PARAMETER STRUCTURE

```
DCL 1 WRITE_OPEN_PARM UNALIGNED,
    2 VOLID   CHARACTER (6) INIT (' '),
    2 DOCNAME CHARACTER (44) INIT (' '),
    2 DOCTYPE CHAR(1),
    2 WACKINT BINARY FIXED(15) INIT (0),
    2 HOSTINT BINARY FIXED(15) INIT (0),
    2 MODE    CHARACTER (1) INIT ('C'),
    2 RECFMT  CHARACTER (1) INIT (' '),
    2 RECLEN  BINARY FIXED(31) INIT (0);
```

WRITE SCREEN MESSAGE

Note this screen format is under discussion. Currently the transfer screen reads "FILE TRANSFER" in big block letters. Its final format is TBD.

```
         DCL 1 WRITE_SCREEN UNALIGNED,
               2 SCREEN_LENGTH FIXED BIN(15) INIT(1836),   /* 1840 */
                               /* LENGTH OF SCREEN DATA     */
               2 SCREEN_OPTION CHAR(1) INIT('F'),
                               /* FORCE SCREEN ONTO TUBE */
               2 SCREEN_ATTRIB CHAR(1) INIT('Y'),
                               /* CHAR HEX 'E8'             */
          /*   2 SCREEN_POSITION BIT(32)                    */
          /*     INIT('01000000000100010100000001000000'B), */
                 /* HEX   4   0   1   1   4   0   4   0    */
                 /* CONTROL DATA FOR SCREEN PLACEMENT      */
               2 SCREEN_DATA,
                 3 LINE1  CHAR(80) INIT((80)' '),
                 3 LINE2  CHAR(80) INIT(
  ' VM TO DW '),
                 3 LINE3  CHAR(80) INIT((80)' '),
                 3 LINE4  CHAR(80) INIT(
  '                   FFFFFFFFF    II    LL           EEEEEEEE'),
                 3 LINE5  CHAR(80) INIT(
  '                   FF           II    LL           EE'),
                 3 LINE6  CHAR(80) INIT(
  '                   FF           II    LL           EE'),
                 3 LINE7  CHAR(80) INIT(
  '                   FFFFFF       II    LL           EEEEEE'),
                 3 LINE8  CHAR(80) INIT(
  '                   FF           II    LL           EE'),
                 3 LINE9  CHAR(80) INIT(
  '                   FF           II    LL           EE'),
                 3 LINE10 CHAR(80) INIT(
  '                   FF           II    LLLLLLLLL    EEEEEEEEE'),
                 3 LINE11 CHAR(80) INIT((80)' '),
                 3 LINE12 CHAR(80) INIT((80)' '),
                 3 LINE13 CHAR(80) INIT((80)' '),
                 3 LINE14A CHAR(40) INIT(
    '     TTTTTTT   RRR       A     N     N  '),
                 3 LINE14B CHAR(40) INIT(
 '  SSSSS   FFFFFFFFF  EEEEEEEEE   RRR    '),
                 3 LINE15A CHAR(40) INIT(
    '      TT      R   R     A A    NN    N  '),
                 3 LINE15B CHAR(40) INIT(
    ' S      S  FF         E          R   R  '),
                 3 LINE16A CHAR(40) INIT(
    '      TT      R    R  A   A    N N   N  '),
                 3 LINE16B CHAR(40) INIT(
    'SS        FF         E          R    R  '),
                 3 LINE17A CHAR(40) INIT(
    '      TT      R   R   A   A    N  N  N  '),
                 3 LINE17B CHAR(40) INIT(
    '  SS      FFFFFF    EEEEE       R   R   '),
                 3 LINE18A CHAR(40) INIT(
    '      TT      RRRR    AAAAAAA  N    N N '),
                 3 LINE18B CHAR(40) INIT(
    '    SSS   FF         E          RRRR    '),
                 3 LINE19A CHAR(40) INIT(
    '      TT      R   R  A      A  N     NN '),
                 3 LINE19B CHAR(40) INIT(
    'S       S  FF         E          R   R  '),
                 3 LINE20A CHAR(40) INIT(
    '      TT      R    R A      A  N     N  '),
                 3 LINE20B CHAR(40) INIT(
    ' SSSSSS   FF         EEEEEEEEE  R    R  '),
                 3 LINE21 CHAR(80) INIT((80)' '),
                 3 LINE22 CHAR(80) INIT((80)' '),
                 3 LINE23 CHAR(80) INIT((80)' ');
```

WRITE OPEN RETURN PARAMETER STRUCTURE

```
DCL 1 WRITE_OPEN_RETURN UNALIGNED,
      2 RETCODE  BINARY FIXED (31) INIT(0),
      2 REASCODE BINARY FIXED (31) INIT(0),
      2 RECFMT   CHARACTER (1) INIT(' '),
      2 RECLEN   BINARY FIXED (31) INIT (0);
```

WRITE PARAMETER STRUCTURE

```
DCL 1 WRITE_RECORD UNALIGNED,
      2 WTWACK  FIXED BIN(15) INIT(10),
      2 WTHOST  FIXED BIN(15) INIT(10),
      2 WTNLR   FIXED BIN(31) INIT(1),
      2 RECORD  CHAR(2048) VAR;            /* DATA LENGTH */
                                           /* DATA        */
```

WRITE RETURN PARAMETER STRUCTURE

```
DCL 1 WRITE_RETURN UNALIGNED,
      2 RETCODE   BINARY FIXED (31) INIT(0),
      2 REASCODE  BINARY FIXED (31) INIT(0);
```

WRITE CLOSE PARAMETER STRUCTURE

```
DCL 1 WRITE_CLOSE_PARM UNALIGNED,
      2 CLWACK FIXED BIN(15) INIT(10),
      2 CLHOST FIXED BIN(15) INIT(10),
      2 CLTYPE CHAR(1) INIT(' ');
```

WRITE CLOSE RETURN PARAMETER STRUCTURE

```
DCL 1 WRITE_CLOSE_RETURN UNALIGNED,
      2 RETCODE   BINARY FIXED (31) INIT(0),
      2 REASCODE  BINARY FIXED (31) INIT(0);
```

RESET RETURN PARAMETER STRUCTURE

```
DCL 1 RESET_RETURN UNALIGNED,
      2 RETCODE  FIXED BIN(31) INIT(0),      /* RETURN CODE */
      2 REASCODE FIXED BIN(31) INIT(0);      /* REASON CODE */
```

RESET PARAMETER STRUCTURE

```
DCL 1 RESET_PARM UNALIGNED,
      2 RESET_WACK_INT FIXED BIN(15) INIT(10),
      2 RESET_HOST_INT FIXED BIN(15) INIT(10);
```

RESET SCREEN MESSAGE

```
DCL 1 RESET_SCREEN UNALIGNED,
      2 SCREEN_LENGTH FIXED BIN(15) INIT(242),  /* 86 */
                      /* LENGTH OF SCREEN DATA */
      2 SCREEN_OPTION CHAR(1) INIT('E'),
                      /* FORCE SCREEN ONTO TUBE */
      2 SCREEN_ATTRIB CHAR(1) INIT('Y'),
                      /* CHARACTER HEX 'E8'     */
/*    2 SCREEN_POSITION BIT(32)                             */
/*          INIT('01000000000100010100000001000000'),       */
             /* HEX  4   0   1   1   4   0   4   0   */
      2 SCREEN_DATA   CHAR(80) INIT(
        ' Abnormal Condition Detected -                    '),
      2 SCREEN_DATA1  CHAR(80) INIT(
        '                                                  '),
      2 SCREEN_DATA2  CHAR(80) INIT(
        '                      DW Cleanup in Progress      ');
                      /* ANY SIZE UP TO 1840 CHARS */
```

QUERY PARAMETER STRUCTURE

```
DCL 1 QUERY_PARM UNALIGNED,
      2 QUERY_WACK_INT BIN FIXED(15) INIT(0),
      2 QUERY_HOST_INT BIN FIXED(15) INIT(0);
```

QUERY RETURN STRUCTURE

```
DCL 1 QUERY_RETURN UNALIGNED,
      2 RETCODE BIN FIXED(31),
      2 REASCODE BIN FIXED(31),
      2 DATA CHAR(200) VARYING;     /* DATA LENGTH */
                                    /* DATA        */
```

QUERY SCREEN MESSAGE

```
DCL 1 QUERY_SCREEN UNALIGNED,
      2 SCREEN_LENGTH BIN FIXED(15) INIT(19),
      2 SCREEN_FORCE CHAR(1) INIT('E'),
      2 SCREEN_ATTRIB CHAR(1) INIT('Y'),
      2 SCREEN_DATA CHAR(17) INIT(' QUERY FOR L3DATA');
```

TRANSFER DW TO VM

. Setup OPEN subroutine call to open DW document

- put diskette name into READ_OPEN_PARM
- put document name into READ_OPEN_PARM
- put document type into READ_OPEN_PARM
- set up WACK interval in READ_OPEN_PARM
- set up HOST TIMER interval in READ_OPEN_PARM . Issue OPEN subroutine call to open the DW document

```
CALL DWROPEN(READ_OPEN_PARM,READ_SCREEN,READ_OPEN_RETURN)
```

. Check results. If acceptable, continue; otherwise handle error.

. Setup READ subroutine call

- set up WACK interval in READ_RECORD
- set up HOST TIMER interval in READ_RECORD . In a loop, issue READ to extract a chunk of data from the DW document that was just opened. Do this until you get to the end of file (signaled by the return code) or till an error occurs that is terminal.

```
CALL DWREAD(READ_RECORD,READ_SCREEN,READ_RETURN);
```

. Setup CLOSE subroutine call

- set up WACK interval in READ_CLOSE_PARM
- set up HOST TIMER interval in READ_CLOSE_PARM . Issue CLOSE subroutine call to CLOSE the DW document

```
CALL DWRCLSE(READ_CLOSE_PARM,READ_SCREEN,READ_CLOSE_RETURN)
```

. Check results. If acceptable, continue; otherwise handle error.

TRANSFER VM TO DW

. Setup OPEN subroutine call to open DW document

- put diskette name into WRITE_OPEN_PARM
- put document name into WRITE_OPEN_PARM
- put document type into WRITE_OPEN_PARM
- set up WACK interval in WRITE_OPEN_PARM
- set up HOST interval in WRITE_OPEN_PARM
- set up mode in WRITE_OPEN_PARM
    - replace or create

- set up record format in WRITE_OPEN_PARM
- set up record length in WRITE_OPEN_PARM . Issue the OPEN subroutine call to open the DW document

```
CALL DWWOPEN(WRITE_OPEN_PARM,WRITE_SCREEN,
                             WRITE_OPEN_RETURN)
```

. Check results. If acceptable, continue; otherwise handle error.

. Setup WRITE subroutine call

- set up WACK interval in WRITE_RECORD
- set up HOST TIMER interval in WRITE_RECORD . In a loop, issue the WRITE to write the extracted chunk of of data to the DW document that was just opened. Do this until you get to the end of file of the VM file that the user specified or till you get a terminal error.

```
CALL DWWRITE(WRITE_RECORD,WRITE_SCREEN,WRITE_RETURN)
```

. set up the CLOSE subroutine call

- set up the close type in WRITE_CLOSE_PARM
- set up WACK interval in WRITE_CLOSE_PARM
- set up HOST TIMER interval in WRITE_CLOSE_PARM . Issue CLOSE subroutine call to CLOSE the DW document

```
CALL DWWCLSE(WRITE_CLOSE_PARM,WRITE_SCREEN,
             WRITE_CLOSE_RETURN)
```

. Check results. If acceptable, continue; otherwise handle error.

PROGRAM DESCRIPTION FOR DOWN (DHIDOWN)

<u>HOW DOWN FITS INTO THE DW-ANR-HOST SYSTEM</u>

DOWN is a transform that is called by the command interface. It transforms DCF to L3. It supports a subset of the possible DCF commands and some restrictions on the parameters it supports for the supported commands. Any unsupported commands may be passed into L3 as text, if the user requests.

<u>WHAT IS L3/L3P</u>

<u>L3</u>
- OIIA L3 is OFFICE INFORMATION INTERCHANGE ARCHITECTURE LEVEL 3

- "self_describing data stream composed of unformatted text, embedded text processing controls and formalized information carrying constructs"

- "provides disciplined support for the coexistence of disparate and similar word processing products by creating an environment in which the portability of editable and formattable text documents is assured"

L3P

- OIIA L3 panther
- a implementation dependent product application
- COF
- OLDER ARCHITECTURE

EXAMPLES OF L3

- show structured fields
- compare a dcf file to a L3 hexdump
- where text starts
- a single-byte formatting control (cre)
- a multi-byte formatting control
- show direct conversions
- show conversion problems
- show how several dcf commands
  can map to 1 L3 structure

DECISION TABLES

INTRODUCTION

A decision table is a way to represent a set of rules for making decisions. This is the major documentation vehicle for the transform algorithms that DHIDOWN implements. The tables we use are set up in rows and columns. The columns are known as rules, and the rows are conditions.

EXAMPLE OF A DECISION TABLE

| RULE | 1 | 2 | 3 | 4 | 5 | 6 | 7 |
|---|---|---|---|---|---|---|---|
| PRIOR STATE: | | | | | | | |
| LASTTX | - | - | - | N | N | Y | Y |
| INPUT: | | | | | | | |
| EOR FIRST? | N | Y | - | N | Y | N | Y |
| THEN ONE OF: | | | | | | | |
| TEXT | -N | -N | -N | Y | Y | Y | Y |
| CONTROL | Y | Y | -N | -N | -N | -N | -N |
| EOF | -N | -N | Y | -N | -N | -N | -N |
| ACTION: | | | | | | | |
| CALL CONT(1) | 1 | - | - | - | - | - | - |
| CALL CONT(2) | - | 1 | - | - | - | - | - |
| CALL CONT(3) | - | - | 1 | - | - | - | - |
| CALL CONT(4) | - | - | - | 1 | - | - | - |
| CALL CONT(5) | - | - | - | - | 1 | - | - |
| WRITE TEXT | - | - | - | - | - | 1 | - |
| WRITE CRE TEXT | - | - | - | - | - | - | 1 |
| NEXT STATE: | | | | | | | |
| LASTTX | N | N | - | Y | Y | -Y | -Y |

Each node (intersection of row and column) may be a "Y","N","-". The node may be yes or true, no or false, or either. If it is a "-N" or a "-Y" , this means it is not important to that rule because it's value is already known. Example, "EOF" can not exist with text or controls, therefore if either text or controls exist, EOF has to be NO. The table is in 2 parts. PRIOR STATE and INPUT are both used as the decision maker. If any rule is found to be true, then the assigned ACTION for that rule is executed, including setting the NEXT STATE. For example, if there was a CONTROL and there was not an EOR FIRST, RULE 1 applies. This is true because LASTTX, TEXT, EOF do not come into this decision and EOR FIRST and CONTROL match. Because rule 1 applies, we would then CALL CONT(1) and set LASTTX to "N". There is in existence a decision table complier that will take a table like this and convert it to high level code. We are researching this, but are not sure if it will meet all out needs. One problem area is that a real decision table assumes 1 and only 1 rule can be correct. We frequently use the tables to decide if any of the rules apply to the situation

INPUT AND OUTPUT REQUIREMENTS FOR DOWN

I/O FLOWCHART

INPUTS AND OUTPUTS FOR DOWN

```
                          +-------------+
     INPUTS               |             |     OUTPUTS
                          |             |
A SCRIPT/VS INPUT         |             |  AN OUTPUT FILE
FILE ALREADY OPENED       |             |  CONTAINING AN L3 DOCUMENT
TO PLI FILE EXPRESSION    |             |  ALREADY OPENED TO PLI FILE
"DCFIN"                   |             |  EXPRESSION "L3OUT"
                          |   DHIDOWN   |
SWITCH (user format)      |   (DOWN)    |  OPTIONAL FILE CONTAINING TRACE
IF TRUE, A FILE ALREADY   |             |
OPENED TO PLI FILE        |             |  RETURN CODE
EXPRESSION "FORMAT"       |             |
                          |             |
SWITCH (user conversion)  |             |
IF TRUE, A FILE ALREADY   |             |
OPENED TO PLI FILE        |             |
EXPRESSION "CTABLE"       |             |
                          |             |
SWITCH (generate trace)   |             |
IF TRUE, A FILE ALREADY   |             |
OPENED TO PLI FILE        |             |
EXPRESSION "TRACE         |             |
                          |             |
SWITCH (unsupported dcf   |             |
        to be written     |             |
        as text)          +-------------+
```

NOTE:-ALL SWITCHES DEFINED AS CHARACTER(1)

-THE 4 SWITCHES AND RETURN CODE ARE IN A STRUCTURE, ONLY A POINTER IS PASSED BETWEEN PROGRAMS.

RECORD FORMATS
- dcf stored as 132 varying
- L3 will be arbitrarily broken into 2k records

SUMMARY OF DOWN

DOWN is a transform program. It reads a DCF source file, breaks up controls, multiple controls, and imbedded controls from the text and processes each control or each text string independently. The design is based on the fact that a string or sequence of DCF controls can be processed and the necessary L3 written out only at the end of the sequence. As each valid control is processed, state variables are set to show what information has been collected. This continues until the end of the sequence, which is text or a point where the state variables conflict. At this point, we can group all the information into structured fields and these structured fields are ordered as required by the L3 architecture. This L3 is then written to a file where it may later be transferred to any device that supports an input L3 architecture, namely Displaywriter.

PROGRAM FLOWCHART

```
                    +------------+
          +-----+   :            :-------> INIT_STATE_VAR_PERSISTENT
          :     :   :            :-------> INIT_STATE_VAR_TRANSIENT
          : HEX :<--:  DHIDOWN   :-------> INIT_STATE_VAR_CONDITIONAL
          :     :   :            :
          +-----+   :            :---------------------------+
                    :------------:                           :
                    :   (SCAN)   :                           :
                    +------------+                           :
                      :        :                             :
                      :        :                             :
                      :        :                             :
  +-----------+       V        :                             :
  :           :   +------+     :      +------+               :
  :GET_NUMBER :<--:      :     +----->:      :               :
  :           :   : CONT :            : TEXT :---+           :
  +-----------+   :      :     +----->:      :   :           :
                  +------+     :      +------+   :           :
                   :   :       :                 :           :
                   :   :  +-------------+        V           :
                   :   :  :             :    +-----------+   :
                   :   +->: UNSUPPORTED :    :           :   :
                   :      :             :    : SAVE_TEXT :---+
                   :      +-------------+    :           :   :
                   :          :              +-----------+   :
                   V          V                  A           :
             +-------------------+               :           V
             :                   :---------------+     +----------+
             : SEQUENCE_COMPLETE :                     :          :
             :                   :-------------------->: WRITE_L3 :
             +-------------------+                     :          :
                                                       +----------+
                                                             :
     NOTE: These routines called                             :
           from more than 1 place.                           V
                                                       +-----------+
     INIT_STATE_VAR_TRANSIENT                          :           :
     INIT_STATE_VAR_PERSISTENT                         : DISK FILE :
     INIT_STATE_VAR_CONDITIONAL                        :           :
     ERROR_CONTROL                                     +-----------+
     WRITE_TRACE
```

This flowchart shows the general flow of control through the program. Each connecting line shows the normal calling path and note that control will return along any path used to get to any point in the chart.

PROGRAM OVERVIEW

DOWN'S SUBROUTINES WITH PROGRAM LOGIC

DHIDOWN -- MAIN ROUTINE

```
     PURPOSE: This is the main procedure of "DOWN".
              It does several things:
                 INIT_TRACE_FILE
                 GET_FORMAT_UNIT
                 SETUP_GENERATION_VECTORS
                 SETUP_CONVERSION_TABLE

                 SCAN - (MAIN CONTROL FOR TRANSFORM)
```

```
CAllS   : WRITE_L3
          WRITE_TRACE
          INIT_STATE_VAR_CONDITIONAL
          INIT_STATE_VAR_TRANSIENT
          INIT_STATE_VAR_PERSISTENT
          TEXT
          CONT
          ERROR_CONTROL
          HEX
```

ROUTINE INIT STATE VAR PERSISTENT

PURPOSE: This procedure is used to initialize state variables.

CAllS : none

ROUTINE INIT STATE VAR CONDITIONAL

PURPOSE: This procedure is used to initialize state variables.

CAllS : none

ROUTINE INIT STATE VAR TRANSIENT

PURPOSE: This procedure is used to initialize state variables.

CAllS : none

ROUTINE TEXT

PURPOSE: This procedure processes a line of text by adding hyphenation, converting to MLP, and outputting the line.

```
CAllS   : SAVE_TEXT
          WRITE_TRACE
```

ROUTINE CONT

PURPOSE: This procedure processes all controls.

```
CAllS   : UNSUPPORTED
          WRITE_TRACE
          ERROR_CONTROL
          SEQUENCE_COMPLETE
          INIT_STATE_VAR_CONDITIONAL
```

ROUTINE UNSUPPORTED

PURPOSE: This procedure handles unsupported controls or parameters.

```
CAllS   : ERROR_CONTROL
          TEXT
          SEQUENCE_COMPLETE
```

ROUTINE SEQUENCE COMPLETE

PURPOSE: This procedure processes the state variables and outputs the necessary L3 that converts that sequence.

```
CAllS   : WRITE_L3
          SAVE_TEXT
          INIT_STATE_VAR_TRANSIENT
```

ROUTINE SAVE TEXT

PURPOSE: This procedure buffers L3 text to be added to the required L3 BT vector.

CAllS : WRITE_L3

ROUTINE WRITE TRACE

PURPOSE: This procedure takes a buffer and writes it to the trace file when trace option is yes.

CAllS : NONE

ROUTINE WRITE L3

PURPOSE: This procedure takes buffered L3 and writes it to the disk.

CAllS : NONE

ROUTINE ERROR CONTROL

PURPOSE: This procedure takes an error code and a message code and updates the largest return code,reason code and also passes the error message text to the trace file. It will terminate run if error code exceeds some set value.

CAllS : WRITE_TRACE

ROUTINE HEX

PURPOSE: This procedure is used in initialization of character variables with bit representation of hex defined with EBCDIC characters.

CAllS : NONE

ROUTINE GET NUMBER

PURPOSE: This procedure is used to get a binary number from the EBCDIC character string input.

CAllS : NONE

EXAMPLES OF SYSTEM FLOW

The code by which DOWN scans the DCF datastream and separates controls from text is collected in the SCAN program. The SCAN program handles DCF records that contain no controls, by calling TEXT. SCAN calls the CONT program whenever it encounters a control. SCAN calls CONT again at the end of each sequence of controls so CONT can write out the L3 that corresponds to the sequence.

An EOR between two DCF records that contain only text is not considered to be a control. SCAN transforms such an EOR by writing out a CRE into the L3 datastream or margin text buffer. TEXT then continues converting graphic characters from DP EBCDIC to MLP and writing the result into the output L3 datastream or margin text buffer.

SCAN detects the start of a DCF control, which it must pass to CONT, by noting either
(a) an EOR followed by a period (i. e. a period in column one) or
(b) a semicolon followed immediately by a period, in any columns, including columns 1 and 2. That semicolon must be coded as a parameter of SCAN because future releases could allow DCF's ".DC CW xx" control to specify a new control word separator character "xx" to replace the semicolon.

When SCAN detects the start of a DCF control, SCAN calls CONT and passes CONT 2 variables. "CONTROL" which contains the 2 character control ID and "PARAMS" which contains the parameter for that control.

Once SCAN has passed a DCF control to CONT, SCAN must continue to call CONT for each new control and must also call CONT one last time when SCAN finds that the next thing in the DCF datastream is text. This last call lets CONT call SEQUENCE_COMPLETE to write out the L3 corresponding to the sequence of controls passed by the preceding calls. After CONT returns from this last call, SCAN calls TEXT to converts the EOR ,if any, and text that followed the last control and write it into the L3 datastream or margin text buffer.

If CONT finds that the control is not supported, and if unsupported controls are to be written out as text, then CONT calls for the control to be written out as text by calling UNSUPPORTED.

In unusual cases, such as successive .PA controls, CONT will find that the control it just got from SCAN can not be transformed to L3 as part of the current sequence of DCF controls. In such a case, CONT calls SEQUENCE_COMPLETE to write out the L3 corresponding to the controls in the sequence it has gotten so far and then starts a new sequence with the control it just got.

When CONT finds that the control it just got was .RH ON or .RF ON, CONT performs a major mode switch that includes the following actions.
- Provide a new set of state bits.
- Initialize them as for the start of a document.
- Set a bit that causes SCAN and CONT to write L3 into the corresponding top or bottom margin text buffer.

DOWN then continues to process text and commands as normal, only the output get stored in a different place. Then when CONT gets the corresponding .RH OFF or .RF OFF, CONT undoes the above actions, leaving the new margin text in the margin text buffers.

SCAN'S CALL PARAMETERS & SCAN'S STATE BIT

When SCAN calls CONT, SCAN uses a call parameter to tell CONT and TEXT what to do. The value of this call parameter means the following:
- CONT(1): Process normal control
- CONT(2): Not used
- CONT(3): Process End Of File

- CONT(4): Process end of sequence before more text
- TEXT(1): Write text to buffer
- TEXT(2): Write CRE text to buffer SCAN relies on a state variable LASTTX to tell it whether the last thing it saw in the DCF datastream was text (LASTTX = 1) or a supported control (LASTTX = 0). This is the extent of the prior state information that SCAN needs. The initial value of LASTTX at the start of processing any document, and also at the start of processing margin text, is one. In general, LASTTX is set to 1 or 0 depending on whether it has just processed text or a control. However, when CONT finds that a given control is not supported (either because of the entire control or because of the particular parameters it has), UNSUPPORTED will call SEQUENCE_COMPLETE to write out the L3 of the preceding sequence and then calls TEXT to add the text to the datastream. The routine TEXT will set LASTTX to show text was processed last even through it started out as a control and CONT had set LASTTX to false.

SCAN's use of the information in LASTTX and SCAN's generation of the calling parameter for CONT are given in the following table. An example of its use follows the table.

BASIC OPERATION OF SCAN

| RULE | 1 | 2 | 3 | 4 | 5 | 6 |
|---|---|---|---|---|---|---|
| PRIOR STATE: | | | | | | |
| LASTTX | - | - | N | N | Y | Y |
| INPUT: | | | | | | |
| EOR FIRST? | - | - | N | Y | N | Y |
| Then one of: | | | | | | |
| TEXT | -N | -N | Y | Y | Y | Y |
| CONTROL | Y | -N | -N | -N | -N | -N |
| EOF | -N | Y | -N | -N | -N | -N |
| ACTION: | | | | | | |
| CALL CONT (1) | 1 | - | - | - | - | - |
| CALL CONT (3) | - | 1 | - | - | - | - |
| CALL CONT (4) | - | - | 1 | 1 | - | - |
| CALL TEXT (1) | - | - | 2 | - | 1 | - |
| CALL TEXT (2) | - | - | - | 2 | - | 1 |
| NEXT STATE: | | | | | | |
| LASTTX | N | - | Y | Y | Y | Y |

EXAMPLE OF PROCESSING BY SCAN & CONT

Consider the following example document, where text1, text2, etc. are arbitrary strings of characters that are not controls and where .X1, .X2, etc. are controls. Suppose that .X4 and .X6 are unsupported controls. Each End Of Record (EOR) and the End Of File (EOF) are shown explicitly. Except for the EOF, each numbered line is a record of DCF.

(A) text1 EOR (B) text2 EOR (C) .X1;.X2 EOR (D) .X3;text3 EOR (E) .X4 EOR (.X4 is unsupported)

(F) text4;.X5;.X6 EOR (.X6 is not supported)

(G) text5 EOR (H) EOF

DOWN processes the above example as follows.

(A) SCAN writes text1 (RULE5).

(B) SCAN writes CRE and text2 (RULE 6) but SCAN must not write another CRE because .X1 may be one of the controls that does not transform into L3 that starts with CRE but instead starts with an RCR or RPE. As a result, any EOR is transformed with what follows it.

(C) SCAN calls CONT with a call parameter (1), that says process this control. SCAN has set a bit to remember that an EOR occurred. CONT sets state bits to remember that this control occurred in the sequence and then returns. Then SCAN calls CONT again with a call parameter (1) saying to process another normal control. CONT sets bits and returns.

(D) SCAN calls CONT with a parameter (1) saying to process yet another control. The EOR is stilled remembered from (B). EOR after controls are not noticed by SCRIPT or DOWN, only EOR'S after text. When CONT returns, SCAN see the text which ends the sequence, so SCAN calls CONT with parameter (4) saying "text ended the sequence". CONT calls SEQUENCE_COMPLETE to write out the L3 corresponding to the sequence .X1, .X2, .X3, and at least one EOR.It then resets its state bits by calling INIT_STATE_VAR_TRANSIENT to be ready for the next sequence whenever it begins, and then returns. At this point, SCAN calls TEXT (1) to write out text3 without a preceding CRE (RULE 5).

(E) SCAN calls CONT with the parameter (1) saying to process the control. CONT notes that .X4 is not a supported control. If this is to be written out as text, this must end the sequence of controls that are to be transformed as a unit, just as any other text would end the sequence. Therefore, CONT calls UNSUPPORTED who decides if this is to be written out as text. If it is, then UNSUPPORTED calls SEQUENCE_COMPLETE to write the L3 appropriate for the sequence it just got. UNSUPPORTED then calls TEXT to output the text and which will set the variable LASTTX to one, meaning that the last thing was text (so SCAN need not call CONT if the next thing is text too, as it is in this example). This unsupported control must be preceded by a semicolon when written, since it does not already have one, so that it will still be treated as a control if it is transformed back UP to the DCF form after having been adjusted by Displaywriter's paginator or LINE ADJ key.

If unsupported DCF controls are not being written out as if they were text, but rather are being dropped, then UNSUPPORTED returns as if nothing happened. LASTTX is still left at zero which says a control was processed.

(F) SCAN sees an EOR and text4. SCAN thinks text4 was preceded by text rather than by a control (since LASTTX is equal to one). Note again that each EOR is processed with the text or control that FOLLOWS it. Hence SCAN calls TEXT(2) which writes a CRE and converts text4 to MLP and writes the result (RULE 6).

SCAN sees the semicolon and period and calls CONT with the parameter (1) saying process this control .x5. CONT sets bits and returns. SCAN calls CONT again parameter (1), normal control. CONT notes that .X6 is not supported. CONT calls UNSUPPORTED which will call SEQUENCE_COMPLETE and write out the L3 appropriate for the sequence it has gotten (namely whatever is appropriate for control .X5 ). UNSUPPORTED then calls TEXT to output this control as text. In this case, no leading semicolon need be added when the control is passed as text. It already has one.

(G) SCAN transforms the EOR before text5 and text5 itself, without any help from CONT (RULE 6). As before, LASTTX = 1 tells SCAN that the preceding thing was text, not a control.

(H) Scan sees the EOR and then the EOF. SCAN calls CONT with the parameter (3) specifying the End Of File (which makes presence of the EOR very uninteresting). CONT sets the bit appropriate to an EOF (which happens to be all that is set, since the preceding thing was text, but which could be just the last bit set for a sequence of controls). Then CONT calls SEQUENCE_COMPLETE to process the bits that are set. This includes writing out an End Unit in this case. Then CONT returns to SCAN. Scan returns and DOWN is finished.

EXCEPTION CONDITIONS FOR DOWN

EXCEPTION CONDITIONS FOR DOWN

THESE ARE THE DOWN ERRORS:

70 01 There was an ERROR in the down SCAN DECISION TABLE. This should never occur unless the code is changed.

71 01 Down got a script control that the transform does not support. The control will be ignored, and depending on the setting of the keep_script_control_word parameter, it may or may not be kept in the document as text.

71 02 Down got an unsupported parameter to a script control that the transform does support. This will cause it to act like an unsupported control (71,1).

72 01 The script tabs received as input are not in ascending order. This becomes an unsupported parameter.

72 02 The script tabs received contained a number higher than 255. The resultant tab rack will be truncated after 255.

74 01 A hanging indent caused a break.

74 02 Insufficient tabs were found following a hanging indent.

75 01 There was no tab position to the right of the current position to indent to.

76 01 The margin text was truncated because it exceeded 2K bytes.

/**************** TERMINAL ERRORS ****************************/

79 01 We do not support format type of "CMT".

79 02 The format unit contains unrecognizable 13. The 2 byte length identifier did not match the length of the file record.

| | | |
|---|---|---|
| 79 | 03 | The format unit does not have all the required vectors. Specifically, one or more of the required PMF vectors was not found. |
| 79 | 04 | The user format unit contained an invalid tab rack. |
| 79 | 05 | Any one format unit vector exceeded 2048 bytes. |
| 79 | 06 | The associated PMF margin text vector contains a margin text vector format that is unsupported. We only support format '00'. |
| 79 | 07 | The associated PMF margin text vector contains a margin text vector type that is unsupported. We only support types '1' thru '6'. |

PROGRAM DESCRIPTION FOR UP (DHIUP)

HOW UP FITS INTO THE DW-ANR SYSTEM

SUMMARY

UP is a data stream transformation program that runs on the host VM/370 system. The UP program transforms an editable OIIA-L3 data stream (from the displaywriter) into an editable DCF document (for use on the host).

A document that exists on a displaywriter diskette is sent to the host VM/370 using the ANR link and file transfer software. The UP program is then called to transform this OIIA-L3 representation of the document into a DCF format of the document so that it can be viewed and edited on the host.

All transfer/transform activity is controlled by the command processor program which allows for file naming, transform selection, and error reporting.

TRANSFORM DIRECTION

The document starts on the displaywriter as an OIIA-L3P data stream stored on a work diskette. After file transfer and file transform, the document will reside on a VM/370 mini disk as a DCF (script) file.

The following diagram is included to show the upward direction of the data stream during a displaywriter to host VM/370 document transfer and transform.

```
 ________________________________________
|              VM/370                    |
|              ------                    |
|                                        |
|              XEDIT                     |
|            SCRIPT/VS                   |
|       TRANSFER/TRANSFORM               |
|________________________________________|
               /|
               /|
               /|
          ______________
         | controller  |
         |_____________|
               /|
               /|ANR
               /|
 ________________________________________
|          DISPLAYWRITER                 |
|          -------------                 |
|                                        |
|          TYPING TASKS                  |
|          3277 EMULATION                |
|          FILE TRANSFER                 |
|________________________________________|
```

INPUT AND OUTPUT REQUIREMENTS FOR UP

I/O FLOWCHART

The basic function of the UP program is to read an OIIA-L3 file and to write a DCF file. The following diagram is included to show all of the input and output requirements for the UP program. For each input or output requirement (shown below) there is a corresponding section following this flowchart.

```
  Input                                                    Output
  -----                                                    ------

                        ____________________
                       |                    |
 _________             |                    |              __________
| OIIA-L3 |            |                    |             | DCF      |
| FILE    |--------->  |                    | --------->  | FILE     |
|_________|            |                    |             |__________|
                       |                    |
                       |                    |
                       |                    |
                       |                    |              __________
                       |                    |             | TRACE    |
                       |                    | --------->  | FILE     |
                       |      EPSTUP        |             |__________|
                       |      PROGRAM       |
 _________             |                    |              __________
| CONVERT |            |                    |             | FORMAT   |
| FILE    |--------->  |                    | --------->  | FILE     |
|_________|            |                    |             |__________|
 _________             |                    |              __________
|         |            |                    |             | Return   |
| Pointer |--------->  |                    | --------->  | Code     |
|_________|            |                    |             |__________|
                       |____________________|
```

```
OIIA-L3 FILE - has a pl1 file expression of L3IN    (required)
CONVERT FILE -  "  "  "  "        "       " CONVERT (optional)
DCF FILE     -  "  "  "  "        "       " DCFOUT  (required)
TRACE FILE   -  "  "  "  "        "       " ADCFOUT (optional)
FORMAT FILE  -  "  "  "  "        "       " FORMATO (optional)
Pointer      - locates shared data  (switches and return code)
```

L3 INPUT FILE EXAMPLE

This is an example of an OIIA-L3 data stream. The architecture of the data stream is "self-describing". It is composed of a series of structures which contain formatting information, unformatted text, and embedded controls. These structures, with their sub-structures, controls, and text are shown in the following example (uploaded by prototype D2). The first line of each pair deliniates and names the structures, and gives the character representation of any text. The second line is the actual L3 data stream.

```
<--FUP---><--DP----------------------------><--FUP---><--PMF---(PIP)
0005E103000012E2050000010100F0F0F0F0F000F0F10005E1030000D7E201000013

---------------------------------(LP)-------------------------------
E50700000000002FD03DE00690069038400001EE60100000000056007801000101000870

------------------------(TP)----------------------------------------
20D000F0020100060064040400097E602000000000000600000B0000100000150000 1A00

--------------------------------------------------------------------
001F000024000002900002E00003300003800003D00004200004700004C000051000056

--------------------------------------------------------------------
00005B000060000065000006A00006F000074000079000007E000083000088000008D0000

--------------------------------------------------------------------
9200009700009C0000A10000A60000AB0000B00000B50000BA0000BF0000C40000C900

---------------------------------------------(PM)--------------><---
00CE0000D30000D80000DD0000E20000E70000EC0000F1000AE402000101010101010008

-MP--------><--MP----------><---------><--AMF----(PIP)--------------
E501000002D00008E50400003B100005E1030000D7E202000013E50700000000002FD0

----------------(LP)------------------------------------------------
3DE006900690384000 1EE601000000000560078010001010008702A3000F00201000600

------(TP)----------------------------------------------------------
6401040097E602000000000000600000B0000100000150000 1A00001F000024000002900

--------------------------------------------------------------------
002E00003300003800003D00004200004700004C000051000056000005B000060000065

--------------------------------------------------------------------
00006A00006F00007400007900007E00008300008800008D00009200009700009C0000

--------------------------------------------------------------------
A10000A60000AB0000B00000B50000BA0000BF0000C40000C90000CE0000D30000D800

---------------------------(PM)--------------><--MP----------><--MP-
00DD0000E20000E70000EC0000F1000AE4020001010101010008E501000002D00008E5

---------><--TUP---------------><--BT----- F o u r   s c o r e   a n d
0400003B10000BE10400F0F0F0F1F0F0013EE80700C696A49940A283969985408 19584

   s e v e n   y e a r s   a g o ,   o u r   f a t h e r s   b r o u g
40A285A5859540A8858199A2408187966B4096A49940868 1A3888599A240829996A487
```

```
 h t   f o r t h   o n   t h i s   c o n t i n e n t   a   n e w   n
88A34015869699A38840969540A38889A240839695A389958595A34081409585A64095

 a t i o n ,   c o n c e i v e d   i n   l i b e r t y   a n d   d e
81A38996956B40839695838589A58584408995401593898285 99A3A840819584408485

 d i c a t e d   t o   t h e   p r o p o s i t i o n   t h a t   a l l
8489838 1A3858440A39640A38885409799969796A289A389969540A38881A340819393

     m e n   a r e   c r e a t e d   e q u a l .   N o w   w e   a r e
40159485954081998540839985 81A3858440859 8A481934B40D596A640A68540819985

   e n g a g e d   i n   a   g r e a t   c i v i l   w a r ,   t e s
408595878187858440899540814087998581A340158389A5899340A681996B40A385A2

 t i n g   w h e t h e r   t h a t   n a t i o n   o r   a n y   n a t
A38995874 0A68885A388859940A38881A34095 81A38996954096994081 95A84095 81A3

 i o n   s o   c o n c e i v e d   a n d   s o   d e d i c a t e d
899695401 5A2964083969583858 9A585844081958440A2964084858489838 1A3858440

 c a n   l o n g   e n d u r e . ----><--EUP---><--BT------>
83819540939695874085958 4A499854B40150C0005E106000006E807000C
```

DCF OUTPUT EXAMPLE

This DCF example was created by UP prototype D2 from the L3 file described in the preceeding section.

```
.CM RUN DATE = 09/28/82
.CM RUN TIME = 15:54:44
.IM STARTUP
Four score and seven years ago, our fathers brought
forth on this continent a new nation, conceived in
liberty and dedicated to the proposition that all
men are created equal. Now we are engaged in a great
civil war, testing whether that nation or any nation
so conceived and so dedicated can long endure.
```

This is the scripted version of the above DCF example:

Four score and seven years ago, our fathers brought forth on this continent a new nation, conceived in liberty and dedicated to the proposition that all men are created equal. Now we are engaged in a great civil war, testing whether that nation or any nation so conceived and so dedicated can long endure.

TRACE OUTPUT EXAMPLE

The trace file lists all the actions of the UP program. It is an optional file intended to aid in debugging the program, and tracing the L3 input. This TRACE example was created by UP prototype D2.

```
--- ---  UP TRANSFORM TRACE FILE  --- ---

--- FILE NAME = LINCOLN
--- FILE TYPE = L3
--- FILE MODE = *

.CM RUN DATE = 09/28/82
.CM RUN TIME = 15:54:44
.IM STARTUP
```

```
********* FORMAT UNIT
****   1    FUP     L1-VECT  /E10300/  # 1  LTH =    5 **
****   2    DP      L1-VECT  /E20500/  # 1  LTH =   18 ** UNSUPPORTED
********* FORMAT UNIT
****   3    FUP     L1-VECT  /E10300/  # 2  LTH =    5 **
****   4    PMF     L1-VECT  /E20100/  # 1  LTH =  215 **
**       1    PIP     L2-VECT /E50700/  # 1  LTH =   19 **
**       2    LP      L2-VECT /E60100/  # 1  LTH =   30 **
**       3    TP      L2-VECT /E60200/  # 1  LTH =  151 ** NBR=        48
**       4    PM      L2-VECT /E40200/  # 1  LTH =   10 **
****   5    MP      L1-VECT  /E50100/  # 1  LTH =    8 ** PMF TOP-THIS-PG
****   6    MP      L1-VECT  /E50400/  # 2  LTH =    8 ** PMF BOT-THIS-PG
********* FORMAT UNIT
****   7    FUP     L1-VECT  /E10300/  # 3  LTH =    5 **
****   8    AMF     L1-VECT  /E20200/  # 1  LTH =  215 **
**       1    PIP     L2-VECT /E50700/  # 2  LTH =   19 **
**       2    LP      L2-VECT /E60100/  # 2  LTH =   30 **
**       3    TP      L2-VECT /E60200/  # 2  LTH =  151 ** NBR=        48
**       4    PM      L2-VECT /E40200/  # 2  LTH =   10 **
****   9    MP      L1-VECT  /E50100/  # 3  LTH =    8 ** AMF TOP-THIS-PG
****  10    MP      L1-VECT  /E50400/  # 4  LTH =    8 ** AMF BOT-THIS-PG
********* TEXT UNIT
****  11    TUP     L1-VECT  /E10400/  # 1  LTH =   11 ** APM IMPLIED
****  12    BT      L1-VECT  /E80700/  # 1  LTH =  318 **
Four score and seven years ago, our fathers brought
forth on this continent a new nation, conceived in
liberty and dedicated to the proposition that all
men are created equal. Now we are engaged in a great
civil war, testing whether that nation or any nation
so conceived and so dedicated can long endure.
********* END UNIT
****  13    EUP     L1-VECT  /E10600/  # 1  LTH =    5 ** BT/PE IGNORED
****  14    BT      L1-VECT  /E80700/  # 2  LTH =    6 **


--- NORMAL END OF PROGRAM   RC / CC =        0/        0
```

POINTER AND RETURN CODE

The command program (DHIMAIN) passes a pointer to the UP program (DHIUP) so it can locate the following information:

(1) Return Code

This is a value that is passed back to the calling program to indicate the degree of success or failure of this run of the UP program.

(2) Completion Code

This is another value that is passed back to the calling program to indicate the degree of success or failure of this run of the UP program.

(3) Convert Table Switch

This switch tells the UP program whether to use the default MLP-EBCDIC convert table, or a user supplied convert table, when converting characters in the data stream.

(4) Trace Switch

This switch tells UP whether or not the user wants the trace (debugging) file to be created.

(5) Format Unit Switch

This switch indicates if the user wants the UP program to save the format unit of the OIIA-L3 data stream. If requested the format unit is written, without alteration, to a VM file. This file can then be used by the DOWN transformation program.

(6) File Name

This is the VM/370 file name of the OIIA-L3 input document that the UP program is transforming. It is a character string eight bytes long.

(7) File Type

This is the VM/370 file type of the OIIA-L3 input document that the UP program is transforming. It is a character string eight bytes long.

(8) File Mode

This is the VM/370 file mode of the OIIA-L3 input document that the UP program is transforming. It is a character string two bytes long.

When UP returns control to the command program (DHIMAIN) it passes back completion status information. This is done by updating the return code and completion code in the above structure (using the pointer to locate it). For a list of return codes and their meanings see the section on error exceptions for UP.

SUMMARY OF UP

PROGRAM OVERVIEW

The Up program has been designed around the main input file containing the OIIA-L3 data stream.

The entire up program, as well as the parser, handles one first level vector at a time. That means the parser does a 'get' until it obtains the entire vector. Then subroutines of read_vector write out the DCF that corresponds to the contents of that first level vector. (The parser expects the first 5 bytes of every vector to be a valid LLCTF).

The design and the program have been broken into three sections; Initiate, Read Vector, and Terminate.

L3 architecture insists on expandability so anything up does not recognize, up is forced to ignore.

UP can not error check the L3 input. Except for an invalid length field (greater than 32,767 or less than 5), there is no way for up to say that it has detected incorrect L3. Up's parser can go to the end of the input file containing L3 without recognizing anything.

PROGRAM FLOWCHART

```
+------+
|      |     +-----------+
|begin |---->|           |    +--------------------------+
|      |     |           |--->| accept switches (DHIMAIN)|
|      |     |           |    +--------------------------+
|      |     | INITIATE  |                 v
|      |     |           |    +--------------------------+
|      |     |           |    | initialize all variables |
|      |     |           |<---| date/time  startup macro |
|      |<----|           |    +--------------------------+
|      |     +-----------+
|      |
|      |     +-----------+    +--------------------------------------+
|      |     |           |--->|  read and select one 1st level vector |
|      |     |           |    +--------------------------------------+
|      |     |           |         |            |              |
|      |     |           |    unsupported   not text          text
|      |     |           |         |            v            (BT,MT)
|      |     |           |         |    +-----------+           v
|      |     |           |         |    | write FU  |   +--------------+
|  D   |     |           |         v    | store P/AMF|  |    select    |
|  H   |     |           |    +-----+   | 2nd level |   |   one byte   |
|  I   |     | READ      |    |     |<--| vectors   |   |              |
|  U   |     | VECTOR    |    | t   |   +-----------+   +--------------+
|  P   |     |           |    | r   |                        /|        |
|      |     |           |    | a m |   +-----+              |        |
|      |     |           |    | c e |<--| end |--no--------->|        |
|      |     |           |    | e s |   +-----+                       |
|      |     |           |    |   s |    /|  +--------------------+   |
|      |     |           |<---|   a |     |<-| process 2B control |<-|
|      |     |           |    |   g |     |  | (skip extra bytes) |   |
|      |     |           |    |   e |     |  +--------------------+   |
|      |     |           |    +-----+     |  +--------------------+   |
|      |     |           |                |<-| process 1B control |<-|
|      |     | do until  |                |  +--------------------+   |
|      |<----| L3 eof    |                |  +--------------------+   |
|      |     +-----------+                |<-| process character  |<-|
|      |                                     |  (mlp/ebcdic)      |
|      |     +-----------+                   +--------------------+
|      |---->|           |    +-------------------------+
|      |     | TERMINATE |--->|  trace messages         |
|      |     |           |<---|  return code            |
| end  |<----|           |    +-------------------------+
|      |     +-----------+
+------+
```

UP'S MAIN SUBROUTINES WITH PROGRAM LOGIC

INITIALIZE SUBROUTINE

- Initialize:
  - ten state variables used in the single- and multi-byte control decision tables:
    - ended_dcf_record
    - ended_paragraph
    - unindented
    - ended_page
    - hyphenating
    - last_was_shy
    - last_was_cre
    - last_was_pe
    - ended_word
    - delimit_wus

- cnt_cur_it, current indent tab count
- current_format, current type of format
- cnt_vectorid corresponding to each first level vector indicating how many vectors of the same vectorid were encountered
  - example: count_bt tells how many bt vectors have been encountered
- cnt_2nd_vectorid corresponding to each second level vector
- cnt_multiid corresponding to each multi byte control

- Accept input from DHIMAIN
  - convert_table_switch
  - trace_switch
  - format_switch
  - file_name
  - file_type
  - file_mode

- Write the two DCF controls that invoke the startup macro at the beginning of the document.
  - used to tell the DCF formatter which characters to translate on input into other characters or into the null string, to handle many single byte controls.

- Write the date and time stamp into the DCF and Trace files.

- Initialize the MLP/EBCDIC conversion table.
  - Use the program default convert table or read in a user defined convert table

- Initialize the formatting compare fields to SCRIPT/VS defaults
  - For example ".SS", null margin text, etc...

READ VECTORS SUBROUTINE

- Parse the OIIA-L3 input data stream into its largest recognizable segments
  - first level vectors
- Handle one first level vector at at time
- Assume the first 5 bytes of the input data stream contain a valid LLCTF identifier.
- Assume that each vector thereafter has a valid length
- Call subroutines to handle each first level vector.
  - in general, vectorid_vector
  - for example, bt_vector
- Each vectorid_vector subroutine increments the count of that type of vector
  - for example, bt_vector increments count_bt
- Write out entire format unit (FU) as a cms file
  - if and only if this is in the format unit, and if requested by a user's input switch
  - used by DOWN as a user supplied format unit
  - pli file id is formato Subroutines called by Read Vector Subroutines pmf_vector, amf_vector, and tufc_vector

- Save the necessary formatting values
  - for subsequent use
    - at start of document (implied APM)
    - to transform APM
    - to transform AAM
    - to transform RTMF
    - before a BT that followed a TUFC
  - in the form of a pl/1 structure containing all line and page formatting parameters that UP needs to create the required DCF controls
    - this save is done in subroutine setup_format
    - setup format is called with a pointer set to the AMF, PMF or TUFC data structure Subroutines mp_vector and mt_vector.

- Store margin text and margin text information
  - MP and MT vectors can follow PMF, AMF, or TUFC for margin text as if this were the start of
    - store this-page or next-page status
    - store the actual margin text for later output
    - tag the margin text as top or bottom
    - tag the margin text as either PMF, AMF, or TUFC in origin
- Process contents of the MT buffers essentially as if it were a body text vector but only when the format has been activated
  - at start of document (implied APM)
  - to transform APM
  - to transform AAM
  - to transform RTMF
  - to transform TUFC
- Only process the margin text if it is different from the currently active margin text in the script document.

Subroutine tup_vector

- Initiate processing of text unit
- If count_tup is one(starting first text unit) then imply an APM, i. e.:
  - write DCF that corresponds to the information saved in the pl/1 structure while reading the PMF by calling write_format while pointing to the PMF structure
    - write margin text defined just after the PMF, if any Subroutine write_format

- Writes out the dcf corresponding to a PMF, AMF, or TUFC structure.

- Calls subroutines
    - margin_format
    - spacing_format
    - adj_alg_format
    - source_format
    - tabs_format
- These subroutines are also used by the multi-byte controls for writting DCF Subroutine setup_format

- Stores the dcf corresponding to a PMF, AMF, or TUFC first level vector
- Reads and parses the second level vectors of the format first level vectors
- Calls the correct second level vector subroutine
    - pip_2nd_vect
    - lp_2nd_vect
    - tp_2nd_vect
    - ln_2nd_vect
    - pin_2nd_vect
    - pm_2nd_vect
- These subroutines are called (with a pointer set) and they do the actual data storage Subroutines apm_vector, aam_vector and rtmf_vector

- Write out correct dcf controls for APM, AAM, and RTMF
- Use the information stored by PMF or AMF
- Pass a pointer identifying appropriate pl/1 structure and call the subroutine write_format Subroutine bt_vector

- Process body text vector by calling read_text subroutine which then distinguishes between:
    - multi-byte controls
    - single-byte controls
    - text character and call one of the following:
    - process_multi_byte
    - bs_nbs_ubs_single_byte
    - cre_single_byte
    - ht_single_byte
    - it_single_byte
    - inx_single_byte
    - rcr_irt_single_byte
    - nul_single_byte
    - nsp_single_byte
    - rsp_single_byte
    - pe_single_byte
    - hyp_single_byte
    - rpe_single_byte
    - sp_single_byte
    - sbs_single_byte
    - sub_single_byte
    - sps_single_byte
    - shy_single_byte
    - wus_single_byte
    - zicr_single_byte
    - character_output Subroutine character_output

- Convert one character at a time from MLP to EBCDIC
- Write into the output buffer the converted character by calling write_character subroutine Subroutine xxx_single_bytes
(for each control listed above)

- Transform actual control using the decision table information as described in "L3 single-byte controls to DCF" in chapter 4.
  - cre decision table
  - rcr or irt decision table
  - zicr decision table
  - pe decision table
  - rpe decision table
  - rsp ubs nbs bs decision table Subroutine process_multi_bytes:

- Call appropriate subroutine
  - slp_multi_byte
  - stab_multi_byte
  - atf_multi_byte
    uses atf decision table
    for centering
  - bus_multi_byte
    writes .us on
  - eus_multi_byte
    writes .us off
  - ppin_multi_byte
    writes "&" (in margin text only)
    for page numbering
  - rmlf_multi_byte
    uses a subset of PMF or AMF data
    to change line formatting Subroutine write_character

- Write out the character to the text_output buffer
- Check to avoid writting DCF records greater than 132 bytes Subroutine write_control

- Write out the a DCF comand
- Called by any routine that needs to write SCRIPT controls Subroutine write_buffer

- Writes out a DCF line
- The characters were stored one by one in the write_character subroutine
- called by any routine that wants to end the DCF record Subroutine write_save_word

- Writes out a DCF line except for the last word in the buffer
- The saved word becomes the first part of cleared buffer
- Called only for hyphenation and word underscore

TERMINATE SUBROUTINE

- Write out any remaining DCF output in the text_output buffer

- Determine and save return/completion code

- Write completion info to trace file

INTERNAL SUBROUTINE DESCRIPTIONS

PRIMARY SUBROUTINES

```
MODULE NAME: DHIUP

LANGUAGE: PLI

LOGIC FLOW DIAGRAM REFERENCE:
         SEE DHIUP PROGRAM FLOWCHART

PURPOSE: TRANSFORM AN OIIA-L3 DATA STREAM INTO A DCF FILE

PROCESS: THIS IS THE MAINLINE MODULE FOR UP TRANSFORM
         ALL SUBROUTINES ARE INTERNAL TO THIS PROCEDURE

CALLED BY: DHIMAIN

MODULES CALLED: NONE

FILES READ: L3IN
            CONVERT

FILES WRITTEN: DCFOUT
               ADCFOUT
               FORMAT

EXIT CONDITIONS NORMAL:
         NORMAL END OF FILE REACHED FOR
         L3IN GIVES A RETURN CODE EQUAL ZERO
         AND PASSES CONTROL BACK TO DHIMAIN

EXIT CONDITIONS ABNORMAL:
         GIVES A NON ZERO RETURN CODE
         AND PASSES CONTROL BACK TO DHIMAIN
         (SEE SECTION ON EXCEPTION CONDITIONS)


SUBROUTINE NAME: INITIALIZE

LANGUAGE: PLI

PURPOSE: INITIALIZE ALL VARIABLES, SWITCHES AND TABLES,
         AND START PROGRAM EXECUTION.

CALLED BY: DHIUP


SUBROUTINES CALLED: WRITE_TRACE_MSG
                    WRITE_CONTROL
                    SET_STATE_BEGIN

EXIT CONDITIONS NORMAL:
         PASSES CONTROL BACK TO DHIUP
```

```
EXIT CONDITIONS ABNORMAL:
        STORES A NON ZERO RETURN CODE
        AND PASSES CONTROL BACK TO DHIUP

SUBROUTINE NAME: READ_VECTORS

LANGUAGE: PLI

PURPOSE: READ ONE FIRST LEVEL VECTOR AND CALL
        A SUBROUTINE TO PROCESS IT.

CALLED BY: DHIUP

SUBROUTINES CALLED: BT_VECTOR
                    FUP_VECTOR
                    EUP_VECTOR
                    TUP_VECTOR
                    DP_VECTOR
                    PMF_VECTOR
                    AMF_VECTOR
                    APM_VECTOR
                    AAM_VECTOR
                    RTMF_VECTOR
                    TUFC_VECTOR
                    MP_VECTOR
                    MT_VECTOR
                    UNKNOWN_VECTOR

EXIT CONDITIONS NORMAL:
        PASSES CONTROL BACK TO DHIUP

EXIT CONDITIONS ABNORMAL:
        STORES A NON ZERO RETURN CODE
        AND PASSES CONTROL BACK TO DHIUP

SUBROUTINE NAME: TERMINATE

LANGUAGE: PLI

PURPOSE: WRITE ANY REMAINING DCF, AND END THE PROGRAM.

CALLED BY: DHIUP

SUBROUTINES CALLED: WRITE_BUFFER
                    WRITE_TRACE_MSG

EXIT CONDITIONS NORMAL:
        PASSES CONTROL BACK TO DHIUP

EXIT CONDITIONS ABNORMAL:
        STORES A NON ZERO RETURN CODE
        AND PASSES CONTROL BACK TO DHIUP
```

SECONDARY SUBROUTINES

```
MODULE NAMES AND ANY CALLS
FROM THAT MODULE

    UNKNOWN_VECTOR
        CALLS: WRITE_TRACE_L1

    FUP_VECTOR
        CALLS: WRITE_TRACE_MSG
               WRITE_TRACE_L1
```

```
EUP_VECTOR
    CALLS: WRITE_TRACE_MSG
           WRITE_TRACE_L1

TUP_VECTOR
    CALLS: WRITE_TRACE_MSG
           WRITE_TRACE_L1
           WRITE_FORMAT

PMF_VECTOR
    CALLS: WRITE_TRACE_L1
           SETUP_FORMAT

AMF_VECTOR
    CALLS: WRITE_TRACE_L1
           SETUP_FORMAT

APM_VECTOR
    CALLS: WRITE_TRACE_L1
           WRITE_FORMAT

AAM_VECTOR
    CALLS: WRITE_TRACE_L1
           WRITE_FORMAT

RTMF_VECTOR
    CALLS: WRITE_TRACE_L1
           WRITE_FORMAT

TUFC_VECTOR
    CALLS: WRITE_TRACE_L1
           SETUP_FORMAT

MP_VECTOR
    CALLS: WRITE_TRACE_L1

MT_VECTOR
    CALLS: WRITE_TRACE_L1
           WRITE_TRACE_MSG

DP_VECTOR
    CALLS: WRITE_TRACE_L1

BT_VECTOR
    CALLS: WRITE_TRACE_L1
           WRITE_FORMAT
           READ_TEXT

SETUP_FORMAT
    CALLS: READ_FORMAT_VECT

WRITE_FORMAT
    CALLS: WRITE_CONTROL
           MARGIN_FORMAT
           SPACING_FORMAT
           ADJ_ALG_FORMAT
           SOURCE_FORMAT
           TABS_FORMAT
           SET_STATE_FORMAT

READ_FORMAT_VECT
    CALLS: PIP_2ND_VECTOR
           LP_2ND_VECTOR
           TP_2ND_VECTOR
           LN_2ND_VECTOR
           PIN_2ND_VECTOR
           PM_2ND_VECTOR
           UNKNOWN_2ND_VECTOR
```

```
PIP_2ND_VECTOR
    CALLS: WRITE_TRACE_L2

LP_2ND_VECTOR
    CALLS: WRITE_TRACE_L2

TP_2ND_VECTOR
    CALLS: WRITE_TRACE_L2

LN_2ND_VECTOR
    CALLS: WRITE_TRACE_L2

PIN_2ND_VECTOR
    CALLS: WRITE_TRACE_L2

PM_2ND_VECTOR
    CALLS: WRITE_TRACE_L2

UNKNOWN_2ND_VECTOR
    CALLS: WRITE_TRACE_L2

READ_TEXT
    CALLS: PROCESS_MULTI_BYTE
           BS_NBS_UBS_SINGLE_BYTE
           CRE_SINGLE_BYTE
           HT_SINGLE_BYTE
           IT_SINGLE_BYTE
           INX_SINGLE_BYTE
           RCR_IRT_SINGLE_BYTE
           NUL_SINGLE_BYTE
           BS_NBS_UBS_SINGLE_BYTE
           NSP_RSP_SINGLE_BYTE
           PE_SINGLE_BYTE
           RCR_IRT_SINGLE_BYTE
           HYP_SINGLE_BYTE
           RPE_SINGLE_BYTE
           NSP_RSP_SINGLE_BYTE
           SP_SINGLE_BYTE
           SBS_SINGLE_BYTE
           SUB_SINGLE_BYTE
           SPS_SINGLE_BYTE
           SHY_SINGLE_BYTE
           BS_NBS_UBS_SINGLE_BYTE
           WUS_SINGLE_BYTE
           ZICR_SINGLE_BYTE
           CHARACTER_OUTPUT

PROCESS_MULTI_BYTE
    CALLS: STAB_MULTI_BYTE
           SLP_MULTI_BYTE
           BUS_MULTI_BYTE
           EUS_MULTI_BYTE
           ATF_MULTI_BYTE
           PPIN_MULTI_BYTE
           BLFC_MULTI_BYTE
           ELFC_MULTI_BYTE
           RMLF_MULTI_BYTE
           UNKNOWN_MULTI_BYTE

STAB_MULTI_BYTE
    CALLS: WRITE_TRACE_MB
           TABS_FORMAT

ATF_MULTI_BYTE
    CALLS: WRITE_TRACE_MB
           WRITE_TRACE_MSG
           WRITE_TRACE_MSG
```

```
BUS_MULTI_BYTE
    CALLS: WRITE_TRACE_MB
           WRITE_BUFFER
           WRITE_CONTROL
           SET_STATE_NOBREAK

EUS_MULTI_BYTE
    CALLS: WRITE_TRACE_MB
           WRITE_BUFFER
           WRITE_CONTROL
           SET_STATE_NOBREAK

PPIN_MULTI_BYTE
    CALLS: WRITE_TRACE_MB

BLFC_MULTI_BYTE
    CALLS: WRITE_TRACE_MB
           WRITE_BUFFER
           WRITE_CONTROL

ELFC_MULTI_BYTE
    CALLS: WRITE_TRACE_MB
           SET_STATE_LINE

SLP_MULTI_BYTE
    CALLS: WRITE_TRACE_MB
           SPACING_FORMAT
           ADJ_ALG_FORMAT

RMLF_MULTI_BYTE
    CALLS: WRITE_TRACE_MB
           WRITE_BUFFER
           WRITE_CONTROL
           SPACING_FORMAT
           ADJ_ALG_FORMAT
           TABS_FORMAT
           SET_STATE_LINE

UNKNOWN_MULTI_BYTE
    CALLS: WRITE_TRACE_MB

BS_NBS_UBS_SINGLE_BYTE
    CALLS: WRITE_BUFFER
           WRITE_CONTROL
           WRITE_CHARACTER
           SET_STATE_BACKSPACE

CRE_SINGLE_BYTE
    CALLS: WRITE_CHARACTER
           WRITE_BUFFER

HT_SINGLE_BYTE
    CALLS: WRITE_BUFFER
           WRITE_CHARACTER
           SET_STATE_WORDEND

IT_SINGLE_BYTE
    CALLS: WRITE_BUFFER
           WRITE_TRACE_MSG
           WRITE_CONTROL
           SET_STATE_WORDEND

INX_SINGLE_BYTE
    CALLS: WRITE_CHARACTER

RCR_IRT_SINGLE_BYTE
    CALLS: WRITE_CHARACTER
           WRITE_BUFFER
           WRITE_CONTROL
```

```
NUL_SINGLE_BYTE

NSP_RSP_SINGLE_BYTE
    CALLS: WRITE_BUFFER
           WRITE_CONTROL
           WRITE_CHARACTER
           SET_STATE_BACKSPACE

PE_SINGLE_BYTE
    CALLS: WRITE_BUFFER
           WRITE_CHARACTER

HYP_SINGLE_BYTE
    CALLS: WRITE_CHARACTER
           SET_STATE_CHAR

RPE_SINGLE_BYTE
    CALLS: WRITE_CONTROL
           WRITE_BUFFER

SP_SINGLE_BYTE
    CALLS: WRITE_BUFFER
           WRITE_CHARACTER
           SET_STATE_WORDEND

SBS_SINGLE_BYTE
    CALLS: WRITE_CHARACTER
           SET_STATE_CHAR

SUB_SINGLE_BYTE
    CALLS: WRITE_CHARACTER
           SET_STATE_CHAR

SPS_SINGLE_BYTE
    CALLS: WRITE_CHARACTER
           SET_STATE_CHAR

SHY_SINGLE_BYTE
    CALLS: WRITE_SAVE_WORD
           WRITE_CHARACTER
           SET_STATE_CHAR

WUS_SINGLE_BYTE
    CALLS: WRITE_SAVE_WORD
           WRITE_CONTROL
           WRITE_BUFFER
           SET_STATE_WORDEND

ZICR_SINGLE_BYTE
    CALLS: WRITE_BUFFER
           WRITE_CONTROL

CHARACTER_OUTPUT
    CALLS: WRITE_CHARACTER
           SET_STATE_CHAR

MARGIN_FORMAT
    CALLS: WRITE_CONTROL
           READ_TEXT

SPACING_FORMAT
    CALLS: WRITE_CONTROL

ADJ_ALG_FORMAT
    CALLS: WRITE_CONTROL
           WRITE_TRACE_MSG

SOURCE_FORMAT
    CALLS: WRITE_CONTROL
           WRITE_TRACE_MSG
```

```
TABS_FORMAT
    CALLS: WRITE_CONTROL

WRITE_CHARACTER
    CALLS: WRITE_BUFFER
           WRITE_TRACE_MSG

WRITE_SAVE_WORD
    CALLS: WRITE_BUFFER
           CLEAR_BUFFER

WRITE_CONTROL

    CALLS: WRITE_BUFFER
           WRITE_TRACE_MSG
           WRITE_DCFOUT

WRITE_BUFFER
    CALLS: WRITE_DCFOUT
           CLEAR_BUFFER

CLEAR_BUFFER

WRITE_DCFOUT
    CALLS: WRITE_TRACE_MSG

WRITE_TRACE_MSG

WRITE_TRACE_L1

WRITE_TRACE_L2

WRITE_TRACE_MB

SET_STATE_BEGIN

SET_STATE_FORMAT

SET_STATE_LINE

SET_STATE_WORDEND

SET_STATE_CHAR

SET_STATE_BACKSPACE

SET_STATE_NOBREAK

HEXOUT

BITS
```

EXCEPTION CONDITIONS FOR UP

```
51 - L3 vector has invalid length field.
     This is an invalid OIIA-L3 input file.    (terminal)

52 - no space before ATF

53 - text before ATF

54 - not enough tabs set for this IT

55 - margin text vector > 2048 bytes

59 - convert file error                        (terminal)

59 - read/write error                          (terminal)
```

USER MODIFIABILITY OF HOST DW ANR CODE

| MODIFICATION | DOCUMENT |
| --- | --- |
| Screen defaults (currently optimized for transfer/transform path) can be changed by the PROFS System Administrator. | Systems Administrator Reference |
| Call interface for Host Code independent of PROFS for transfer and transform can be used with customer's own CMS EXECS. | PLM |
| Transform Program Modifiability can be achieved by removal of the transform completely. EXAMPLE: Use host hard file only. | PLM and options screen (Users Manual) |
| Replacement of the transform completely. EXAMPLE: New Transform PP data === WPIF data for DW merge. (WPIF is word processing information format) | PLM and options screen (Users Manual) |
| Modification of the contents of the L3-DCF Transform Program: | |
| INPUT FILES TO TRANSFORM PROGRAM Format Unit & Convert Table can be specified by the user. | (User Documentation |
| * Add algorithms to PL/1 Source Code (available aids are sample algorithms in decision table form with available state variables) EXAMPLE: Left margin, Begin Keep/ End Keep. | (Customer will require Host Source Code, Program Logic Manual, and L3 specifications) |
| * Replace existing Algorithms with new algorithms. EXAMPLE: Decimal Tabs | |

DCF SUPPORT SCHEDULE

Only some DCF controls are supported. They are listed in the following table under columns with headers that tell:

- whether they are written by UP (u),
- whether they are read by DOWN (d),
- whether they are supported in the Endicott prototype (e),
- whether they are supported in Driver 1 (d1),
- whether they are supported in Driver 2 (d2),
- whether they are supported in the final NAD-specified level to be announced and shipped (n).

Note that DOWN reads only some parameters of these controls and only some ways of writing these controls and parameters. Such restrictions are listed in tables above.

Notes numbered in the table are as follows.

note 1: may be used only for indicating source drawer note 2: .sp is only partially supported Labels "..." and comments marked by ".*" are not supported.

| PROTOTYPE OR DRIVER | e | | d1 | | d2 | | n | | |
|---|---|---|---|---|---|---|---|---|---|
| UP OR DOWN | u | d | u | d | u | d | u | d | |
| .AA | | | | | | | | | |
| .AN | | | | | | | | | |
| .AP | | | | | | | | | |
| .BC | | | | | | | | | |
| .BF | | | | | | | | | |
| .BM | | | | | | | | | |
| .BR | x | x | x | x | x | x | x | x | |
| .BX | | | | | | | | | |
| .CB | | | | | | | | | |
| .CC | | | | | | | | | |
| .CD | | | | | | | | | |
| .CE | | | x | x | x | x | x | x | |
| .CL | | | | | | | | | |
| .CM | | | x | | x | x | x | x | (see note1) |
| .CO | | | | | | | | | |
| .CP | | | | | | | | | |
| .CS | | | | | | | | | |
| .CT | | | | | | | | | |
| .CW | | | | | | | | | |
| .DC | | | | | | | | | |
| .DD | | | | | | | | | |
| .DF | | | | | | | | | |
| .DH | | | | | | | | | |
| .DI | | | | | | | | | |
| .DL | | | | | | | | | |
| .DM | | | | | | | | | |
| .DS | | | x | x | x | x | x | x | |
| .DU | | | | | | | | | |
| .EC | | | | | | | | | |
| .EF | | | | | | | | | |
| .EL | | | | | | | | | |
| | u | d | u | d | u | d | u | d | |
| | e | | d1 | | d2 | | n | | |

| PROTOTYPE OR DRIVER | e | | d1 | | d2 | | n | |
|---|---|---|---|---|---|---|---|---|
| UP OR DOWN | u | d | u | d | u | d | u | d |
| .EM | | | | | | | | |
| .EZ | | | | | | | | |
| .FL | | | | | | | | |
| .FM | | | | | | | | |
| .FN | | | | | | | | |
| .FO | x | x | x | x | x | x | x | x |
| .FS | | | | | | | | |
| .GO | | | | | | | | |
| .GS | | | | | | | | |
| .HM | | | | | | | | |
| .HS | | | | | | | | |
| .HW | | | x | x | x | x | x | x |
| .HY | | | | | | | | |
| .Hn | | | | | | | | |
| .IE | | | | | | | | |
| .IF | | | | | | | | |
| .IL | | | | | | | | |
| .IM | | | | | | | | |
| .IN | | x | x | x | x | x | x | x |
| .IR | | | | | | | | |
| .IT | | | | | | | | |
| .IX | | | | | | | | |
| .JU | | x | x | x | x | x | x | x |
| .KP | | | | | | | | |
| .LB | | | | | | | | |
| .LI | | | | | | | | |
| .LL | | | | | | | | |
| .LT | | | | | | | | |
| .LY | | | | | | | | |
| .MC | | | | | | | | |
| .ME | | | | | | | | |
| | u | d | u | d | u | d | u | d |
| | e | | d1 | | d2 | | n | |

| PROTOTYPE OR DRIVER | e | | d1 | | d2 | | n | |
|---|---|---|---|---|---|---|---|---|
| UP OR DOWN | u | d | u | d | u | d | u | d |
| .MG | | | | | | | | |
| .MS | | | | | | | | |
| .NL | | | | | | | | |
| .OC | | | | | | | | |
| .OF | | | | | | | | |
| .OR | | | | | | | | |
| .PA | | | x | x | | | x | x |
| .PF | | | | | | | | |
| .PI | | | | | | | | |
| .PL | | | | | | | | |
| .PM | | | | | | | | |
| .PN | | | | | | | | |
| .PP | | | | x | | x | | x |
| .PS | | | | | | | | |
| .PT | | | | | | | | |
| .QQ | | | | | | | | |
| .QU | | | | | | | | |
| .RC | | | | | | | | |
| .RE | | | | | | | | |
| .RD | | | | | | | | |
| .RF | | | | | x | x | x | x |
| .RH | | | | | x | x | x | x |
| .RI | | | | | | | | |
| .RN | | | | | | | | |
| .RT | | | | | | | | |
| .RV | | | | | | | | |
| .SA | | | | | | | | |
| .SC | | | | | | | | |
| .SE | | | | | | | | |
| .SK | | x | | x | | x | | x |
| .SL | | | | | | | | |
| | u | d | u | d | u | d | u | d |
| | e | | d1 | | d2 | | n | |

| PROTOTYPE OR DRIVER | e | | d1 | | d2 | | n | |
|---|---|---|---|---|---|---|---|---|
| UP OR DOWN | u | d | u | d | u | d | u | d |
| .SO | | | | | | | | |
| .SP | | x | | x | | x | | x(note 2) |
| .SS | | | x | x | x | x | x | x |
| .SU | | | | | | | | |
| .SV | | | | | | | | |
| .SX | | | | | | | | |
| .SY | | | | | | | | |
| .TB | | | x | x | x | x | x | x |
| .TC | | | | | | | | |
| .TE | | | | | | | | |
| .TH | | | | | | | | |
| .TI | | | | | | | | |
| .TM | | | | | | | | |
| .TR | | | | | | | | |
| .TS | | | | | | | | |
| .TU | | | | | | | | |
| .TY | | | | | | | | |
| .UC | | | | | | | | |
| .UD | | | | | | | | |
| .UN | | | | | | | | |
| .UP | | | | | | | | |
| .US | | | x | x | x | x | x | x |
| .UW | | | | | | | | |
| .WF | | | | | | | | |
| .WZ | | | | | | | | |
| .ZZ | | | | | | | | |
| | u | d | u | d | u | d | u | d |
| | e | | d1 | | d2 | | n | |

L3P SUPPORTED IN PROTOTYPE

The prototype differed from support that is to be shipped in two important respects. First, the prototype supported a subset of the functions that are to be shipped. Second, the prototype supported L3P, the internal datastream of the Displaywriter, rather than the Office Information Interchange Architecture Level 3 datastream, more commonly called OIIA L3, or even L3, which is approved for shipment. The L3P support is summarized in the following tables. L3P remains important to the product because it tells which of the many functions that can be specified in an L3 datastream are actually supported by Displaywriter. Our transforms, in turn, support a subset ot the functions supported by Displaywriter.

The next table shows the content of a general L3P document as used inside DW. It tells which are required and which are optional. The longer table that follows it gives all of the first level structures, second level structures, multi-byte controls, parameters of these three sorts of things, and single-byte controls that appear in L3P. It tells which are required and which are optional and also tells which are supported in the Prototype (P) and in the sYmmetric (Y) extension of the Prototype, which was extended to the support (N) specified by NAD, which is to be shipped. Its first column tells which items in L3P differ from L3. A key at the end of the table tells how to read its columns.

The subsequent section describes L3 and its support to be shipped.

COMPLETE L3P DOCUMENT, SUMMARY EXAMPLE

| Req. or Opt. | ABBR | UNIT, or FIRST LEVEL STRUCTURE, or -SECOND LEVEL STRUCTURE, or --PARAMETER (just examples are given) |
|---|---|---|
| | | FORMAT UNIT |
| R | FUP | FORMAT UNIT PREFIX |
| R | DP | DOCUMENT PARAMETERS |
| O | DPP | DOCUMENT PROFILE |
| R | SP | SEGMENT PREFIX = FORMAT SEGMENT PREFIX |
| R | PMF | PRIMARY MASTER FORMAT |
| O | PM | -PAGE MEDIA |
| R | CP | --COPIES |
| | | ... 4 MORE PARAMETERS OF PM |
| | | ... 7 MORE Second Level Structures in PMF |
| R | SP | SEGMENT PREFIX |
| R | AMF | ALTERNATE MASTER FORMAT |
| | | ...SAME STRUCTURE AS PMF |
| R | | TEXT UNIT |
| R | TUP | TEXT UNIT PREFIX (starts first text segment) |
| R | | --PAGE NAME (of text unit only) |
| R | COF | Carry Over Format |
| | | ... About the same structure as PMF |
| O | EPM | ESTABLISH PRIMARY MASTER FORMAT (ACTIVATE) |
| O | EAM | ESTABLISH ALTERNATE MASTER FORMAT " |
| O | RTMF | RETURN TO MASTER FORMAT |
| O | PFC | PAGE FORMAT CHANGE |
| R | BT | BODY TEXT |
| R | BT | --BODY TEXT |
| | | GRAPHIC CHARACTERS |
| | | SINGLE-BYTE CONTROLS |
| | | MULTI-BYTE CONTROLS |
| O | SP | SEGMENT PREFIX = TEXT SEGMENT PREFIX |
| R | COF | CARRY OVER FORMAT |
| R | BT | BODY TEXT |
| R | BT | --BODY TEXT |
| O | SP | SEGMENT PREFIX = TEXT SEGMENT PREFIX |
| | | ...More SPs as required so none exceeds 2 KB |
| | | TEXT UNIT |
| | | ...More Text Units as required for new PFCs or page end controls |

| | | |
|---|---|---|
| R | | END UNIT |
| R | EUP | END UNIT PREFIX |
| R | COF | CARRY OVER FORMAT |
| R | BT | BODY TEXT |
| R | BT | --BODY TEXT<br>A One Byte Control: Page Eject |

L3P STRUCTURES AND PARAMETERS

| DIFF | UP | DOWN | Req or Opt | ABBR | FIRST LEVEL STRUCTURE, or -SECOND LEVEL STRUCTURE, or --PARAMETER |
|---|---|---|---|---|---|
| X | | | R | FUP | FORMAT UNIT PREFIX |
| | | | R | DP | DOCUMENT PARAMETERS |
| X | | . | R | CGCS | --CODED GRAPHICS CHAR SET |
| X | | . | R | - | --CODE PAGE ID |
| | | . | O | - | --PRESERVE PAGE NAME |
| X | | . | O | - | --DOCUMENT LANG ATTR. |
| X | | | O | DPP | DOCUMENT PROFILE |
| | | | - | - | -TWO LEVELS OF PARAMS OMITTED* |
| | | | R | SP | SEGMENT PREFIX of format |
| X | | | R | PMF | PRIMARY MASTER FORMAT |
| X | | | R | PM | -PAGE MEDIA |
| | | . | R | CP | --COPIES |
| | | . | R | FMCP | --FORMS, CURRENT PAGE |
| | | N | R | SDCP | --SOURCE DRAWER, CURRENT PAGE |
| | | | R | FSP | --FORMS, SUBSEQ. PAGE |
| | | N | R | SDSP | --SOURCE DRAWER, SUBSEQ. PAGE |
| X | | | R | PP,PIP | -PAGE PARAMETERS |
| | | . | R | PW,PIW | --PAGE WIDTH |
| | | . | R | PD | --PAGE DEPTH |
| | | . | R | FBTLF | --FIRST BTL, FIRST PAGE |
| | | . | R | FBTLS | --FIRST BLT, SUBSEQ. PAGE |
| | | . | R | LTBTL | --LAST BTL |
| X | | . | R | LP | -LINE PARAMETERS |
| | | . | R | GCFSID | --GLOBAL CODED FONT SECTION ID |
| | | . | R | FWTH | --FONT WIDTH |
| | | . | R | - | --FONT ATTRIBUTE |
| X | | . | R | GCCSID | --CODED GRAPHIC CHAR SET ID |
| X | | . | R | - | --CODE PAGE ID |
| | | . | R | LFMG | --LEFT MARGIN |
| | | . | R | RHMG | --RIGHT MARGIN |
| | | . | R | LNDEN | --LINE DENSITY |
| | | . | R | LNSP | --LINE SPACING |
| | P | P | R | ADJ | --ADJUST STATE |
| | | . | R | ZN | --ZONE |
| | | . | R | JUST | --JUSTIFY PERCENT |
| X | P | P | R | ALIGN | --ALIGNMENT STATE |
| | | . | R | LNNM | --LINE NUMBER STATE |
| X | P | Y | R | HT | -HORIZONTAL TABS |
| | | . | O | ALIGNC | --ALIGNMENT CHAR |
| | P | Y | O | POS | --POSITION |
| X | | | O | PN | -PAGE NUMBERING |
| | | | R | PGN | --NUMBER |
| | | | R | LOC | --LOCATION |
| | | | R | INCR | --INCREMENT |
| X | P | Y | O | MP | -MARGIN TEXT PARAMS (TOP) |
| | P | Y | R | TYP | --TYPE (note real info.) |
| | P | Y | R | SP | --STARTING PAGE |
| | | . | R | SL | --START LINE |
| X | P | Y | O | MT | -MARGIN TEXT (TOP) |
| | P | Y | R | TYP | --TYPE (note real info.) |
| | P | Y | O | MGTXT | - MARGIN TEXT |
| X | P | Y | O | MP | -MARGIN TEXT PARAMS (BOTTOM)<br>*same contents as TOP* |

L3P STRUCTURES AND PARAMETERS

| DIFF | UP | DOWN | Req or Opt | ABBR | FIRST LEVEL STRUCTURE, or -SECOND LEVEL STRUCTURE, or --PARAMETER |
|---|---|---|---|---|---|
| X | P | Y | O | MT | -MARGIN TEXT (BOTTOM) |
| | | | | | *same contents as TOP* |
| X | | | R | SP | SEGMENT PREFIX |
| X | | | R | AMF | ALTERNATE MASTER FORMAT |
| | | | | | *same contents as PMF* |
| X | | | R | TUP | TEXT UNIT PREFIX |
| | | P | R | - | -PAGE NAME |
| X | no | Y | R | COF | CARRY OVER FORMAT |
| | | . | R | FP | -FORMAT PROPAGATION |
| | | . | R | - | --STATE |
| | | . | R | FMT | --FORMAT |
| X | | . | R | COP | -CARRY OVER PARAMETERS |
| | | . | R | FMTCHG | --FORMAT CHANGE LEVEL |
| | | . | R | INLVL | --INDENT LEVEL |
| | | . | R | VA | --VISUAL ATTRIBUTES |
| | | . | R | | --reserved |
| | | . | R | PNUM | --PAGE NUMBER |
| | | . | R | UM | --UNDERSCORE MODE |
| | | . | R | UB | --UNDERSCORE BYPASS |
| | | . | R | - | --OVERSTRIKE CODE PAGE ID |
| | | . | R | - | --OVERSTRIKE CHARACTER |
| | | . | R | - | --OVERSTRIKE BYPASS |
| X | | . | O | - | --SPELLING LANGUAGE ATTRIBUTE |
| | | | R | PP,PIP | -PAGE PARAMETERS |
| | | | | | *same contents as in PMF* |
| | | P | R | LP | -LINE PARAMETERS |
| | | | | | *same contents as in PMF* |
| | | Y | R | HT | -HORIZONTAL TABS |
| | | | | | *same contents as in PMF* |
| N | P | no | O | EPM,APM | ESTABLISH PMF |
| N | P | no | O | EAM,AAM | ESTABLISH AMF |
| N | P | no | O | RTMF | RETURN TO MASTER FORMAT |
| X | P | Y | O | PFC | PAGE FORMAT CHANGE |
| | | | | | *same contents as PMF* |
| X | P | P | R | BT | BODY TEXT (the structure) |
| X | P | P | R | BT | --BODY TEXT (the parameter) |
| | | | | | graphic characters |
| X | | | | | single-byte controls |
| X | | | | | multi-byte controls |
| X | | | O | SP | SEGMENT PREFIX (of text) |
| | | | | | *repeat segments (SP through BT) as needed so no segment exceeds 2 KB* |
| X | | | R | TUP | TEXT UNIT PREFIX |
| | | | | | *repeat units (TUP through BT) as needed for new PFCs or page ends* |
| X | | | R | EUP | END UNIT PREFIX |
| | no | | R | COF | CARRY OVER FORMAT |
| | no | | R | BT | BODY TEXT (the structure) |
| | no | . | R | BT | --BODY TEXT (the parameter) |
| | no | . | | | a single-byte control: PE |

END OF L3P STRUCTURES AND PARAMETERS

L3P MULTI-BYTE CONTROLS

| DIFF | UP | DOWN | ABBR | MULTI-BYTE CONTROL or --PARAMETER |
|---|---|---|---|---|
| | N | N | ATF | ALIGN TEXT FIELD |
| | N | N | - | --ALIGNMENT TYPE |
| X | | . | - | --ALIGNMENT POSITION |
| N | | | BK | BEGIN KEEP |
| N | | | EK | END KEEP |
| N | P | P | BLFC | BEGIN LINE FORMAT CHANGE |
| N | P | P | ELFC | END LINE FORMAT CHANGE |
| X | N | N | BUS | BEGIN UNDERSCORE |
| | N | N | - | --MODE |
| | N | N | BYP | --BYPASS |
| N | N | N | EUS | END UNDERSCORE |
| X | | | DCG | DISPLAY CONTROL GRAPHIC |
| | | | CON | --CONTROL |
| | | | PPN | PRINT PAGE NAME |
| N | N | N | SPPN | SET/PRINT PAGE NUMBER (PPIN,L3) (Print page image #) |
| N | | | RLM | RELEASE LEFT MARGIN |
| E | | | RMF | RETURN TO MASTER FONT |
| N | ? | ? | RMLF | RETURN TO MASTER LINE FORMAT |
| X | | | SCG | SET CGCSID THROUGH GCID |
| | | | CGCSID | --CODED GRAPHIC CHAR SET ID |
| | | | CPID | --CODE PAGE ID |
| E | | | SCFG | SET FONT THROUGH GFID |
| E | | | SFG | " |
| | | | GCFSID | --GLOBAL CODED FONT ID |
| | | | FWD | --FONT WIDTH |
| | | | FA | --FONT ATTRIBUTE |
| X | P | P | SLP | SET LINE PARAMTERS |
| | | | GCFSID | --GLOBAL CODED FONT SECTION ID |
| | | | FWTH | --FONT WIDTH |
| | | | - | --FONT ATTRIBUTE |
| X | | | GCCSID | --CODED GRAPHIC CHAR SET ID |
| X | | | - | --CODE PAGE ID |
| | | | LFMG | --LEFT MARGIN |
| | | | RHMG | --RIGHT MARGIN |
| | | | LNDEN | --LINE DENSITY |
| | | | LNSP | --LINE SPACING |
| | P | P | ADJ | --ADJUST STATE |
| | | | ZN | --ZONE |
| | | | JUST | --JUSTIFY PERCENT |
| X | P | P | ALIGN | --ALIGNMENT STATE |
| | | | LNNM | --LINE NUMBER STATE |
| X | P | Y | STAB | SET TABS active |
| | | . | - | --REPLACE |
| X | | . | - | --ALIGNMENT |
| | P | Y | - | --POSITION |
| X | | | SVA | SET VISUAL ATTRIBUTES |
| X | | | VATT | --VISUAL ATTRIBUTE |
| | | | BMW | BEGIN MISSPELLED WORD |
| | | | EMW | END MISSPELLED WORD |
| | | | BOS | BEGIN OVERSTRIKE |
| X | | | - | --CODE PAGE ID |
| | | | - | --CHARACTER |
| | | | - | --BYPASS |
| N | | | EOS | END OVERSTRIKE |
| X | | | ITU | INCLUDE TEXT UNIT |
| | | | - | --CGCS/CODE PAGE ID |
| | | | - | --DOCUMENT NAME |
| | | | - | --VOLUME ID |
| X | | | - | --TEXT UNIT (NAME) |
| | | | INS | INSERT |
| | | | - | --CGCS/CODE PAGE ID |
| | | | - | --VARIABLE NAME |
| | | | - | --PUNCTUATION ID |

L3P MULTI-BYTE CONTROLS

| DIFF | UP | DOWN | ABBR | MULTI-BYTE CONTROL or --PARAMETER |
|---|---|---|---|---|
| XE | | | BCL | BEGIN COLUMN LAYOUT |
| | | | - | --NUMBER OF COLUMNS |
| | | | - | --FIXED/FLOATING |
| | | | - | --GUTTER WIDTH |
| | | | - | --COLUMN WIDTH |
| X | | | ECL | END COLUMN LAYOUT |
| X | | | RL | REPORT LAYOUT |
| | | | - | --CGCS/CODE PAGE ID |
| | | | - | --SECTION DEFINITION |
| X | | | CC | COMPUTATION |
| | | | - | --CGCS/CODE PAGE ID |
| | | | - | --SET SYMBOL NAME |
| | | | - | --EXPRESSION |
| X | | | GC | GROUP COMPUTATION |
| | | | - | --CGCS/CODE PAGE ID |
| | | | - | --SET SYMBOL NAME |
| | | | - | --COMPUTATION TYPE |
| | | | CHT | COLUMN HEADING TEXT |
| | | | SPP | SET PRESENTATION PAGE SIZE |
| | | | SPC | SET PRESENTATION COLOR |
| X | | | SSCA | SET SPELLING CHECK ATTRIBUTES |
| X | | | - | --DICTIONARY ID |
| X | | | DCG2 | DISPLAY CONTROL GRAPHIC 2 |
| | | | - | --CONTROL |
| X | | | QLO | QUERY/LOGICAL OPERATOR |
| | | | - | --FUNCTION TYPE |

END OF L3P MULTI-BYTE CONTROLS

L3P SINGLE-BYTE CONTROLS

| DIFF | UP | DOWN | ABBR | SINGLE-BYTE CONTROL |
|---|---|---|---|---|
| N | P | P | BS | BACKSPACE |
| N | P | P | CRE | CARRIER RETURN |
| N | P | P | HT | HORIZONTAL TAB |
| N | P | Ps | IT | INDENT TAB |
| N | | | INX | INDEX (INDX) |
| N | P | P | IRT | INDEX RETURN (=INR,IR) |
| N | P | P | NUL | NULL |
| N | P | P | NBS | NUMERIC BACKSPACE |
| N | P | P | RPE | PAGE END (PE) |
| | P | P | NSP | NUMERIC SPACE |
| N | P | P | RCR | REQUIRED CARRIER RETURN |
| N | P | P | HYP | REQUIRED HYPHEN |
| N | P | P | RPE | REQUIRED PAGE END |
| N | P | P | RSP | REQUIRED SPACE |
| N | P | P | SP | SPACE |
| E | | | SBS | SUBSCRIPT |
| E | | | SPS | SUPERSCRIPT |
| N | P | P | SUB | SUBSTITUTE code point |
| E | N | N | SHY | SYLLABLE HYPHEN |
| N | P | P | UBS | UNIT BACKSPACE |
| N | | | WUS | WORD UNDERSCORE |
| N | ? | ? | ZICR | ZERO-INDEX CARRIER RTN. |

END OF L3P SINGLE-BYTE CONTROLS

END OF L3P ITEMS

KEY

```
DIFF tells whether the item DIFFers between this L3P and L3.
  X  means a syntaX change.
  E  means a sEmantic change.
  N  means No change.
 " " means may change, but not important to us.

UP and DOWN tell whether the item is supported*
           in the two transformation programs
                        UP   (L3P to DCF)
                        DOWN (DCF to L3P).
           The levels of support are:
   P means support * in the Prototype of 2/12/82.
   Y means support * that must be added to P
           to make it sYmmetric.
   N means support * that must be added to Y
           to meet the NAD requirement.
   . means not supported, but a default value is necessary.
 Note that the functional content of the "O" level
     is approximately that of "Driver 1",
     which is approximately that of the protoytype "P".

 * "support" has the following meaning:
```

DOWN "supports" an L3 item if DOWN uses information from the DCF document to derive an appropriate value for this L3 item.

Note that DOWN must write a complete L3 document with all required structures and parameters. L3 parameters do not have default values. Therefore DOWN supplies default values for many parameters, independent of anything in the DCF document. This is not what "supported" means. Defaulting is indicated by a "." under DOWN.

UP "supports" an L3 item if it incorporates appropriate information from this item into the DCF datastream. Note that UP must be able to read all items, at least to ignore them. This does not constitute "support" of an item.

SUPPORTED L3 ITEMS AND THEIR GENERATION ON DW

The following table lists all of the relevant L3 structures, vectors, parameters, and controls. It tells how to generate each of them using Displaywriter. It tells whether the transform programs UP (U) and DOWN (D) support them.

For details of Displaywriter generation, see the "Spindletop Program System Design" section A, "Keyboard Access Method (KAM) Interface"

Support is specified by the first two columns, headed U and D. Here "P" means "supported in the first prototype", "N" means "supported in the Plan of Record that meets the NAD requirement" and "." means "DOWN supplies a default value but ignores the actual value given in any corresponding DCf controls".

Note that nearly anybody can tell what is supported more easily by reading the Overview Section, subsection Transforms, which summarizes the unsupported items.

L3 STRUCTURES AND PARAMETERS

| UD | Req or Opt | ABBR | FIRST LEVEL STRUCTURE, or -SECOND LEVEL STRUCTURE, or --PARAMETER |
|---|---|---|---|
| | R | FUP | FORMAT UNIT PREFIX |
| | | | Select "Typing Tasks", select "Create or Revise Document". This puts in Format Unit per user's "Setup". Some things may be changed as described below. Others are fixed. |
| | R | DP | DOCUMENT PARAMETERS |
| | | | Fixed |
| . | R | CGCS | --CODED GRAPHICS CHAR SET |
| | | | Not used, but initialized (Fixed). See CGCSID which is used instead. |
| . | R | - | --CODE PAGE ID |
| | | | Same |
| . | O | - | --PRESERVE PAGE NAME |
| | | | "Create or Revise Document" Menu, option "Preserve Page Numbers" |
| . | O | - | --DOCUMENT LANG ATTR. |
| | | | Not used, but initialized (Fixed) |
| | R | FUP | FORMAT UNIT PREFIX |
| | | | Fixed |
| PP | R | PMF | PRIMARY MASTER FORMAT |
| | | | "Create or Revise Document" Menu, option "Change Document Format" |
| | R | PP,PIP | -PAGE PARAMETERS |
| | | | "Page Format" Menu, options below |
| . | R | PW,PIW | --PAGE WIDTH |
| | | | Paper or envelope size |
| . | R | PD | --PAGE DEPTH |
| | | | Same |
| . | R | FBTLF | --FIRST BTL, FIRST PAGE |
| | | | First typing line, first page |
| . | R | FBTLS | --FIRST BLT, SUBSEQ. PAGE |
| | | | First typing line, following pages |
| . | R | LTBTL | --LAST BTL |
| | | | Last typing line |
| PP | R | LP | -LINE PARAMETERS |
| | | | "Line Format" Menu, see "SLP" multi-byte control for all parameters below |
| . | R | GCFSID | --GLOBAL CODED FONT SECTION ID |
| . | R | FWTH | --FONT WIDTH |
| . | R | - | --FONT ATTRIBUTE |
| . | R | GCCSID | --CODED GRAPHIC CHAR SET ID |
| . | R | - | --CODE PAGE ID |
| . | R | LFMG | --LEFT MARGIN |
| . | R | RHMG | --RIGHT MARGIN |
| . | R | LNDEN | --LINE DENSITY |
| PN | R | LNSP | --LINE SPACING |
| PN | R | ADJ | --ADJUST STATE |
| . | R | ZN | --ZONE |
| . | R | JUST | --JUSTIFY PERCENT |
| PN | R | ALIGN | --ALIGNMENT STATE |
| . | R | LNNM | --LINE NUMBER STATE |
| | | | End reference to "SLP" |
| PN | R | TP | -TAB PARAMETERS |
| | | | "Margins & Tabs Menu", see "STAB" multi-byte control for both parameters below |
| . | O | ALIGNC | --ALIGNMENT CHAR |
| PN | O | POS | --POSITION |
| | | | End reference to "STAB" |
| | O | PIN | -PAGE IMAGE NUMBERING |
| | | | Fixed |
| | R | PGN | --NUMBER |
| | | | Type margin text, press "INSTR", select |

L3 STRUCTURES AND PARAMETERS

| UD | Req or Opt | ABBR | FIRST LEVEL STRUCTURE, or<br>-SECOND LEVEL STRUCTURE, or<br>--PARAMETER |
|---|---|---|---|
| | | | "Page number". This writes "SPPN" into "Margin Text" and prompts you for initial page number to be used for each "APM" but not for "RTMF" |
| | R | LOC | --LOCATION<br>Not supported in DW |
| | R | INCR | --INCREMENT<br>Fixed at one |
| | O | PM | -PRINT MEDIUM<br>"Page Format" Menu, option "Printing Paper Source" |
| . | R | CP | --COPIES<br>Fixed |
| . | R | FMCP | --FORMS, CURRENT PAGE<br>"Printing Paper Source" |
| NN | R | SDCP | --SOURCE DRAWER, CURRENT PAGE<br>Same |
| | R | FSP | --FORMS, SUBSEQ. PAGE<br>Same |
| NN | R | SDSP | --SOURCE DRAWER, SUBSEQ. PAGE<br>Same |
| NN | O | MP | MARGIN TEXT PARAMS (TOP)<br>(Alternating) Headers & Footers Menu(s) |
| NN | R | TYP | --TYPE (note real info.)<br>Selected by selection of which menu or which part of menu |
| NN | R | SP | --STARTING PAGE<br>"Print Header/Footer on____" |
| . | R | SL | --START LINE<br>"First Header/Footer line___" |
| NN | O | MT | -MARGIN TEXT (TOP)<br>Create/Revise Header |
| NN | R | TYP | --TYPE (note real info.) |
| NN | O | MGTXT | -- MARGIN TEXT<br>Type the text |
| NN | O | MP | MARGIN TEXT PARAMS (BOTTOM)<br>See above<br>*same contents as TOP* |
| NN | O | MT | MARGIN TEXT (BOTTOM)<br>"Create/Revise Footer"<br>*same contents as TOP* |
| PP | R | FUP | FORMAT UNIT PREFIX<br>Fixed |
| PP | R | AMF | ALTERNATE MASTER FORMAT<br>"Change Alternate Document Format"<br>*same contents as PMF* |
| PP | R | TUP | TEXT UNIT PREFIX |
| . | R | - | -PAGE NAME<br>Assigned by system to guarantee uniqueness and monotonicity |
| P | O | APM | ACTIVATE PMF<br>"Format Selection" Menu, option "Begin using Document Format" |
| P | O | AAM | ACTIVATE AMF<br>"Format Selection" Menu, option "Begin using Alternate Format" |
| N | O | RTMF | RETURN TO MASTER FORMAT<br>"Format Selection Menu", option "Return all Formats to starting choice"<br>I.E. To primary or alternate master. |

L3 STRUCTURES AND PARAMETERS

```
   Req          FIRST LEVEL STRUCTURE, or
   or           -SECOND LEVEL STRUCTURE, or
UD Opt   ABBR   --PARAMETER
==========================================================
NN O     TUFC   TEXT UNIT FORMAT CHANGE
                  "Change Format" Key at page boundary,
                  options as in PMF (Q.V.)  and change
                  either page format or margin text
                  (so neither SFC nor LFC suffices)
                  *same contents as PMF*
PP R     BT     BODY TEXT (the structure)
                  Text Create - Revise Menu
PP R     BT     --BODY TEXT (the parameter)
PP                  GRAPHIC CHARACTERS
                      Key or "Shift" Key plus Key
PP                  SINGLE-BYTE CONTROLS
                      Key or "Code" Key plus Key or "Control"
                      Key plus Key
PP                  MULTI-BYTE CONTROLS
                      Key, "Instruction" Key plus Menu
                      Selection
PP R     TUP    TEXT UNIT PREFIX
                  "Page End" key or page-end decision by the
                  paginator.
                 *repeat units (TUP through
                  BT) as needed for new PFCs
                  or page ends*

PP R     EUP    END UNIT PREFIX
PP R     BT     BODY TEXT (the structure)
PP R     BT     --BODY TEXT (the parameter)
                    a single-byte control: PE
```

END OF L3 STRUCTURES AND PARAMETERS

L3 MULTI-BYTE CONTROLS

```
           L3 MULTI-BYTE CONTROL or
UD ABBR    --PARAMETER
==========================================================
NN ATF     ALIGN TEXT FIELD
             "CTR" Key
NN -       --ALIGNMENT TYPE
               Create only "3" meaning "Center it"
 . -       --ALIGNMENT POSITION
               Support only "0" meaning "Current Position"
   BK      BEGIN KEEP
             "Instruction" key (Text, not in margin) Menu
   EK      END KEEP
             Same
PP BLFC    BEGIN LINE FORMAT CHANGE
             "Change Format" Key pressed at a line boundary
PP ELFC    END LINE FORMAT CHANGE
             Same
NN BUS     BEGIN UNDERSCORE
             "Code" plus key
NN -       --MODE
               Support one mode
NN BYP     --BYPASS
NN EUS     END UNDERSCORE
             "Code" plus key
   DCG     DISPLAY CONTROL GRAPHIC
             Not generated in Datastream
   CON     --CONTROL
               Same
```

L3 MULTI-BYTE CONTROLS

```
          L3 MULTI-BYTE CONTROL or
UD ABBR   --PARAMETER
=====================================================
   PPN    PRINT PAGE NAME
            "Instruction" key menu (when in margin) option
            "System Page Number"
NN PPIN   PRINT PAGE IMAGE NUMBER (PPIN,L3)
            "Instruction" key menu (when in margin) option
            "Page Number"
   RLM    RELEASE LEFT MARGIN
            No way to create it using DW; can come from
            OS6, CMC
   RMF    RETURN TO MASTER FONT
            "Change Format" key menu, option "Return
            typestyle to starting choice
N  RMLF   RETURN TO MASTER LINE FORMAT
            "Change Format" key menu (at a line boundary),
            option "Return line formats, Margins & Tabs  to
            starting choice"
   SCG    SET CGCSID THROUGH GCID
            "Code" plus "KYB CHG" key
   CGCSID --CODED GRAPHIC CHAR SET ID
              Number typed on prompt line after pressing
              "KYB CHG" key (e.g. 001 = standard keyboard,
              101 = 3277, and 203 = symbol keyboard).
              Initial value is given in operator's Setup
              which is changed by "Program Diskette Tasks"
              option "Workstation Description".
              Six CGCSIDs can be specified for loading.
              Note that CGCSID or "keyboard ID" carries
              less information than CPID.
              CGCSID is used for compatibility with less
              intelligent boxes such as printers.
   CPID   --CODE PAGE ID
              Implied by what operator typed on prompt line
              AFTER PRESSING "Code" plus "KYB CHG".
              (E.g. typing either 001 or 101 implies CPID
              = 256 and typing 203 implies CPID = 259)
   SCFG   SET FONT THROUGH GFID
            "Chg FMT" Key (anywhere), option
            "Typestyle Number"
   SFG    "
   GCFSID --GLOBAL CODED FONT ID
              Type Style Number typed in above menu
   FWD    --FONT WIDTH
              Implied by above
   FA     --FONT ATTRIBUTE
              Same
PP SLP    SET LINE PARAMETERS
            "Chg Fmt" Key menu, option "Change Line Format"
            or "Change margins & tabs
   GCFSID --GLOBAL CODED FONT SECTION ID
              "Typestyle number" selection in above
   FWTH   --FONT WIDTH
              Implied by above
   -      --FONT ATTRIBUTE
              Same
   GCCSID --CODED GRAPHIC CHAR SET ID
              Carried forward from "KYB CHG" Key
   -      --CODE PAGE ID
              Same
   LFMG   --LEFT MARGIN
              "Chg Fmt" key menu, option "Change Margins
               & Tabs"
              option "Set Margins"
   RHMG   --RIGHT MARGIN
              Same
```

L3 MULTI-BYTE CONTROLS

```
              L3 MULTI-BYTE CONTROL or
UD ABBR       --PARAMETER
============================================================
   LNDEN      --LINE DENSITY
                  "Chg Fmt" Key menu, option
                  "Change Line Format"
                  option "Lines/CM or IN."
   LNSP       --LINE SPACING
                  Same, except last option is "Line Spacing"
PP ADJ        --ADJUST STATE
                  Same, except last option is
                  "Adjust Line Endings"
   ZN         --ZONE
                  Same, except last option is "Zone Width"
   JUST       --JUSTIFY PERCENT
                  Same, except last option is "Line Alignment"
PP ALIGN      --ALIGNMENT STATE
                  Other options of above
                  (Encode 3 options in 2 bits)
   LNNM       --LINE NUMBER STATE
                  Not supported, defaults to "OFF"
NN STAB       SET TABS active
                "Chg Fmt" key menu, option
                "Change Margins & Tabs"
 . -          --REPLACE
                  Only "YES" is supported:
                  Replace, do not append
 . -          --ALIGNMENT
                  Keys at tab position, see menu.
NN -          --POSITION
                  Where the above keys are pressed
   SVA        SET VISUAL ATTRIBUTES
                "DELETE" key and any key used to change what is
                highlighted (temporarily during editing)
                or a process
   VATT       --VISUAL ATTRIBUTE
                  Same
   BMW        BEGIN MISSPELLED WORD
                "Spell check" process
   EMW        END MISSPELLED WORD
                Same
   BOS        BEGIN OVERSTRIKE
                "Code" plus key
   -          --CODE PAGE ID
                  Based on current keyboard
   -          --CHARACTER
                  Entered on prompt line after pressing key
   -          --BYPASS
                  Defaults to "ALL" only
   EOS        END OVERSTRIKE
                "ENTER" key after moving to desired place
   ITU        INCLUDE TEXT UNIT
                "Instruction" key (text) menu
   -          --CGCS/CODE PAGE ID
                  Implied
   -          --DOCUMENT NAME
                  "Include" menu option's menu
   -          --VOLUME ID
                  Same
   -          --TEXT UNIT (NAME)
                  Same
   INS        INSERT
                "CODE" plus "SEMICOLON" key (I.E. variable key)
                "STAT Create Revise" Feature Loaded (Textpack 2
                UP)
```

L3 MULTI-BYTE CONTROLS

```
            L3 MULTI-BYTE CONTROL or
UD ABBR     --PARAMETER
==========================================================
   -        --CGCS/CODE PAGE ID
                Prompted by merge process
   -        --VARIABLE NAME
                Same
   -        --PUNCTUATION ID
                Same
   BCL      BEGIN COLUMN LAYOUT
              "Col Layout" key (Textpack 2 UP)
   -        --NUMBER OF COLUMNS
                Menu
   -        --FIXED/FLOATING
                Menu
   -        --GUTTER WIDTH
                Menu
   -        --COLUMN WIDTH
   ECL      END COLUMN LAYOUT
              "ENTER" leaving above menu
   RL       REPORT LAYOUT
              "INSTR" key menu, option "File Report
              instructions"
   -        --CGCS/CODE PAGE ID
                Menu specified a further structured field
   -        --SECTION DEFINITION
                Same
   CC       COMPUTATION
              "INSTR" Key menu, option "MATH"
   -        --CGCS/CODE PAGE ID
                Menu specified structured field
   -        --SET SYMBOL NAME
                Same
   -        --EXPRESSION
              Same
   GC       GROUP COMPUTATION
              "INSTR" key menu, option "Summary Math"
   -        --CGCS/CODE PAGE ID
                Menu specifies structured field
   -        --SET SYMBOL NAME
                Same
   -        --COMPUTATION TYPE
                Same
   CHT      COLUMN HEADING TEXT
              "INSTR" key menu option "
              Multi-column file listing"
   SPP      SET PRESENTATION PAGE SIZE
              Not created or supported
   SPC      SET PRESENTATION COLOR
              Same
   SSCA     SET SPELLING CHECK ATTRIBUTES
              "INSTR" key menu, option
              "Language for Spell Check"
              or "Begin Spell Check"
   -        --DICTIONARY ID
                Enter on prompt line
   DCG2     DISPLAY CONTROL GRAPHIC 2
              Not created
   -        --CONTROL
                Same
   QLO      QUERY/LOGICAL OPERATOR
              Same
   -        --FUNCTION TYPE
                Same

   END OF   L3 MULTI-BYTE CONTROLS
```

L3 SINGLE-BYTE CONTROLS

| UD | ABBR | SINGLE-BYTE CONTROL |
|---|---|---|
| PP | BS | BACKSPACE<br>"code" plus key<br>(or key, if specified in "Setup") |
| PP | CRE | CARRIER RETURN<br>Key<br>(or "Code" plus key, if specified in "Setup"),<br>or process |
| PP | HT | HORIZONTAL TAB<br>Key (or "Control" plus "I" Key) |
| NN | IT | INDENT TAB<br>"Code" plus key (I.E. required-left-aligned TAB<br>and implicit ones) |
| | INX | INDEX (INDX)<br>Key |
| PP | IRT | INDEX RETURN (=INR,IR)<br>"CODE" plus "Index" key |
| PP | NUL | NULL<br>"CONTROL" plus "Space" key |
| PP | NBS | NUMERIC BACKSPACE |
| NN | RPE | PAGE END (PE)<br>Key, or process |
| PP | NSP | NUMERIC SPACE<br>No way to create it in DW |
| PP | RCR | REQUIRED CARRIER RETURN<br>"CODE" plus key (or key if specified in setup) |
| PP | HYP | REQUIRED HYPHEN<br>"CODE" plus key (or key if specified in setup) |
| PP | RPE | REQUIRED PAGE END<br>"CODE" plus key |
| PP | RSP | REQUIRED SPACE<br>"CODE" plus key |
| PP | SP | SPACE<br>Key (not created by Justify Process) |
| | SBS | SUBSCRIPT<br>"CODE" plus key |
| | SPS | SUPERSCRIPT<br>"CODE" plus key |
| PP | SUB | SUBSTITUTE code point<br>"CONTROL" plus "Z" key, or commo. process |
| NN | SHY | SYLLABLE HYPHEN<br>KEY (or "Code" plus key if specified in setup),<br>or process |
| PP | UBS | UNIT BACKSPACE<br>Created by a process only, not by keyboard |
| N | WUS | WORD UNDERSCORE<br>"CODE" plus key |
| NN | ZICR | ZERO-INDEX CARRIER RTN.<br>"CONTROL" plus "RETURN" key |

END OF L3 SINGLE-BYTE CONTROLS

3. TRANSFORMATION ALGORITHMS, SUMMARY & VECTORS

FUNCTIONS SUPPORTED IN THE TRANSFORMS

The following table lists all of the DCF controls that UP writes and DOWN reads. It also lists the main L3 structures, parameters, and controls that UP reads and DOWN writes. For exact specification of the level of L3 support, see preceding sections. Support of default DCF parameters is also covered elsewhere.

In general, UP and DOWN support the same functions, as shown in the table. The only major exceptions are that UP never writes .SK, .SP, or .PP. However, this does not mean that they support exactly the same items in DCF or in L3. For example, UP has to write ".FO OFF and .JU ON" to transform L3's ADJUST OFF, JUSTIFY ON state. However, UP never has to write ".JU OFF". Therefore, ".JU OFF" is supported in DOWN but not in UP. For another example, UP supports the L3 structure ACTIVATE ALTERNATE MASTER, (AAM) by generating a large number of DCF controls to establish a new formatting state. However, DOWN need not have the pattern recognition capability that would be required to note that a large number of controls, together with their exact parameter values, can be compressed into the AAM structure. Instead, DOWN uses a TEXT UNIT FORMAT CHANGE structure. Therefore, AAM is supported in UP but not in DOWN. Similarly, UP transforms a succession of CARRIER RETURNS into a succession of blank lines, not into a ".SK" control, to have that measure of "what you see is what you get". Therefore ".SK" and ".SP" are supported in DOWN but not in UP.

FUNCTIONS SUPPORTED IN THE TRANSFORMS

| DCF CONTROL | L3 STRUCT. OR type | L3 PARAM. OR CONTROL | FUNCTION IN DCF OR L3 |
|---|---|---|---|
| .PA )<br>.PA NOSTART) | sbc | RPE | PAGE END |
| .FO ON,OFF )<br>.FO LEFT )<br>.JU ON,OFF ) | mbc<br>LP *1 | SLP<br>ADJ,JUST | FORMAT,<br>JUSTIFY,<br>ADJUST |
| .TB a b... | mbc *1 | STAB | TABS |
| .BR | sbc | CRE ZICR | BREAK |
| .SK n )<br>.SP n ) | sbc | CREs | BLANK LINES |
| .PP | sbc | CRE | PARAGRAPH |
| .IN h | sbc | IT | INDENT |
| .SS )<br>.DS ) | TUFC *1<br>mbc | LNSP<br>SLP | 1 OR 2 SPACE |
| .US ON,OFF | mbc | BUS,EUS | UNDERSCORE |
| .CE text | mbc | ATF | CENTERING |
| .HW wo-r-d | sbc | SHY | HYPHENATE |
| .RH ON *2 )<br>.RF ON *2 ) | TUFC *1 | MP,MT | MARGIN TEXT |
| .CM *3 | PMF,PFC# | SDCP,SDSP | SOURCE DR. |

KEY:
sbc SINGLE-BYTE CONTROL
mbc MULTI-BYTE CONTROL

Notes on FUNCTIONS SUPPORTED IN THE TRANSFORMS

*1 This information appears several places in L3:

- in the PMF,
  where UP uses it by default at the start of a document
  and where DOWN must put it;
  and where UP must use it to transform an APM
  or sometimes an RTMF

- in AMF
  where UP must use it to transform an AAM
  and sometimes an RTMF

- in a TUFC where UP and DOWN must use it
  and put it

*2 The parameters OFF, EVEN, ODD, and CANCEL are also supported

*3 The comment is used to preserve, in a DCF document, the information an L3 document supplied about which printer drawer to feed paper from. The comment must exactly match one of the following text strings.

```
.CM PRINTING PAPER SOURCE TOP
.CM PRINTING PAPER SOURCE BOTTOM
.CM PRINTING PAPER SOURCE BOTTOM, THIS PAGE ONLY
.CM PRINTING PAPER SOURCE MANUAL FEED
```

<u>L3P'S DELIMITERS (INSIDE DW)</u>

| L3P ITEM | .ENDS LINE | .ENDS PARAGRAPH | .RESETS INDENT TAB LEVEL | .ENDS ATF's FIELD | .ENDS PARAGRAPH AFTER CRE OR PE *3 | .ENDS WORD *4 | REMARKS |
|---|---|---|---|---|---|---|---|
| CRE | Y | . | . | Y | Y | Y | OPTIONAL DOWN LEFT |
| RCR | Y | Y | Y | Y | . | Y | REQ'D DOWN LEFT |
| IRT | Y | Y | Y | Y | . | Y | ALWAYS = RCR |
| ZICR | Y | . | . | Y | Y | Y | MOVES LEFT ONLY |
| INX | *2 | . | . | Y | Y | Y | MOVES DOWN ONLY |
| PE | *1 | . | . | Y | . | Y | ENDS TEXT UNIT |
| RPE | Y | Y | Y | Y | . | Y | REQ'D PAGE END |
| HT | . | . | . | Y | Y | Y | |
| IT | . | . | . | Y | Y | Y | |
| RLM | . | . | . | . | Y | . | |
| ATF | . | . | . | Y | . | Y | |
| LFC | *1 | Y | Y | Y | . | Y | |
| RMLF | *1 | Y | Y | Y | . | Y | |
| EPM | *1 | Y | Y | . | . | . | ) THESE IMPLY A |
| EAM | *1 | Y | Y | . | . | . | ) REQ'D PAGE END, |
| TUFC | *1 | Y | Y | . | . | . | ) EVEN IF NO RPE |
| RTMF | *1 | Y | Y | . | . | . | ) IS PRESENT |

*1 Syntax allows these controls to appear only after a line ending control, but these do not themselves end a line. This is an indirect requirement for the last four controls because they can appear only after a PE (or at the start of a document) and because a PE, in turn, can appear only after a line ender.

*2 INX at the top of a page, or separated from the top of a page only by other INXs, acts as a line ender.

*3 CRE + any of these controls ends a paragraph. The other controls that do this are SP, RSP, NSP, UBS, NBS, BS.

*4 The other controls that delimit WUS's word are NSP, SP, and WUS itself.

L3'S DELIMITERS

| L3 ITEM | .ENDS SYNTACTIC# LINE *7# | .ENDS PARAGRAPH *5# | .RESETS INDENT TAB LEVEL | .ENDS ATF's FIELD | .ENDS PARAGRAPH AFTER CRE OR PE#*3 | .DELIMITS WORD | REMARKS |
|---|---|---|---|---|---|---|---|
| CRE | Y | . | . | .# | Y | Y | CARRIER RETURN |
| RCR | Y | Y | Y | Y | . | Y | REQUIRED CARRIER RETURN |
| IRT | Y | Y | Y | Y | . | Y | ALWAYS = RCR |
| ZICR | Y | . | . | .# | Y | Y | MOVES LEFT ONLY |
| INX | .# | . | . | .# | Y | Y | MOVES DOWN ONLY |
| PE | *1 | . | . | .# | . | Y | PAGE END (NOT REQUIRED) |
| RPE | Y | Y | Y | Y | . | Y | REQUIRED PAGE END |
| HT | . | . | . | .# | Y | Y | HORIZONTAL TAB |
| IT | . | . | . | .# | Y | Y | INDENT TAB (T.L.MARGIN) |
| RLM | . | . | . | . | Y | . | RELEASE LEFT MARGIN |
| ATF | . | . | . | Y | Y# | Y | ALIGN TEXT FIELD |
| LFC | *1 | Y | Y | Y | . | Y | LINE FORMAT CHANGE |
| RMLF | *1 | Y | Y | Y | . | Y | RETURN MASTER LINE FMT. |
| APM | *1 | Y | Y | Y# | . | . | ) THESE IMPLY A |
| AAM | *1 | Y | Y | Y# | . | . | ) REQ'D PAGE END, |
| TUFC# | *1 | Y | Y | Y# | . | . | ) EVEN IF NO RPE |
| RTMF | *1 | Y | Y | Y# | . | . | ) IS PRESENT |
| SP | . | . | . | . | Y | Y | SPACE |
| NSP | . | . | . | . | Y | Y | NUMERIC SPACE |
| RSP | . | . | . | . | Y | . | REQUIRED SPACE |
| BS | . | . | . | . | Y | *8 | BACKSPACE |
| NBS | . | . | . | . | Y | *8 | NUMERIC BACKSPACE |
| UBS | . | . | . | . | Y | *8 | UNIT BACKSPACE |
| WUS | . | . | . | . | . | *8 | WORD UNDERSCORE |
| Hex6D | . | . | . | . | . | *8 | UNDERSCORE |

Differs from L3P.

*1 Syntax allows these controls to appear only after a line ending control, but these do not themselves end a line. This is an indirect requirement for the last four controls because they can appear only after a PE (or at the start of a document) and because a PE, in turn, can appear only after a line ender.

*2 INX at the top of a page, or separated from the top of a page only by other INXs, acts as a line ender.
NOT IN L3.

*3 CRE or PE followed by any of these controls ends a paragraph, even though one of these controls by itself does not end a paragraph.

*5# CRE preceded by a syntactic line delimiter (*7#) ends a paragraph. So does (PE followed by anything that ends a paragraph after CRE) or (APM, AAM, TUFC, RTMF, or EUP). (*6#)

*6# CRE or PE, with things listed, end a paragraph even if some specified things intervene.

*7# Semantic line enders are Syntactic line enders (minus SDLP, ZICR, PE, (and CR if Adjustable)) and (plus (Algorithm if adjustable) and TUP).

*8# These controls delimit a word for WUS only

The following L3 delimiters are not supported in DW and will not be considered in the transformations.

| | | | | | | | | | |
|---|---|---|---|---|---|---|---|---|---|
| NCRE# | : | Y | Y | . | . | . | Y | : |
| ABM# | : | . | . | . | . | Y | . | : |
| SDLP# | : | Y | . | . | . | Y | Y | : |
| ATL# | : | . | . | . | . | Y | . | : |

ADJUST, ALIGN, FORMAT, AND JUSTIFY

L3's ADJUST STATE (ADJ) and ALIGNMENT STATE (ALIGN) parameters (in the LINE PARAMETERS second level structure, in the PMF, AMF, TUFC first level structures, or in the SLP multi-byte control) determine, respectively, whether or not output lines will be concatenated to put as many words as will fit on each line and whether or not spaces will be inserted in lines to make the right margin straight. These L3 parameters correspond to DCF's .FO and .JU controls as follows.

| L3 PARAMs ADJ | ALIGN | THEIR MEANING | DCF CONTROLS |
|---|---|---|---|
| 0 | 1 | OBSERVE LINE ENDS<br>RAGGED RIGHT | .FO OFF<br>.JU ON |
| 0 | 4 | OBSERVE LINE ENDS<br>STRAIGHT RIGHT<br>(Note that some DCF installations do not support this function.) | .FO OFF |
| 1 | 1 | CONCATENATE LINES<br>RAGGED RIGHT | .FO LEFT |
| 1 | 4 | CONCATENATE LINES<br>STRAIGHT RIGHT | .FO ON |

UP can use this table directly because ADJ and ALIGN always come as a pair. When UP sees the pair in the PMF or in a TUFC, UP writes the DCF controls shown in the table into the output DCF datastream. When UP sees the pair in the AMF, UP saves the information for use upon encountering an AAM.

DOWN uses the table directly to transform a .FO control because .FO's three supported parameter values correspond unambiguously to the first, third, and fourth lines in the table. A .FO control overrides any values set by previous .FO or .JU controls. DOWN writes a TUFC or the multi-byte control sequence BLFC BEGIN LINE FORMAT CHANGE
SLP SET LINE PARAMETERS
STAB SET TABS
ELFC END LINE FORMAT CHANGE whenever DOWN sees a .FO control. DOWN uses the current values for everything except ADJ and ALIGN and uses the table's values for these two parameters.

Down transforms .JU by generating the same four multi-byte controls, but setting only ALIGN as follows.

| FROM DCF | TO L3 |
|---|---|
| .JU ON | ALIGN = 4 |
| .JU OFF | ALIGN = 1 |

Note that .JU leaves ADJ (and everything else except ALIGN) unchanged.

DCF has a default of .FO ON. Hence DOWN's default PMF must have ADJ = 1 and ALIGN = 4. UP uses the DCF defaults, which are external to the document.

COLUMNS USED FOR TABS AND INDENTS

Column numbers in DW (or L3) and in DCF are not related in any simple way. The most important differences are as follows.

In L3, a tab in column 6 positions text in colum 6. In DCF, a tab in column 5 positions text in column 6.

The above is a fact, not an accident of how columns are counted. For the moment, count columns with column 1 defined to be the permanent left margin, i. e. the leftmost column of the screen. If you use DW to set a tab at column 6 (which puts a 6 into the appropriate parameter of the L3 datastream), then go to the permanent left margin, then either tab or indent to that tab setting, and finally type an "A", you will see that the "A" goes in column 6 underneath the tab symbol on the scale line. However, if you use the ".TB 5" DCF control to set a tab in column 5, then type a tab character and an "A", then run the result through the DCF formatter, you will see that the "A" goes in column 6. Similarly, again in DCF, if you use the control ".IN 5" and type an "A", you will see that the formatter puts the "A" in column 6.

The column numbers that are displayed in the scale line on DW's screen start counting columns with column 0 at the left edge of the paper (which is very different from the way we counted columns in the above paragraph). The column numbers that are displayed by an editor used to enter or edit DCF input start counting columns with 1 at the permanent left margin (as we did in the above paragraph).

In L3, a tab setting of "1" means a tab at the permanent left margin and it is useless because there is no column from which you could tab to the permanent left margin. In DCF a parameter of "1" in a ".TB" control is also called a tab at the permanent left margin and it is meaningful because it causes text preceded by by a tab character to start in column 2.

L3 does not allow a tab position parameter of 0, which would mean a tab setting one to the left of the permanent left margin (although L3P allows a tab position parameter of zero and ignores it). DCF treats a tab rack that begins with a "0" as a command to clear the tab rack and treats the control ".IN 0" as a request to start further text in column 1, i. e. at the permanent left margin.

There are also important similarities between the ways L3 and DCF treat columns, as follows.

The permanent left margin can be set an integer number of character positions to the right of the left edge of the paper. In DW you drag the left margin around an interactive menu. In DCF you use the ".PM" control or the "BIND" option on the SCRIPT command.

The leftmost typing position on the screen is at the permanent left margin.

Tab settings "float" to remain at constant distances from the permanent left margin, no matter how the permanent left margin is moved relative to the left edge of the paper. Suppose you create tab settings at 5, 10, 15, etc., when the permanent left margin is at the left edge of the paper. In DW, as you drag the permanent left margin to the right, you see the tab settings remain a constant distance from the left edge of the screen, and hence from the permanent left margin, even though the column numbers at which the tabs are displayed are increasing. That is, the tab settings remain in the fifth, tenth, etc. columns from the left edge of the screen, but the numbers over the tab settings change and are not always integer multiples of 5. In DCF, the position of the permanent left margin need not even be specified in the document itself because it can be specified when the DCF formatter is run.

No tab settings can exist between the left edge of the paper and the permanent left margin.

The numerical values of the tab settings do not change as the permanent left margin is changed. Count columns as in the first paragraph of this section. A tab setting of 6 in the L3 datastream (i. e. in a STAB multi-byte control or a TP structure parameter) causes text to start in column 6, no matter where the permanent left margin is relative to the left edge of the paper. A tab setting of 5 in DCF (e. g. the "5" in ".TB 5 10 15") causes text to start in column 6 no matter what values of ".PM" or "BIND" are used.

A temporary left margin can be set to the right of the permanent left margin without moving the tab settings. This has no effect on the functions of the tab settings except that it vitiates tab settings that are to the left of the temporary left margin. In DW you use the Required Tab Key to insert Indent Tab single-byte controls into the L3 datastream and thereby indent to successive tab settings. In DCF you specify a number of character positions that you want the temporary left margin to be to the right of the permanent left margin, in any of several controls such as ".IN 5".

Tabbing and indentation place characters in consistent columns. Consistency is automatic in L3 because it can indent only to tab settings. Consistency is achieved in DCF by insuring that, for example, tabbing to a tab that is set in column 5 causes characters to start in the same column (column 6) as does the control ".IN 5". Note that ".IN 0" unindents and causes text to begin in column 1, the leftmost column.

The default tab racks display as if a tab setting exists at each integer multiple of 5. In L3 the actual default tab setting numbers are 6, 11, 16, 21, 26, etc., but they are displayed at columns numbered 5, 10, 15, etc., if the permanent left margin is zero. If the permanent left margin is larger, then the same tab settings are displayed at larger-numbered columns. In DCF the default tab control is ".TB 5 10 15 20 25...", even though they cause characters to begin in columns 6, 11, 16, 21, 26, etc.

The goals of the UP and DOWN transformations of column numbers are fairly simple. The goals are as follows.

UP should transform the default L3 tab rack into the default DCF tab rack and DOWN should transform the default DCF tab rack into the default L3 tab rack.

If L3 and DCF have their permanent left margins set equal to the same numbers of characters of displacement away from the left edge of the paper, then either UP or DOWN should transform a character that is n character positions from the left edge of the paper in the input document into a character that is n character positions from the left edge of the paper in the output document. This should be true when n is determined by any of the three ways that follow (or by any combination of these ways). First, by spacing over from the permanent left margin to the desired position. Second, by tabbing to the desired position. Third, by indenting to the desired position.

The column number transformation algorithms which come as close as possible to the above goals are relatively simple.

DOWN treats a "0" parameter of a ".TB" control as a command to clear the tab rack. For each positive parameter of a ".TB" control, DOWN adds one to get the parameter it puts into L3's STAB multi-byte control or TP second level vector. (DOWN also extends the tab rack with values that are one more than integer multiples of 5, to provide more indentation points, except in margin text where bytes are in short supply.)

UP ignores tabs that L3 sets in columns 0 or 1 and subtracts one from each greater tab setting(i. e. from each parameter in a STAB or a TP) to get the parameters it puts into DCF's ".TB" control.

These algorithms meet their goals with the following exceptions.

DOWN can indent only to tab settings. That is, DOWN can not exactly obey a DCF indent control unless a tab has been set at the desired new temporary left margin. Instead, DOWN indents to the smallest tab setting that is greater than or equal to the specified indentation.

UP ignores a tab set in column 1. As a result, DOWN can not regenerate such a tab if the document is later returned to the L3 form. This should not cause any change in document formatting, because that L3 tab set at 1 did nothing anyway.

TABS

L3's TAB PARAMETERS (TP) second level structure (in the LINE PARAMETERS second level structure, in the PMF, AMF, or TUFC first level structures), or the SET TABS (STAB) multi-byte control, specifies the currently active tab settings. They transform to and from DCF's .TB control. However, L3's TP structure has a parameter (ALIGNC) that can specify the following four alignments

| ALIGNC | ALIGNMENT | Typical usage |
|---|---|---|
| 0 | NORMAL (LEFT) | |
| 1 | PERIOD ALIGN | decimal numbers |
| 2 | COMMA ALIGN | European decimals |
| 3 | CENTER ALIGN | column headings |
| 4 | RIGHT ALIGN | integer numbers |

whereas DCF's .TB gives only left alignment which is also known as "normal" alignment.

UP transforms L3's TP to DCF's .TB control by ignoring ALIGNC and transferring the tab settings from the POS parameter to the .TB control. When UP sees TP in the PMF or in a TUFC, or sees the STAB multi-byte control, UP writes the DCF control into the output DCF datastream. When UP sees TP in the AMF, UP saves the information for use upon encountering an AAM.

DOWN transforms DCF's .TB control to a TP in a TUFC or in a STAB multi-byte control in the group BLFC BEGIN LINE FORMAT CHANGE
SLP SET LINE PARAMETERS
STAB SET TABS
ELFC END LINE FORMAT CHANGE DOWN may combine a sequence of DCF controls that resulted from a single TUFC (or even from an APM or AAM) and incorporate the lot into one TUFC. DOWN will not attempt to recognize the pattern of parameter values in a succession of DCF controls as being equivalent to the PMF or the AMF in order to incorporate the lot into an APM or an AAM.

DOWN fills out any tab rack specified by a user's .TB statement by adding tabs to the right of the rightmost user-specified tab setting. DOWN adds a tab setting at each integer multiple of 5 up to a limit set by L3's limitations, which are a maximum of 48 tab settings and a maximum tab setting of 255. The purpose is to provide tab settings to which the L3 document's temporary left margin can be indented by means of Indent Tab controls. There is no hope for a user who sets the first tab far to the right of the permanent left margin, because there is no way to provide tab settings (for use as indentation points) to the left of the leftmost tab setting a user specifies.

This filling out of a .TB's tab rack also applies to the default tab rack specified in the PMF that DOWN reads from the given Format Unit File. This gives a user many positions to indent to, even before the first user-specified change to the tab rack, and even if the default tab rack has only a few tab settings. In general, the Format Unit File's PMF's tab rack should match the DCF default tab rack of 5, 10, 15, ... , so this filling will not add tab settings. As noted above, these tab settings cause text to start in columns that are 6, 11, 16, ... columns away from the permanent left margin, so the matching DW tab settings are one more than integer multiples of 5 away from the left edge of the DW screen.

UNDERSCORE

The transforms support all three major methods of underscoring:

1. Begin Underscore, End Underscore
2. Backspace and type underline characters
3. Word underscore (in L3 only)

Number 2 works in L3 and in DCF since the backspace (BS) and underscore (hex '6D') characters are identity conversions in each direction. Hence, number 2 need not be discussed further.

DCF's underscoring uses the controls

```
   .US ON
   and
   .US OFF
```

to bracket the text to be underscored

L3's underscoring either uses the BUS (begin underscore) and EUS (end underscore) multi-byte controls (with the default parameter values of 1 for MODE and 0000 0000 for BYP, which DW ignores) to bracket the text to be underscored, or else uses the WUS (word underscore) single-byte control after the word to be underscored.

The UP transform reads these L3 controls, ignores parameters, and generates the DCF controls. The DOWN transform reads the DCF controls and generates the L3 controls with their default parameter values.

For example, the text abc def ghi is produced by either of the following L3 datastreams

```
  abc BUSdefEUS ghi
```

or

```
  abc defWUS ghi
```

where BUS, EUS, and WUS are used to stand for L3 controls, which are, of course, unprintable bytes.

The same text happens to be also produced by either of the following two DCF datastreams.

```
  abc ;.US ON;def;.US OFF; ghi
```

or

```
  abc +
  .US ON
  def+
  .US OFF
   ghi
```

where "+" stands for the defined continuation character. Note that the positioning of spaces after "c" and before "g" is crucial. The spaces must not be put before the "d" and after the "f", because we must avoid underlining spaces.

Note that there is no "+" after the ".US ON" or after the ".US OFF". This is not a typographical error. A "+" in these places produces rather surprising results that are very undesirable. The "+" brings the text that follows up onto the line containing the "+" and therefore causes that text to be treated as if it were (illegal) parameters of the .US control. The ".STARTUP" macro, which UP invokes at the start of each document it produces, needs a ".DC CONT 4E" control to define the continuation character to be the character "+", i. e. hex '4E'.

Note that the corresponding DCF datastream, without continuation characters,

```
  abc
  .US ON
  def
  .US OFF
  ghi
```

will produce the same text if and only if .FO ON is in effect. Otherwise the DCF formatter places the text on three different lines, even though the .US control, itself, does not cause a break.

An unsolved technical problem in UP appears whenever an L3 document says to underscore the last characters in a sentence (such as the last word or words of the sentence) but not, of course, to underscore the period at the end of the sentence. The transform is forced to put the ".US OFF" control after the last character that is to be underscored and before the period. This leaves the period in the place in which a period signals the start of another control. The DCF formatter expects to see a valid two-character control following the period. Instead, it sees the two blanks that precede the next sentence, which it considers to be a terminal error. Special algorithms could handle special cases, but no general solution is known. For example, how can UP tell whether a period after the end of underscored text is meant to end a sentence, be the first period of an ellipsis ("..."), or actually start another control?

CENTERING AND ALIGN TEXT FIELD

The L3 multi-byte control ALIGN TEXT FIELD (ATF) centers a field around the horizontal position of the ATF control. The field is begun by an ATF whose Alignment Type parameter is 3. The field is ended by any of the following field ending controls.

Single-byte controls: TP, IT, CRE, RCR, IRT, RPE, PE, ZICR, INDX

Multi-byte controls: BLFC, RMLF, or ATF

Note that the last one of these is another ATF. It can not specify a return to normal alignment by having Alignment Type = 0 because this alignment type is not supported in DW. However, it can begin another field that is to be centered about its new position. The field that is centered need not be an entire line. The point about which the field is centered need not be the center of the page.

DCF's .CE control, used without parameters, centers the line of input text that follows that control. It centers this line about a point half way between the current temporary left margin and the right margin.

DOWN can transform a .CE into 33 required spaces and an ATF and then let the end of the DCF input line (which may transform into a CRE) terminate the text that is to be centered. The spaces are to position the ATF near the center of the page.

Instead of using this default, DOWN could compute the correct number of spaces using its knowledge of the current temporary left margin. If UP were transforming the page horizontal layout controls, that were put into L3 for formatting on the DW printer, into DCF controls, which are unlikely to be correct for the printer or display to which the document will go on the host system, then DOWN could use L3's margins to compute the correct number of spaces. Alternatively, DOWN could use DCF substitution symbols to tell the DCF formatter to compute the center from device-dependent formatting parameters. The default of 33 spaces will be used now.

UP transforms an ATF to a .CE at the start of a record and lets one of the controls in the above list terminate the text that is to be centered. This termination works because UP does no breaking of long L3 text lines into screen-size DCF lines. If a DW is used to format 132 column text, for example, UP will pass input lines up to 132 characters long. These can be used to center text wider than a 3270 screen without interference from UP.

Note that this algorithm applies only to centering an entire line between the current page margins, because that is all that the .CE control supports. In other cases, UP could go into a formatter mode, format the last line to see what was being centered, and put the result into DCF in .FO OFF mode, but that is very hard to implement and is inconsistent with editable interchange.

Note that DCF has no way (short of formatting the line and inserting the desired number of spaces) to support L3's "centering tab" capability. Again, this is because L3 can center a field (any subset of a line) whereas DCF can center only an entire line.

Thus, several conditions prevent correct transformation of L3's centering into DCF. See the chapter on "UP's ALGORITHMS FOR DELIMITERS" and its section on "ALIGN TEXT FIELD" for treatment of these conditions.

DOUBLE SPACE AND SINGLE SPACE

The DCF controls ".DS" and ".SS" determine how much an index operation changes the current vertical position, so they correspond to values of L3's LINE SPACING (LNSP) parameter. LNSP can be in the LINE PARAMETERS (LP) second level structure, which can be in the PMF, AMF, or TUFC first level structures. Moreover, LNSP can be in the SET LINE PARAMETERS (SLP) multi-byte control in a LFC, i. e. in the group of multi-byte controls BLFC, SLP, STAB, ELFC.

The semantics of LNSP is the number of half-lines an index operation moves, so the correspondence is as follows.

| DCF control | LNSP value |
|---|---|
| .SS | 2 |
| .DS | 4 |

DOWN will read these DCF controls after it has written out the PMF and AMF. Hence, it must transform these DCF controls into an LNSP parameter either in an SLP multi-byte control (in the LFC group) or in a TUFC. This is business as usual for DOWN. The usual line parameter changes and tab rack changes can be satisfied by writing this group of multi-byte controls; only changes to margin text requires DOWN to write a TUFC. DOWN never writes anything except the default PMF and AMF, and never writes an APM or an AAM.

DOWN must also save the new LNSP parameter value in the prototype TUFC which it is prepared to write out at any time on demand, since L3 is generally unable to change just one thing without also respecifying a scad of other things.

UP will read the LNSP parameter in all four contexts in which LNSP can occur. What UP generates is determined as follows.

| OUTPUT DCF control | INPUT LNSP value |
|---|---|
| .SS | 1, 2, or 3 |
| .DS | 4, 5, 6, 7, or 8 |

What UP does depends on the context, as follows.

| Context in which LNSP is read | What UP does as a result |
|---|---|
| PMF | Write .SS or .DS into the DCF datastream, because there is a default activation or establishment of the PMF at the start of each document. Save the LNSP information (2 or 4) with the rest of the PMF data for transformation and writing into the DCF datastream whenever it reads an APM or sometimes an RTMFin the L3 datastream. |
| AMF | Just save 2 or 4 with the rest of the AMF data for transformation and writing into the DCF datastream whenever it reads an AAM or sometimes an RTMF in the L3 datastream. |
| TUFC | Write out .SS or .DS in the DCF datastream. |
| SLP | Write out .SS or .DS in the DCF datastream. |

MARGIN TEXT

UP TRANSFORMS MP AND MT

UP reads the "TYP" and "SP" parameters from the MARGIN TEXT PARAMETERS first level structure that follows one of the PMF, AMF, or TUFC first level structures. UP then sets a switch, associated with the AMF, PMF or TUFC, that tells whether any following Margin Text should appear on "this" page or the "next" page. UP then reads the "TYPE" parameter and the actual margin text from the MARGIN TEXT first level structure that follows. The type and the text is also stored and associated with either the AMF, PMF or TUFC. Each type of format structure (AMF, PMF, TUFC) has four storage buffers in the UP program, top odd, top even, bottom odd, and bottom even. They are all cleared when the associated format structure is encountered, and then each of these buffers may or may not be filled by a following MARGIN TEXT structure. A TOP-ODD MARGIN TEXT structure following the PMF stores its information in the PMF-TOP-ODD buffer, etc... (Note: For a heading that is to appear on all pages, both the odd and even buffers are filled with the same margin text).

The margin text is output (along with other formatting controls) only when the format vectors are activated. This activation occurs in the UP program for the AMF and PMF information when ever the first level structures APM, AAM, or RTMF are encountered. An APM is implied (and the controls and margin text output) at the start of every document. For TUFC's the next BODY TEXT structure activates the controls and margin text (if present) of the TUFC.

It is important to note that in L3 each activation of a format structure implies that the margin text be cancelled. Therefore it must be respecified in every format structure if it is to remain active. Because the margin text is repeated so often the UP program also keeps four buffers of "currently active" margin text. Before writing out any new margin text, UP checks to see if it is different from the current. If it is the same, UP does not repeat this margin text definition in the SCRIPT file.

When the activation of a format structure occurs, and the margin text buffers associated with that format structure are not empty or equal to the currently active margin text, UP then generates the following DCF controls:

| If "TYPE" was: | Then generate: |
|---|---|
| 1 | .RH ON<br>"MARGIN TEXT"<br>.RH OFF |
| 2 | .RH ON ODD<br>"MARGIN TEXT"<br>.RH OFF |
| 3 | .RH ON EVEN<br>"MARGIN TEXT"<br>.RH OFF |
| 4 | .RF ON<br>"MARGIN TEXT"<br>.RF OFF |
| 5 | .RF ON ODD<br>"MARGIN TEXT"<br>.RF OFF |
| 6 | .RF ON EVEN<br>"MARGIN TEXT"<br>.RF OFF |

That is, use a table such as:

| "TYPE" | a | b |
|---|---|---|
| 1 | .RH | |
| 2 | .RH | ODD |
| 3 | .RH | EVEN |
| 4 | .RF | |
| 5 | .RF | ODD |
| 6 | .RF | EVEN |

and generate:

```
   a  ON  b
   "MARGIN TEXT"
   a  OFF
```

Note that the "MARGIN TEXT" in between the ON and the OFF can contain any of the DCF controls that we support (except PA which makes no sense), so the same routines used for BT can be used to put out "MARGIN TEXT".

UP must determine where to put the results of transforming the MARGIN TEXT structures. In DCF, a Running Heading defined by .RH or a Running Footing defined by .RF is first used on the page following the one on which it is defined. In L3, the SP parameter of the MP second level structure specifies whether the margin text contained in the following MT parameter is to be used on the current page (0) or on the next page (1).

UP can cause margin text to be used first on the current page by putting the complete definition of a RH or RF before the ".PA" DCF control that starts the current page. In practice, this is very difficult for UP because UP may have transformed a previous Required Page End to a .PA control and then generated many other controls corresponding to such L3 items as a TUFC or RTMF, before receiving the margin text definition. To solve this difficulty, UP writes a .PA NOSTART control, not a .PA control, as the transform of either a RPE or one of the controls that implies a Required Page End.

This gives UP the flexibility to put the margin text definition either before or after the start of the current page, to control whether the margin text will be first used on the current page or on the next page. This is the way UP transforms the SP parameter that was saved from the MP vector that is associated with an MT vector. To start using the defined margin text first on the current page, UP puts the margin text definition (i. e. the .RH ON, text, and .RH OFF, or .RF ON, text, .RF OFF) into the DCF datastream. However, to start using the defined margin text first on the next page, UP precedes the margin text definition in the DCF datastream by a .SK 0 control. That control does not cause generation of any text, but it does "Start the Page". See Figure 28 in the DCF User's Guide.

MARGIN TEXT defined in the PMF will appear on the document's first page (appropriate for SP = 0) if UP makes the .RH ON or .RF ON precede the first body text put into the DCF datastream for the document. However, if SP = 1, then UP must put a .SK 0 control into the DCF text before the .RH ON or the .RF ON, to force the margin text to appear only on the subsequent pages.

MARGIN TEXT could be changed from its PMF value by an AAM (which, among many other things, writes out the margin text that was stored just after the AMF). Margin Text could also be changed when a TUFC is activated. Either of these actions occur at the start of a new required page and implie a .PA NOSTART in the DCF datastream. UP must precede the .RF or .RH by a .SK 0 control if and only if the SP value is 1. That control starts the current page and forces the new margin text to wait for the start of the next page.

The sequence of events then for margin text is always store the parameters and text, wait for a format activator, and then compare and write the margin text.

DOWN TRANSFORMS .RH AND .RF

The DOWN transform always stores margin text in 4 buffers: top odd, top even, bottom odd, and bottom even. These margin text buffers are initialized from the margin text associated with the PMF of the format unit specified for that transform. Any margin text vector specified as "all" will be loaded into both the odd and even buffers for the appropriate top or bottom pair. Whenever a TUFC is output, all margin text vectors are always written out. This includes 2 MP vectors and 4 MT vectors. Any margin text vector that contains no margin text will be output as as 5 byte "LLCTF". When DOWN outputs the MP vectors, it fills in MP's SP parameter to tell where the margin text is to go. It has to know, when it gets .RH ON or .RF ON, where the DCF formatter would put the defined margin text. State bits GOTPA and GOTPAN tell it where. These and other state bits are defined later. The setting and use of these bits is described here.

When DOWN is reading a sequence of DCF controls, and gets a .PA control, DOWN sets GOTPA. Similarly, when DOWN gets a .PA NOSTART control, DOWN sets GOTPAN. When DOWN gets any of the controls (supported or not) that starts a page (e.g. .SK) DOWN tests GOTPAN and, if GOTPAN = 1, sets GOTPA.

The resultant meanings and SP values are as follows:

| STATE: GOTPAN | STATE: GOTPA | DCF 's meaning of this state when DOWN sees .RH ON or .RF on | Resultant SP |
|---|---|---|---|
| 0 | 0 | There is text on the current page and margin text goes on the SUBSEQUENT page | 1 |
| X | 1 | The next page has been started (although no text yet) so margin text goes on the SUBSEQUENT page | 1 |
| 1 | 0 | Prior page was ended, but this page has not started, so margin text goes on the CURRENT page | 0 |

Thank you Hoffy!

When a ".RH" or a ".RF" ON is found in the document, a set of state bits are set to describe which buffers are to be used. The appropriate buffers are cleared (for "ON" or "CANCEL"), and all text until an appropriate "OFF" is found will be output to the specified buffers. Any text that exceeds the 2048 byte limit of DOWN will be truncated. Any commands not allowed in margin text will not be processed, such as .PA or another ".RH" or ".RF" ON. Any time a TUFC is generated, the current contents of the buffers will be output. DOWN supports the CANCEL parameter alone or with either the odd or even parameter. CANCEL will set the appropriate buffer to its 5 byte "LLCTF" which says to L3 there is no margin text for that parameter.

TRANSFORMATIONS OF MARGIN TEXT PAGE NUMBERS

UP and DOWN support page numbers in margin text. An "&" in the DCF "MARGIN TEXT" tells DCF to insert the current page number in place of the "&". The corresponding symbol in L3 is hex 2BD40247, the multi-byte control PRINT PAGE IMAGE NUMBER (PPIN). The transforms interconvert these two strings in MARGIN TEXT only.

Note that DCF has a default RT-type header that contains a right-justified page number, even if the document has an RH-type header that contains a page number symbol. The transforms do not support this obsolete form of header. DCF also has defaults of two blank lines after the default RT header, a blank line of BT-type footer, and two blank lines between body text and that footer.

UP suppresses these undesired defaults by putting out the DCF controls

```
.HS 0
.HM 0
.FM 0
.FS 0
```

which leave no header and footer spaces for them. DOWN should ignore these controls and not even pass them as text (when it is passing the rest of what it does not support as text) to avoid having them replicated by round trips. This is accomplished by using a macro ".STARTUP" following a ".MS"control at the start of each DCF document that UP produces. The same macro contains ".TI" and ".TS" controls.

The transforms could make up a Running Heading, with just a right-justified page number, for any document that has no Running Heading at all, if desired.

FORMATTING MARGIN TEXT

Unfortunately, the page vertical formatting of margin text is very different in DCF and in L3.

DCF's formatting assumes that the RH or RF margin text goes within the space allocated to the "body" of the document. It relies on the user to supply blank lines at the end of the RH, if the RH is not to be pressed right against the top of the body text. (This sounds odd until you use RT to form a table heading that you want to go on each page of a multi-page table with no blank space between the table heading and the table.) Similarly, DCF relies on the user to supply blank lines at the beginning of the RF, if the RF is not to be pressed against the end of the body text. Thus, DCF uses whatever room the RH and RF text leave on the page to format true non-margin text.

It is becoming fashionable to override the DCF defaults for top and bottom margin, and make these margins zero, by putting .TM 0; .BM 0 in the DCF datastream. Then a user puts explicit blank lines at the start of the running heading to establish the desired top margin blank space and puts explicit blank lines at the end of the running footing to establish the desired bottom margin blank space.

The L3 formatting of margin text is completely different. It provides explicit and separate starting line positions for the body text, header, and footer. It provides an explicit ending line position for the body text. These are all parameters in units of one 1440 th of an inch, measured from the top of the page. They appear in the PP and MP structures. Their meanings are shown at the right in the following figure.

DOCUMENT VERTICAL PAGE LAYOUT

```
          DOCUMENT    L3 PARAMETER  which tells
     ___________________________________________________
          page top----0-------------the origin
          RT TEXT (pn)
          blanks
     *1   RH TEXT-----SL1 in MP-----where header starts
          RH TEXT
          blanks
          TEXT--------FBTLF in PP---where true body
          TEXT                      text starts (on first
          blanks                    page). See FBTLF.
          blank-------LBTL in PP----where true body ends
          RF TEXT-----SL4 in MP-----where footer starts
          RF TEXT
     *2   blanks
          RT TEXT (b)
     *3   page bottom-PD in PP------Tells depth of paper
```

Notes give the DCF vertical page layout controls:

```
     *1  TM gives the number of lines between the top of
            the page and the start of the Running Heading
     *2  BM gives the number of lines between the bottom
            of the paper and the end of the Running Footing
     *3  PL gives the number of lines on the paper
```

UP and DOWN handle page vertical formatting by using defaults.

Supplying defaults is necessary for UP because two DCF formatter defaults will change in Release 3. The required defaults are as follows.

```
    .TM 6
    .BM 6
```

These are the default values in Release 2 of DCF but Release 3 of DCF will use default values of 0.

A user or system administrator will usually supply DOWN with a suitable default FORMAT file for documents to be processed. This file contains an L3 Format Unit and is easily generated (from any DW document having the desired format) by using the supplied option in the UP transform. If no such FORMAT file is provided, DOWN uses the following hard-coded defaults values.

DOWN allows 5/8 inch of white space at the top, so uses an SL1 equal to 5/8 inch in 1440 ths, i. e. 900. Down allows 2 lines of top margin text and two blank lines below that, and assume 0.1 inch per line, so FBTLF and FBTLS are $$900 + 1440 \times (2+2) \times 0.1 = 1476$$

This is not critical because of L3's error condition handler, explained under Margin Text Parameters, that makes body text move down to accommodate longer top margin text. The DW operator will know to go in and reformat the document because of the abutment of margin text and body text, if no blank lines were at the bottom of the running heading.

Assume the page is 11 inches deep, has 5/8 inches of white space at the bottom, has 2 lines of bottom margin text, and has 2 blank lines above that. Then $$SL4 = 1440 \times (11 - (5/8 + (2 \times 0.1))) = 14652$$

where "SLi" means "the SL parameter in a MARGIN TEXT structure of TYPE i". Assume there are two blank lines above the bottom margin text. Then $$LBTL = SL4 - 1440 \times (2 \times 0.1) = 14364$$

This is more critical because if a user enters more than 2 lines of bottom margin text, then this text will run into the white space at the bottom of the page or even overflow the page.

This assumed that the DCF document did not use blank lines at the start of the bottom margin text to separate it from the body text. Blank lines at the start of the bottom margin text would force the non-blank bottom margin text lower than desired. It is necessary for DOWN to strip off blank lines at the start of bottom margin text to get around the enormous difference in the ways DCF and L3 create blank lines between body text and margin text.

If we assume that the start of bottom margin text will always include any desired blank lines, then we should make $$LBTL = SL4$$

This is another way around the difference.

COMMENT USED TO PASS SOURCE DRAWER INFORMATION

Memos prepared on DW frequently request that the first page is to be printed on letterhead paper and the subsequent pages are to be printed on blank paper. This request is expressed in L3 by the following parameters

```
    FMCP    (FORMS, CURRENT PAGE)
    SDCP    (SOURCE DRAWER, CURRENT PAGE)
    FSP     (FORMS, SUBSEQUENT PAGE)
    SDSP    (SOURCE DRAWER, SUBSEQUENT PAGE)
```

which appear in the PRINT MEDIUM (PM) second level structure which appears in each PMF, AMF, and TUFC first level structure. This request can not be expressed in DCF controls. The requirement is to preserve this L3 information on a round trip from L3 to DCF and then from DCF to L3.

The proposal is for UP to transform some or all of an L3 document's PM structure into a comment in DCF, with a keyword such as "L3*STRUCTURE" that will more or less distinguish it from other DCF comments, and for DOWN to recognize a comment beginning with that keyword as something it is to transform into whichever of PMF, AMF, or TUFC is appropriate. The first such comment in a document goes into the PMF; the second, if any, goes into the AMF; and any others go into the TUFCs whose other parameters follow the appearance of the special comment. There are several possibilities for the form of these comments.

The first possibility is that the comment could look like

```
    .CM L3*STRUCTURE 10E40200...
```

where the hexadecimal form of the L3 structure has been converted to printable but meaningless characters by the obvious nibble-to-character conversion in which hex '10E40200' etc. becomes the character string shown. In principle, this technique could be used to make the L3-to-DCF-to-L3 path as complete as desired. UP could put any information, that it does not transform from L3 to DCF, into DCF comments. One example of L3 information that is not transformed to DC, but should be returned to L3, is decimal tab alignment. Comments do not affect what is produced by the DCF formatter program, but they are available for transformation back DOWN from DCF to L3. (Note that there is no such path through L3 to hold DCF's unique information because there are no comments in L3.) In practice, only a few such extra comments would make the editable form of the document in DCF format look so unfamiliar and suspicious that no one would have the courage to edit it, so the entire purpose of the editable-form transformations is vitiated.

The second possible form of the comment is somewhat more meaningful and editable. It is generated by parsing the L3 structure into something like

```
     .CM L3*STRUCTURE PAGE MEDIA FOLLOWS
     .CM L3*STRUCTURE COPIES = a
     .CM L3*STRUCTURE FORMS, CURRENT PAGE = b
     .CM L3*STRUCTURE SOURCE DRAWER, CURRENT PAGE = c
     .CM L3*STRUCTURE FORMS, SUBSEQUENT PAGE = b
     .CM L3*STRUCTURE SOURCE DRAWER, SUBSEQUENT PAGE = c
```

where it is easier (although still nontrivial) to instruct a DCF user that:

- a is a number of copies between 1 and 256;
- b tells whether the print is
  - paper (1),
  - manual feed (2), or
  - envelope (3); and
- c tells whether feed is to be from
  - the top drawer (1), or
  - the bottom drawer (2).

As a third possibility, the meanings of b and c could be spelled out as character strings, such as "TOP DRAWER" instead of c = "1", and a DCF user could be told what other character strings are valid for each.

A fourth possibility is to default the copies and forms parameters and have the comments look like

```
     .CM L3*STRUCTURE SOURCE DRAWER, CURRENT PAGE = TOP
     .CM L3*STRUCTURE SOURCE DRAWER, SUBSEQUENT PAGE = BOT
```

and to support it only in the PMF.

The fifth form of the comment, recommended by DW experts, relates directly to the options that DW presents on the "PRINTING PAPER SOURCE" menu by which a DW user sets values into the PM structure. In this form, the DCF comment looks like one of the following four lines.

(1) .CM PRINTING PAPER SOURCE TOP
(2) .CM PRINTING PAPER SOURCE BOTTOM
(3) .CM PRINTING PAPER SOURCE BOTTOM, THIS PAGE ONLY
(4) .CM PRINTING PAPER SOURCE MANUAL FEED

UP will generate one of these character strings in DCF for each PM it encounters in L3 that has the four optional parameters FMCP, SDCP, FSP, and SDSP. DOWN will recognize any one of them and generate the corresponding parameters in the appropriate PM. DOWN will ignore any variant on these comments altogether.

UP and DOWN both use the following table.

| COMMENT NUMBER | : | FMCP | SDCP | FSP | SDSP |
|---|---|---|---|---|---|
| (1) | : | 1 | 1 | 1 | 1 |
| (2) | : | 1 | 2 | 1 | 2 |
| (3) | : | 1 | 2 | 1 | 1 |
| (4) | : | 2 | 1 | 2 | 1 |

Note that "b" above is the key to FMCP and FSP, while "c" above is the key to SDCP and SDSP.

The latter possibility is implemented.

PARAGRAPH

UP will never generate the .PP DCF control, because this control is like a GML tag in that .PP specifies the role some text plays in a document, (namely "this is a paragraph") and only incidentally specifies the processing that this part of the document is to receive (namely "skip a line and indent 3 spaces"). We can not identify, from the processing specified in an L3 document, what is intended to be a paragraph. We surely do not want to scan L3 text to find combinations of skipping a line and indenting 3 spaces in order to generate the .PP control.

DOWN could transform .PP by performing the semantics of .SK 1 and then inserting 3 blank characters in the datastream. However, the type of .PP paragraph supported by DCF is not in common use. Most outfits prefer to not indent the first line of a paragraph (even though this makes it ambiguous whether a sentence that happens to begin at the top of a page is or is not the start of a new paragraph). Therefore, most outfits either eschew the .PP control or else redefine it by means of a DCF macro to mean just a .SK. Since we transform DCF input, we do not see the results of macro expansion, and we do not propose to write our own DCF macro expander.

To support this common control, DOWN transform it as .SK 1 which is the most usual macro used for it.

4. TRANSFORMATIONS, SINGLE-BYTE CONTROLS

PAIRED SINGLE-BYTE CONTROLS

L3 has several pairs of single-byte controls in which one member is required and the other member is, in some sense, optional. They are SPACE, HYPHEN, CARRIER RETURN, and PAGE END. In none of these cases does DCF naturally support the distinction between required and optional controls. The distinctions must be preserved through an UP to DCF and DOWN to L3 round trip and also UP must put the correct transformations for each into DCF. The paired L3 controls and their properties are given in the following table.

PAIRED L3 CONTROLS

| HEX | ACR. | NAME | GENERATION | PROCESSING |
|---|---|---|---|---|
| 40* | SP | SPACE | KEY | DELIMITS WORDS, EXPANDS WHEN JUSTIFYING |
| 41 | RSP | REQUIRED SPACE | CODED KEY | NOT A WORD DELIM. DOES NOT EXPAND WHEN JUSTIFYING |
| CA | SHY | SYLLABLE HYPHEN | ADJUST WITH HYPHENATION, OR CODED KEY | REMOVED BY RE-ADJUSTING |
| 60* | HYP | REQUIRED HYPHEN | KEY | NOT REMOVED BY READJUSTING |
| 15 | CRE | CARRIER RETURN | CODED "RET" KEY OR KEY (PROFILE) & PAGINATION & "LINE ADJ" KEY | REMOVED BY READJUSTING |
| 06 | RCR | REQUIRED CARRIER RETURN(PROFILE) | "RET" KEY OR CODED "RET" KEY | NOT REMOVED BY READJUSTING |
| 0C | PE | PAGE END | KEY OR PAGINATION | ENDS A TEXT UNIT, MAY BE REMOVED BY REPAGINATION |
| 3A | RPE | REQUIRED PAGE END | CODED KEY | TREATED AS AN RCR, PAGINATION PUTS A PE AFTER AN RPE |

* THESE MAKE SENSE AS-IS IN DCF

INVALID SINGLE-BYTE CONTROLS

The L3P to L3 converter in DW produces the L3 datastream that the UP transformation reads and transforms to DCF. That L3 datastream can contain single-byte Controls that are not part of the L3 architecture. Examples are '2F'X or "BEL" and '2A'X or "SW", which are valid L3P single-byte controls, and '0A'X or "RPT" which is a valid ASC value. All have the property that they are less than '40'X but are not valid L3 single-byte controls. UP completely ignores such bytes in the L3 input datastream.

DW people have requested an alternative treatment, to preserve such values in the DCF output datastream, in case the document is subsequently transformed back DOWN to L3 form and hence converted back to to L3P on the DW diskette, where they may be meaningful. Such an alternative treatment is available. See the next section's subsection on "SBS, SPS, UBS, and PE".

SIMPLE SINGLE-BYTE CONTROLS

UP must transform L3's single-byte controls in several different ways. These are summarized in a table at the end of this section.

SP AND HYP

Two of the single-byte controls, namely Space (SP) and Required Hyphen (HYP), have all of the ideal properties for transformation, as follows.

1. The identical function exists in DCF.
2. That function is represented by the same byte value in DCF so it is recognized by the DCF formatter program as is.
3. That byte value is printable, displayable on a 3270 screen, and enterable from a 3270 keyboard.
4. No action is required of the UP transformation other than moving the byte value from the L3 datastream to the DCF datastream.
5. No action is required of the DOWN transformation other than moving the byte value from the DCF datastream to the L3 datastream.

The other nineteen single-byte controls lack one or more of these properties.

HT, BS, AND RSP

Three of the single-byte controls, Horizontal Tab (HT), Backspace (BS), and Required Space (RSP) lack only property 3. It is traditional to enter and display Horizontal Tab as a NOT symbol, perhaps to enter and display Required Space as a CENT symbol, and sometimes to enter and display the Backspace as an AMPERSAND. DCF has the .TI control to let a user tell the DCF formatter to treat these displayable and enterable characters as if they were the Horizontal Tab, Required Space, and Backspace symbols when they are needed for formatting a document, but which are not displayable or enterable on a 3270.

This traditional method is not suitable for general document transformation. It makes three symbols unusable in all documents. A user who wants to write a document that contains NOT symbols would need an option to tell the transformers to use some other symbol for TAB, etc. This option would have to be used every time the document is processed by UP or by DOWN. The complexities and possibilities for human error are excessive.

The algorithm to be used for transformation is to employ CMS's capability to "SET INPUT" and "SET OUTPUT". The

SET INPUT 5F 05 command tells CMS to treat the key that normally produces the NOT symbol, hex '5F, as a request for the TAB character, hex 05', in the document that is being edited. The

SET OUTPUT 05 ¬ command tells CMS to display a hex '05' in the document as if the document contained a ¬, or hex '5F', at that point.

Thus, these two commands allow a user to enter and display TAB characters as if they were NOT symbols. These CMS commands should be placed in each user's XEDIT profile (fn = PROFILE and ft = XEDIT) or in each user's overall profile (fn PROFILE and ft = EXEC). The transform programs are accompanied by a file (fn = STARTUP and ft = EXEC) containing all such necessary CMS commands.

The reasons for selecting this algorithm are as follows.

a. The original character remains in the document so it can be treated as a TAB by the DCF formatter without a .TI control being needed in the document.

b. The original character remains in the document so it can be converted back to a TAB in the L3 form without loss of information.

c. A user can change the character by which TAB is displayed and entered, in case the user wants to enter and use NOT signs as text characters, without remembering to tell the DOWN transformer about this unusual requirement.

d. This unusual requirement can be specified only once for a user who uses NOT symbols, rather than being specified when a document is entered and also specified every time a document is transformed.

e. The character by which a user enters and displays TAB is a late decision rather than having to be coded into the transformation programs.

f. No option needs to be allowed on the menus that invoke the transformations for TAB and the other dozen characters that fail property 3.

The same algorithm just described for Horizontal Tab is also used to make Required Space and Backspace enterable and displayable. The only question is whether the recommended CMS SET commands for Required Space and Backspace will use a special symbol, such as CENT and AMPERSAND, or will use the same symbol that is used for all other peculiar L3 characters as described below. The answer can easily depend on whether an individual PROFS system administrator thinks users (individually or collectively) are more likely to want required blanks and Backspaces or CENT and AMPERSAND symbols.

Note that all CMS installations allow a file to contain the Backspace symbol (Hex '16'). Different DCF installations process Backspace symbols in different ways, when preparing output for an I/O device that is not capable of producing two characters in the same character position. A 3277, 3278, and 3279 are examples of such devices. One common way is to start a new line and put the character that is intended to be on top of another character below it (or even above it) instead. Whether or not such processing is a favor, depends on what an individual user was trying to accomplish with a Backspace.

SBS, SPS, UBS, AND PE

Several of the L3 single-byte controls are not supported in the transformation programs. These are Subscript (SBS), Superscript (SPS), and Unit Backspace (UBS). Nevertheless, some algorithm is required for them, for the following reasons.

a. They would confuse the DCF formatter if ignored.

b. They should be preserved by a round trip UP to DCF and then back DOWN to L3.

c. They may display as blanks or other even more misleading characters on 3270.

The algorithm has three parts.

First, transfer these single-byte controls from the L3 datastream to the DCF datastream without changing them at all.

Second, supply one CMS command

```
    SET OUTPUT wx 7B
```

for each different unsupported L3 control (hex 'wx') to make all of these L3 single-byte controls display as some one graphic character such as the NUMBER or POUND symbol (hex '7B'). Note that no SET INPUT commands are necessary because these need not be entered in DCF form.

Third, use the DCF control

```
    .TS wx //
```

to tell the DCF formatter to Translate the String consisting of the unsupported L3 single-byte control (hex 'wx') into the null or empty string, which is specified by the two slashes with a null string between them.

The SET OUTPUT commands go in a PROFILE as described for HT. The .TS commands go into the start of every document produced by UP, one way or another. One way is for UP to place these DCF controls at the start of every DCF document it generates and for DOWN to ignore them (not even passing them on as text if it is told to pass any DCF controls it can not transform, to avoid a control explosion upon multiple UP-DOWN round trips). Another way is for UP to always use a DCF macro, or imbed a standard document, at the start of every document and to put these .TS controls in that macro or standard document. The imbed way is far more convenient, but the macro way must be supported because PROFS does not support imbed files.

Note that this algorithm for unsupported L3 single-byte controls does not apply to unsupported L3 multi-byte controls. There is no DCF control to tell the DCF formatter to translate a multi-byte string into a character or into a string (which, in this case, would be the null or empty string). This would require fancy pattern recognition because it would not be clear where the multi-byte string would begin. We would want translation to be done only when the multi-byte string was playing the role of an L3 multi-byte control. This is not a reasonable thing to ask of the DCF formatter.

SUB AND NUL

Two L3 single-byte controls are supported in a trivial way. Substitute (SUB) is always converted into an underscore and Null (NUL) is always dropped altogether. It would seem neater to treat these in the same way as the above unsupported single-byte controls, i. e. keep them in the datastream, tell DCF to ignore them, and pass them back whence they came. The Displaywriter position was to treat them in the special way just described.

NBS AND NSP

Two L3 single-byte controls have very nearly perfect DCF equivalents. Numeric Backspace (NBS), hex '36', and Numeric Space (NSP), hex 'E1', should be supported by leaving them in the datastream for possible transformation back DOWN to L3, but telling both CMS and the DCF formatter to treat them as Backspace and Space, respectively, which are the same in a non-proportionally spaced font.

Unfortunately, CMS does not allow any character's display output to be set equal to a Space or '40'X. Hence, NSP must be made to display as something else, and the pound sign was selected. Fortunately, the DCF formatter does allow NSP to be treated as a space. Both CMS and DCF allow NBS to be treated as Backspace. This requires the CMS commands

```
     SET OUTPUT 36 &     (assuming NBS is to display
                          as an AMPERSAND '50'X )
     SET OUTPUT E1 #     (to make NSP display
                          as a POUND sign '7B'X)
```

and the DCF controls

```
     .TI 36 16           (to make NBS format
                          as a BS)
     .TI E1 40           (to make NSP format
                          as an SP)
```

Note that it is not necessary to have SET INPUT commands for these single-byte controls because there is no need to enter them instead of their near-equivalents. All this will change when DCF supports proportional spacing.

PARTIAL SUPPORT OF PE AND INX

The same three-part algorithm described for SBS, SPS, UBS, and PE (which are not supported) is used as part of the complete support for L3's Page End single-byte control. The algorithm puts into the DCF datastream a byte that is equal to L3's Page End (PE) single-byte control, tells the screen how to display it, and tells the DCF formatter to ignore it. UP does this so that DOWN can restore the byte to the L3 datastream at the appropriate point and thus preserve the end of a Text Unit through an UP-then-DOWN round trip. This is important to a DW operator because each Text Unit corresponds to one page. Thus PE requires the usual SET OUTPUT statement and .TS control. It also requires much more: it requires DOWN to end the current BT vector, start a new Text Unit with a TUP, and start a new BT vector.

Moreover this same three-part algorithm is used for Index, INX. Unfortunately, there is nothing in DCF to transform INX into. An INX tells DW to move straight down, that is, to place the next character directly below where it would have placed the character if the INX had not occurred. The UP transformation has no idea where that is.

The only way UP could find out where the next character is to go would be to return to the last paragraph boundary, such as an RCR or a CRE ZICR, format all of the L3 text and controls up to the INX, and then see what character position in the line the INX occupied. Then UP could force a paragraph break at the INX, using a CRE and a ZICR, to force a known position at the start of the next line, and put in enough spaces to move over under where the INX was. There are two ways to look at this. First, this requires UP to include most of a host-based formatter for L3, which does not exist and which is difficult to program. Second, the result would be a final form document not suitable for host-based editing.

As a result, UP just puts into the DCF datastream a byte that is equal to L3's INX single-byte control, so that DOWN can restore the byte to the L3 datastream at the appropriate point and preserve the INX through an UP-then-DOWN round trip. It requires the corresponding SET OUTPUT statement and .TS control.

This transformation of INX UP to DCF does put the next character at the correct horizontal position. It does not, however, move down to the next line.

WHY THE REST ARE MORE COMPLICATED

The remaining L3 single-byte controls are not so easy. Those discussed above require the UP transformation to make a one-to-one substitution (or somewhat more, in the case of PE) into the DCF datastream, to have appropriate CMS commands in every user's profile, and to have appropriate DCF controls processed at the start of every DCF document. The remaining single-byte controls require the UP transform program to take some more difficult action.

The remaining controls may delimit lines, paragraphs, indentations, pages, and so on. Hence, they require actions that depend on what DCF controls UP has written into the DCF datastream since it wrote the last graphic character into the DCF datastream. Algorithms for these single-byte controls require decision tables and state diagrams and individual discussion.

TRANSFORMATIONS OF L3 SINGLE-BYTE CONTROLS TO DCF

| SINGLE-BYTE CONTROL, L3 | | DCF DATA | CMS FIXED | | DCF FIXED .TI | DECISION TABLE | |
|---|---|---|---|---|---|---|---|
| ACRON. | HEX | HEX | SET INPUT | SET OUTP | (.TS) | . | EXAMPLE |
| SP | 40 | 40 | * | * | * | * | |
| HYP | 60 | 60 | * | * | * | * | |
| HT | 05 | 05 | 5F | 5F | * | * | |
| BS | 16 | 16 | 50 | 50 | * | * | |
| RSP | 41 | 41 | 4A | 4A | * | * | |
| SBS | 38 | 38 | * | 7B | (nul) | * | |
| SPS | 09 | 09 | * | 7B | (nul) | * | |
| UBS | 1A | 1A | * | 7B | (nul) | * | |
| SUB | 3F | 6D | * | * | * | * | |
| NUL | 00 | * | * | * | * | * | |
| NBS | 36 | 36 | * | 50 | 16 | * | |
| NSP | E1 | E1 | * | 40 | 7B | * | |
| WUS | 23 | * | * | * | * ) | * | .US ON, OFF |
| IT | 39 | | * | * | * | Y | .IN h and TABs |
| SHY | CA | | * | * | * | | .HW wo-r-d |
| CRE | 15 | | * | * | * | Y | END OF RECORD |
| RCR | 06 | | * | * | * | Y | .IN 0 |
| ZICR | 0D | | * | * | * | Y | .BR |
| INX | 25 | 25 | * | 7B | (nul) | | EOR (Impossible) |
| IRT | 33 | | * | * | * | Y | Same as RCR |
| PE | 0C | 0C | * | 7B | (nul) | Y | * |
| RPE | 3A | | * | * | * | Y | .IN 0; .PA |

* MEANS "DO ABSOLUTELY NOTHING".

| HEX | CHARACTER |
|---|---|
| 50 | AMPERSAND |
| 4A | CENT |
| 5F | NOT |
| 7B | POUND |

INDENT AND INDENT TAB

DISCUSSION

DCF's Offset (.OF) control indents subsequent lines but not the current line. Indent (.IN) indents the current line and following lines. Indent Line (.IL) indents only the current line. These DCF controls, with unsigned integer parameters, specify indentation quantity by giving the character position of the new temporary left margin. Such indent controls are not cumulative: the temporary left margin is whatever was specified in the latest control. This is a "hard" temporary left margin: there is no way to move to its left.

L3's single-byte control INDENT TAB (IT) tells DW to move its position in the current line to the right until it reaches the next tab setting. IT also tells DW to indent following lines by one more tab setting, establishing a new temporary left margin one more tab setting to the right of the permanent left margin.

That is, DW behaves as if there were a HT at the IT's position in the current line and behaves as if there were one more HT at the position at which it starts each subsequent line. L3's IT controls (unlike DCF's indent controls with unsigned integer parameters) are cumulative, so three ITs cause the formatter to behave as if there were three HTs at the position at which it starts each following line. This succession establishes a temporary left margin at the third tab setting on the current tab rack.

For example, suppose some L3 control such as a Required Carrier Return, or RCR, resets the temporary left margin to the permanent left margin ( which is specified by the latest LFMG parameter in a PMF, AMF, or TUFC structure, or in a LFC multi-byte control). Then the first IT changes the temporary left margin to the first tab setting on the current tab rack, the next IT sets the temporary left margin to the second position on the tab rack, and so on. The temporary left margin is where a Carrier Return returns to. The temporary left margin always corresponds to a tab that is set on the current tab rack.

As noted above, an IT single-byte control causes the current line's current position to be advanced to the next step on the tab rack, even if the current position is not the temporary left margin. Thus an IT does not move the start of the line in which it occurs to the new temporary left margin, unless the IT itself came at the start of that line.

An "ordinary indent" is caused by an IT that does occur after a line ending control. It causes the current line to start at the next tab setting in the tab rack, and also moves the temporary left margin to that same tab setting, so that this is where subsequent lines will start. Such an IT corresponds to .IN in DCF.

An IT that does not occur after a line ending control causes a "hanging indent". The tab setting to which the IT moves the current line's position usually is (but need not be) the same tab setting to which the the IT moves the temporary left margin. A hanging indent does not correspond to a .IN or a .OF control in DCF because of the tab it implies in the current line. It corresponds to both a .IN NOBREAK to handle subsequent lines and a TAB character to handle the current line.

A control like ".IN 10 NOBREAK" can be used to specify a new indentation for following lines without breaking the present line. This produces a "hanging indent" and can be used to make bulleted items by typing text at the end of a "boiler plate" line as follows. This example assumes that the tab rack has settings at 5, 10, 15, 20, ...

.IN 5;*;.IN 10 NOBREAK;-Text goes here. Note that the - character just before the "Text" is a "tab" character, which may not be printable.

.IN 5;*;.IN 10 NOBREAK;-This is one of several bulleted items that are so long that each occupies more than one line of formatted text.

.IN 5;*;.IN 10 NOBREAK;-In each item, the bullet "*" is to be indented 5 as specified by the ".IN 5" control.

.IN 5;*;.IN 10 NOBREAK;-The tab character moves the text over to the next tab setting, which is equal to 10 in this case.

.IN 5;*;.IN 10 NOBREAK;-The subsequent lines in each item are indented 10 as specified by the ".IN 10 NOBREAK" control which is separated from the text by a semicolon on each side.

.IN 5;*;.IN 10 NOBREAK;-Note that the first 24 characters of each line are ugly and are hard to type correctly. However, they may be typed only once and then duplicated as many times as needed. When using this, please remember to reset the indentation after the last bulleted item.

.IN 5;*;.IN 10 NOBREAK;-If text need not be right justified, it may be easier to use ".FO OFF" and type the indentations with the space bar instead of using a hanging indent.

The above examples used ".LI ON" before them and ".LI OFF" after them to tell the DCF formatter to show the controls rather than obeying the controls. The example below allows the DCF formatter to obey the controls and produce the normal DCF output final form. The first bulleted item given above will format as follows.

```
     *-Text goes here.  Note that the - character just
          before the "Text" is a "tab" character, which may
          not be printable.
```

One basic difference between indenting in DCF and in L3 is that DCF has no control that indents to a tab setting or relates in any way to the current tab rack. The temporary left margin specified by a DCF control word may or may not correspond to a tab set on the current tab rack. Therefore there is no direct transform for DOWN to use to transform DCF's indenting controls to L3's IT.

Another basic difference between the DCF indenting controls and IT is that a DCF control either specifies its desired duration in lines (which we do not support) or else remains in effect until changed by another such DCF control. The IT indentation in L3, on the other hand, continues only until the next occurrence of one of the following 9 things in the datastream.

Single-byte controls:
- o RCR (but not CRE)
- o IRT
- o RPE (but not PE)

Multi-byte controls:

- o LFC (i. e. BLFC, SLP, STAB, and ELFC)
- o RMLF

First level structures:

- o APM
- o AAM
- o TUFC
- o RTMF

Note that these are very nearly the paragraph ending controls, but some combinations of L3 controls, such as CRE CRE or CRE ZICR, end paragraphs but do not reset the temporary left margin back to the permanent left margin.

The third difference (which makes translating DCF DOWN to L3 complex) is the fact that DCF can move a temporary left margin either right or left to any character setting; whereas L3 can only move the temporary left margin right to the next tab setting (by an IT), or left to the permanent left margin (by any of the above 9 things). Fancier movement of the temporary left margin requires L3 to use combinations of controls.

Thus, we see that the correspondence between DCF's INDENT controls and L3's Indent Tab is not simple or exact. As a result, the transformations between them are also not simple or exact.

UP can transform an IT to a .IN h, with or without a NOBREAK parameter, and with or without a following TAB character, by using the current tab settings to compute "h". The transformation's details depend on whether the IT represents an ordinary indent or a hanging indent. The results inevitably transfer information from the tab rack to DCF controls where it can not respond to changes in the tab settings.

DOWN can transform a .IN h to one or more ITs, if the desired indentation happens to correspond to a setting on the current tab rack. DOWN can not correctly transform a .IN h NOBREAK, unless it is followed by the one correct number of TAB characters. DOWN can not transform a .OF or .IL control at all without formatting the text to see where output lines begin. Details on the implemented transformations, and some rejected alternative transformations, follow.

UP'S TRANSFORMATION OF INDENT TAB

UP transforms an IT, or Indent Tab, single-byte control in L3 to a .IN, or INDENT, control in DCF. To perform the transformation, UP needs to know whether the IT is an ordinary indent or a hanging indent. This information is available in the form of a state bit that tells whether or not the previous L3 controls have "ENDED DCF RECORD". This state bit will be described later. For now, just note that it tells UP which of the two following transformation algorithms to use.
If the IT follows a line ending control, or follows other ITs that follow a line ending control, so the IT just establishes a new temporary left margin for the next line and for subsequent lines, i. e. if the IT appears when ENDED DCF RECORD is set, then this is an ordinary indent. To transform an ordinary indent, UP writes

```
.IN h EOR
```

where "h" is the horizontal character position of the new temporary left margin, as described in the next section, and "EOR" stands for End Of Record.

The control shown above goes at the start of a new record (because of the transformation of the previous L3 line ending control to a DCF EOR). This control also ends a record (because of the EOR shown with this control) so this leaves ENDED DCF RECORD set, which is fortunate, because an IT that follows an ordinary IT is itself an ordinary indent not a hanging indent.

Note that if a succession of several ITs follows a line ending control, then each IT in the succession is processed as an ordinary indent and produces its own DCF record containing the control shown above. The DCF formatter responds only to the last-written control. All of the controls are visible to a person editing the DCF form of the document. This is beneficial, because each control came from a different IT.

If the IT does not follow a line ending control, but rather is in the middle of a line and moves the current position in the current line to the next tab setting as well as establishing a new temporary left margin for following lines, i. e. if the IT appears when ENDED DCF RECORD is not set, then this is a hanging indent. To transform a hanging indent, UP writes

```
.IN h NOBREAK;-
```

where "-" stands for the TAB character, hex '05'. This does not start a new record (so the semicolon is necessary in front of the dot to delimit this control from preceding text). This must also not end the record (so no EOR is shown with this control.

Note that a succession of hanging ITs must transform to a succession of the controls and TABs shown above. These must all go into a single DCF record, after the text that preceded the ITs, and before the text that followed the ITs.

Otherwise the result will not be processed correctly by the DCF formatter. If the resulting record would exceed DCF's 132-character limit, then a continuation character such as a PLUS SIGN "+", hex '4e', must be used, as in

```
;.IN h NOBREAK;-+ EOR
```

This sequence will be processed correctly by the DCF formatter. It requires the document to have had hex '4E' defined as the continuation character by means of the control

```
.DC CONT 4E
```

For some reason, the DCF formatter will not string together a succession of INdent controls and TABs that are written on different lines, even though each has the NOBREAK parameter. Moreover, use of the Continue Text, .CT, DCF control does not suffice to tell the DCF formatter to string the controls together as if they were on the same line. They must either be on the same line or else use the continuation character as shown above, or else the DCF formatter will begin a new output line rather than just moving the current position in the current line to successive tab settings, which is the correct transformation of a hanging indent.

UP'S CALCULATION OF THE NEW TEMPORARY LEFT MARGIN

In the INDENT controls specified above, "h" is an unsigned integer chosen based on the current temporary left margin and on the current tab rack. This "h" is the character position of the new temporary left margin. It is the character position of the next tab setting to the right of the current temporary left margin. It determines where subsequent lines will begin until the next IT moves the temporary left margin further to the right, or until one of the 9 L3 items mentioned above moves the temporary left margin all the way left to the permanent left margin.

Note that L3 always has tab settings at the required character positions for the current line and for subsequent lines. These positions are the same in the case of an ordinary indent and are different in the case of a hanging indent.

There are two reasonable algorithms for calculating the value of h to put into a DCF INDENT control, as follows.

In the first algorithm, UP maintains a variable, CURITC, which is the CURrent Indent Tab Count, i. e. the number of tab settings by which the temporary left margin is moved to the right of the permanent left margin. UP initializes CURITC to 0 when UP starts processing a document. A value of 0 corresponds to the origin of the tab rack, character position 0, which is always the permanent left margin. UP increments CURITC by 1 whenever UP processes an IT in the L3 datastream. Then UP looks to see what tab setting corresponds to the new value of CURITC. After UP sees the first IT, CURITC is 1 and corresponds to the character position of the first tab setting in the current tab rack, etc. The character position corresponding to the new value of CURITC is the value of "h" that UP writes in the .IN control that UP generates as the transform of IT.

UP resets CURITC to 0 and puts the control

```
    .IN 0
```

into the DCF datastream, whenever UP sees one of the 9 things that reset the temporary left margin. Note that each of the ways of changing the tab rack is included in one of those 9 things, so the only way to implicitly change the physical position of the temporary left margin is to insert a mid-line font pitch change, which the transforms do not support.

In the second algorithm for calculating the value of h to write into a DCF INdent control, UP maintains a variable CURTLM which is the CURrent Temporary Left Margin expressed as the number of characters that the temporary left margin is to the right of the permanent left margin. UP initializes CURTLM to 0 when UP starts processing a document. A value of 0 corresponds to the origin of the tab rack, character position 0, which is always the permanent left margin. Whenever UP processes an IT in the L3 datastream, UP looks to see what tab setting has the next character position that is strictly greater than CUTRLM. UP writes this tab setting as the new value of CURTLM and also as the value of h in the INdent control. After UP sees the first IT, CURTLM is equal to the character position of the first tab setting in the current tab rack, etc.

UP resets CURTLM to 0 and puts the control

```
     .IN 0
```

into the DCF datastream, whenever UP sees one of the 9 things that reset the temporary left margin. Note that each of the ways of changing the tab rack is included in one of those 9 things, so the only way to implicitly change the physical position of the temporary left margin is to insert a mid-line font pitch change, which the transforms do not support.

Note that either algorithm for transforming an IT from L3 to DCF builds information from the current tab rack into DCF's .IN control. Thereafter DCF indents as specified by the .IN control, not by the tab rack. Hence the indentation will not change if the tab rack is edited on DCF. Moreover, editing either the .IN or the tab rack (in .TB) will compromise the ability of DOWN to produce a correctly formatted L3 document, as the next sections show.

DOWN'S REJECTED ASSUMPTION ABOUT INDENT

One suggested assumption is that a PROFS user never generates or modifies any DCF controls. The suggested assumption is that a PROFS user is a professional; not a publications professional, but a professional in some other field such as management or law. The suggested assumption is that such a professional, at most, types words and sends them to his or her secretary. Then the secretary adds formatting as necessary and sends the new version back to his or her boss who changes and adds words but not DCF controls. Therefore the suggested assumption is that the only DCF controls that DOWN ever sees in a DCF document were put there by UP.

If we make that assumption, then DOWN can assume that each DCF .IN control was put there by UP in response to an L3 IT control. This allows us to assume that there is a tab setting in the tab rack that will produce the desired indentation, and that it is the next tab setting to the right of the current temporary left margin. Moreover, the .IN control produced by a hanging indent will have the NOBREAK parameter and will be followed by a TAB character; and the .IN control produced by an ordinary indent will lack the NOBREAK parameter and will not be followed by a TAB character. Therefore DOWN can just ignore the parameters on the .IN control, assume presence of any needed TAB, and transform the .IN control into an IT single-byte control.

The suggested assumption also lets us ignore the question of how long the indentation will continue, because UP will have transformed the L3 control that terminated the original INDENT TAB into something that DOWN transforms back into something that terminates the INDENT TAB.

Unfortunately, the list of things that can foul up all these assumptions is long and contains things that users will sometimes do. Therefore, DOWN implements transformations for a less restricted set of assumptions.

DOWN'S REJECTED TRANSFORMATION OF INDENT

DOWN need not transform DCF's .IN control into L3's Indent Tab control. Instead, DOWN could transform a .IN into a movement of L3's permanent left margin. That is, DOWN could respond to a .IN control by manipulating the left margin using the LEFT MARGIN parameter in the SET LINE PARAMETERS multi-byte control (in the Line Format Change sequence) or in a TUFC first level structure. For example, DOWN could treat ".IN 5" as a request to move the permanent left margin to position 5 and could treat a following ".IN 0" as a request to move the permanent left margin back to where the permanent left margin started. However, by moving the permanent left margin, L3 would move the origin of the tab rack along with what DCF actually intended to be the temporary left margin. A temporary left margin slides along the tab rack without carrying the tab rack with it in both DCF and L3. Highly experienced text processing architecture professionals aver that adding or subtracting a constant value to or from each of the tab settings, to compensate for the movement of the origin, would lead to unmanageable complexity. Therefore DOWN uses IT as the translation of the DCF indenting controls.

DOWN'S IMPLEMENTED TRANSFORMATION OF INDENT

Whenever DOWN sees a

```
.IN h
```

control in the DCF datastream, DOWN applies a fairly complex algorithm. Among other things, DOWN compares "h" to the current value of the variable "CURINC" that is the CURrent INdent in Characters. This variable is always equal to the character position of the temporary left margin, i. e. equal to the number of characters that the temporary left margin is to the right of the permanent left margin.

The only easy case is the case in which CURINC happens to be the character value of one tab setting on the current tab rack and h happens to be the character position of the next tab setting to the right of that one. In this case, DOWN simply transforms DCF's

```
.IN h
```

control into L3's CRE and IT single-byte controls or transforms DCF's

```
.IN h NOBREAK;-
```

where "-" stands for the TAB character, hex '05', into L3's IT single-byte control. Then DOWN sets CURINC equal to h, and goes on to the next L3 item. The other cases require a more general and sometimes less exact algorithm involving CURINC.

When DOWN starts processing a document, DOWN sets CURINC to 0 because the temporary left margin starts out at the same place as the permanent left margin. Whenever DOWN generates an L3 control that resets the temporary left margin back to the permanent left margin, i. e. whenever DOWN unindents, DOWN resets CURINC to zero.

In general, DOWN's algorithm for transforming a .IN h control requires DOWN to compare h to CURINC, to zero, and to the tab settings in the current tab rack; and also requires DOWN to know whether the .IN control has a NOBREAK parameter, whether some other DCF control in the same sequence of controls causes a break, and whether the .IN control is followed by one or more TAB characters.

DOWN's algorithm is specified concisely by decision tables in later chapters. The following discussion is probably necessary and possibly sufficient for understanding the algorithm. This discussion treats the possible cases that DOWN must handle, one at a time. The answers to the following questions tell which case we are dealing with.

1. Is h less than CURINC?
2. Does h correspond to a tab setting?
3. Does some control cause a break?

Implications of answers to these questions are as follows.

1. Is h less than CURINC?
   YES: Need an RCR to reset the temporary left margin back to the permanent left margin, then some ITs to establish the new temporary left margin.
   NO: Can go right to the new temporary left margin, so need only some ITs.

2. Does h correspond to a tab setting?
   YES: Can transform the new temporary left margin exactly.
   NO: Must approximate the new temporary margin with the next tab setting to the right of the specified value.

3. Does some control cause a break? (The break can be caused by this .IN or by some other control in the same sequence.)
   YES: Have an ordinary indent, so need to write a CRE and some ITs.
   NO: Have a hanging indent, need no CRE, but can have exact transformation only if the DCF datastream has one TAB character for each IT that has to be written into the L3 datastream to produce the specified new temporary left margin.

The three questions' answers determine eight cases, each with its proper transform of .IN. The cases are as follows, where "Y" means yes and "N" means no.

| CASE / QUESTION | A | B | C | D | E | F | G | H |
|---|---|---|---|---|---|---|---|---|
| 1 | N | N | Y | Y | N | N | Y | Y |
| 2 | Y | N | Y | N | Y | N | Y | N |
| 3 | Y | Y | Y | Y | N | N | N | N |

AN EXAMPLE TAB RACK AND PAGE
SHOWING NUMBER OF INDENT TABS REQUIRED (NIT)

```
        _________________________________________
C       .PERMANENT LEFT MARGIN IS POSITION 0
A   N   .         1111111111222222222233333333334
S   I   01234567890123456789012345678901234567890
E   T   .____T____T____T____T____T____T____T____T
        .    .    .    .    .    .    .    .    .
        .    .    .    .    .    .    .    .    .
        ..........*..............*...............
A   3   .    .    CURINC    .    h    .    .    .
        .    .    .    .    .    .    .    .    .
        .    .    .    .    .    .    .    .    .
        ..........*...........*..*...............
B   3   .    .    CURINC    . h  h'   .    .    .
        .    .    .    .    .    .    .    .    .
        .    .    .    .    .    .    .    .    .
        .........................*.........*.....
C   5   .    .    .    .    .    h    .    CURINC
        .    .    .    .    .    .    .    .    .
        .    .    .    .    .    .    .    .    .
        ......................*..*.........*.....
D   5   .    .    .    .    . h  h'   .    CURINC
        .    .    .    .    .    .    .    .    .
        .    .    .    .    .    .    .    .    .
        .____T____T____T____T____T____T____T____T
```

CASE A

N 1. Is h less than CURINC?
Y 2. Does h correspond to a tab setting?
Y 3. Does some control cause a break?

This case is an ordinary indent. Its L3 output is a CRE and zero or more ITs. The "CRE IT" combination transforms the "break" part of the control unless the number of ITs is zero, in which case a ZICR must be put out after the CRE to cause a break. Therefore, simplicity dictates that a ZICR always be written into the DCF datastream, after the CRE, as a part of the transformation of this case. If any TAB characters are present in the same DCF sequence, then DOWN writes out the same number of HT single-byte controls after the ITs. In cases of ordinary indents, these do not interact. DOWN must set CURINC equal to the character position of the new temporary left margin, namely h.

The number of ITs required is the number of TABs required to move the current position from CURINC to h. The ITs behave like HTs to move the current line's starting position from the old temporary left margin (CURINC) to the specified new temporary left margin (h). The ITs also establish the desired new temporary left margin so that subsequent lines will start where the current line is about to start. This number of ITs required is one more than the number of tab settings whose positions are both greater than CURINC and less than h.

The Number of ITs required is shown as NIT in the following figure. In this CASE A, the 2 tab settings at 15 and 20 are both greater than CURINC, which is equal to 10 in the figure, and less than h, which is 25 in the figure. Thus the number of ITs needed in CASE A is one more than 2 and NIT is 3.

CASE B

N 1. Is h less than CURINC?
N 2. Does h correspond to a tab setting?
Y 3. Does some control cause a break?

This case is an ordinary indent that can not be transformed exactly because there is no tab setting at the specified new temporary left margin. The best approximation is to move the temporary left margin to the first tab setting to the right of the specified new position, i. e. to the smallest tab setting that is greater than h. Give the name h' to the position of the tab setting that is the smallest tab setting greater than h. The number of ITs required is the number of TABs required to move the current position from CURINC to h'. This number is one more than the number of tab settings whose positions are both greater than CURINC and less than h'. This number is therefore, because of the relation between h and h', also one more than the number of tab settings whose positions are both greater than CURINC and less than h. This is the same calculation as in the previous case, so the number of ITs depends directly on h. DOWN must set CURINC equal to the character position of the new temporary left margin, namely h', not h.

This case's approximate transformation is perfectly respectable if the tab rack has a tab setting about every five character positions, which is the usual default, because the maximum error will be four character positions. It will never overlap fields, because it always errs in the direction of putting text too far to the right. The DW operator will see immediately if unadjustable lines have been made too long for the page width in use, and can correct all lines by a single change to the tab settings. Note that this case will not occur in documents originated on DW and transformed UP to DCF and then back DOWN to DW, unless the DCF user has edited the tab rack or put in new .IN controls. Such DCF users should be warned to stick to indent values that are multiples of 5.

This case does have a potential disaster built into it. There may be no tab setting that is greater than the specified value of h. In this situation, the code that calculates the required number of ITs must return the answer "zero" and set the bit that warns a user that the transformation was not completely successful. Any use of a case that has an approximate temporary left margin could give a weaker form of the same message.

This disaster would be quite likely to occur if DOWN used the tab rack given in a .TB control without modification. A DCF user tends to set up only those tabs that correspond to columns. To avoid the disaster, DOWN always fills out any tab rack given in a .TB control with the remainder of the default tab rack, that is, with a tab setting at each integer multiple of 5 greater than the largest tab setting specified in the .TB control, out to a maximum character value of 80. However, there is no way to transform indentations, for example, for a DCF user who sets tabs at 40 and 60 but wants to indent to columns 5 and 10.

CASE C

| | | |
|---|---|---|
| Y | 1. | Is h less than CURINC? |
| Y | 2. | Does h correspond to a tab setting? |
| Y | 3. | Does some control cause a break? |

This case is an ordinary indent, but it specifies a new temporary left margin that is to the left of the old temporary left margin. Its L3 output is an RCR and zero or more ITs. The RCR resets the temporary left margin all the way left to the permanent left margin. The ITs move the temporary left margin to its desired position. DOWN must set CURINC equal to the character position of the new temporary left margin, namely h.

If the value of h was zero (which we assume to be a default tab setting on any tab rack, so that we can discuss it as part of this case) then the number of ITs is zero. This handles the special case of the DCF control

```
.IN 0
```

which is used to end an indentation, i. e. to reset the temporary left margin back to the permanent left margin and leave it there. In this situation DOWN must set CURINC to zero.

The RCR transforms the "break" part of the control. The number of ITs required is the number of TABs required to move the current position from the permanent left margin (which is position zero on the tab rack, by definition) to h. This number is one more than the number of tab settings whose positions are both greater than zero and less than h.

If the value of h was zero (which we assume to be a default tab setting on any tab rack, so that we can discuss it as part of this case) then the number of ITs is zero. This handles the special case of the DCF control

```
.IN 0
```

which is used to end an indentation, i. e. to reset the temporary left margin back to the permanent left margin and leave it there.

```
CASE D
 Y      1.  Is h less than CURINC?
 N      2.  Does h correspond to a tab setting?
 Y      3.  Does some control cause a break?
```

This case is an ordinary indent, but it specifies a new temporary left margin that is to the left of the old temporary left margin and that does not correspond to any tab setting. Its L3 output is an RCR and one or more ITs.

The number of ITs required is the number of TABs required to move the current position from the permanent left margin (which is position zero on the tab rack, by definition) to h', where, as in case B, h' is the position of the tab setting that is the smallest tab setting greater than h. The number of ITs required is one more than the number of tab settings whose positions are both greater than zero (which is true for all tab settings) and less than h'. As before, this number is also one more than the number of tab settings whose positions are both greater than zero and less than h. DOWN must set CURINC equal to the character position of the new temporary left margin, namely h', not h.

```
CASE E
 N      1.  Is h less than CURINC?
 Y      2.  Does h correspond to a tab setting?
 N      3.  Does some control cause a break?
```

This case has no break, so it is a hanging indent. In particular, to give this case or the ones that follow, the .IN control that is being transformed must have the NOBREAK option specified and also any other controls that DOWN processes as part of the same sequence as this .IN must be controls that do not cause a break. In this case, the L3 output is zero or more ITs and zero or more HTs. The L3 output must not contain any CRE or RCR because either of these would cut down the hanging indent.

The number of ITs is the number of tabs that would be required if the current position were CURINC and if it were desired to move the current position to h, because this is the number of ITs that are required to move the old temporary left margin over to the new temporary left margin for subsequent lines. Note that the current position is not the old temporary left margin, CURINC, but rather is somewhere out in the middle of the line; and it is not desired to move the current position to h; so the previous sentence is just a construction for determining how many ITs are needed. This number of ITs is one more than the number of tab settings that are both greater than CURINC and less than h.

What actually happens in the current line is that each of the ITs causes the current position, whatever it is, to move to the next tab setting, whatever that may be. DOWN can not avoid this, because ITs are all that DOWN has to work with in L3 and ITs cause TABing in the current line.

DOWN's only hope for an exact transformation of a hanging indent is that, in the DCF datastream, the .IN h NOBREAK control is accompanied by a number of TAB characters that is at least as large as the number of ITs that DOWN must put into the L3 datastream. This is always true if UP wrote the DCF datastream as the transformation of a hanging indent in L3. Otherwise, DOWN will probably get too few TABs in the DCF datastream to transform the hanging indent exactly into L3. The error will appear to be a gap where the text skips to the next one or more tab settings, even though this was not called for in the input DCF.

The number of HTs that DOWN should put into the L3 datastream, after the ITs, is the number of TABs that are with the .IN NOBREAK control in the DCF datastream minus the number of ITs that DOWN writes into the L3 datastream as a result of that .IN NOBREAK control. Unfortunately, if this difference is negative, then DOWN can not put the correct number of HTs into the L3 datastream. If this difference is negative, then DOWN must settle for putting zero HTs into the L3 datastream, and accept the fact that the result will have an undesired gap. When DOWN replaces a negative difference by zero, it should report a not entirely successful transformation.

DOWN must set CURINC equal to the character position of the new temporary left margin, namely h.

CASE F

N 1. Is h less than CURINC?
N 2. Does h correspond to a tab setting?
N 3. Does some control cause a break?

This case has no break, so it is a hanging indent, like CASE E. However, in this case, there is no tab setting at the specified new temporary left margin. The transformation is the same as for CASE E except that DOWN must set CURINC to h', the smallest tab setting that is greater than h, and may report a not completely successful transformation. The numbers of ITs and HTs are calculated as for CASE E, because the calculations depend on h rather than on h'.

CASE G

Y 1. Is h less than CURINC?
Y 2. Does h correspond to a tab setting?
N 3. Does some control cause a break?

This case has no break, so it is a hanging indent, but the specified new temporary left margin is less than the current temporary left margin. Unfortunately, the only L3 controls, such as RCR, that move the temporary left margin to the left, also cause a break. That is, it is impossible to establish the new temporary left margin without forcing the current position to move to the next line. DOWN can not correctly transform a hanging indent that moves the temporary left margin to the left.

The closest transform is to establish the requested new temporary left margin by writing out an RCR and an appropriate number of ITs, so subsequent lines will be as requested, and accept the breaking of the current line. This should signal a rather severe departure form correct transformation.

The number of ITs is the number of tab settings greater than zero and also less than h. The new value of CURINC is h.

```
CASE H
 Y      1.  Is h less than CURINC?
 N      2.  Does h correspond to a tab setting?
 N      3.  Does some control cause a break?
```

This case has no break, so it is a hanging indent, the specified new temporary left margin is less than the current temporary left margin, and the specified new temporary left margin does not correspond to any tab setting. This is as bad as it can get. The approximate transformation is the same as for CASE G except that DOWN must set CURINC to h', the smallest tab setting that is greater than h. The number of ITs is calculated as for CASE G, because the calculation depends on h rather than on h'.

DOWN'S REESTABLISHMENT OF INDENT LEVEL

DOWN has to generate one of the L3 controls
    LFC (i. e. BLFC, SLP, STAB, and ELFC)
    TUFC
to transform one of the DCF controls
    .FO
    .JU
    .TB
    .RH
    .RF
    .CM PRINTING PAPER SOURCE It is significant that each of these L3 controls does reset the temporary left margin back to the permanent left margin, whereas none of these DCF controls does that. As a result, the transformation of one of these DCF controls leaves the indent level undesiredly reset.

DOWN must notice when a sequence of DCF controls has required DOWN to write out one of these L3 controls but has not requested that DOWN reset the indent level. In this case, DOWN must look at the CURINC state variable to see what indent level is desired, and write out enough IT single-byte controls to reestablish that indent level. Note that a LFC or a TUFC can change the tab rack, so the number of ITs in effect after such a control may have to differ from the number of ITs that were in effect before the control, to produce the same number of character positions of indentation which was specified by the most recent .IN control in DCF.

DOWN'S TRANSFORMATION OF TABS AFTER HANGING INDENT

We have just seen that correct transformation of a hanging indent requires that the .IN h NOBREAK control be followed by as many TAB characters in the DCF datastream as DOWN writes out in the L3 datastream. DOWN transforms that many following TAB characters into nothing at all. If DOWN gets anything other than that number of TABS or a CRE, then DOWN must set an error bit.

The algorithm for this uses a state variable CURHANG. When DOWN generates n ITs for a hanging indent, DOWN sets CURHANG to n. The action that takes place when DOWN transforms a text character or an EOR when CURHANG is nonzero is as follows.

If the next is a TAB, just decrement CURHANG by 1.
If the next is an EOR, just reset CURHANG to zero.
Otherwise, i. e. if anything except TAB and EOR occurs when CURHANG is nonzero, set the error warning bit, and reset CURHANG to zero. This is summarized by the following decision table. The format and meaning of a decision table are discussed at length later.

HANGING INDENT DECISION TABLE

| | 1 | 2 | 3 | 4 |
|---|---|---|---|---|
| INPUT: | | | | |
| TAB | - | Y | -N | -N |
| EOR | - | -N | Y | -N |
| OTHER | - | -N | -N | Y |
| PRIOR STATE: | | | | |
| CURHANG GT 0 | N | Y | Y | Y |
| OUTPUT: | | | | |
| NONE | - | 1 | - | - |
| NORMAL | 1 | - | 1 | 1 |
| NEXT STATE: | | | | |
| CURHANG - 1 | - | 1 | - | - |
| SET ERROR | - | - | - | 1 |
| CURHANG = 0 | - | - | 1 | 1 |

DOWN'S POSSIBLE EXTENSION OF INDENT

In case no tab setting corresponds to the value of h specified in a DCF INdent control, DOWN could add a tab setting at that character position. DOWN could then also set a flag saying that it has inserted a required tab setting, set a flag saying that there is now no user-specified tab setting at that exact position, and set a variable that gives the character position of that tab setting. DOWN would then have to maintain that tab setting and those flags, even if the data stream contains subsequent changes to the tab rack which may add and then possibly delete user-specified tab settings at that same character position.

Note that it would never be necessary for DOWN to insert TAB characters into the L3 datastream to get past the inserted tab setting (which is clearly impossible to do without formatting each line to know whether the new tab is in the way) because it is impossible for the current horizontal position in DCF to ever get to the left of the inserted tab setting. This is because that inserted tab setting is the temporary left margin and DCF has a "hard" temporary left margin. A DW user would, from time to time, see tab settings appearing and disappearing in the tab rack, and would have to use different numbers of tabs to get past them if he or she made use of the DW's "soft" temporary left margin.

This extension to the algorithm is not implemented,because of the complexity it adds to programming of the functions and editing of the resultant documents.

HYPHEN

DISCUSSION

L3's HYP, or required hyphen, or hex '60', is printable in DCF, and is correctly interpreted by the DCF formatter, so UP need not change HYP. However, the SHY, syllable hyphen, or hex 'CA', has no corresponding character in DCF and therefore must be transformed to and from something else in DCF.

The use of SYH in L3 is to tell the DW formatter where it is allowed to hyphenate a particular occurrence of a particular word, when it is formatting, i. e. where it is allowed to split that word when it is adjusting line endings to put as much as possible on each line. For example, a German typing a paper on the theory of probability could type the subject as abc wahr-schein-lich-keits-rech-nung def using SHYs in the places where "-" is shown. Here, abc and def are whatever text precedes and follows the sesquipedalian word. The DW screen would not show one of these SHYs except in two cases. The first case is when the cursor is moved to the right from the character just before the SHY. Then the cursor does not move. The fact that there is a SHY is noted in the upper right of the DW screen. The second case is when the word is actually split at one of the SHYs. Then the SHY appears as a hyphen character on the screen and would also print as a hyphen character.

The corresponding function is achieved in DCF by typing

```
abc
.HW wahr-schein-lich-keits-rech-nung
def
```

where abc and def are just whatever text precedes and follows the word, as before, but where each "-" has to be a real hyphen character because that is all that DCF has. The .HW control tells the DCF formatter to change the meaning of each hyphen in the word that follows the .HW control. The DCF formatter treats a single hyphen as if it were a SHY and prints it out as a hyphen character only if the DCF formatter actually decides to hyphenate this word at the point of this hyphen.

The DCF formatter treats two hyphens as a required hyphen that it must print whether or not it splits the word at that point.

UP'S TRANSFORMATION OF SHY

When UP detects a SHY, it does the following things. First, it backs up to the most recent word delimiter. Second, it ends the record there. Third, it inserts a

```
.HW
```

followed by a blank, but not followed by a semicolon. Fourth, as far as the next word delimiter, it replaces each L3 SHY by an ordinary DCF hyphen and replaces each L3 ordinary HYP by two ordinary DCF hyphens. Fifth, it ends the record there.

The most common appearance of a SHY is just before a CRE in adjustable text. Such a SHY can be inserted and removed by the "Line ADJ" key or by the paginator. Such a SHY causes printing of a hyphen character as long as it remains at the end of a line.
Readjusting text can eliminate that hyphen if it no longer falls at the end of a line, i.e. if the SHY is no longer just before a CRE.

This most common case requires special processing in UP, because CRE is itself a word delimiter. (To see this, try "hyp SHY hen SHY CRE ate WUS". The "WUS" underscores only the "ate".) UP puts ".HW" in a new record anyway. Starting another new record in the middle of the hyphenatable word would end the efficacy of the ".HW". To keep the word together, UP completely ignores a CRE that immediately follows a SHY.

UP does not ignore the other line delimiters (RCR, IRT, and ZICR) or the page delimiters (PE and RPE) even when they immediately follow a SHY. A judgement call says that these delimiters contain author's intent that is stronger than a SHY. In particular, an RCR or RPE prevents readjustment of text across their locations.

Note that DCF has no way to specify syllable hyphenation in a word that is in the middle of a line of non-adjustable text. The ".HW" and the hyphenatable word must be alone on a line, because DCF will ignore anything that appears to the right of the hyphenatable word. In adjustable text, the DCF formatter reflows the hyphenatable word back into its proper place in a line. The reflowing does not take place in non-adjustable text and use of continuation characters is no help.

Therefore, DW operators should obey the rule "Use syllable hyphens only in adjustable text. Use required hyphens in non-adjustable text and before required carrier returns, page ends, and require page ends".

DOWN'S TRANSFORMATION OF .HW

DOWN detects the .HW control and sets a state bit, CURHW. When converting graphic characters, from DCF's data processing EBCDIC to L3's MLP, DOWN goes to a special routine whenever it encounters a hyphen. This routine converts the hyphen to a SHY if CURHW is set but another state bit, CURSHY, is not set. Then the routine sets CURSHY. As a result, if other hyphens follow immediately, then each such hyphen will be converted to a HYP rather than a SHY.

Any graphic character other than hyphen resets CURSHY. An EOR or a ";" resets CURHW and also CURSHY.

DOWN resets both CURHW and CURSHY when it starts a document and also when it starts or stops defining margin text. DOWN does not need a duplicate copy of these state bits for margin text because a hyphenated word can not carry over a definition of new margin text. BUT PLEASE NOTE that resetting these at the beginning and end of a definition of margin text may not be automatic and should be explicitly tested.

A decision table for this function follows. DOWN uses many decision tables to transform DCF controls. Decision tables are described later, in that context. This one is unique in that it applies to a graphic character. Please either note that the decision table corresponds to the above paragraphs, or wait for the explanation in a following section.

DOWN's DECISION TABLE FOR HYPHENATING A WORD

| RULE | 1 | 2 | 3 | 4 | 5 | 6 |
|---|---|---|---|---|---|---|
| PRIOR STATE | | | | | | |
| CURHW | N | Y | Y | - | - | - |
| CURSHY | -N | N | Y | - | - | - |
| DCF INPUT | | | | | | |
| START DOC OR MT | N | N | N | N | N | Y |
| HYPHEN | Y | Y | Y | -N | -N | -N |
| WORD DELIMITER | -N | -N | -N | -N | Y | -N |
| OTHER GRAPHIC* | -N | -N | -N | Y | -N | -N |
| L3 OUTPUT | | | | | | |
| HYP | 1 | . | 1 | . | . | . |
| SHY | . | 1 | . | . | . | . |
| NEXT STATE | | | | | | |
| CURHW | -N | -Y | -Y | - | N | N |
| CURSHY | -N | Y | -Y | N | N | N |

* ANY GRAPHIC CHARACTER OTHER THAN A HYPHEN OR A WORD DELIMITER

SIMPLE BUT WRONG TRANSFORMATIONS OF SHY

UP's transformation of SHY could be a simple one-for-one substitution if any of the following possible algorithms worked. They don't.

(1) If UP converts SYH to HYP, then most syllable hyphens will appear as required hyphens in the middles of output lines, certainly after changes are made, and probably after DCF readjusts the document. This applies to changing the DCF form. It also applies to changing the L3 form, if DOWN is used to transform the document back to DW's form, since DOWN has no choice but to pass each HYP back into the L3 datastream as a HYP, even if it started out as a SHY.

(2) If UP converts SHY to a space or to nothing, then the first part of a word that is hyphenated and continued on the next line will be treated as a word in its own right, followed by a blank, when DCF or DW changes and/or readjusts the document.

(3) If UP converts SHY to some little-used symbol, such as AT, or hex '7C', then DOWN could convert that symbol back to SHY. This allows full integrity and editability on DW. Unfortunately, the DCF symbol substitution controls are not powerful enough to change AT to a hyphen when AT appears at the end of a line and otherwise change AT into the null string, so this does not give good documents on DCF. Feasible conversions are as follows.

(3A) If we tell DCF to convert AT to a blank, we get un-hyphenated word-fragments.

(3B) If we tell DCF to convert AT to the null string, hyphenated words are shown correctly only if changes have moved them to middles of lines.

(3C) If we tell DCF to convert AT to a hyphen, we get hyphenated words in middles of lines after a document is reformatted or changed in DCF.

(3D) If we tell DCF to treat AT as a continuation character, by using

```
.DC CONT 7C
```

(which tells DCF that an AT at the end of an input line means to continue the next input line's characters as if they continued on this line, without even a space) then the DCF formatter will put hyphenated words back together when it is reformatting the document. This would be an easy transformation, but would give desired results only if SHYs were used merely at ends of lines where words happen to break when they are entered.

(4) If a SHY could occur only at the end of a line, then SHY could be left as is in a document and SHY could be defined to be the continuation character. This is not applicable to L3. However, this is true in 3730/DOSF-DPCX and hence is the algorithm used in Document Interchange Facility.

LINE ENDERS AND PARAGRAPH ENDERS

AVAILABLE CONTROLS

An L3 document can be unformatted or formatted. Text that has undergone extensive revision can have some very short lines and some very long lines. The line lengths are made roughly equal, in areas of the document for which adjust mode is on, when an operator requests LINE ADJust or DOCUMENT PAGINATION. The result is another L3 document. DCF is always unformatted because the output of the formatter is a different data stream. Either L3 unformatted, L3 formatted, or DCF unformatted can have optional line enders, which are ignored by formatters if adjust, format, or concatenate mode is on, and can also have required line enders which must be obeyed by formatters.

L3 has an optional line ender, Carrier Return or CRE, which causes the current position to move down one line and also move left to the temporary left margin. Pressing the LINE ADJ key or paginating the document can move text from one side of a CRE to the other, to fill a line, in parts of the document for which ADJUST is turned on. CRE corresponds to End Of Record (EOR) in DCF. The DCF formatter can combine text after an EOR with text before the EOR, to fill a line, if .FO ON is in effect.

L3 has another optional line ender, Zero Index Carrier Return or ZICR, that causes the current position to move straight left to the temporary left margin. This does not correspond to anything in DCF unless the current position is already at the temporary left margin. Index or INX is also a sort of line ender. It moves the current position straight down. It, too, corresponds to nothing in DCF unless the current position is already at the temporary left margin.

L3 has several required line enders, such as the Required Carrier Return or RCR, and the Line Format Change sequence of multi-byte controls. A required line ender prevents the LINE ADJ key or the paginator from concatenating text that follows it with text that precedes it, to fill a line. A required line ender also prevents justification of the text that precedes it, i. e. prevents padding the preceding line's spaces with more spaces, to produce a straight right margin. These single required line enders happen to also cause an unindent. (The "Necessary Carrier Return, or NCRE, has been proposed to be a single required line ender that does not unindent. It is not supported in DW.)

A required line ender is called a "paragraph ender", because people want the text that starts one paragraph kept separate from the text at the end of the preceding paragraph, even if there is room for more text on the last line of the preceding paragraph. Moreover, people do not want the last line of a paragraph justified. However, the term "paragraph" is not quite apt because most people also want to see a blank line and/or some indentation at the start of a real paragraph.

A CRE is an optional line ender. However, a CRE goes part of the way toward ending a paragraph. This action may be completed by one of several optional line enders, such as another CRE or a ZICR, or by one of several things that do not themselves even end lines, such as a space or an ATF. These combinations are paragraph enders but do not reset indent levels.

The 52 controls in DCF that cause a break correspond only very roughly to L3's required line enders, i. e. paragraph enders. A break prevents concatenation of text before it and after it for the purpose of filling out a line and also prevents justification of the last line before it. However, a break's effect on the current position is about half way between the effects of CRE and ZICR and is not at all like the effect of its natural counterpart, an RCR. A break moves down one line and moves left to the temporary left margin, if the current position is not at the temporary left margin, like CRE. A break causes no motion at all if the current position is already at the temporary left margin, like ZICR. And that is not the only difference. The other difference concerns indentation.

Most of L3's paragraph enders, such as RCR, ELFC, and APM, cause an unindent, i. e. a resetting of the temporary left margin (established by one or more Indent Tab controls), back to the permanent left margin (established by an LFMG parameter in the SLP multi-byte control and in the PMF, AMF, and TUFC structures). As we have seen, a few of L3's combinations that are paragraph enders, such as CRE ZICR and CRE followed by a SP, do not cause an unindent.

None of DCF's controls that causes a break causes an implicit unindent. Unindent is always explicit, such as .IN 0. Moreover, the .IN control may or may not cause a break, depending on whether the NOBREAK parameter is omitted or included. DCF treats an EOR followed by a space or tab as a break, as L3 does, but L3 has a much longer list of things that end a paragraph after CRE.

DCF's BREAKS (i.e. a .BR or any control that causes a break) definitely do end the previous line but they do not necessarily begin a new line. For example, three successive .BR controls do not cause three or two or even one blank line. L3's line enders begin new lines. For example, three CREs or three RCRs cause three or two blank lines (depending on whether there was a preceding line ender).

Thus the correspondence between required and optional line enders in L3 and DCF is complicated and is not always exact.

CRE in L3 is not equivalent to EOR in DCF. For example, 3 CREs require generation of either 2 or 3 DCF records, each containing at least a single blank, where the number depends on whether the UP just ended a DCF record. An RCR in L3 is not equivalent to a .BR in DCF. For example, 3 RCRs mean either 2 or 3 blank lines, and an unindent, whereas 3 .BRs produce no blank lines and no unindent.

RELATIONS OF LINE AND PARAGRAPH ENDERS TO KEYS

The correspondence between DW keys and L3 line enders is complex. DW allows a user to specify, in the user's profile, whether the RET key is to put into the L3 datastream the optional line ender, CRE, or the required line ender (paragraph ender) RCR. Using RCR prevents subsequent adjustment of lines even if the active ADJUST parameter is 1 (= yes) in whatever SET LINE PARAMETERS multi-byte control or LINE PARAMETERS second level structure (in the PMF, AMF, or TUFC first level structures) is in effect. Use of RCR also prevents justification of the line containing the text that preceded the RCR, even if the active ALIGNMENT STATE is 4 (= JUSTIFY).

Use of CRE, on the other hand, allows adjustment of lines if the active ADJUST parameter is 1 and allows justification of the preceding text if ALIGNMENT STATE is 4.

RCR and CRE are still very different, even when the active ADJUST parameter is 0 (= no) and the ALIGNMENT STATE is 1 (= LEFT), because RCR unindents and CRE does not.

DW also inserts CREs as a user types along, if the active ADJUST parameter is 1. This occurs each time a user types a word whose completion would go beyond the allowed right margin zone. The DW automatically spills the entire word down to the start of the next screen line and places a CRE where the word previously began. DW does no corresponding insertion of RCRs at the right margin when the active ADJUST parameter is 0. Instead, DW then beeps at the right margin and lets the user go on typing beyond the margin, scrolling the screen horizontally as necessary to show what is typed. As a consequence, with ADJUST equal to either 1 or 0, when the user presses the RET key, he or she does it because he or she intends to start a new line, not because he or she just happened to run out of room on the line. Therefore, the normal profile specifies that the RET key produces RCR single-byte controls.

Index has its own DW key labeled INDEX. ZICR can be generated by pressing the CONTROL key (which is not engraved as such on many keyboards) and the RET key (which is not engraved with this function's name).

DCF's relation between keys and optional line ending controls is not complex. DCF has only one type of carrier return: EOR. It is inserted in the datastream when the user presses the RET key (marked with a down-and-left arrow). The DCF formatter obeys these endings of input records, as required endings of output lines, if and only if a user has overridden the default .FO ON state, either by .FO OFF or by .CO OFF.

DCF allows a user to enter the .BR control to force the formatter to break concatenation of text, even if more text would fit on the previous line. That is, a break tells the formatter to begin a new output line where the next input line starts, and to not justify the previous line's right margin, even if FOrmatting or JUstification or COncatenation is turned on. All of the controls that cause a break are entered using ordinary text keys. An input line that starts with a space or a tab has the same effect of breaking concatenation with the previous line.

DOWN'S TRANSFORMATIONS OF LINE AND PARAGRAPH ENDERS

In general, DOWN should transform a break (whether it comes from a .BR control or from one of the other 51 controls that cause a break, but not from a line that begins with a space or a tab) into a CRE ZICR in L3. This combination ends a paragraph without unindenting.

Transforming a break into a RCR is not correct, because it would require reestablishing the indent level. This can be done, by writing zero or more Indent Tab single-byte controls after the RCR, but this should be avoided because it specifies the current indent tab level at an extra place in the datastream. A user should be able to change whatever produced that indentation and have the change continue as far as the original indentation lasted. Reestablishing the current indent level after an RCR makes a second place where a user has to make a change to achieve that effect. This in inconsistent with the spirit of editable transformation.

DOWN must ignore a break when it is already at a break. Otherwise the extra CRE in the CRE ZICR would leave a blank line. For examples, three .BRs are equivalent to one .BR; and a .BR after a .SK or any other control that causes a break must be ignored.

In general, DOWN should transform an EOR in DCF into a CRE in L3. However, several controls that can follow an EOR can require DOWN to write out something other than CRE instead. For examples, DOWN must transform the DCF sequence "EOR .IN 0" into the L3 single-byte control RCR with no preceding CRE allowed; and DOWN must transform the DCF sequence "EOR .IN 0 .PA" into the L3 single-byte control RPE, with no preceding CRE or RCR allowed. As a result, DOWN transforms each sequence of DCF controls as one entity, and transforms line enders and paragraph enders only as members of such sequences. The transforms given above for individual enders are a very small part of the algorithm.

UP'S TRANSFORMATIONS OF LINE AND PARAGRAPH ENDERS

In general, UP should transform a CRE into termination of the current record in DCF. This amounts to ending a text line as seen by an editor and it amounts to ending an input line as seen by the DCF formatter.

However, if the current DCF record is empty, because something else just ended the DCF record, then UP transforms a CRE by putting a space in the DCF record before ending the record. Of course, anything in L3 that acts as a line ending control can cause UP to terminate a record and hence can cause the current record to be empty when the next L3 item is encountered, and that item may be a CRE.

In general, UP should transform an RCR by terminating the current DCF record and generating a new record containing only a .IN 0 BREAK control. This both breaks (ends the paragraph) and unindents (resets the temporary left margin back to the permanent left margin) so it is a full transformation of RCR. The BREAK parameter need not be written, since it is the default for the .IN control, but UP writes the parameter out anyway to make the function clear to a person who is editing the DCF form of the document.

Again, UP must notice whether the current record is empty, that is, whether some other control has already ended the DCF record. If so, then UP inserts a space before terminating the record to cause a blank line (i. e. a record containing one space) rather than a null record that has peculiar effects on the DCF formatter. Then UP writes out the .IN 0 BREAK control.

However, it would be highly undesirable for UP to transform a sequence of five RCRs into five blank lines alternating with five .IN 0 BREAK controls. Therefore, UP keeps track of what functions are needed. After one L3 control has ended a DCF record, another control that causes an end of DCF record knows to put in a space first. After one L3 control has caused a break (ended a paragraph), another L3 control that causes a break need not put in an extra DCF control to cause a break. After one L3 control has unindented, another L3 control need not write out the DCF control .IN 0 BREAK. Finally, after one L3 control has ended a required page, by writing a .PA control into the DCF datastream, another DCF control such as APM that ends a required page knows not to write another .PA and leave an undesired blank page.

UP's goal is to generate a minimum number of DCF controls, where more controls would either be wrong or be confusing to a person editing the DCF form of the document. Achieving this goal set the tone for the entire UP transform, whereas the need to transform an entire sequence of DCF controls as a single entity set the tone for the DOWN transform.

UP can transform ZICR correctly only if ZICR follows an L3 line ender control that ended a DCF record. Otherwise UP should move the current position straight left and it can not tell DCF to do that. UP can not even backspace to the start of the line: without formatting the text, UP has no idea how many characters it would have to backspace over. Besides, DCF does not support text overlays. Therefore, UP does the best it can.

If ZICR occurs when UP has not just ended a DCF record, UP ends the record. This moves to the temporary left margin of the next line, giving fresh space to put characters into, right under where they were intended to go. This happens to be what DW shows a user on the screen after a user creates a ZICR. Using this approximation should signal an imperfect transformation. This case is very rare, since DW users do not even have key engravings to tell them how to generate a ZICR. Therefore, UP makes no provision for saving the ZICR byte and allowing DOWN to regenerate the ZICR in case the document is transformed back to the L3 form If ZICR occurs after a CRE ,then UP writes a .BR control and an EOR, because this is the interesting case of a required line ender (i. e. paragraph ender) that does not cause an unindent, so frequently generated by DOWN. UP does the same if ZICR follows a PE.

In all other situations, of which there are many, UP ignores ZICR altogether, because any transformation of ZICR would be redundant to transformations of previous controls in all other situations. This, again, is the tone of UP: remember what has been done and do not repeat unnecessarily.

UP transforms Index, or INX, not at all, except to leave the single-byte control in the DCF datastream for DOWN to use in regenerating the INX if the document is transformed back to the L3 form. This should flag an imperfect transformation. Note that the approximations used for INX and ZICR are consistent. In each case, the following text has the correct horizontal position but goes on a wrong line.

UP transforms Index Return, or IRT, exactly like RCR.

PAGE ENDERS

DISCUSSION

DCF's page control is .PA which expresses an author's intent to put following text on a new page. The DCF formatter obeys any .PA controls and also ends pages as is necessary to avoid running text off the bottoms of pieces of paper. The output of the DCF formatter is not in DCF format and does not participate directly in our transforms. Hence DOWN never sees the printer carriage control type of page enders that are inserted by the DCF formatter. Note that the .PA control does not cause a new output page to begin unless and until some text appears to go onto that page.

L3 has both required page end (RPE) and page end (PE) single-byte controls. Only the DW operator can insert and delete an RPE, which expresses the author's intent to start a new page with the following text. The operator or the paginator can insert or delete a PE. The operator also frequently inserts a PE to cause text to appear at the top of a new screen. The paginator removes such a PE that would cause space to be wasted at the bottom of a page, and also inserts a PE where necessary to prevent text from running off the bottom of a page. In making such decisions, the paginator respects any RPEs by inserting a PE after each RPE. The paginator ignores any existing PEs. It is a PE (and never an RPE) that actually tells the printer to begin a new page, whether the document has been paginated or not.

Both PE and RPE have important formatting properties. PE is processed as a CRE, the non-required carrier return. That is, it does not reset the indent level or end a paragraph but it does end a line. Things that end a paragraph when they follow CRE also end a paragraph when they follow PE. RPE is processed as a RCR so it does end a line, end a paragraph, and reset indent level. This disparity helps make the transforms interesting. The .PA control in DCF does not unindent; its counterpart in L3 does unindent. Fortunately, both do end a line and both do end a required line, i. e. end a paragraph.

UP'S TRANSFORMATION OF RPE AND PE

L3 can be paginated or unpaginated. A given document is unpaginated until the operator explicitly invokes pagination. It can be transformed to DCF in either form. In an unpaginated document, an RPE does not cause the printer to go to a new page but a PA does. In spite of this, the UP transform obviously must transform RPE to .PA and must not transform PE to .PA. The UP transform merely transfers any existing PEs from the input L3 document to the output DCF document (as unprintable bytes which CMS displays as a POUND SIGN, or some such, which the DCF formatter is told to ignore, and which the DOWN transform transfers back from the input DCF document to the output L3 document. This is all that PE means to the UP and DOWN transforms. As a result, a given document will start screens at familiar places after an UP-then-DOWN round trip.

UP could always transform an RPE into an EOR to end the DCF record, a .IN 0 BREAK to unindent, and a .PE to end the paragraph and end the page. In the tone of UP mentioned before, UP remembers whether the record has already been ended or the unindent has already been done. If so, UP writes only what is necessary.

Moreover, as already mentioned, when UP writes a .PA, UP remembers that the required page end has occurred so that some other L3 controls can avoid causing an extra .PA and hence an undesired blank page. This is fully described in the next section.

UP'S TRANSFORMATION OF L3 STRUCTURES THAT IMPLY RPE

In L3, any of the first level structures

APM
AAM
TUFC
RTMF make changes that affect overall page layout, not just line layout. For this reason, the DW Paginator carefully distinguishes text that precedes one of these structures from text that follows it. The Paginator formats text that follows one of these structures on output pages whose format is determined by the structure and will not mix that text with preceding text. As a result, the DW paginator behaves as if any of these structures implies a Required Page End (RPE) single-byte control. This is not L3 architecture. The RPE control need not be in the data stream. However, after pagination, any DW document prints out as if an RPE preceded any one of these structures. Therefore, a correct transformation UP from L3 to DCF must have a .PA control along with the controls that UP explicitly generates in response to one of these structures.

However, UP can not simply generate a ".PA" control along with the other controls that UP generates in response to one of these structures. For example "RPE, PE, TUP, APM, TUFC" is a valid sequence in L3 and must result in exactly one .PA control (plus other controls) in DCF. Note that if UP generated three .PA controls for this sequence, then UP would produce two undesired blank pages. Note, on the other hand, that three successive RPE controls in an L3 datastream must result in three .PA controls and must produce two blank pages.

UP employs the mechanism of a state bit, as described in general later, to avoid generating undesired duplicate controls. The state bit is "ENDED PAGE". It refers to a required ending of a page, produced by RPE or by one of the four controls under discussion; and does not refer to the sort of page end represented by PE, which can be inserted or deleted at will by the DW Paginator.

In response to an RPE control, UP writes a .PA control and sets ENDED PAGE to tell a following APM, AAM, TUFC, or RTMF structure not to write a .PA control. Similarly, any one of these structures that writes a ".PA" control sets ENDED PAGE to tell another one of these structures, if one follows, that it should not write a .PA control. Note, however, that in response to an RPE, UP always writes out a .PA control. This is necessary so that an author can produce blank pages by inserting a succession of RPE controls.

One result of this mechanism is that if a user generates the sequence "PE, TUP, APM, BT, RPE" in an L3 document and transforms it UP to DCF, then the result will have two ".PA" controls and will print a blank page. Note that the DW Paginator puts a PE after the RPE in that sequence, thus ending the Text Unit. That Text Unit's Body Text vector contains only the RPE and the added PE. A blank page is at least a moderately plausible transformation of that Text Unit.

What resets ENDED PAGE? Clearly, any graphic character such as "a" must reset it because the L3 sequence "RPE PE a PE TUP APM" must allow the APM to cause writing of a ".PE" control after a page containing only the graphic character "a". Clearly a PE and a TUP must not reset ENDED PAGE because the sequence "RPE PE TUP APM" must prevent the APM from causing writing of a ".PE" control. Other controls and structures reset it.

The initial value of ENDED PAGE is "set" because one of the four structures discussed here, when it appears in the first Text Unit of a document, must be prevented from causing UP to write out a .PE control, and thereby leave an undesired initial blank page. Thus the initial state is equivalent to having just processed a RPE.

Note the relationship of ENDED PAGE to the similar-sounding state bit LAST WAS PE. The purpose of ENDED PAGE is to remember whether a .PA has been written out and to prevent duplication and erroneous blank pages. The purpose of LAST WAS PE is to remember that we have had no text since the end of the latest Text Unit, and hence that SP, HT, etc. must end a paragraph. Thus ENDED PAGE refers only to a required page end, whereas LAST WAS PE is of interest only when the preceding text unit did not even end with a paragraph end, let alone with a required page end, and we need to know whether the first text in the next text unit is a new paragraph.

DOWN'S TRANSFORMATION OF .PA AND THE PE BYTE

DOWN transforms a .PA control, like any other DCF control, as a part of a sequence of controls. If a .PA appears alone, that is, with text rather than controls on both sides of it, then DOWN writes out an RPE single-byte control and enough Indent Tab single-byte controls to reestablish the indent level. The ITs are necessary because .PA does not unindent and RPE does. In the more usual case, where a required page end is accompanied by a different indentation, the .PA control will be in the same sequence as a .IN control and DOWN will write zero or more ITs in response to the .IN control.

As already noted, UP transfers a PE byte, that it finds in the L3 datastream, over to the DCF datastream. DOWN just reverses the process. Down transfers a PE byte, which is not an editable DCF control, back to the output L3 datastream. Nevertheless, a document produced by DOWN usually needs to be paginated before it is formally printed on DW. The main reason is that DOWN relies on the DW paginator to insert a PE (and provide the rest of the massive manipulation that implies) after each RPE.

DEFAULTS USED IN DOWN

The following default values are built into DOWN for use in the unusual case where a system administrator has not created a FORMAT file. In the usual case, DOWN takes all desired defaults from such a file, which contains a Format Unit that is tailored for one or more particular users. The values in a FORMAT file cas be set easily by using standard DW keystrokes to create a document with the desired PMF, and then transforming that document UP to DCF with the option that generates a FORMAT file. Thus, the following defaults need not be perfect and no mechanism for changing them is necessary.

```
                                             DEFAULT
STRUCT.  PARAMETER NAME                      VALUE
------------------------------------------------------------

DP:      CGCS ID                             001
         CODE PAGE ID                        256
         PRESERVE PAGE NAME                  0
         DOCUMENT LANGUAGE ATTRIBUTE         01

PMF:
         PM: COPIES                          1
             FORMS                           2 (manual feed)
             SOURCE DRAWER                   1 (top drawer)
             SDSP                            1 (source drawer
                                               subsequent page)
         PP: PW    = 8 1/2" x 1440     =   12240
             PD    = 11"    x 1440     =   15840
             FBTLF = 1"     x 1440     =   1440
             FBTIS = 1"     x 1440     =   1440
             LTBTL = (11"-1") x 1440 =    14400

 Note: We are assuming one inch top and bottom margins
       for TM and BM.

         LP: GCFSID                          8
             FWTH                            144
             FA                              1 (monospaced)
             CGCSID                          001
             Code Page ID                    256
             LFMG                            1440
 Note: Actual DCF default .PM=0, bind(2), means that
       default margin is 2 characters. Increased in L3
       on grounds of reasonableness.

             RHMG (1440x(1+6))               10080
             LNDEN 1/8"x1440                 180
             LNSP(single space)              2
             ADJ                             1
 Note: because default state in DCF is format on.
             Reserved Byte
             ZN                              10
 Note:  There is no DCF default for ZN

             JUST                            100
             ALIGN                           4
             LNNM                            4
```

TP:

Note: The default tab rack in DCF is 5,10,....80. We must translate this into POS and ALIGNC pairs for L3. Note that ALINGC is 1 byte and POS two bytes.

ALINGC is always 0

POS is 0 5 10 ... 80

TUP Page Name C'000100'

RECORD FORMAT OF L3

Definitions of L3 give the structures and controls in L3. However, they do not specify the details of how these are put into records for media or transmission. On DW diskettes, a few structures appear in one record or sector, then that record is padded with many zeros even though that record has enough room to contain the next several structures, and the next structure starts in the next record. This is also the nature of Media Image as sent over the BSC TP link. This is not a property of L3 and will not be true of the records transmitted over the ANR link. The L3 transmitted over ANR is a string of vectors only. The actual ANR medium will have a unique form of the data involving converting the 256 possible bytes to forms innocuous to the controller (e. g. by converting each nibble to a byte between 0 and F) and involving transmission blocks. This form will be generated and returned to L3 by the transmission subroutines on the host and the DW that are supplied by the author of the DW code. The datastream, as seen by the host code that uses these subroutines, has the properties given in the following tables.

RECORD PROPERTIES OF L3P FOR PROTOTYPE

| PROPERTY | INPUT TO UP | OUTPUT FROM DOWN |
|---|---|---|
| RECORD FORMAT | VARIABLE | VARIABLE |
| RECORD SIZE | 2 KB | 2 KB |
| IS THERE A HEADER RECORD | NO | NO |
| PAD CHARACTERS | NONE | NONE |
| WHEN DO YOU START A NEW RECORD | EACH SAM ACCESS | FUP, FSP, TUP, TSP, EUP |
| WHAT ELEMENTS OF L3P MUST START NEW RECORDS | NONE | AS ABOVE |
| FORM OF I/O USED | STREAM (RECORD WOULD WORK TOO) | STREAM (RECORD WOULD WORK TOO) |

RECORD PROPERTIES OF L3 FOR SHIPMENT

| PROPERTY | INPUT TO UP | OUTPUT FROM DOWN |
|---|---|---|
| RECORD FORMAT | VARIABLE | VARIABLE |
| RECORD SIZE | 2 KB OPTIONAL, NO CONTEXT SIGNIFICANCE | 2 KB OPTIONAL, NO CONTEXT SIGNIFICANCE |
| IS THERE A HEADER RECORD | NO | NO |
| PAD CHARACTERS | NONE | NONE |
| WHEN DO YOU START A NEW RECORD | EXCEED RECORD SIZE | EXCEED RECORD SIZE |
| WHAT ELEMENTS OF L3P MUST START NEW RECORDS | FUP (NEW DOC.) | FUP (NEW DOC.) |
| FORM OF I/O USED | STREAM ONLY | STREAM ONLY |

5. UP'S ALGORITHMS FOR DELIMITERS

The algorithms in the preceding sections show many of the things that UP does while transforming L3 to DCF. It should be noted that L3 specifies formatting conditions in a very repetitive fashion, which is no harm because DW operators never see the redundancy. UP includes code that compares most DCF controls that UP is about to write out, against the current formatting conditions, and refrains from writing out redundant ones. This is important because DCF users do see formatting controls. For formatting controls, therefore, UP performs a "many-to-one" transformation.

The rest of the algorithms used in UP concern transformation of delimiters, rather than of formatting controls. These algorithms employ state variables and a state machine implementation as described in this chapter. One L3 delimiter transforms into one or more DCF controls, depending on the current state of the document. UP's transformation of delimiters is therefore a "one-to-many" transform. In each case, note that UP is, in principle, simpler than DOWN's many-to-many transformation.

SUMMARY OF L3 AND DCF DELIMITERS

Several single-byte or multi-byte controls or structures in L3 delimit lines, paragraphs, indentations, and pages. DCF contains controls for roughly similar purposes. They are as shown with what they delimit in the following table.

| L3 CONTROL OR STRUCTURE | ABBR. | ENDS LINE | ENDS PARA-GRAPH | UIN-DENTS | ENDS PAGE |
|---|---|---|---|---|---|
| Carrier REturn | CRE | O | M | . | . |
| Required Carrier Return | RCR | Y | Y | Y | . |
| Index ReTurn | IRT | Y | Y | Y | . |
| Zero Index Carrier Return | ZICR | O | M | . | . |
| INdeX | INX | . | . | . | . |
| Page End | PE | O | . | . | O |
| Required Page End | RPE | Y | Y | Y | Y |
| Line Format Change | LFC | Y | Y | Y | . |
| Return to Master Line Format | RMLF | Y | Y | Y | . |
| APM, AAM, TUFC, and RTMF | | Y | Y | Y | Y |

| DCF CONTROL OR EOR | ABBR. | ENDS LINE | ENDS PARA-GRAPH | UIN-DENTS | ENDS PAGE |
|---|---|---|---|---|---|
| END OF RECORD | EOR | O | . | . | . |
| Any control that causes a break | - | Y | Y | . | . |
| .IN 0 NOBREAK | - | Y | . | Y | . |
| .IN 0 | - | Y | Y | Y | . |
| .PA | - | Y | Y | . | Y |

Y means yes, i. e. "required"
O means optional,
M means maybe (i. e. if and only if the control follows a CRE or a PE)
. means no

UP'S SEQUENCE DEPENDENCY AND STATE MACHINE

UP can not transform these delimiter controls independently of one another. Successive delimiters tend to interact with one another. Moreover, one L3 delimiter can require generation of several DCF controls, and most of these controls tend to be redundant to DCF controls generated previously.

The transformation of each delimiter, and of each of several special controls, depends on what precedes it. This information is represented by the states of a collection of state bits. UP reads an L3 delimiter, writes out DCF appropriate to that L3 input and to the prior state, and then sets or resets state bits as is necessary to convert the prior state to the correct next state.

The algorithms are described in words, in decision tables, and in state diagrams that show combinations of the values of the state bits as regions on paper.

DEFINITIONS OF THE STATE VARIABLES

ENDED DCF RECORD is set whenever UP encounters any L3 item (such as RCR or CRE) that specifies the end of a line. This must cause the UP transform to end one DCF record and begin another one. It is not set when the UP transformation chooses to put a DCF control (such as .HW or .US) at the start of a new DCF record, even though L3 did not specify the end of a line. It is reset when L3 specifies anything to be put on the new line, so the current location in the document is no longer at the end of a line.

ENDED PARAGRAPH is set when L3 specifies anything (such as RCR or two CREs) that must cause a break in adjustment, i. e. a point in text that is not only the end of a line with this particular pagination, but also must be the end of a line with any pagination. In DCF this corresponds to a BREAK. This uses the text processing definition of a "paragraph end", namely any point across which the author demands that text never be reflowed. No blank line or indentation is required to satisfy this definition, even though a layperson's definition of a "paragraph end" usually includes a blank line or indentation as well as the break in adjustment to mark the end of a paragraph. It is reset when L3 specifies anything to be put in the new paragraph, so the current location in the document is no longer at the end of a paragraph.

UNINDENTED is set when L3 explicitly specifies that the temporary left margin must be reset back to the permanent left margin, that is, that the indent tab level must be reset. Any graphic character resets this bit, meaning that there could be a nonzero indent tab level. This must be done even if no IT control now actually indents the temporary left margin, because ITs or .INs can be edited in at any point in a document at any time.

Any one of the roughly eight L3 controls that zeros the indent tab level sets this "UNINDENTED" state bit. If that bit is already set when one of these controls appears, UP refrains from writing out a .IN 0 control to reset the indent tab level. One result of this is that four successive RCR controls will generate one .IN 0 control and three blank lines rather than four .IN 0 controls alternating with three blank lines.

ENDED PAGE is set when L3 specifies a required page end. Thus it is set only for RPE. It is not set for PE, which can be moved around by a change in pagination. It is reset when L3 specifies anything to be put in the new page, so the current location in the document is no longer at the end of a page.

LAST WAS CRE is set whenever UP encounters a Carrier Return (CRE) in the L3 datastream. It is reset by anything other than CRE. This allows UP to obey the L3 semantics that say that several L3 controls behave differently depending on whether they do or do not follow a CRE control. For example, CRE itself causes the end of a paragraph if and only if it follows either CRE or PE.

LAST WAS PE is set by Page End (PE) and is reset by anything else that occurs within a Body Text vector. It is not reset by vectors that fall between two Body Text vectors, such as AAM or TUFC. In practice, LAST WAS PE is always ORed with LAST WAS CRE.

LAST WAS SHY is set by Syllable HYphen and is reset by anything else. Its major use is telling UP to ignore a CRE because the last L3 item was a SHY. Note: This bit first appears in the 9/30/82 edition.

DELIMIT WUS is set by any L3 item that separates one word from the next word, for purposes of processing a later Word UnderScore, if any. It is reset by anything that is not a word delimiter for WUS. Whenever UP sets WUS, UP also remembers where it is in the output DCF datastream. This is the start of a word, so it is the point UP will back up to and insert a ".US ON" if it sees a WUS in the datastream at the end of the word that begins at that point. Note: This bit first appears in the 9/30/82 edition.

ENDED WORD is set by any L3 item that separates one word fron the next word, for the purposes of hyphenation (and for general purposes that do not apply to transformations). It is reset by anything that is not a general word delimiter. Fewer L3 items set ENDED WORD than set DELIMIT WUS. UP remembers where it was when it last set ENDED WORD. This is the point UP will back up to , and place a ".HW" at, if it sees a SHY in the following word.

HYPHENATING has a very restricted purpose, so it is not shown in the decision tables or state diagrams. It is set, used, and reset as follows.

> UP sets HYPHENATING whenever UP encounters the first SHY (syllable hyphen) single-byte control in a word.
>
> After UP sets HYPHENATING, UP backs up, places ".HW" before the word, replaces this SHY by a hyphen (which the ".HW" will cause the SCRIPT/VS formatter to print only if the hyphen happens to fall at the end of a line), and continues processing the word, replacing each SHY by a hyphen and replacing each HYP by two hyphens. It is the HYPHENATING bit that tells UP that it is already hyphenating the word. Without HYPHENATING, UP would put one ".HW" before the word for each SHY in the word, and would not know to replace a HYP in the word by two hyphens.
>
> Eventually, UP will process some word ending control. When HYPHENATING is one, UP transforms any word ender into a continuation character followed by End Of Record (since the control ".HW" can not have any text on its line other than the hyphenated word) and resets HYPHENATING (to end the special processing of SHYs and HYPs).

Please note that LAST WAS SHY, DELIMIT WUS, ENDED WORD, and HYPHENATING were used for the first time in the 9/30/82 edition of this document. Most of the resulting changes to the document are just filling in obvious states before and after unchanged actions. These changes are not marked with revision codes. Substantive changes due to these new state variables are so marked.

DECISION TABLES

A given decision table specifies the actions that UP takes in response to a given L3 input item. The item is named in the top line. The next lower lines specify the prior state bits.

Each column on the right represents a "rule" or "production rule", i.e. a condition of the state bits that requires UP to take a unique action. A rule is "satisfied" if all of the state bits marked "Y" are one and all of the state bits marked "N" are zero. The values of state bits marked"-", "-Y", or "-N" are irrelevant to whether or not the rule is satisfied.

The remaining lines in the table are actions that UP takes when a given rule is satisfied. The actions marked 1, 2, etc. for a given rule specify the DCF that UP writes out. The state bits that UP changes, in order to produce the required next state as a result of that input item occurring in the L3 datastream when that rule is satisfied, are marked by "Y" if UP must set that bit or by "N" if UP must reset that bit. The values of state bits marked"-", "-Y", or "-N" are not changed.

A blank decision table follows.

L3 INPUT: ________

| | 1 | 2 | 3 | 4 |
|---|---|---|---|---|
| PRIOR STATE: | | | | |
| ENDED DCF RECORD | - | - | - | - |
| ENDED PARAGRAPH | - | - | - | - |
| UNINDENTED | - | - | - | - |
| ENDED PAGE | - | - | - | - |
| LAST WAS CRE | - | - | - | - |
| LAST WAS PE | - | - | - | - |
| LAST WAS SHY | - | - | - | - |
| DELIMIT WUS | - | - | - | - |
| ENDED WORD | - | - | - | - |
| DCF OUTPUT: | | | | |
| EOR (END OF RECORD) | - | - | - | - |
| ONE SPACE + EOR | - | - | - | - |
| .BR + EOR | - | - | - | - |
| .IN 0 + EOR | - | - | - | - |
| .PA + EOR | - | - | - | - |
| PE BYTE | - | - | - | - |
| NEXT STATE: | | | | |
| ENDED DCF RECORD | - | - | - | - |
| ENDED PARAGRAPH | - | - | - | - |
| UNINDENTED | - | - | - | - |
| ENDED PAGE | - | - | - | - |
| LAST WAS CRE | - | - | - | - |
| LAST WAS PE | - | - | - | - |
| LAST WAS SHY | - | - | - | - |
| DELIMIT WUS | - | - | - | - |
| ENDED WORD | - | - | - | - |

Meanings of entries on right sides of decision tables are as follows.

TOP SECTION (PRIOR STATE):

| | |
|---|---|
| Y (YES) | This state bit must be true in order to satisfy this rule. |
| N (NO) | This state bit must be false in order to satisfy this rule. |
| - (DON'T CARE) | This state bit can be either true or false. It need not be tested when determining whether this rule is satisfied. |
| -Y (DON'T CARE BECAUSE KNOWN TO BE "Y") or -N (DON'T CARE BECAUSE KNOWN TO BE "N") | This state bit need not be tested when determining whether this rule is satisfied, because the known value of some other state bit implies the value of this one. It is specified to facilitate understanding but does not affect the algorithm. To the algorithm, "-Y" or "-N" is just a "DON'T CARE" like "-". |

Note that a column, or rule, applies if and only if all the conditions marked "Y" are true and all the conditions marked "N" are false. Exactly one rule should be satisfied in any possible state. If no rule is satisfied, then do nothing at all.

MIDDLE SECTION (DCF OUTPUT):

| | |
|---|---|
| 1,2,3,''' | Order in which actions are performed when this rule is satisfied. Note that several things that can be done in any order may have the same order number. Note that the state changes specified in BOTTOM SECTION can be done in any order relative to each other and relative to these DCF outputs. |
| - | Do not perform this action when this rule is satisfied. |

BOTTOM SECTION (NEXT STATE):

| | |
|---|---|
| Y (YES) | Set this state bit. |
| N (NO) | Reset this state bit. |
| - (DON'T CHANGE) or -Y or -N | Do not set or reset this state bit. Again, a "Y" or "N" following a "-" is a comment on a known value of a state bit rather than a part of the algorithm. To the algorithm, -Y or -N is just a "DON'T CHANGE" |

Note that the BOTTOM SECTION compresses two possible actions, set and reset, as well as no action, into each line. (Another way of expressing the same meaning would use two lines for each line used here. One line would say, for example, SET ENDED DCF RECORD. The other corresponding line would say RESET ENDED DCF RECORD. Then one or neither of these could have a number in it.)

INITIAL STATE

The initial state at the start of processing a document is

ENDED PAGE
and UNINDENTED
and ENDED PARAGRAPH
and ENDED DCF RECORD
and ENDED WORD
and DELIMIT WUS
but not LAST WAS CRE
and not LAST WAS PE.
and not LAST WAS SHY This happens to be equivalent to implying an RPE control just before the start of each document. The same information in tabular form is as follows.

| STATE BIT | VALUE |
|---|---|
| ENDED DCF RECORD | Y |
| ENDED PARAGRAPH | Y |
| UNINDENTED | Y |
| ENDED PAGE | Y |
| LAST WAS CRE | N |
| LAST WAS PE | N |
| LAST WAS SHY | N |
| DELIMIT WUS | Y |
| ENDED WORD | Y |

STATES SET BY CHARACTERS

The states set by graphic characters, including letters, numbers, and special symbols, tell the program that it is not at the end of a record, not at the end of a paragraph, not unindented, and not at the end of a page. In addition, the state set by any character that is not a word delimiter tells the program that it is not at the end of a word and may set many other states as well. (For example, only a SP that is not after a CRE or a PE just sets DELIMIT WUS and ENDED WORD. All other word delimiters set other bits as well.) This information in tabular form is as follows.

STATE SET BY A WORD-DELIMITER

| STATE BIT | VALUE |
|---|---|
| ENDED DCF RECORD | - |
| ENDED PARAGRAPH | - |
| UNINDENTED | - |
| ENDED PAGE | - |
| LAST WAS CRE | - |
| LAST WAS PE | - |
| LAST WAS SHY | N |
| DELIMIT WUS | Y |
| ENDED WORD | Y * |

* Several L3 items are word delimiters for WUS but are not general word delimiters.

STATE SET BY CHARACTER THAT IS NOT A WORD-DELIMITER

| STATE BIT | VALUE |
|---|---|
| ENDED DCF RECORD | N |
| ENDED PARAGRAPH | N |
| UNINDENTED | N |
| ENDED PAGE | N |
| LAST WAS CRE | N |
| LAST WAS PE | N |
| LAST WAS SHY | N |
| DELIMIT WUS | N * |
| ENDED WORD | N |

* Several L3 items are word delimiters for WUS but are not general word delimiters.

RELATIONS AMONG STATE VARIABLES

The values of the state bits are not independent. They are related as follows.

```
1.  ENDED PAGE (which refers to a Required page end)
       implies UNINDENTED
           and ENDED PARAGRAPH
           and ENDED DCF RECORD
           and ENDED WORD
           and DELIMIT WUS
       but not LAST WAS CRE
       and not LAST WAS SHY

2.  UNINDENTED(which means, not only are no levels of
               indentation in effect, but a control
               has just reset the indent level)
       implies ENDED PARAGRAPH
           and ENDED DCF RECORD
           and ENDED WORD
           and DELIMIT WUS
       but not LAST WAS CRE
       and not LAST WAS SHY

3.  ENDED PARAGRAPH
       implies ENDED DCF RECORD
           and ENDED WORD
           and DELIMIT WUS

4.  LAST WAS CRE
       implies ENDED DCF RECORD
           and ENDED WORD
           and DELIMIT WUS
       and not LAST WAS PE
       and not LAST WAS SHY

5.  LAST WAS PE
       implies ENDED DCF RECORD
           and ENDED WORD
           and DELIMIT WUS
       and not LAST WAS CRE
       and not LAST WAS SHY

6.  LAST WAS SHY
       implies not LAST WAS CRE
           and not LAST WAS PE
           and not DELIMIT WUS
           and not ENDED WORD
           and not ENDED DCF RECORD
           and not ENDED PARAGRAPH
           and not UNINDENTED

7.  DELIMIT WUS
       implies ENDED WORD
```

However, other interesting combinations are possible:

```
CRE + ZICR causes ENDED PARAGRAPH
              and ENDED DCF RECORD
          but not UNINDENTED

CRE causes ENDED DCF RECORD
   but not ENDED PARAGRAPH
   and not UNINDENTED
```

Note that the case consisting of ENDED RECORD, not LAST WAS CRE and not ENDED WORD is impossible. This fact is used and discussed only in the ZICR algorithm, q. v.

Note also that a PE control leaves a slightly wierd state. In L3, a PE is legal only after a valid single-byte line ending control. Thus, ENDED DCF RECORD is already set when the PE appears. UP writes a hex '0C', which is the value of the PE byte, into the DCF datastream to preserve the PE's position. This byte goes into the new DCF record, so we are not at the start of the record. Nevertheless, the PE leaves ENDED DCF RECORD set. This is correct only because every document produced by UP has an implicit DCF .TS 0C // control that tells the DCF formatter to ignore the 0C altogether. As far as text is concerned, the DCF record has nothing in it yet. UP must not end a record after the PE any more than UP is allowed to end a record that actually has nothing in it. Either would leave a null record that would upset the DCF formatter.

The above information is repeated in the following tabular and pictorial forms. The table is laid out like a decision table, with state bits as rows and rules as columns. Rule numbers 1 through 7 correspond to the above implications with the same numbers and the remaining rules express contrapositives.

| IMPLICATIONS | 1 | 2 | 3 | 4 | 5 | 6 | 7 | 8 | 9 | 10 |
|---|---|---|---|---|---|---|---|---|---|---|
| ENDED DCF RECORD | -Y | -Y | -Y | -Y | -Y | -N | - | N | - | - |
| ENDED PARAGRAPH | -Y | -Y | Y | - | - | -N | - | -N | N | - |
| UNINDENTED | -Y | Y | - | - | - | -N | - | -N | -N | N |
| ENDED PAGE | Y | - | - | - | - | -N | | -N | -N | -N |
| LAST WAS CRE | -N | -N | - | Y | -N | -N | - | -N | - | - |
| LAST WAS PE | - | - | - | -N | Y | -N | - | -N | - | - |
| LAST WAS SHY | -N | -N | - | -N | -N | Y | - | - | - | - |
| DELIMIT WUS | -Y | -Y | -Y | -Y | -Y | -N | Y | - | - | - |
| ENDED WORD | -Y | -Y | -Y | -Y | -Y | -N | -Y | - | - | - |

The pictorial forms are state diagrams in which any state bit's being on or off is represented by the inside or outside of a rectangle. Each rectangle is labeled with the name of the state bit that is on for all points inside that rectangle, except for the rectangle NOT ENDED WORD whose inside corresponds to the ENDED WORD state bit's being off, and LAST WAS CRE OR PE, which represents the union of the LAST WAS CRE and the LAST WAS PE state bits. Relations among state bits determine how the rectangles overlap.

The first state diagram shows relations among five sets that form a simple hierarchy. ANYTHING is the outer rectangle. Anything of interest is represented by a point somewhere in this rectangle. ENDED DCF RECORD is a subset of ANYTHING represented by a large rectangle in the lower right corner of ANYTHING. ENDED PARAGRAPH is a smaller rectangle in the lower right corner of ENDED DCF RECORD, and so on. Points, i. e. interesting combinations of values of state bits, are marked with asterisks. The point marked "EXAMPLE" has the state bit values noted in the table. The set of all points having these values of the state bits is the P-shaped region that is shaded as "//////////".

SIMPLIFIED STATE DIAGRAM
FOR RELATIONS AMONG STATE VARIABLES

```
 _____________________________________________
:          ANYTHING                          :
:     ________________________________________
:    :                                       :
:    :       ENDED DCF RECORD                :              EXAMPLE
:    :                                       :                 V
:    :     __________________________________:                 :
:    :     :////////////////////////////////:                 :
:    :     :////////////////////////////////:                 :
:    :     ://// ENDED PARAGRAPH ///////:                 :
:    :     :////////////////////////// *K----------------K
:    :     :////////////////////////////////:
:    :     :///______________________________:
:    :     :///:                             :
:    :     :///:     UNINDENTED              :
:    :     :///:                             :
:    :     :///:     ________________________:
:    :     :///:    :                        :
:    :     :///:    :    ENDED PAGE          :
:    :     :///:    :                        :
:____:_____:___:____:________________________:
```

STATE BITS' VALUES
FOR "EXAMPLE" POINT
AND FOR REGION SHOWN AS "///"

| STATE BIT | VALUE |
|---|---|
| ENDED DCF RECORD | Y |
| ENDED PARAGRAPH | Y |
| UNINDENTED | N |
| ENDED PAGE | N |

The second state diagram introduces two more sets that relate to the others in a more complicated way. The set LAST WAS CRE OR PE, which represents the union of LAST WAS CRE and LAST WAS PE, is represented by a tall rectangle along the right side of ENDED DCF RECORD. The set NOT ENDED WORD is a subset of ANYTHING represented by a rectangle that overlaps LAST WAS CRE OR PE. Therefore, ENDED WORD is true for all points in the set that is the outside rectangle with its top right corner removed. For example, there are no situation when a word is not ended and a paragraph is ended. Therefore, there is no intersection between the NOT ENDED WORD rectangle and the ENDED PARAGRAPH rectangle. Ignoring the difference between LAST WAS CRE and LAST WAS PE, the state diagram shows that there are 12 possible combinations of the seven state bits shown. This can be used to conclude that things are only 12 / 128 = 9.3% as complex as they could be.

This full state diagram points out two important states: the initial state described above and the state set by other printable (i. e. graphic) characters that are not word delimiters.

In the state diagrams, "K" is used for a left-pointing arrow, "A" points up, and "V" points down. These arrows print the same on all output devices.

State diagrams are used to illustrate all of UP's decision tables. A decision table's rules correspond to a state diagram's state transitions. A state transition flows from a prior state, out the right side of the diagram, down to the bottom, left through the correct DCF output to be generated when the given L3 input item occurs in that prior state, and finally back up to the correct next state.

The "EXAMPLE OF A STATE TRANSITION" shown is used when we receive a RCR and if the prior state is ENDED PARAGRAPH, but not UNINDENTED, not LAST WAS CRE, and not LAST WAS PE. The UP transform writes out a .IN 0 control and changes a state bit to say that UNINDENTED is now true.

```
        FULL STATE DIAGRAM
 FOR RELATIONS AMONG STATE VARIABLES          STATE SET BY
                                              A PRINTABLE
_____________________________.__._ .______    CHARACTER
:                            .  .  . LAST-:   (NOT A WORD
:                            .  .  . WAS- :   DELIMITER,
:                            .  .  . SHY  :   AND NOT SHY)
:                            .  .  .______:       V
:                            .  . not-    :       :
:                            .  . DELIMIT-:       :
:     ANYTHING               .  . WUS     :       :
:                            .  .     *K----------K
:                            .  .________:
:                            .     not-   :
:   _________________________.____________:
:   :                        .      ENDED-:
:   :                        .    ________:
:   :                        .    . WORD  :
:   :     ENDED DCF RECORD   .____._______:
:   :                             .       :
:   :    _________________________._______:
:   :    :                        .       :
:   :    :                        .       :
:   :    :                        .       :   EXAMPLE OF A
:   :    :     ENDED PARAGRAPH  *-----------------------V S
:   :    :                        .       :             : T
:   :    :   _____________________._______:             : A
:   :    :   :                    . LAST- :             : T
:   :    :   :    UNINDENTED      .       :             : E
:   :    :   :                    . WAS-  :             : T
:   :    :   :   _________________._______:    INITIAL  :
:   :    :   :   :                . CRE-  :    STATE    : T
:   :    :   :   :   ENDED PAGE   .       :      V      : R
:   :    :   : * :                . or PE :      :      : A
:   :    :   : A :                .       :      :      : N
:   :    :   : : :       *K----------------------K      : S
:   :    :   : : :                .       :             : I
:___:____:___:_:_:________________._______:             : T
               :                                        : I
               :                                        : O
               K----K .IN 0   EOR  K--------------------K N
```

CRE

A Carrier REturn moves the current position down one line and moves left to the temporary left margin.

1. When CRE is not after a line ender, the DCF output file is not at the start of a record. The DCF output that UP writes in response to a CRE in this case consists entirely of an EOR, that is, UP ends the current DCF record. Since this CRE is not after a line ender, it is not after a CRE or a PE and therefore it does not end a paragraph.

2. When CRE is after a line ender, the DCF output file is at the start of a new record. Here a CRE always causes a blank line, i.e. a DCF record containing one space character. This blank line is an implied paragraph ender in DCF, whether or not this CRE followed a CRE. Therefore, astonishingly, it is not necessary to use the LAST WAS CRE state bit in this case to determine whether to end a paragraph, even though "a CRE that follows another CRE ends a paragraph" is an important true statement about L3. A CRE after any line ender ends a paragraph. Each PE follows a line ender, so this applies to the PE + CRE case as well.

A CRE resets ENDED PAGE. This is because appearance of anything except Page End control in a Body Text vector, even a CRE, means that we are no longer immediately after a Required Page End. For example, the purpose of ENDED PAGE is to prevent the APM in the L3 sequence "... RPE PE TUP APM ..." from generating a second .PA control and thereby producing the error of a blank page. However, the L3 sequence "... RPE CRE PE TUP APM ..." has a BLANK line after the RPE. Paginating on DW would put a PE between the RPE and the CRE. That would yield a blank page on a DW printer. Therefore, the correct transform of the L3 sequence "... RPE CRE PE TUP APM ..." has two .PA controls. The APM must imply that the last Text Unit meant to end with a RPE, whether it had one explicitly or not; so the transformation of the APM must include a .PA control. This is assured if CRE resets the ENDED PAGE status bit. In fact, any of the controls whose algorithms follow, with the exception of ENDED PAGE must reset the ENDED PAGE state bit for the same reason.

L3 INPUT: CRE

| | 1 | 2 | 3 | 4 |
|---|---|---|---|---|
| PRIOR STATE: | | | | |
| ENDED DCF RECORD | N | Y | -N | - |
| ENDED PARAGRAPH | -N | - | -N | - |
| UNINDENTED | -N | - | -N | - |
| ENDED PAGE | -N | - | -N | - |
| LAST WAS CRE | -N | - | -N | - |
| LAST WAS PE | -N | - | -N | - |
| LAST WAS SHY | N | -N | Y | - |
| DELIMIT WUS | - | -Y | -N | - |
| ENDED WORD | - | - | -N | - |
| DCF OUTPUT: | | | | |
| EOR (END OF RECORD) | 1 | - | - | - |
| ONE SPACE + EOR | - | 1 | - | - |
| .BR + EOR | - | - | - | - |
| .IN 0 + EOR | - | - | - | - |
| .PA + EOR | - | - | - | - |
| PE BYTE | - | - | - | - |
| NEXT STATE: | | | | |
| ENDED DCF RECORD | Y | -Y | -N | - |
| ENDED PARAGRAPH | -N | Y | -N | - |
| UNINDENTED | -N | - | -N | - |
| ENDED PAGE | -N | N | -N | - |
| LAST WAS CRE | Y | Y | -N | - |
| LAST WAS PE | N | N | -N | - |
| LAST WAS SHY | -N | -N | N | - |
| DELIMIT WUS | Y | -Y | -N | - |
| ENDED WORD | Y | Y | -N | - |

```
  L3 INPUT:    CRE

_____________________________._______
:                            . LAST-:
:                            . WAS- :
:                            . SHY  :  3
:                            .   *------------------------V
:                            .______:                     :
:                                   :  1                  :
:        ANYTHING                *----------------------V :
:                                   :                   : :
:   ________________________________:                   : :
:   :                               : 2'                : :
:   :       ENDED DCF RECORD     *------------------V   : :
:   :                               :               :   : :
:   :    ___________________________:               :   : :
:   :    :                          : 2"            :   : :
:   :    :     ENDED PARAGRAPH   *--------------V   :   : :
:   :    :                          :           :   :   : :
:   :    :   _______________________:           :   :   : :
:   :    :   :                      : 2"'       :   :   : :
:   :    :   :    UNINDENTED     *----------V   :   :   : :
: * :    :   :                      :       :   :   :   : :
: A : *  :   :   ___________________:       :   :   :   : :
: : : A  : * :   :                  : 2""   :   :   :   : :
: : : :  : A : * :   ENDED PAGE  *----------V   :   :   : :
: : : :  : : : A :                  :       :   :   :   : :
:_:_:_:__:_:_:_:_:_ ________________:       :   :   :   : :
  :   :    :   :                            :   :   :   : :
  :   :    :   :                            :   :   :   : :
  :   :    :   :                            :   :   :   : :
  :   :    :   K-----K  SPACE EOR  K--------K   :   :   : :
  :   :    :                                    :   :   : :
  :   :    K---------K  SPACE EOR  K------------K   :   : :
  :   :    :                                        :   : :
  :   :    K---------K  SPACE EOR  K----------------K   : :
  :   :                                                 : :
  :   K--------------K        EOR  K--------------------K :
  :                                                       :
  K-------------------------------------------------------K
```

NOTE: Transformation does not depend on the prior state's LAST WAS CRE or LAST WAS PE or ENDED WORD or DELIMIT WUS. The next state always sets LAST WAS CRE, resets LAST WAS PE, and resets ENDED WORD. Hence, for clarity, these states are not shown.

RCR OR IRT

Either Required Carrier Return or Index ReTurn moves down one line and moves left to the permanent left margin. That is, it ends a line (i. e. causes an EOR in DCF), ends a paragraph (i. e. causes a break), and unindents (i. e. causes a .IN 0). If one or more of these are already done, it refrains from writing redundant or incorrect duplicate controls. If it comes after a line ender, then it leaves a blank line by inserting a space before the EOR.

1. If it is not after a line ender, it must end the DCF record, and also must end the paragraph and unindent (because these have not been done if a record has not been ended).

2'. If it is after (another) line ender but not after a paragraph ender, it must leave a blank line, end a paragraph, and unindent.

2". If it occurs when a paragraph has been ended (and hence after a line has been ended) but not after an unindent, it must leave a blank line and also unindent. Note that the .IN 0 control that unindents also ends a paragraph (breaks). Hence case 2'' can not write any fewer DCF controls than case 2' needs, and the same decision table rule can handle both of these cases.

3. If it occurs after an unindent it need only leave a blank line, whether or not it occurs after a required page end.

L3 INPUT: RCR or IRT

| | 1 | 2 | 3 | 4 |
|---|---|---|---|---|
| PRIOR STATE: | | | | |
| ENDED DCF RECORD | N | Y | -Y | - |
| ENDED PARAGRAPH | -N | - | -Y | - |
| UNINDENTED | -N | N | Y | - |
| ENDED PAGE | -N | -N | - | - |
| LAST WAS CRE | -N | - | - | - |
| LAST WAS PE | -N | - | - | - |
| LAST WAS SHY | - | -N | -N | - |
| DELIMIT WUS | - | - | -Y | - |
| ENDED WORD | - | - | -Y | - |
| DCF OUTPUT: | | | | |
| EOR (END OF RECORD) | 1 | - | - | - |
| ONE SPACE + EOR | - | 1 | 1 | - |
| .BR + EOR | - | - | - | - |
| .IN 0 + EOR | 2 | 2 | - | - |
| .PA + EOR | - | - | - | - |
| PE BYTE | - | - | - | - |
| NEXT STATE: | | | | |
| ENDED DCF RECORD | Y | -Y | -Y | - |
| ENDED PARAGRAPH | Y | Y | -Y | - |
| UNINDENTED | Y | Y | -Y | - |
| ENDED PAGE | -N | -N | N | - |
| LAST WAS CRE | N | N | N | - |
| LAST WAS PE | N | N | N | - |
| LAST WAS SHY | N | -N | -N | - |
| DELIMIT WUS | Y | Y | -Y | - |
| ENDED WORD | Y | Y | -Y | - |

L3 INPUT: RCR or IRT

```
 ______________________________________
:                                      :
:        ANYTHING                      :
:                                      :  1
:                      *---------------------------------V
:                                      :                 :
:    __________________________________:                 :
:   :                                  :                 :
:   :        ENDED DCF RECORD          :                 :
:   :                                  :  2'             :
:   :                             *---------------------V :
:   :     _____________________________:             :   :
:   :    :                             :  2"         :   :
:   :    :    ENDED PARAGRAPH   *-------------------V   :
:   :    :                             :             :   :
:   :    :     ________________________:             :   :
:   :    :    :                        :  3'         :   :
:   :    :    :   UNINDENTED    *-----------V        :   :
:   :    :    :                        :    :        :   :
:   :    :    :     ___________________:    :        :   :
:   :    :    : *  :                   :  3"   :     :   :
:   :    :    : A  :    ENDED PAGE  *-----------V    :   :
:   :    :    : :  :                   :    :        :   :
:___:____:_ _:_:_:_____________________:    :        :   :
              :                             :        :   :
              :                             :        :   :
              :                             :        :   :
              K---K    SPACE EOR         K----K      :   :
              :                                      :   :
              :                                      :   :
              K---K  SPACE EOR           K-----------K   :
              :      .IN 0 EOR                           :
              :                                          :
              :                                          :
              K---K  EOR                  K--------------K
                     .IN 0 EOR
```

NOTE: Transformation does not depend on the prior state's
LAST WAS CRE or LAST WAS PE or ENDED WORD.
The next state always
resets LAST WAS CRE, resets last was PE,
and sets ENDED WORD.
Hence, for clarity, these states are not shown.

ZICR

A Zero Index Carrier Return moves straight left to the temporary left margin. This motion is supported in DCF if and only if the current position is already at the temporary left margin, in which case the ZICR causes no motion at all.

1. If ZICR occurs other than at the end of a record, UP transforms it (by default) like a CRE, that is, by ending the DCF record, and by then inserting a ".BR" control so that subsequent formatting of the text will not reflow text around the ZICR's location.

2. The special cases of a ZICR following either a CRE or a PE causes a paragraph end without unindenting. This is supported for both cases. It is supported for the CRE + ZICR case because the CRE moves down and left and the ZICR therefore causes no further motion. It is supported for the PE + ZICR case because any PE must follow a valid single-byte line ending control, the PE does not move the current position, and therefore the ZICR does not move the current position. The pair of controls CRE + ZICR or the pair of controls PE + ZICR transforms to .BR if the last paragraph has not already ended, in which case there has also not been an unindent. In this case, UP sets ENDED PARAGRAPH and resets LAST WAS CRE or LAST WAS PE. It would be equally correct to leave LAST WAS CRE or LAST WAS PE set, because each of several ZICRs that happen to follow one of these can be thought of as ending a paragraph. This does not matter because UP does not write redundant controls.

If ZICR occurs in any other situation, its only transformation is to reset ENDED PAGE. The other situations are as follows. Their completeness and consistency can be seen by noting that each region in the following state diagram is covered by one and only one rule number (colored pencils help) or by giving the decision table to an analysis program.

3. If ZICR comes after the end of a paragraph, whether or not ZICR comes after a CRE, do nothing except reset ENDED PAGE.

4. If ZICR comes after a record has been ended but the last thing is not a CRE or PE, do nothing except reset ENDED PAGE.

Note that the case consisting of ENDED RECORD, not LAST WAS CRE and NOT ENDED WORD is impossible. To see this, first note that NOT ENDED WORD implies not ENDED PARAGRAPH. The only things that end a record without also ending a paragraph are CRE and ZICR. (A PE looks as if it can do this; but, in fact, a PE itself must follow a line ender.) Hence, the only thing that gives ENDED DCF RECORD, not ENDED PARAGRAPH, and not LAST WAS CRE is ZICR. But ZICR does end a word. Therefore NOT ENDED WORD is impossible along with ENDED DCF RECORD, not ENDED PARAGRAPH, and not LAST WAS CRE. Therefore, the state diagrams contain a "P"shaped region that should be empty. It is labeled 4' and is overstruck "////" in the ZICR state diagram. If this region were not empty, then ZICR would need a rule for handling that case by setting ENDED WORD. Since it is empty its treatment is a don't care condition and it can be allowed to go along with the rest of rule 4. That is, the lower right entry in the decision table can be "-Y" instead of "Y". This relation among state variables looks just slightly accidental, so the possibility of this region's being non-empty is left in the state diagrams. None of the other algorithms are sensitive to whether or not this region is empty.

L3 INPUT: ZICR

| | 1 | 2' | 2" | 3 | 4 |
|---|---|---|---|---|---|
| PRIOR STATE: | | | | | |
| ENDED DCF RECORD | N | -Y | -Y | -Y | Y |
| ENDED PARAGRAPH | -N | N | N | Y | N |
| UNINDENTED | -N | -N | -N | - | - |
| ENDED PAGE | -N | -N | -N | - | - |
| LAST WAS CRE | -N | Y | -N | - | N |
| LAST WAS PE | -N | -N | Y | - | N |
| LAST WAS SHY | - | -N | -N | -N | -N |
| DELIMIT WUS | - | - | -Y | -Y | - |
| ENDED WORD | - | - | -Y | -Y | - |

L3 INPUT: ZICR

| | | | | | |
|---|---|---|---|---|---|
| **DCF OUTPUT:** | | | | | |
| EOR (END OF RECORD) | 1 | - | - | - | - |
| ONE SPACE + EOR | - | - | - | - | - |
| .BR + EOR | 2 | 1 | 1 | - | - |
| .IN 0 + EOR | - | - | - | - | - |
| .PA + EOR | - | - | - | - | - |
| PE BYTE | - | - | - | - | - |
| **NEXT STATE:** | | | | | |
| ENDED DCF RECORD | Y | -Y | -Y | -Y | -Y |
| ENDED PARAGRAPH | Y | Y | Y | -Y | -N |
| UNINDENTED | -N | -N | -N | - | - |
| ENDED PAGE | -N | -N | -N | N | N |
| LAST WAS CRE | -N | N | -N | N | -N |
| LAST WAS PE | -N | -N | N | N | -N |
| LAST WAS SHY | N | -N | -N | -N | -N |
| DELIMIT WUS | Y | Y | -Y | -Y | Y |
| ENDED WORD | Y | Y | -Y | -Y | Y |

L3 INPUT: ZICR

```
 ______________________________________________________________
:                                                    .         :
:                                                    .  NOT-   :
:                                                    .  ENDED- :
:          ANYTHING                                  .         :   1
:                                                    .     *-------------------V
:                                                    .         :   1           :
:                                             *--------------------------------V
:                                                    .         :               :
:    ________________________________________________.__________:               :
:    :                                               ./ WORD //:               :
:    :                                               .//////////:              :
:    :                 *4                            ./ *4' ///:               :
:    :                                               .//////////:              :
:    :                                               ./_________:              :
:    :                                               ./.        :   2          :
:    :           ENDED DCF RECORD                    ./.   *--------------V    :
:    :                                               ._.________:         :    :
:    :                                                 .        :   2     :    :
:    :                                                 .   *--------------V    :
:    :                                                 .        :         :    :
:    :      ___________________________________________.________:         :    :
:    :     :                                           .        :         :    :
:    :     :       ENDED PARAGRAPH                     .        :         :    :
:    :     : *3                                        .   *3   :         :    :
:    :     :     ______________________________________.________:         :    :
:    :     :    :                                      . LAST-  :         :    :
:    :     :    :      UNINDENTED                      . WAS-   :         :    :
:    :     :    : *3                                   .   *3   :         :    :
:    :     :    :     _________________________________.________:         :    :
:    :     : *  :    :                                 . CRE-   :         :    :
:    :     : A  :    :     ENDED PAGE                  . OR PE  :         :    :
:    :     : :  :    :   *3                            .   *3   :         :    :
:    :     : :  :    :                                 .        :         :    :
:____:_____:_:_:_:___:_________________________________:________:         :    :
             :                                                            :    :
             :                                                            :    :
             K-----------K   .BR EOR   K----------------K                      :
             :                                                                 :
             :                                                                 :
             K-----------K        EOR  K--------------------K
                              .BR EOR
```

*3, *4: No output; no state change except reset ENDED PAGE

PE

The Page End single-byte control in L3 signals the end of a Text Unit and an optional end of a printed page. It is "optional" because, in general, the paginator can move PEs to move page boundaries. DW processes a PE as if it were a CRE, except that a PE never leaves a blank line, even though a PE always follows a valid single-byte control line ender. In L3, a PE is always followed by the end of the current Body Text vector. Unless this is the last Body Text vector, a Text Unit Prefix comes next followed by zero or more format-changing structures which can transform to several DCF controls.

When UP receives a PE, hex '0C', in the L3 datastream, UP places a hex '0C' into the DCF data stream, so that any subsequent DOWN transform can preserve preexisting pagination.

Displaywriter's editor always puts a CRE ahead of any PE. Therefore, Rule 1 handles the only normal case of a PE occurring when the DCF record has been ended. However, a DW operator can delete the CRE. Rule 2 handles this very unusual case by ending the DCF record when the record is not already ended.

UP does not end a record after the PE byte. Doing so would give the DCF formatter a null record. This is because the 0C always goes at the start of a record (since the PE must follow a line ender in L3) and because the DCF formatter ignores the 0C byte altogether (since an implicit .TS 0C // control is at the start of every document produced by UP).

Writing a PE byte into the DCF datastream begins a DCF record with a byte that the DCF formatter is told to ignore. The ENDED DCF RECORD state bit therefore need not be reset. If it had to be reset, then so would ENDED PARAGRAPH, UNINDENTED, and ENDED PAGE. In fact, RPE sets all of these. The PE that follows the RPE absolutely must not reset them.

The new state remembers that the last item in L3 was a PE so that the first character in the next Text Unit's Body Text can begin a new paragraph if necessary. The new state also remembers that the PE ended a word. The inability to hyphenate a word across a physical page boundary helps both text readers and text processing programmers.

A PE does not cause a .PA because it does not imply an author's requirement to start a new page. Therefore, PE does not set ENDED PAGE, which refers to a required page end. However, PE is the one thing in a Body Text vector that does not reset ENDED PAGE. In a paginated document, an RPE is always followed by a PE. Having PE reset ENDED PAGE would defeat the goal of remembering that a RPE was the last thing in a Body Text vector, so an AAM, for example, must not write out a .PA control.

No state diagram is given for PE because a state diagram makes the transformation look much more complex than the decision table does.

L3 INPUT: PE

| | 1 | 2 | 3 | 4 |
|---|---|---|---|---|
| PRIOR STATE: | | | | |
| ENDED DCF RECORD | Y | N | - | - |
| ENDED PARAGRAPH | - | - | - | - |
| UNINDENTED | - | - | - | - |
| ENDED PAGE | - | - | - | - |
| LAST WAS CRE | - | - | - | - |
| LAST WAS PE | - | - | - | - |
| LAST WAS SHY | - | - | - | - |
| DELIMIT WUS | - | - | - | - |
| ENDED WORD | - | - | - | - |
| DCF OUTPUT: | | | | |
| EOR (END OF RECORD) | - | 1 | - | - |
| ONE SPACE + EOR | - | - | - | - |
| .BR + EOR | - | - | - | - |
| .IN 0 + EOR | - | - | - | - |
| .PA + EOR | - | - | - | - |
| PE BYTE | 1 | 2 | - | - |
| NEXT STATE: | | | | |
| ENDED DCF RECORD | -Y | Y | - | - |
| ENDED PARAGRAPH | - | - | - | - |
| UNINDENTED | - | - | - | - |
| ENDED PAGE | - | - | - | - |
| LAST WAS CRE | N | N | - | - |
| LAST WAS PE | Y | Y | - | - |
| LAST WAS SHY | N | N | - | - |
| DELIMIT WUS | Y | Y | - | - |
| ENDED WORD | Y | Y | - | - |

!

RPE

A Required Page End expresses an author's intent to begin a new page. It also ends a record, ends a paragraph, and causes unindenting, if these are not already done. DW processes an RPE like an RCR except that an RPE does not normaly cause a blank line, even after a line ender. UP transforms RPE into DCF's .PA control to preserve author's intent, even though DW does not start a new page at an RPE unless the DW operator has requested pagination. The paginator puts a PE after each RPE, and the PE causes a new page.

The UP transformation depends on prior state only to determine which of the possible outputs would be redundant and are therefore not to be put into the DCF datastream. In particular, an RPE results in a .PA even if the ENDED PAGE state bit is already set. This state bit is used to suppress generation of a wrong (not just redundant) .PA control in response to APM or other structure that implies a RPE but never generates a blank page. Several successive RPEs do express an author's intent to leave blank pages.

Note that the L3 sequence "Line ending control, RPE, no PE" will cause a blank line in L3 but not in the transformed document produced by UP. This will occur only in an unpaginated L3 document and is not considered to be an error in transformation.

L3 INPUT: RPE

| | 1 | 2 | 3 | 4 |
|---|---|---|---|---|
| **PRIOR STATE:** | | | | |
| ENDED DCF RECORD | N | Y | -Y | - |
| ENDED PARAGRAPH | -N | - | -Y | - |
| UNINDENTED | -N | N | Y | - |
| ENDED PAGE | -N | -N | - | - |
| LAST WAS CRE | -N | - | - | - |
| LAST WAS PE | -N | - | - | - |
| LAST WAS SHY | - | -N | -N | - |
| DELIMIT WUS | - | - | - | - |
| ENDED WORD | - | - | - | - |
| **DCF OUTPUT:** | | | | |
| EOR (END OF RECORD) | 1 | - | - | - |
| ONE SPACE + EOR | - | - | - | - |
| .BR + EOR | - | - | - | - |
| .IN 0 + EOR | 2 | 1 | - | - |
| .PA + EOR | 3 | 2 | 1 | - |
| PE BYTE | - | - | - | - |
| **NEXT STATE:** | | | | |
| ENDED DCF RECORD | Y | -Y | -Y | - |
| ENDED PARAGRAPH | Y | Y | -Y | - |
| UNINDENTED | Y | Y | -Y | - |
| ENDED PAGE | Y | Y | Y | - |
| LAST WAS CRE | -N | N | N | - |
| LAST WAS PE | -N | N | N | - |
| LAST WAS SHY | N | -N | -N | - |
| DELIMIT WUS | Y | Y | Y | - |
| ENDED WORD | Y | Y | Y | - |

! (marked beside the ENDED PAGE rows)

L3 INPUT: RPE

```
:                                          :
:       ANYTHING                           :  1
:                        *---------------------------------V
:                                          :               :
:   ____________________________________   :               :
:   :                                      :               :
:   :       ENDED DCF RECORD               :               :
:   :                                      :  2'           :
:   :                    *-----------------------------V   :
:   :     _____________________________    :           :   :
:   :     :                                :  2"       :   :
:   :     :   ENDED PARAGRAPH    *-------------------V   :
:   :     :                                :           :   :
:   :     :   ______________________       :           :   :
:   :     :   :                            :  3'       :   :
:   :     :   :   UNINDENTED     *-----------V         :   :
:   :     :   :                            :  :        :   :
:   :     :   :   _________________        :  :        :   :
:   :     :   :   :                        :  3" :     :   :
:   :     :   :   :   ENDED PAGE *-----------V         :   :
:   :     :   :   : *                      :  :        :   :
:___:_____:_ _:_ _:_A______________________:  :        :   :
                    :                         :        :   :
                    :                         :        :   :
                    :                         :        :   :
                    K--K  .PA EOR     K-------K        :   :
                    :                                  :   :
                    :                                  :   :
                    :                                  :   :
                    K--K  .IN 0 EOR   K----------------K   :
                    :     .PA   EOR                        :
                    :                                      :
                    :                                      :
                    K--K  EOR               K--------------K
                          .IN 0 EOR
                          .PA   EOR
```

NOTE: Transformation does not depend on the prior state's LAST WAS CRE or LAST WAS PE or ENDED WORD. The next state always resets LAST WAS CRE, resets last was PE, and sets ENDED WORD. Hence, for clarity, these states are not shown.

LFC OR RMLF

Either the Line Format Change sequence of multi-byte controls (i. e. BLFC, SLP, STAB, and ELFC), or the Return to Master Line Format multi-byte control, should follow a line ender. In the UP transform, either of these ends a DCF record if it does not, for some reason, follow a line ender. It ends a paragraph, causes unindent, and ends a word, if any of these are necessary. However, it never causes a blank line, even when it occurs after a line ender control.

Note that the SLP and STAB multi-byte controls in a LFC sequence, or the RTMF itself, can cause generation of several DCF controls. The break control, unindent control, or end of record generated for the LFC or RTMF as a whole precede these "OTHERS REQUIRED", as shown in the decision table and state diagram.

A reasonable case could be made for the idea that either of these could leave ENDED PAGE set, if either of these is the last thing in a Text Unit that otherwise ends with RPE and (if paginated) PE. However, this case makes no sense, because APM and the other structures that pay attention to ENDED PAGE all override the changes that an LFC or a RMLF makes. Hence, for simplicity, these will reset the ENDED PAGE STATE BIT.

L3 INPUT: LFC or RMLF

| | 1 | 2 | 3 | 4 |
|---|---|---|---|---|
| PRIOR STATE: | | | | |
| ENDED DCF RECORD | N | Y | -Y | - |
| ENDED PARAGRAPH | -N | - | -Y | - |
| UNINDENTED | -N | N | Y | - |
| ENDED PAGE | -N | -N | - | - |
| LAST WAS CRE | -N | - | - | - |
| LAST WAS PE | -N | - | - | - |
| LAST WAS SHY | - | -N | -N | - |
| DELIMIT WUS | - | - | - | - |
| ENDED WORD | - | - | - | - |
| DCF OUTPUT: | | | | |
| EOR (END OF RECORD) | 1 | - | - | - |
| ONE SPACE + EOR | - | - | - | - |
| .BR + EOR | - | - | - | - |
| .IN 0 + EOR | 2 | 1 | - | - |
| .PA + EOR | - | - | - | - |
| PE BYTE | - | - | - | - |
| OTHERS REQUIRED | 3 | 2 | 1 | - |
| NEXT STATE: | | | | |
| ENDED DCF RECORD | Y | -Y | -Y | - |
| ENDED PARAGRAPH | Y | Y | -Y | - |
| UNINDENTED | Y | Y | -Y | - |
| ENDED PAGE | N | N | N | - |
| LAST WAS CRE | -N | N | N | - |
| LAST WAS PE | -N | N | N | - |
| LAST WAS SHY | N | N | N | - |
| DELIMIT WUS | Y | Y | Y | - |
| ENDED WORD | Y | Y | Y | - |

```
 L3 INPUT:    LFC or RMLF

______________________________________________
:                                            :
:        ANYTHING                            :   1
:                        *------------------------------------V
:                                            :                :
:    ________________________________________:                :
:    :                                       :                :
:    :        ENDED DCF RECORD               :                :
:    :                                       :   2'           :
:    :                   *------------------------------V     :
:    :      _________________________________:          :     :
:    :      :                                :   2"     :     :
:    :      :     ENDED PARAGRAPH     *---------------------V     :
:    :      :                                :          :     :
:    :      :    ____________________________:          :     :
:    :      :    :                           :   3'     :     :
:    :      :    :     UNINDENTED     *-----------V     :     :
:    :      :    :                           :    :     :     :
:    :      :    :    _______________________:    :     :     :
:    :      :    :    :                      :   3"    :     :     :
:    :      :    : *  :    ENDED PAGE   *-----------V     :     :
:    :      :    : A  :                      :    :     :     :
:___:_____:_ _:_:_:_ ______________________:    :     :     :
                   :                              :     :     :
                   :                              :     :     :
                   K------K  OTHERS REQUIRED  K-K     :     :
                   :                                    :     :
                   :                                    :     :
                   :                                    :     :
                   K------K  .IN 0 EOR  K---------------K     :
                   :         OTHERS REQUIRED                  :
                   :                                          :
                   :                                          :
                   K------K  EOR                K-------------K
                             .IN 0 EOR
                             OTHERS REQUIRED
```

NOTE: Transformation does not depend on the prior state's LAST WAS CRE or LAST WAS PE or ENDED WORD. The next state always resets LAST WAS CRE, resets last was PE, and sets ENDED WORD. Hence, for clarity, these states are not shown.

PARAGRAPHERS: RSP, UBS, NBS, OR BS

Any of the Required SPace, Unit BackSpace Numeric BackSpace, and BackSpace single byte-controls in L3 starts a new paragraph when it follows a CRE or a PE. Otherwise, it does not even cause a line end.

This is very different from other paragraph delimiters. Any other paragraph delimiter ends the old paragraph; one of RSP, UBS, NBS, or BS (if it follows CRE or PE and if a paragraph has not just ended) begins a new paragraph. The difference is that the next state produced by one of these has all of the state bits reset. After one of these has been transformed into the output DCF datastream, we are not at the end of a DCF record (because this character is in the record) we are not at the end of a paragraph (instead, we are one character into the new paragraph), we are not necessarily unindented (because a user is free to edit in an indentation here), and we can not be at the required end of a page.

There is one weird case here. A UBS is ignored by the DCF formatter. It is possible to generate a record containing just a UBS byte. This is treated as a null record. Tough.

UP transforms each of RSP, UBS, NBS, and BS into the corresponding character in DCF. That is, in DCF, the byte is equal to the single-byte control in L3.

1. If one of these follows a CRE or follows a PE, but ENDED PARAGRAPH is not already set, then UP writes out a .BR control, ends that record, puts the corresponding character in the new record, and resets all of the state bits.

2. If one of these follows neither a CRE nor a PE, or if ENDED PARAGRAPH is already set, then UP just writes the corresponding character and resets all of the state bits.

The fact that UP can write the same simple output in rules 1 and 2 below seems to be an accident that results from the following line of reasoning.

Note that one of RSP, UBS, NBS, and BS that "follows" a PE may follow the PE at a considerable distance. Any PE ends a Text Unit. The new TU may have an APM, TUFC, MT, MP, or other format-setter before its Body Text vector. Any format-setter always ends a line, ends a paragraph, unindents, and (by implication) ends a page. Hence the case where RSP, UBS, NBS, or BS follows a PE and yet ENDED PARAGRAPH is false, can occur only when the Text Unit's BT vector started without a format-setter. In this case the DCF output is left with a record that contains only a PE byte.

A .TS 0C // control is implied at the start of any document UP generates. This control tells the DCF formatter to ignore a PE byte, hex'0C'. If UP wrote out an EOR and then a .BR, it would leave the DCF formatter with a record containing only the PE byte. The DCF formatter would treat that as a null record with undesirable results. At the start of a new Body Text vector, UP transforms graphic characters without first ending a record. It must also refrain from starting with an EOR for RLM, RSP, UBS, NBS, or BS, even though what it writes out first in response to the new Body Text vector is a control. The DCF formatter will recognize the control as a control because the DCF formatter ignores the PE byte that is in "column" one and sees the .BR as starting in "column" one.

The RSP, UBS, NBS, and BS controls are not identical in the way they delimit words. RSP is not a word delimiter. The others delimit a word for purposes of WUS, but not for such general purposes as hyphenation. Therefore, although these are combined into one decision table for convenience of exposition, they require slightly different processing.

Any one of several other things in L3 also ends a paragraph when it follows a CRE or a PE; but does not require a special transformation. Any of IT, SP, HT, or NSP also ends a paragraph when it follows CRE or PE; but it needs no special transformation. An IT transforms into a .IN h control when the IT follows a CRE. Any of the others transforms into a SPACE or a TAB in DCF, and a DCF record that starts with a SPACE or a TAB is treated as an automatic break. An ATF also ends a paragraph when it follows a CRE or a PE; but it has its own (imperfect) transformation for this case. Either of CRE or ZICR also ends a paragraph when it follows a CRE or PE; but CRE and ZICR are delimiters in their own rights and have separate algorithms. Release Left Margin also ends a paragraph when it follows CRE or PE; but it can not be generated in DW.

L3 INPUT: RSP, UBS, NBS, OR BS

| | 1' | 1" | 2' | 2" |
|---|---|---|---|---|
| PRIOR STATE: | | | | |
| ENDED DCF RECORD | -Y | -N | - | -Y |
| ENDED PARAGRAPH | N | N | N | Y |
| UNINDENTED | -N | -N | -N | - |
| ENDED PAGE | -N | -N | -N | - |
| LAST WAS CRE | Y | -N | N | - |
| LAST WAS PE | -N | Y | N | - |
| LAST WAS SHY | -N | -N | - | - |
| DELIMIT WUS | - | - | - | - |
| ENDED WORD | - | - | - | - |
| DCF OUTPUT: | | | | |
| EOR (END OF RECORD) | - | - | - | - |
| ONE SPACE + EOR | - | - | - | - |
| .BR + EOR | 1 | 1 | - | - |
| .IN 0 + EOR | - | - | - | - |
| .PA + EOR | - | - | - | - |
| PE BYTE | - | - | - | - |
| UNIQUE CHARACTER | 2 | 2 | 1 | 1 |
| NEXT STATE: | | | | |
| ENDED DCF RECORD | N | N | N | N |
| ENDED PARAGRAPH | Y | Y | N | N |
| UNINDENTED | -N | -N | -N | N |
| ENDED PAGE | -N | -N | -N | N |
| LAST WAS CRE | N | -N | N | N |
| LAST WAS PE | -N | N | N | N |
| LAST WAS SHY | -N | -N | N | N |
| DELIMIT WUS | * | * | * | * |
| ENDED WORD | N | N | N | N |

* UBS, NBS, and BS set DELIMIT WUS and reset ENDED WORD

RSP resets DELIMIT WUS and resets ENDED WORD

L3 INPUT: RSP, UBS, NBS, OR BS

```
__________________________________________
: *2'      ANYTHING             .   .  not-     :
:                               .   .  DELIMIT- :
:      (for RSP)                .   .  WUS      :
: :-----------------------------*       2'     :
: :    (for UBS, NBS, BS)   .   .______________:
: :---------------------------*         2'     :
: :                           .         not-   :
: :                           .         ENDED- :
: :  _________________________.________________:
: : : *2'                     .///////WORD///:
: : :                         .//////////////:
: : :                         .//////_________:  1
: : :   ENDED DCF RECORD      .//////.  *-------------V
: : :                         ._______._______:  1     :
: : :                                 .  *-------------V
: : :                                 .       :        :
: : :    _________________________.________:        :
: : :    : *2"                    . *2"     :        :
: : :    :      ENDED PARAGRAPH   .         :        :
: : :    :                        .         :        :
: : :    :   _____________________.________:        :
: : :    :   : *2"                .  *2"    :        :
: : :    :   :                    . LAST-   :        :
: : :    :   :    UNINDENTED      . WAS-    :        :
: : :    :   :   _________________._________:        :
: : :    :   :   : *2"            . CRE-    :        :
: : :    :   :   :   ENDED PAGE   . OR PE   :        :
: : :    :   :   :                          :        :
: : :    :   :   :                .  *2"    :        :
:_:_:____:___:___:________________:_________:        :
  :                                                  :
  :                                                  :
  K------------K  .BR EOR                    K------K
  :               CORRESPONDING CHARACTER
  :                                                 STATE
  K------------K CORRESPONDING CHARACTER     K----K 2" OR
                                                    2'
```

PAGERS: APM, AAM, TUFC, AND RTMF

Any of the first level structures Activate Primary Master (i. e. use the PMF), Activate Alternate Master (i. e. use the AMF), Text Unit Format Change (i. e. use format given in the structure itself), and Return To Master Format (i. e. use whichever of PMF and AMF was in use most recently) implies a Required Page End in the preceding Text Unit, whether an RPE was actually there or not. If not, and if this is not the start of the document, then the UP transform has not already written a .PA control into the DCF datastream and UP must do so in response to this structure.

These structures can not occur in a Body Text vector. They must occur after a PE or at the start of a document. L3 architecture says that they end a paragraph when they follow a PE. This is uninteresting because requiring a page end implies requiring unindenting, ending a paragraph, and ending a record.

UP need not test whether one of these structures follows a PE, because it always either follows a PE or is at the start of a document. However, UP must know the prior state to avoid writing out redundant or wrong controls.

In particular, writing out a second successive .PA in response to one of these structures that follows a RPE control is wrong because that would leave a blank page in the DCF document that was not present in the L3 document. Moreover, two of these structures can occur together. No more than one of them must transform to a .PA control, for the same reason. The mechanism for accomplishing this uses the ENDED PAGE state bit. RPE and these structures set it. Whenever it is set, it prevents these structures (but not RPE) from writing .PA.

Writing .IN 0 is redundant if, at the point where this control appears, we have already ended a paragraph and unindented. Ending a record is wrong if we have already ended a record, because that causes a null record and perhaps a blank line. This structure may appear right after a PE control (which is then the only thing in a DCF record so far, because a PE must follow a line ending control, and which leaves ENDED DCF RECORD set) or after DCF controls written into the datastream in response to another one of these structures. Each such DCF control is followed by an EOR, leaves ENDED DCF RECORD reset, and leaves others as is. This structure must not cause a blank line or a null record. Therefore, after a PE, this structure's resultant DCF controls must go in the same record as the PE itself. This is normal. The controls in the decision tables show where EORs go, and the EORs tend to go at the ends of controls, not before them.

L3 INPUT: APM, AAM, TUFC, AND RTMF

| | 1 | 2 | 3 | 4 |
|---|---|---|---|---|
| PRIOR STATE: | | | | |
| ENDED DCF RECORD | -Y | -Y | -Y | - |
| ENDED PARAGRAPH | - | -Y | -Y | - |
| UNINDENTED | N | Y | -Y | - |
| ENDED PAGE | -N | N | Y | - |
| LAST WAS CRE | -N | - | -N | - |
| LAST WAS PE | -Y | -Y | -Y | - |
| LAST WAS SHY | -N | -N | -N | - |
| DELIMIT WUS | -Y | -Y | -Y | - |
| ENDED WORD | -Y | -Y | -Y | - |
| DCF OUTPUT: | | | | |
| EOR (END OF RECORD) | - | - | - | - |
| ONE SPACE + EOR | - | - | - | - |
| .BR + EOR | - | - | - | - |
| .IN 0 + EOR | 1 | - | - | - |
| .PA + EOR | 2 | 1 | - | - |
| PE BYTE | - | - | - | - |
| NEXT STATE: | | | | |
| ENDED DCF RECORD | -Y | -Y | -Y | - |
| ENDED PARAGRAPH | Y | -Y | -Y | - |
| UNINDENTED | Y | Y | -Y | - |
| ENDED PAGE | Y | Y | -Y | - |
| LAST WAS CRE | -N | N | -N | - |
| LAST WAS PE | -Y | -Y | -Y | - |
| LAST WAS SHY | -N | -N | -N | - |
| DELIMIT WUS | -Y | -Y | -Y | - |
| ENDED WORD | -Y | -Y | -Y | - |

L3 INPUT: APM, AAM, TUFC, AND RTMF

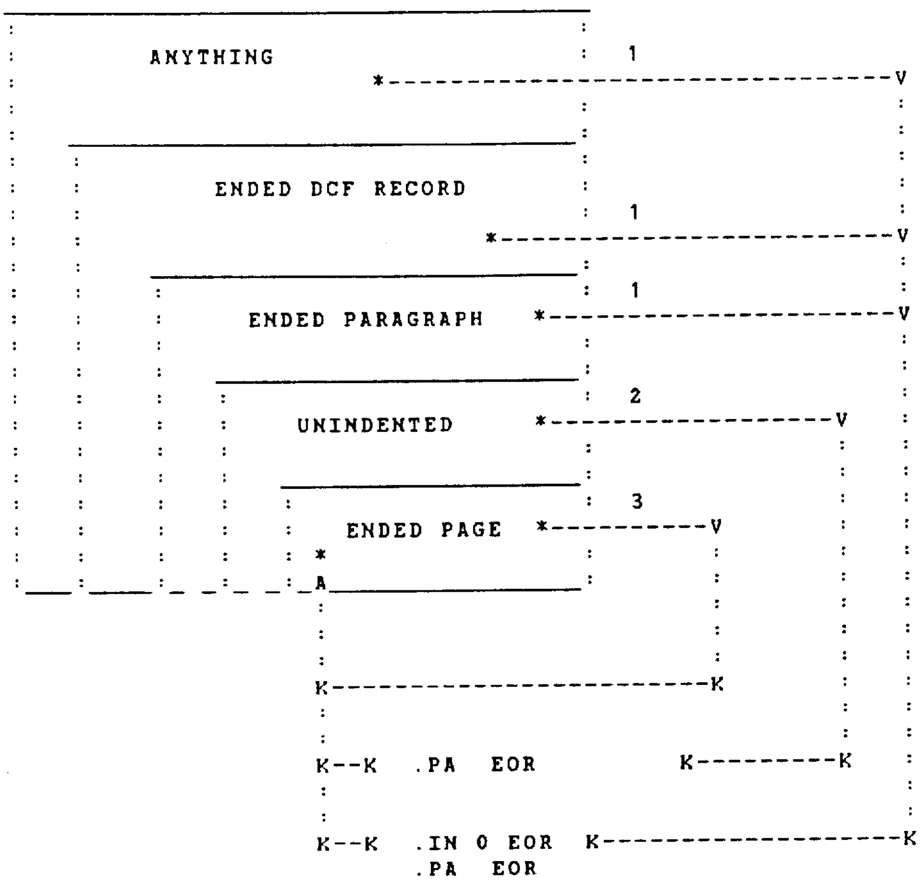

NOTE: Transformation does not depend on the prior state's LAST WAS CRE or LAST WAS PE or ENDED WORD. The next state always resets LAST WAS CRE, leaves last was PE unchanged, and leaves ENDED WORD unchanged. Hence, for clarity, these states are not shown.

OTHER CONTROLS AND STRUCTURES

UP transforms the other L3 items (single-byte controls, multi-byte controls, second level structures, first level structures, and parameters of these structures) independently of these state bits. However many L3 items must reset these state bits.

For example, the first graphic character after an RPE control must reset all of the state bits because we are no longer at the end of a record, we are no longer at the end of a paragraph, we are no longer at the required end of a page, the last control was not CRE, the last control was not PE, and (after editing) there can be nonzero indent tab level.

Multi-byte controls not mentioned above do not set or reset the state bits, single-byte controls exceeding x'41' do not set or reset the state bits, and structure not mentioned do not set or reset the state bits. Note that NSP (X'E1') and SHY (X'CA') are treated separately.

STATE BIT USAGE IN TRANSFORMING MARGIN TEXT

Redefinition of margin text can occur only after a TUFC, APM, AAM, or RTMF first level structure, between a PE and the next Text Unit's Body Text vector. The APM, AAM and RTMF structures define a return to margin text that was transformed from L3 to DCF previously, so no text transformation is done in the middle of the document in response to one of these structures.

Very little information about the state left by the preceding Body Text needs to be preserved across transformation of the L3 that redefines margin text. This is because the TUFC, APM, AAM, or RTMF implies a required page end and hence implies the value of all of the state bits.

The transformation of text at the start of the next Body Text vector depends on the fact that it is the first text in a Text Unit but that this is not the first text unit of the document. This is signified by the LAST WAS PE bit's being on. UP saves LAST WAS PE before it starts transforming margin text, and restores the initial value afterward.

The presence or absence of an RPE at the end of the prior Text Unit's Body Text vector, just before the PE that ended that Text Unit, affects the transformation of margin text and would affect the transformation of one of APM, AAM, RTMF, or TUFC if that could follow the definition of margin text. The information about whether or not there was a final RPE is contained in the ENDED PAGE bit. Again, UP saves the value of ENDED PAGE before starting to transform margin text.

With these exceptions, UP can simply set all state bits to a given state after transforming margin text. That given state is the same as the initial state for a document.

STATE AT END OF MARGIN TEXT DEFINITION

| | |
|---|---|
| ENDED DCF RECORD | Y |
| ENDED PARAGRAPH | Y |
| UNINDENTED | Y |
| ENDED PAGE | * |
| LAST WAS CRE | N |
| LAST WAS PE | * |
| LAST WAS SHY | N |
| DELIMIT WUS | Y |
| ENDED WORD | Y |

* SET TO STATE EXISTING BEFORE MARGIN TEXT DEFINITION

Thus UP can use the same state bits for transforming Margin Text vectors that it uses for transforming Body Text vectors. Before starting to transform a Margin Text vector, UP simply resets each state bit to its initial value. The transformations of delimiters are the same. UP need not even check for the few controls that are not allowed in margin text. They won't be there.

UP'S BACKING UP FOR WUS AMD ATF

Two situations require UP to back up and change DCF it has already generated. Neither of the situations requires UP to back up beyond the record that UP is preparing , so a reasonable implementation uses the fact that UP buffers the last record in main store before writing it out on a disk.

The two situations that require backing up are Word UnderScore or WUS and Align Text Field or ATF.

WORD UNDERSCORE

WUS is a single-byte control that appears in Body Text to cause underscoring of the previous word. UP has no precognition that this will be necessary when UP starts processing the word that is to be underscored.

UP transforms the WUS itself into the DCF control

.US OFF to end underscoring at the end of the word. That is easy. The hard part is to start the underscoring at the start of the preceding word.

UP keeps the entire last record of DCF output available and is always prepared to go back and insert the

.US ON control just after the most recent WUS delimiter. UP saves a pointer to the position in the buffer of the most recent WUS delimiter, to avoid the necessity to scan back for it.

ALIGN TEXT FIELD

ATF is a multi-byte control that can center any field about the point of the ATF control, whereas all that DCF's .CE control can do is center an entire line about the middle of the current typing area.

As a result, the only use of ATF that UP can transform correctly is the case where L3 contains a line ender, some SP (space) characters, RSP (Required SPace) characters, or HT (Horizontal Tab) characters, and then the ATF. The text that is to be centered follows the ATF and ends at the next line ender. Note that an ATF that follows even one space is interpreted as an intent to center the following text.

1. UP transforms this L3 sequence by discarding the record that contains only blank text and beginning the record over again with a .CE control and no additional EOR. The end of the text to be centered takes care of itself at the next line ender.

This has only one reasonable design. UP keeps each output DCF record until something in L3 transforms to an End Of Record in DCF, then commits the record. When UP gets an ATF, it looks to see whether the record it has been building up contains at least one space and nothing other than spaces, required spaces and tab characters. If both of these conditions are satisfied, then UP returns to the start of that record, puts in .CE, and proceeds with ordinary transformation. UP could avoid scanning by keeping track of whether it has put anything except spaces, required spaces and tab characters in the current record. Any other transformation of ATF sets the bit that warns an operator that transformation was not perfect.

2. If UP gets an ATF when it has just ended a DCF record, UP notes that the operator is trying to center text around the left margin and therefore does not try to center anything. This is what DW does.

3. As a special case of an ATF when UP has just ended a DCF record, UP does obey the rule that an ATF after a CRE or a PE ends a paragraph. UP always obeys the rule that ATF ends a word.

4. If UP gets an ATF when it has put non-blank characters in the current output DCF record, UP ends the record (i. e. generates an EOR), starts the new record with a .CE control, sets a severe warning bit, and proceeds. This is as good a transformation of L3's centering a field that is only part of a line, as DCF is capable of.

The latter algorithm also handles the fact that a second ATF is, itself, a delimiter for the field centered by a previous ATF. The second ATF appears when a record contains the previous ATF and its text. Therefore, UP transforms the second ATF to an EOR and a .CE that starts the next record. That EOR ends the text centered by the previous ATF.

L3 INPUT: ATF

| | 1 | 2 | 3' | 3" | 4 |
|---|---|---|---|---|---|
| PRIOR STATE: | | | | | |
| ALL-BLANK RECORD | Y | -Y | -Y | -Y | N |
| ENDED DCF RECORD | N | Y | -Y | -Y | -N |
| ENDED PARAGRAPH | -N | - | N | N | -N |
| UNINDENTED | -N | - | -N | -N | -N |
| ENDED PAGE | -N | - | -N | -N | -N |
| LAST WAS CRE | -N | N | Y | -N | -N |
| LAST WAS PE | -N | N | -N | Y | -N |
| LAST WAS SHY | -N | -N | -N | -N | - |
| DELIMIT WUS | - | - | - | - | - |
| ENDED WORD | - | - | - | - | - |
| DCF OUTPUT: | | | | | |
| ERASE RECORD SO FAR | 1 | - | - | - | - |
| .CE | 2 | - | - | - | 2 |
| EOR (END OF RECORD) | - | - | - | - | 1 |
| ONE SPACE + EOR | - | - | - | - | - |
| .BR + EOR | - | - | 1 | 1 | - |
| .IN 0 + EOR | - | - | - | - | - |
| .PA + EOR | - | - | - | - | - |
| PE BYTE | - | - | - | - | - |
| NEXT STATE: | | | | | |
| ERROR WARNING | - | Y | Y | Y | Y |
| ENDED DCF RECORD | -N | -Y | -Y | -Y | -N |
| ENDED PARAGRAPH | -N | - | Y | Y | -N |
| UNINDENTED | -N | - | - | - | -N |
| ENDED PAGE | -N | -N | -N | N | -N |
| LAST WAS CRE | -N | -N | N | -N | -N |
| LAST WAS PE | -N | -N | -N | N | -N |
| LAST WAS SHY | -N | -N | -N | -N | N |
| DELIMIT WUS | Y | Y | Y | Y | Y |
| ENDED WORD | Y | Y | Y | Y | Y |

```
   L3 INPUT:  ATF
 ____________________________________________  4
 :                  :  NOT-  *---------------------------V
 :                  :  BLANK-   .         :  4          :
 :                  :  RECORD   .    *-------------------V
 :                  _______________________:             :
 :                              .  NOT-    :             :
 :                              .  ENDED-  :  1          :
 :        ANYTHING              .    *----------------V  :
 :                              .         :  1        :  :
 :                        *--------------------------V  :
 :   _____________________________.________:        :  :
 :   :                            ./ WORD //:        :  :
 :   :                            .//////////:        :  :
 :   :                            ./ *2 ////:        :  :
 :   :                            .//////////:        :  :
 :   :                            ./_________:        :  :
 :   :                            ./.       :  3      :  :
 :   :       ENDED DCF RECORD     ./.  *-------------V :  :
 :   :                            ._.________:    :   :  :
 :   :                              .       :  3  :   :  :
 :   :   *2                         .  *-------------V :  :
 :   :    ___________________________.________:   :   :  :
 :   :    :                          .        :   :   :  :
 :   :    :    ENDED PARAGRAPH       .        :   :   :  :
 :   :    : *2                       .   *    :   :   :  :
 :   :    :   _______________________.________:   :   :  :
 :   :    :   :                      . LAST-  :   :   :  :
 :   :    :   :    UNINDENTED        . WAS-   :   :   :  :
 :   :    :   : *2                   .   *    :   :   :  :
 :   :    :   :   ___________________.________:   :   :  :
 : * :    : * :   :                  . CRE-   :   :   :  :
 : : :    : A :   :    ENDED PAGE    . OR PE  :   :   :  :
 : : :    : : :   :  *3              .  *3    :   :   :  :
 :_:_:____:_:_:___:__________________:________:   :   :  :
   :        :                                     :   :  :
   :        K-----------K  .BR EOR          K--------K  :  :
   :                       ERROR WARNING               :  :
   :                                                   :  :
   K--------------------K  ERASE RECORD SO FAR  K------K  :
   :                       .CE                            :
   :                                                      :
   K--------------------K  EOR  .CE         K--------------K
                           ERROR WARNING
     *2: No output; no state change except reset ENDED PAGE
                    and set the ERROR bit.
```

6. DOWN'S ALGORITHMS FOR USE DURING A SEQUENCE

DOWN'S TRANSFORMATIONS OF SHORT SEQUENCES

The simplest transformation that DOWN implements is the transformation of records that contain only text i. e. graphic characters but no DCF controls such as text1 EOR
  text2 EOR where text1 and text2 are arbitrary strings of graphic characters AND EOR means End Of Record. DOWN transforms such records by converting the graphic characters from DP EBCDIC to MLP and transforming each EOR to CRE (carrier return).

The next simplest transformation that DOWN implements is the transformation of one DCF control, all alone in a record, between two records that contain only text, such as

```
text1 EOR
.XX EOR
text2 EOR
```

where .XX is any supported DCF control. DOWN transforms text1 into the corresponding characters in L3 and transforms the sequence that consists of the EOR and the .XX control into the L3 shown in the following table.

Note that some of the transformations to L3 given in the table do not begin by writing out a CRE. They are marked "*1". Hence, even for this simplest case of one DCF control between two records that contain only text, DOWN can not treat the control all by itself. DOWN should not be forced to erase a CRE that it has already written and DOWN should not be forced to look ahead to see what DCF input comes next. These are avoided by considering the EOR to be a full member of the sequence to be transformed. DOWN does not write out any L3 until a sequence ends, often at some more text such as "text2" in the above example. The following table is correct only if this sequence consists of both the EOR that follows "text1" and the control given. The EOR at the end of the control is not distinguished from the EOR at the end of "text1"; but the transformation of a control that does not cause a break would be different if neither EOR were in the sequence. These transformations are marked "*7".

DOWN's TRANSFORMATION OF AN ISOLATED DCF CONTROL TO L3

| FROM DCF CONTROL ".XX" | TO L3 | NOTES |
|---|---|---|
| .BR | CRE ZICR | |
| .PA | RPE ITs | *1 *4 |
| .SK v | CREs | *3 |
| .SP v | RSP CRE s | *3 |
| .PP | RSP CRE s | *3 |
| .IN h BREAK (BREAK=default) | CRE ITs or<br>RCR ITs | *6<br>*1 *4 |
| .IN h NOBREAK and TABs | CRE ITs | *6 *7 |
| .US ON | CRE BUS | *7 |
| .US OFF | CRE EUS | *7 |
| .HW wo-rd | CRE & use SHYs in place of HYPs in next word | *7 |
| .CE text to center | CRE 33 SPaces ATF | |
| .FO ON or OFF or LEFT | CRE LFC ITs (SLP's ADJ and JUST) | *2 *4 |
| .JU ON or OFF | CRE LFC ITs (SLP's ADJ and JUST) | *2 *4 |
| .SS | CRE LFC ITs (SLP's LNSP) | *2 *4 |

CONTINUED ON NEXT PAGE

CONTINUED FROM LAST PAGE

DOWN's TRANSFORMATION OF AN ISOLATED DCF CONTROL TO L3

| FROM DCF CONTROL ".XX" | TO L3 | NOTES |
|---|---|---|
| .DS | CRE LFC ITs (SLP's LNSP) | *2 *4 |
| .TB a b c... | CRE LFC ITs (STAB's ALIGNC & POS) | *2 *4 |
| PE byte | CRE PE TUP BT | *5 |
| .RH ON then .RH OFF | CRE PE TUP TUFC MP MT BT ITs (text goes in MT) | *4 *5 |
| .RF ON then .RF OFF | CRE PE TUP TUFC MP MT BT ITs (text goes in MT) | *4 *5 |
| .CM DRAWER... | CRE PE TUP TUFC MP, MT BT ITs (TUFC's PM's SDCP & SDSP) | *4 *5 |
| EOF | CRE PE EU | *5 |

NOTES ON

DOWN's TRANSFORMATION OF AN ISOLATED DCF CONTROL TO L3

*1

This transformation does not begin by writing out a CRE in response to the EOR that ended the preceding text.

*2

This transformation requires generation of the Line Format Change sequence, i. e. BLFC SLP STAB ELFC, with information transformed from the DCF control to the L3 parameters given in parentheses. The LFC uses the current values for all other parameters. The LFC causes an automatic end of paragraph (which is wrong for .SS and .DS) and an automatic reset of indent tab level (which the ITs restore, *4).

Note that the number of ITs needed to restore the indent tab level must be determined using the new tab settings, if the tab settings are changed by this LFC sequence. Note also that the program fills out a tab rack specified by a .TB control with a tab setting at each integer multiple of five greater than the largest tab setting specified by the .TB control. This is mainly to insure that there will be a tab setting that corresponds reasonably well to the current indent level that is being restored and to indent levels that may be specified in the future.

*3

The number of CREs is 1 + v, where v is 1 for ".PP". Of course, the first CRE is for the EOR at the end of the prior line of text. That first CRE just returns the current position to the temporary left margin without leaving one of the blank lines called for by the ".SP v" or ".SK v" or ".PP" controls.

*4

This DCF control does not reset the temporary left margin, but the L3 control into which DOWN must transform this DCF control does reset the temporary left margin back to the permanent left margin. These ITs restore the temporary left margin to its desired value.
The number of ITs is determined by the current indent tab count, i. e. the number of tab settings on the tab rack by which the temporary left margin is shifted to the right of the permanent left margin. This is one more than the number of tab settings that have character positions less than the desired temporary left margin.
This algorithm is also used to transform .IN h BREAK in case h = 0 and in cases where h is less than the old temporary left margin. The RCR resets the temporary left margin back to the permanent left margin and then the ITs establish the desired new temporary left margin.

*5
The CRE and PE end the current Body Text vector. Its length is therefore known, so it can be written out. It is followed by either another Text Unit or an End Unit.

*6
The number of ITs is one more than the number of tab settings on the current tab rack whose character positions are both greater than the current temporary left margin and less than the desired new temporary left margin. This only applies if the new temporary left margin is to the right of the old temporary left margin. If not, see *4. The current tab rack is the one in effect after this control is transformed.

*7
The DCF control transformed here does not cause a break. The CRE is written into the L3 datastream because of the EOR in the DCF datastream, not because of this control. If this control followed a ";" on a line containing text then the transformation would be different. The difference is crucial when formatting (adjusting) is turned off.

DOWN'S PARSING OF DCF

A DCF line may contain text, a control, several controls, or many combinations of text and controls.
An input stream might look something like this:

```
(1) .XX
(2) text
(3) .AA; text;.XX
(4) text;.XX ;text2
(5) .XX;.AA;.BB;text2
(6) text;.AA;.BB;text2;.CC
```

DOWN must be able to parse these in the same way DCF would parse the input line. DOWN parses the DCF input in mainline section of code called "SCAN". SCAN then passes control to the proper routines to process the text or control.
SCAN starts by reading a line of DCF input into a buffer called "dcf_input_buffer". This is the complete line and may contain controls and or text. Next we need to know if this is a line of text or a control. This is easy, if the first column is a "." then it is a control. Anything else will be considered text.
The line must be parsed into "units" which consist of text and individual controls and there parameters which must be processed one at a time. Down keeps track of each unit with a set of pointers ("begin_ptr", "end_ptr") that identify the beginning and ending character positions of the current unit within the input line. Upon returning to SCAN after processing a unit, if there are more units on the line, SCAN will update its pointers to the next unit and process that unit. This will continue until the line has been completely processed. When the line is complete, DOWN reads a new record and begins again to identify units within the line.

Now to find the end of this DCF unit. This unit may be the whole line, it may be all the text before an imbedded control on that line, or it may be a complete control before another control or text. The requirements for ending a "unit" change depending on what you are presently parsing. There are 3 possibilities:

(1) A PE byte anywhere in the line will act as a control word separator and as a control. It may be followed by either a control or text.

(2) If you are parsing text, the only thing that will end text is a control word separator followed by a ".". A control word separator not followed by a "." does not end a DCF text unit. Only a control may follow a text unit.

(3) If you are parsing a control, a control ends with a control word separator, and may be followed by a control or text.

NOTE: DOWN assumes the control word separator to be a ";". This is coded as a variable so as to allow ".DC" to change this. ".DC" is not now supported.

DOWN scans the input line from the beginning pointer for a PE byte and the correct unit ender depending on if the unit is a control or text. SCAN saves the character positions for these 2 items and then makes 1 of 4 possible decisions on where the unit ends.

1) Neither a PE byte or a control word separator was found.

2) Only a control word separator found on the line

3) Only a PE byte found on the line

4) Both a control word separator and a PE byte were found.

In case (1): the whole line becomes the unit and the end pointer is set to the end of the line. Also set a flag to tell SCAN that next pass it will have to read a new line of input, as it has finished with this line.

In case (2) and case (3): set the end pointer to the character position before the PE byte or before the position where the control word separator occurred. SCAN must check for the special condition where this unit ender ends the input line.

In case (4): SCAN must first decided which occurred first on the line. It will then process the end in the same manner that it did in case 2 or 3. It does not need to check for an occurrence at the end of the line as there are 2 unique occurrences and we processed the first. Therefor in this case there will always be something else past the position which we process as the end of the current unit.

Now SCAN knows the beginning and ending positions of the current unit. Next SCAN must check to see if there is a continuation character at the end of the line. DOWN assumes that the continuation character is always a "+". This is unlike SCRIPT/VS in which the continuation character has no default and must be defined in each document. The continuation character has been coded as a variable and like the control word separator might someday be set by the ".DC"

command. The control ".DC CONT +" becomes a special condition of SCAN, because SCAN thinks that the "+" is a continuation character and SCRIPT is only defining the character and does not processes it as a continuation character. SCAN will handle this control as a special case. Except for this case, the "+" will be removed by moving the end pointer to the character position before the "+" and setting a flag that tells SCAN not to place a carrier return before the text on the next input line.

Now before we pass this unit to the proper routines to be processed, we will break the unit out of the input line to make it easier to use by the other routines. The active unit, beginning pointer to end pointer, is placed in a buffer called "TEXT_BUFFER". Any routine wishing to see the active unit can look here. If the unit is a control, it is further broken down into the 2 character control ID and its parameters.

Now we can call the correct routine to process this unit. When the program returns to SCAN for it's next unit, either it will read a new input line or if there is more on the existing line, it will continue there. To continue on this line, SCAN must be able to find where the next unit starts. This is done with a variable called "bump". Bump tells us how many characters must be skipped to find the beginning of the next unit. This variable is set in many places in SCAN, and updated in others such as when removing the continuation character the end pointer is decreased 1 and bump is increased 1. Remember that the end pointer points to the character position before the control word separator or PE byte and that at least the control word separator must be skipped to get to the beginning of the next unit.

After processing the unit, SCAN will be asked for another unit. SCAN will check if the read flag is set. If it is, SCAN will read a new line of input and set beginning pointer to 1. If the read flag is not set, then there is more to process on this line of input. SCAN will add BUMP to the end pointer to get to the beginning of the next unit. SCAN, in either case, will then start this entire sequence again by searching for items that break up the line, etc., and continue parsing lines and reading lines until an end of file is found.

DOWN handles other peculiarities of DCF as well. One peculiarity is that a semicolon breaks text onto a new line if any control appears before the semicolon in the record. Another peculiarity is that it is legal to write a control's parameters after the two characters that specify the control, without an intervening space.

SCAN'S SPECIAL PROCESSING

In the future, SCAN is likely to have to allow CONT to obey the DCF control ".LI ON" by setting a state variable bit CURLIT that means everything that follows is text, up to but not including the next DCF control ".LI OFF". When this bit is on, SCAN refrains from calling CONT until after SCAN has recognized ".LI OFF" and has turned off CURLIT, without passing ".LI OFF" to CONT.

EXAMPLES OF DOWN'S TRANSFORMATION OF SEQUENCES

DOWN has many occasions to recognize a sequence of EORs and controls, with no intervening text other than spaces, and to transform the entire sequence as a whole into one or more L3 structures, vectors, multi-byte controls, or single-byte controls. In the following examples, "abc", "xyz" etc. are used as examples of text, i.e. graphic character strings that contain no controls or ends of records. EOR means the end of a record.

EXAMPLE 1:

| FROM DCF | : | TO L3 |
|---|---|---|
| abc EOR | : | abc RCR xyz |
| .IN 0 BREAK EOR | : | |
| xyz | | |

In this example, DOWN must note that DCF text has been followed by an EOR, but must refrain from writing the usual CRE into the L3 datastream because an EOR followed by ".IN 0 BREAK EOR" transforms into an RCR. Transforming the EOR into a CRE and then transforming the ".IN 0 BREAK EOR" into an RCR would be incorrect because it would add a blank line to the L3 document that is not present in the DCF document.

EXAMPLE 2:

| FROM DCF | : | TO L3 |
|---|---|---|
| abc EOR | : | abc RPE xyz |
| .IN 0 BREAK EOR | : | |
| .PA EOR | : | |
| xyz | : | |

In this example, DOWN must note the EOR and also the ".IN 0 BREAK EOR". However, DOWN must refrain from writing either a CRE or an RCR into the L3 datastream because the next control is a ".PA". The entire DCF sequence transforms into the single L3 control RPE.

Note that a DCF control ".PA" without a preceding ".IN 0 BREAK EOR" transforms into more L3 controls that the ".IN 0 BREAK and .PA" combination transforms into. The .PA does not reset the indent tab level. The RPE into which DOWN must transform the .PA does reset the indent tab level. Hence DOWN must transform a ".PA" alone into an RPE followed by enough IT controls to reestablish the indent tab level. DOWN can not transform the ".PA" into a PE (which does not reset the indent tab level) because the ".PA" expressed the author's intent to end a page at its point, whereas a PE would probably move, the next time the document is paginated.

Note that DOWN does not generate a PE control after its RPE control. A Displaywriter operator may print the resulting L3 document without first paginating the document. In this case, the RPE will be ignored. Paginating an L3 document has, as one of its functions, making sure that each RPE is followed by a PE and then by the start of a new Text Unit. It is the PE that tells the print process to start a new page. Hence, the ".PA" is obeyed after the document is paginated, which is the usual next step anyway.

EXAMPLE 3:

| FROM DCF | : | TO L3 |
|---|---|---|
| abc EOR | : | abc CRE BLFC SLP |
| .FO OFF EOR | : | STAB ELFC xyz |
| .TB 5 10 20 40 EOR | : | |
| xyz | : | |

In this example two DCF controls change the formatting state and change the tab rack. DOWN could separately transform each of these controls into an LFC (that is, into the sequence of multi-byte controls BLFC, SLP, STAB, ELFC), but can produce the same effect with a single LFC sequence. This is important because a given document may make several UP-then-DOWN round trips. Each trip UP transforms an LFC into both a ".FO" and a ".TB" control. If DOWN transformed each of these DCF controls into its own LFC sequence, then the next UP transformation would produce four DCF controls, and so on. This would be very messy, even though it is not wrong.

Note that UP could perform an analogous function. UP could refrain from writing redundant DCF controls that an LFC implies, if one or more of these controls merely set back the current state. An L3 document always contains SLP and STAB together, even if only one causes a change from the current state. The UP transformation need not preserve this togetherness when it generates a DCF document. Suppressing redundant DCF controls becomes more useful as more of the information in L3's SLP control is transformed to DCF, because the chance of generating redundant DCF controls is greater.

The DOWN transformation has to be able to handle just a ".FO" control or just a ".TB" control, whether or not UP suppresses redundant controls, because a DCF user can enter one without the other and can erase one of a pair generated by UP. To do this, DOWN must store the current tab rack so that it can write a complete LFC sequence in response to just a ".FO" control and DOWN must store the current formatting state so that it can write a complete LFC sequence in response to just a ".FO" control.

UP would have to store the current tab rack and formatting state, it were required to refrain from writing out redundant DCF controls in response to L3 controls that specify a lot in order to change a little. Otherwise UP could not identify the little that did change.

Having UP refrain from generating redundant controls would not simplify DOWN. For example, DOWN would still need to generate only one LFC sequence from a pair of ".FO" and ".TB" controls.

EXAMPLE 4:

| FROM DCF | : | TO L3 |
|---|---|---|
| abc EOR | : | abc CRE PE TUP TUFC |
| MANY CONTROLS | : | BT xyz |
| xyz | : | |

EXAMPLE 5:

| FROM DCF | : | TO L3 |
|---|---|---|
| abc EOR | : | |
| .IN 0 BREAK EOR | : | |
| .SS EOR | : | abc CRE BLFC SLP STAB ELFC xyz |
| xyz | : | but not |
| | : | abc CRE BLFC SLP |
| | : | STAB ELFC CRE xyz |

EXAMPLE 6:

| FROM DCF | TO L3 |
|---|---|
| abc EOR<br>.FO OFF EOR<br>.JU EOR<br>xyz | abc CRE BLFC SLP STAB xyz<br>(where the SLP parameters<br>depend on both .FO and .JU) |

DOWN'S TRANSFORMATION OF SEQUENCES GENERATED BY UP

It is particularly important for DOWN to transform a sequence of DCF controls, that UP generates for a single L3 control, back into the original control whenever possible. This is not simple, because UP generates different sequences of DCF controls for a given L3 control, depending on prior L3 controls. The sequences that UP generates for each single L3 control are as follows.

| SINGLE L3 CONTROL | SEQUENCE OF RESULTING DCF CONTROLS | |
|---|---|---|
| CRE | SPACE | (sometimes) |
| | EOR | |
| RCR or IRT | EOR | ) either |
| | SPACE EOR | ) or |
| | .IN 0 BREAK EOR | |
| ZICR | EOR | ) either |
| | .BR EOR | ) or |
| PE | PE byte | |
| RPE | EOR | (sometimes) |
| | .IN 0 BREAK EOR | (sometimes) |
| | .PA EOR | |
| BLFC or RMLF | EOR | (sometimes) |
| | .IN 0 BREAK EOR | (sometimes) |
| Special Controls | .BR | |
| IT | .IN h NOBREAK TAB | |
| LFC | .SS | ( either |
| | .DS | ( or |
| | .FO ON, OFF, LEFT | |
| | .JU ON | |
| | .TB ... | |
| TUFC, RTMF, APM, AAM | .SS | ( either |
| | .DS | ( or |
| | .FO ON, OFF, LEFT | |
| | .JU ON | |
| | .TB ... | |
| | .RH ON, OFF | ( any |
| | .RF ON, OFF | ( of |
| | .CM DRAWER | ( these |

DOWN'S PERSISTENT STATE VARIABLES

Some state variables are "persistent". They are valid while graphic characters are being transformed. That is, they retain their values between the end of one sequence of controls and the end of the next sequence of controls. The persistent state variables are as follows.

CURINC
The number of characters by which the current temporary left margin is shifted to the right of the permanent left margin, i. e. the "position" value of the tab setting to which the latest IT took the temporary left margin. This is close to the "h" in the most recent DCF control ".IN h".

CURHW
Equal to one iff (used here to mean "if and only if") the graphic characters being processed are part of a DCF word in which each single hyphen is to be replaced by a syllable hyphen (SHY) in L3 and each double hyphen is to be replaced by a single required hyphen (HYP) in L3. This bit is set equal to the transient state variable "GOTHW" at the end of a sequence of DCF controls. Thus, it is turned on by any sequence that contains a .HW control as the last thing in the sequence and is turned off by any sequence that does not contain such a .HW control. The word may not be split across more than one record and it is not ended by a word delimiter. The DCF record is intended to contain exactly one word.

CURSHY
Equal to one iff the last character transformed from DCF to L3 was a hyphen and was converted into a SHY. When this is one, even though CURHW may be one, a DCF hyphen is transformed into a HYP, not into a SHY. This bit is reset by anything other than a hyphen.

CURADJ
Current adjust state: 1 for adjusting line endings to put as much as possible on each line; 0 for not adjusting, i. e. observing the given line endings.

CURAL
Current alignment state: 1 for left alignment; 4 for justification, i. e. creating a straight right margin.

CURTP
Current horizontal tab rack. Note that the first tab settings on this tab rack come directly from the last .TB control that was transformed into L3. However, the tab rack is filled out with a tab setting at each integer multiple of 5 that is greater than the largest tab setting specified by the .TB control. This gives the L3 document more tab settings to indent to, in case of need.

CURSSDS
Current line spacing expressed in full-lines: 1 for single space; 2 for double space. Note the need to double CURSSDS TO GET L3's LNSP parameter CURCMDR
Current comment's specification of source drawer, an integer from 0 to 4 specifying which of the four valid text strings is in effect, or 0 specifying that none is.

CUR_MT

Contains 7 states: on, off, cancel, even, odd, top, and bottom. Currently defines if Margin Text is ON or OFF and which Margin Text buffers are active. For example,".RH ON" means running heading on all pages. The margin text states set would be top, odd, and even. The default "All pages" is specified as odd and even.

CURHANG

Current number of TAB characters hoped for in the preceding transformation of a hanging indent. A DCF .IN h NOBREAK control has been transformed (as a hanging indent) to n Indent Tab (IT) single-byte controls to set the temporary left margin for the next lines. These ITs have a byproduct of causing tabbing in the current line. This is unavoidable and it is correct if and only if the DCF datastream contains at least n TAB characters after the .IN h NOBREAK control. The program sets CURHANG equal to n after transforming the control, and hopes for n TABs. The program will ignore n TABs in the DCF datastream, because they have already been transformed. If it gets anything other than TABs (or an EOR) before it has gotten n TABs, it sets an error bit and resets CURHANG.

CURBREAK

This is set or reset at the end of processing a sequence, so that its value becomes equal to the value of GOTBR in that sequence. It is reset by any text character. This bit is used to remember when a sequence has caused a break in concatenation, in case that sequence was ended by an incompatible control rather than by text. In that case, the immediately following sequence of controls need not transform to an L3 item that ends a paragraph, even if the sequence includes a .BR control. Moreover, since L3 has no item that can be used to cause several breaks without also causing several blank lines, it is wrong to generate extra ends of paragraphs in L3.

CURTPAGE

This is set or reset at the end of processing a sequence, so that its value becomes equal to the value of (GOTPA or GOTPAN) in that sequence. It is reset by any text character. This bit is used to remember when a sequence has forced text to go to the top of the next page, in case that sequence was ended by an incompatible control rather than by text. In that case, the immediately following sequence of controls need not transform to a Required Page End (RPE), which forces text to go to the top of the next page, even if the sequence includes a .PA control. Moreover, since L3 has no item that can be used to cause text to go to the top of the next page without also causing several blank lines, it is wrong to generate extra RPEs in L3.

CURUSON

This is set at the end of processing a sequence that writes out a BUS and is reset at the end of a sequence that writes out an EUS. Therefore, at any time, this bit tells whether or not underscoring is currently on. It is used to suppress a redundant BUS when underscoring is already on and to suppress a redundant EUS when underscoring is already off. Such redundancies are harmless and common in DCF but are fatal syntax errors in L3.

The persistent state variables have the following initial values.

| PERSISTENT STATE VARIABLE | INIT VAL | MEANING OF THIS INITIAL VALUE |
|---|---|---|
| CURINC | 0 | Zero character positions of indenting |
| CURHW | 0 | Not hyphenating the next word |
| CURSHY | 0 | Did not just convert a hyphen to a SHY |
| CURADJ | 1 | Do adjust line endings ! i. e.: |
| CURAL | 4 | Do justify (straight right) ! .FO ON |
| CURTP | X'LLE602000000005000A...', tabs at 5,10,15,... | |
| CURSSDS | 1 | Single space |
| CURCMDR | 0 | No comment has specified a source drawer |
| CURTMT | 0 | Not currently writing Top Margin Text |
| CURBMT | 0 | Not currently writing Bottom Margin Text |
| CURHANG | 0 | No TAB characters already assumed |
| CURBREAK | 1 | Currently at a break in concatenation |
| CURTPAGE | 1 | Currently at the top of a page |

DOWN'S TRANSIENT STATE VARIABLES

Most of DOWN's state variables are "transient". They are valid only during transformation of a sequence of DCF controls. Most are used only within CONT but some affect SCAN. They tell which controls have appeared in the sequence so far. They are used both during processing of the sequence (to tell what variables to set for each new DCF control in the sequence) and after a sequence has ended (to tell what L3 controls to write as a result of the entire sequence and to tell what persistent variable values to leave at the end.)

The number of state variables could have been reduced somewhat by relating them to the output L3 controls that DCF controls imply need for. For example, either a ".FO" control or a ".TB" control could set a state variable "LFC PENDING". However, we instead relate state variables to the input DCF controls themselves. For example, there are two separate state variables "GOTFO" (got a .FO control) and "GOTTB" (got a .TB control). This is more flexible and more easily extendable, because it lets DOWN make all the decisions about what L3 controls to write out after DOWN has read all of the DCF controls in a given sequence.

There are two classes of transient state variables: those that begin with "GOT" and those that begin with "VAL" OR "CNT". Variables in the GOT class are binary variables. For example, GOTIN is set to 1 when we get a .IN h control in a sequence of controls. Variables in the VAL or CNT class contain values or counts. For example, CNTINC is set to the h given in the control. It is the count of characters by which the new temporary left margin is requested to be to the right of the permanent left margin. Note that CNTINC can be zero even if the sequence contains a .IN h control. That just means that the h was zero. This is why both the "GOT" class of parameter and the "VAL" class of parameter are necessary. Another example is VALTP which is set to the L3 form of the new tab rack whenever a .TB control is processed.

The initial values of the transient state variables mean very different things for the two classes. Both classes are set to their specified initial values at the start of processing a document and also at the start of a definition of margin text. The "GOT" class variables are reset to these initial values at the end of transforming each sequence of DCF controls to L3. These initial values are, of course, zero. This makes each sequence of DCF controls begin in the correct state of having gotten no controls.

However, some of the VAL and CNT class variables must not be reset to their initial values at the end of transforming a sequence of DCF controls to L3. These are marked "*" in the following table. Such a variable must represent the latest information when processing controls in a sequence, whether or not the sequence has already had a control that affects the value of the variable. After processing of a sequence has ended, and the corresponding L3 has been written out, such a variable must contain the current information that will be useful while processing the next sequence of DCF controls. They are then equal to their persistent variable counterparts (which start with "CUR"), if they have such counterparts. They will remain the same until the next sequence of controls begins. Then they may change in response to controls in the sequence.

During accumulation of information about a sequence of DCF controls, the "CUR" variables tell what the state was before the sequence began. The "GOT" variables are up to date with the latest DCF controls gotten in the sequence. The "VAL" and "CNT" variables are up to date with the values and counts specified in these controls. The transient state variables, their initial values, and the meanings of these initial values are given in the following table. Note that the meanings will be made clearer in the next section, which tells how to set these variables while processing a sequence.

| TRANSIENT STATE VARIABLE | INIT VAL | MEANING OF THIS INITIAL VALUE |
|---|---|---|
| GOTEOR | 0 | No End Of Record is waiting to be processed |
| GOTBR | 0 | No BREAK is waiting to be processed |
| GOTIN | 0 | No new indentation is waiting to happen |
| CNTINC | *0 | Zero displacement of temporary left margin to the right of permanent left margin |
| GOTPA | 0 | No new page is waiting to begin |
| GOTPAN | 0 | No page is waiting to end (NOSTART) |
| GOTSK | 0 | No new conditional skipping of blank lines |
| CNTBL | 0 | Zero count of new blank lines to skip |
| GOTSP | 0 | No new required spacing of blank lines |
| CNTRBL | 0 | Zero count of new required blank lines |
| GOTUSON | 0 | No underscore on is waiting to happen |
| GOTUSOF | 0 | No underscore off is waiting to happen |
| GOTHW | 0 | Following word does not want SHY for HYP |
| GOTCE | 0 | Following text is not to be centered |
| GOTFOJU | 0 | No format or justify changes waiting |
| VALADJ | *1 | Do adjust line endings ) i. e.: |
| VALAL | *4 | Do justify (straight right) ) .FO ON |
| GOTTB | 0 | No tab rack change is waiting |
| VALTP | *X'LLE602000000005000A...' | tabs at 5,10,15,... |
| GOTSSDS | 0 | No single or double space control waiting |
| VALSSDS | *1 | Single space is in effect |
| GOTPE | 0 | No PAGE END byte has occurred |
| GOTRHON | 0 | No Running Heading is waiting to happen |
| GOTRFON | 0 | No Running Footing is waiting to happen |
| GOTCMDR | 0 | No comment specifying source drawer waiting |
| VALCMDR | *0 | No comment has specified a source drawer |
| GOTEOF | 0 | No End Of File waiting to be processed |

NOTES ON INITIAL VALUES OF TRANSIENT STATE VARIABLES

NOTE *

Initial value is for use at the start of a document or start of margin text definition only; not for use at the end of each sequence of DCF controls.

A "VAL..." or "CNT..." variable marked with an "*" must be valid at any time while processing a sequence. It must start with the current value, not necessarily with the initial value. It changes in response to appropriate controls during the sequence. At the end of the sequence, the sequence's resultant "VAL..." or "CNT..." value can be compared to the pre-existing "CUR..." value to see what change, if any, has occurred. The "VAL..." or "CNT..." variable is set equal to the corresponding "CUR..." persistent variable (if any) after the processing that occurs at the end of a sequence of DCF controls.

The "initial value" given above is the value DOWN assigns to the variable at the start of the document and is the same as the value that DOWN assigns to the corresponding "CUR..." variable at the start of the document. But DOWN does not reset a variable with a "*" back to the initial value at the end of a sequence of controls.

NOTE **

State variables used to transform margin text are completely separate from the state variables used to transform body text. Margin text usually appears in the middle of a sequence of DCF controls in the neighborhood of a page boundary. Margin text contains both graphic characters (whose transformations depend on persistent state variables associated with margin text) and sequences of DCF controls (whose transformation depends on updating a set of transient state variables associated with margin text). The sequence of DCF controls that affect body text continues after margin text has been processed and must have the state variables as they were before the margin text began. A single set of margin text state variables suffices for both top (header) and bottom (footer) margin text because either is complete before the other begins.
Each margin text is treated as a separate document unaffected by any format changes that have occurred in body text. As a result, the persistent state variables associated with margin text must be allocated and initialized as if for the start of a document each time a .RH ON or .RF ON control is encountered. Moreover, the temporary state variables associated with margin text must be allocated and initialized (as described for their body text counterparts) each time a sequence of DCF controls begins within margin text.

Margin Text also has a set of state variables used only in parsing of the margin text parameters. The states of variable MT_STATE are set as the parameter is parsed, used to set up proper commands, and then cleared at the end of the single control. This is unlike transient state variables which are reset only at the end of a sequence.

DOWN'S PROCESSING WITHIN A SEQUENCE OF CONTROLS

The following table specifies the action CONT takes for each element of a sequence. The elements are DCF controls, EORs, and blank text. We shall see later that we tend to just keep accumulating information about controls and blanks in a sequence until we reach non-blank text. Non-blank text ends the sequence. At that point we write out L3 that is the transformation of the entire sequence.

Understanding the processing within a sequence will show that there are some things other than non-blank text that must end a sequence. Anything that makes the correct transformation of the sequence depend on the order of the sequence's items (except for easy cases such as conflicting DCF controls where the later one overrides the earlier one) ends the sequence.

PROCESSING WITHIN A SEQUENCE

| DCF CONTROL | AFFECTS STATE VARIABLES |
|---|---|
| EOR | Set GOTEOR |
| .BR or any of the other 51 DCF controls that cause a BREAK, whether in the supported set or not. This includes the .IN control with the BREAK default value but not with NOBREAK. | Set GOTBR |
| .PA | If GOTPA or GOTPAN or GOTPE is set, start a new sequence with this, else Set GOTPA. |
| .PA NOSTART | If GOTPA or GOTPAN or GOTPE is set, start a new sequence with this, else Set GOTPAN. |
| .SK v | If GOTPA or GOTPAN or GOTPE or GOTSSDS is set, start a new sequence with this, else Set GOTSK. Increase CNTBL by v to count blank lines |
| .SP v | If GOTPA or GOTPAN or GOTPE or GOTSSDS is set, start a new sequence with this, else Set GOTSP Increase CNTRBL by v to count req'd blank lines. |
| .PP | If GOTPA or GOTPAN or GOTPE or GOTSSDS is set, start a new sequence with this, else Set GOTSK Increase CNTBL by 1 to count one blank line |
| .IN h NOBREAK or BREAK | Set GOTIN Set CNTINC TO h to save new temp left margin |

```
: .US ON                    :  Set GOTUSON                    :
:                           :  Reset GOTUSOF                  :
:                           :                                 :
: .US OFF                   :  Set GOTUSOF                    :
:                           :  Reset GOTUSON                  :
:                           :                                 :
: .HW wo-rd                 :  Set GOTHW                      :
:                           :  Note that any CONTROL          :
:                           :    before end of sequence       :
:                           :    must reset GOTHW,            :
:                           :    since DCF would abend then   :
:                           :                                 :
: .CE text to center        :  Set GOTCE                      :
:                           :  Note that any controls can     :
:                           :    intervene; just center       :
:                           :    the next text line           :
:                           :                                 :
: .FO ON or OFF or LEFT     :  Set GOTFOJU                    :
:                           :  Update VALADJ and VALAL        :
:                           :    based on parameters          :
:                           :                                 :
: .JU ON or OFF             :  Set GOTFOJU                    :
:                           :  Update VALAL                   :
:                           :    based on parameter           :
:                           :                                 :
: .SS                       :  Set GOTSSDS                    :
:                           :  Set VALSSDS to 1               :
:                           :                                 :
: .DS                       :  Set GOTSSDS                    :
:                           :  Set VALSSDS to 2               :
:                           :                                 :
: .TB a b c...              :  Set GOTTB                      :
:                           :  Increase each parameter by 1   :
:                           :  Write parameters into VALTP    :
:                           :    Fill beyond last tab setting:
:                           :      with a tab one more than   :
:                           :      each integer multiple of 5:
:                           :      out to a maximum of 48     :
:                           :      tabs or position 255       :
:                           :  If blank, write default rack   :
:                           :                                 :
: PE BYTE                   :  If GOTPE                       :
:                           :    is set, start a new          :
:                           :    sequence with this, else     :
:                           :  Set GOTPE                      :
:                           :                                 :
: .RH ON                    :  Set GOTRHON                    :
:                           :  Initialize separate state      :
:                           :    variables "MGOTBR" etc. **   :
:                           :  Set CURTMT so L3 will be       :
:                           :    written into TMT buffer.     :
:                           :  Set "STARTING PAGE IMAGE"      :
:                           :    so margin text goes on the   :
:                           :    current page if and only if :
:                           :    GOTPA = 0.                   :
:                           :                                 :
: .RH OFF                   :  Terminate above special        :
:                           :    processing, save TMT.        :
: .RF ON                    :  Set GOTRFON                    :
:                           :  Initialize separate state      :
:                           :    variables "MGOTBR" etc. **   :
:                           :  Set CURBMT so L3 will be       :
:                           :    written into BMT buffer.     :
:                           :                                 :
: .RF OFF                   :  Terminate above special        :
:                           :    processing, save BMT.        :
:                           :                                 :
```

| | |
|---|---|
| .CM PRINTING PAPER SOURCE then more text such as "TOP" | Set GOTCMDR Recognize "text" Set VALCMDR to 1, 2, ... |
| Anything except .HW (even EOR resets it) | Reset GOTHW (since .HW takes effect only if it is the last thing in a sequence) |
| Any of the 28 controls that start a page after a .PA NOSTART control | If and only if GOTPAN = 1, set GOTPA for use in setting Margin Text's STARTING PAGE IMAGE. |
| EOF | Set GOTEOF |

7. DOWN'S ALGORITHM FOR USE AT THE END OF A SEQUENCE

DOWN'S TRANSFORMATION OF SEQUENCES

WHY TRANSFORM AN ENTIRE SEQUENCE?

DOWN makes the best transformation of DCF into L3 when DOWN transforms the longest possible sequence of DCF controls into L3 as a single entity. This gives the most information about what is being said in DCF and allows DOWN to produce the most nearly correct transformation into L3 and to eliminate most redundant L3 outputs. This is a normal result of studies of language translation: using "longest match" gives better results than using "first match".

For example, consider translating the English idiomatic expression "out of sight, out of mind" into French. If all six words are translated as a unit, the result is a corresponding French idiomatic expression. If the phrase is translated as two groups of three words each, the resultant French means "invisible and crazy", which is meaningful even though it misses the point somewhat. If the phrase is translated one word at a time, the result is a meaningless jumble of French words.

For another example, consider transforming the following sequence of DCF into L3.

| | |
|---|---|
| .FO OFF | Turns formatting off |
| .IN 0 | Unindents |
| .TB 5 10 15 20 25 50 | Sets a tab rack |
| .SK 3 | Skips 3 lines |
| .DS | Specifies double spacing |

This sequence can and should be transformed into a single Line Format Change sequence of multi-byte controls and three Carrier REturn single-byte controls, that is, into

BLFC SLP STAB ELFC CRE CRE CRE.

The LFC sequence consists of a Begin Line Format Change control, a Set Line Parameters control (which specifies whether formatting, i. e. adjust and justify, is on or off and whether spacing is single or double, among other things, all of which must be specified explicitly), a Set TABs control (which specifies a tab rack and must be given with each SLP control even if it just reiterates the existing tab settings), and an End Line Format Change control. The entire LFC sequence causes an unindent. The three CRE controls leave the three blank lines.

The given sequence can not be transformed correctly one control at a time, because the .IN 0 specifies unindenting without skipping a line and must transform to an RCR which (when it follows a line ender) does skip a line. The closest transformation of each control individually into L3 would be as follows, where the L3 is put on several lines matching the lines of DCF to aid comprehension, and where "ITs" means "one or more Indent Tab single-byte controls to reestablish the original temporary left margin, which the DCF control .FO OFF does not reset, but which AN LFC, its required transform to L3, does reset".

```
BLFC SLP STAB ELFC ITs
RCR
BLFC SLP STAB ELFC
CRE CRE CRE
BLFC SLP STAB ELFC
```

This one-control-at-a-time transformation is undesirable both because it is messy and because it leaves an extra blank line.

Therefore, with some exceptions, DOWN accepts an entire sequence of DCF controls and sets bits and values to remember what controls it got, without writing out any L3. DOWN writes out the corresponding L3 when it gets text at the end of the sequence of controls.

DOWN'S TREATMENT OF SEQUENCE ORDER

Althoughs DOWN accumulates full information about what controls it got in a sequence, DOWN accumulates only some information about the order in which it got the controls. The cases where DOWN accumulates order information are given in the following sections. This part of the algorithm requires very careful consideration of each pair of supported DCF controls to see if the order in which they occur affects what they mean to the DCF formatter. If 18 DCF controls are supported, the number of pairs to be considered is 18 X 17 / 2 = 153. Do not think that these cases can be considered more than one at a time.

ORDER OF OVERRIDES: LAST ONE WINS

Order information is saved in many cases where a DCF control overrides an earlier occurrence of the same control or a related control in the sequence. Examples are as follows.

.US OFF overrides an earlier .US ON, and v. v.
.SS overrides an earlier .DS, and v. v.
.RH ON etc. overrides a preceding
  definition of margin text.

ORDER OF .HW AND ANYTHING (AND .CE'S TOLERANCE)

Order information is also saved in the case of .HW which specifies hyphenation points in the next word only if the word follows immediately with no intervening controls. Any control that follows a .HW in a sequence resets the bit that signifies that a .HW is pending. Contrast this to .CE, which centers whatever comes next, no matter what controls intervene.

ORDER OF INDENT AND TAB SETTING CHANGES

Order information is kept in the case of .IN h and .TB controls. They interact, because DCF's indentation value, h, is expressed in character positions whereas L3's indentation uses Indent Tabs which go to tab settings on the current tab rack. The .TB control changes the current tab rack. Therefore, the program that computes how many ITs to put in uses the version of the tab rack that is updated according to the latest .TB control in the current sequence: it uses VALTP rather than CURTP. In practice, these are equivalent, because the program that computes how many ITs to write runs after the program that writes a LFC or a TUFC in response to a .TB, so CURTP will have been updated to match VALTP. This is an accident of L3 output ordering, and does not affect the following important concept.
The tab rack used to compute the number of ITs is the last tab rack specified in the sequence of DCF controls that contains the .IN h control, not necessarily the tab rack that was specified by a .TB control before the .IN control. What is important is the tab rack that is established as a result of the entire sequence of controls, because that determines the tab settings to which the ITs will actually move. Programmers and testers beware!

Note that VALTP must never be initialized to zero. It must be initialized to the initial value of CURTP at the start of processing a document and it must be left at the current value thereafter.

ORDER OF CENTER AND INDENT

A similar order-dependent interaction would occur later if the center of the line were computed on the basis of the actual temporary left margin and right margin. The program for .CE would have to use the value of the left margin that is updated in response to a .IN h. It would use CNTINC rather than CURINC. This does not apply as long as the number of spaces over to the center is assumed to be a constant such as 33.

ORDER OF PAGE END AND MARGIN TEXT

Order information is saved in the case of .PA NOSTART, which is effectively converted into a .PA by any of 28 controls that start a page. This information is used to position L3 margin text, but it is not used at the end of a sequence. It is used at the point in the sequence at which the .RH ON or .RF ON control appears.

Note that a complete definition of top and or bottom margin text can be included in the middle of a sequence of controls. Such a definition of margin text includes text and any number of controls in any number of sequences of controls. Such a definition of margin text uses separate state bits and uses a separate output buffer for the L3 it generates. The code that processes the definition of the margin text can read values of the main state bits, as just mentioned, to decide on the value of the STARTING PAGE IMAGE parameter in the MARGIN TEXT PARAMETERS structure that it writes into the buffer. This L3 is written into the main L3 datastream later, at the end of the sequence in which the .RH ON or .RH OFF appeared. That parameter's value contains all the order information that is necessary for this case.

HANDLING ORDER BY ENDING THE SEQUENCE

In any other case where the meaning of the DCF becomes order-dependent, DOWN must end the sequence and transform what it has gotten so far into L3. Such cases are discussed in the next section.

Saving status bits that tell which of about 19 items has occurred in a sequence means that there are only 2  19 different possible sequences to be handled, independent of the number of items in the sequence. Saving full order information would allow a sequence containing n items to have 19  n different possibilities. The latter is unprogrammable, because the amount of storage required grows without bound as the length of the sequence increases. Ending the sequence when it threatens to become order-dependent is preferable to keeping order information.

DOWN'S SEQUENCE ENDERS

Any text ends a sequence of controls. This includes any graphics, i. e. letters, numbers, and special characters. It also includes the TAB character which implies blank text. These are the most common sequence enders. However, not every sequence of controls can be transformed as a unit. Some controls make a sequence's transformation order-dependent and must therefore end the sequence and begin another. These cases are as follows.

There is no reason to count blank pages and treat them as parts of a single sequence of DCF controls. Hence, after a sequence has gotten a .PA control, getting another .PA control ends the sequence.

DOWN attempts to preserve the identity of pages in a document that UP transformed from L3 to DCF, when DOWN is transforming the document back to L3. In L3, a page is ended by an RPE PE or by just PE. UP transforms these to a .PA control and a PE byte or to just a PE byte. Therefore, after a sequence has gotten a PE byte, getting another PE byte or a .PA control ends the sequence. Note that a PE byte is allowed after a .PA control without ending the sequence.

For example, this part of the algorithm for the .PA control is incorporated in the table used for processing during a sequence. That table tells what DOWN does when it gets a .PA (with or without the NOSTART parameter). The table says "If GOTPA, GOTPAN, or GOTPE is 1 then start a new sequence with this, else ..." followed by the bit to set if the .PA control does not follow another such control and does not follow a PE byte.

Blank lines at the bottom of one page are not equivalent to blank lines at the top of the next page. Therefore, after a sequence has gotten a .PA control or a PE byte, getting any of

.SK
.SP
.PP ends the sequence.

Similarly, blank lines after a change from single space to double space, or v.v., are not equivalent to blank lines before such a change. The difference is the number of actual lines produced by DW's a print datastream generator while it is reading the CRE controls that DOWN writes. The print datastream generator produces two lines for each CRE (at a line end) if double spacing is in effect. Therefore, after a sequence has gotten a .SS control or a .DS control, getting any of

.SK
.SP
.PP ends the sequence.

Many other things that might be sequence-dependent turn out to not be sequence-dependent. For example, it might have mattered if the formatting controls (such as .FO and .DS) came before or after a .RH control. This does not matter, because formatting controls before a .RH ON have no effect on the formatting of margin text: the margin text definition is effectively a complete document with its own initial formatting state.

GENERAL DECISION TABLE FOR USE AT END OF A SEQUENCE

In principle, the processing that CONT performs, after SCAN tells CONT that it has gotten the end of a sequence of DCF controls, could be expressed by one decision table of the sort that follows. In practice, there would have to be roughly 2 to the 23 rd power rules to cover independent occurrence of the roughly 23 independent things that can occur in a sequence of DCF controls. This complexity is handled by developing an ordering on the L3 items that may need to be written out and giving a separate decision table for deciding whether to write out each item and to change any corresponding state variables to produce the next state. Moreover, those decision tables are allowed to have more than one rule be true at one time: DOWN writes out the item if any one or more of the rules are true. The End State (which plays the role of "prior state" at the end of a sequence), Output, and New State used by the specific decision tables and ordering tables at the end of a sequence are drawn from the following general table.

Note that some of the "Output" items are collections of L3 items and therefore had to be abbreviated to fit the left column of the table. For example, "RSPCREzs" abbreviates "(RSP CRE ZICR) s" which in turn means "write out several triads, where each triad consists of Required SPace, Carrier REturn, and Zero Index Carrier Return)". Each Output item corresponds to one decision table at the end of Chapter 7 and has its L3 items described in detail there.

GENERAL DECISION TABLE FOR USE AT END OF A SEQUENCE

| End State | 1 | 2 | 3 | 4 | 5 | 6 | 7 | 8 |
|---|---|---|---|---|---|---|---|---|
| GOTEOR | . | . | . | . | . | . | . | . |
| GOTBR | . | . | . | . | . | . | . | . |
| GOTPA | . | . | . | . | . | . | . | . |
| GOTPAN | . | . | . | . | . | . | . | . |
| GOTSK | . | . | . | . | . | . | . | . |
| CNTBL | . | . | . | . | . | . | . | . |
| GOTSP | . | . | . | . | . | . | . | . |
| CNTRBL | . | . | . | . | . | . | . | . |
| GOTIN | . | . | . | . | . | . | . | . |
| GOTUSON | . | . | . | . | . | . | . | . |
| GOTUSOF | . | . | . | . | . | . | . | . |
| GOTHW | . | . | . | . | . | . | . | . |
| GOTCE ___ | . | . | . | . | . | . | . | . |
| GOTFOJU | . | . | . | . | . | . | . | . |
| GOTTB | . | . | . | . | . | . | . | . |
| GOTSSDS | . | . | . | . | . | . | . | . |
| GOTPE ___ | . | . | . | . | . | . | . | . |
| GOTRHON | . | . | . | . | . | . | . | . |
| GOTRFON | . | . | . | . | . | . | . | . |
| GOTCMDR | . | . | . | . | . | . | . | . |
| CNTINC LT: CURINC | . | . | . | . | . | . | . | . |
| CNTINC GT: CURINC | . | . | . | . | . | . | . | . |
| CNTINC GT: ZERO | . | . | . | . | . | . | . | . |
| GOTEOF | . | . | . | . | . | . | . | . |
| CURBREAK | . | . | . | . | . | . | . | . |
| CURTPAGE | . | . | . | . | . | . | . | . |
| CURUSON | . | . | . | . | . | . | . | . |

| Output--- | 1 | 2 | 3 | 4 | 5 | 6 | 7 | 8 |
|---|---|---|---|---|---|---|---|---|
| EUS | . | . | . | . | . | . | . | . |
| CRE | . | . | . | . | . | . | . | . |
| RCR | . | . | . | . | . | . | . | . |
| CREs | . | . | . | . | . | . | . | . |
| RSPCREzs | . | . | . | . | . | . | . | . |
| CREzRSPs | . | . | . | . | . | . | . | . |
| RPE | . | . | . | . | . | . | . | . |
| LFC | . | . | . | . | . | . | . | . |
| ZICR | . | . | . | . | . | . | . | . |
| PE, BT | . | . | . | . | . | . | . | . |
| TUP | . | . | . | . | . | . | . | . |
| TUFC,MPMT | . | . | . | . | . | . | . | . |
| ITs | . | . | . | . | . | . | . | . |
| SPs ATF | . | . | . | . | . | . | . | . |
| BUS | . | . | . | . | . | . | . | . |
| CURHA | . | . | . | . | . | . | . | . |
| S PE BT | . | . | . | . | . | . | . | . |
| EU | . | . | . | . | . | . | . | . |

| New State | 1 | 2 | 3 | 4 | 5 | 6 | 7 | 8 |
|---|---|---|---|---|---|---|---|---|
| CURINC | . | . | . | . | . | . | . | . |
| CURHW | . | . | . | . | . | . | . | . |
| CURADJ | . | . | . | . | . | . | . | . |
| CURAL | . | . | . | . | . | . | . | . |
| CURTP | . | . | . | . | . | . | . | . |
| CURSSDS | . | . | . | . | . | . | . | . |
| CURCMDR | . | . | . | . | . | . | . | . |
| CURHANG | . | . | . | . | . | . | . | . |
| CURBREAK | . | . | . | . | . | . | . | . |
| CURTPAGE | . | . | . | . | . | . | . | . |
| CURUSON | . | . | . | . | . | . | . | . |

ONE-CONTROL SEQUENCE TRANSFORMATIONS

DECISION TABLE FOR USE AT END OF A SEQUENCE, ILLUSTRATION FOR ISOLATED CONTROLS, 1

| End State | 1 | 2 | 3 | 4 | 5 | 6 | 7 | 8 |
|---|---|---|---|---|---|---|---|---|
| GOTEOR | N | N | N | N | N | N | N | N |
| GOTBR | Y | N | N | N | N | N | N | N |
| GOTPA | N | N | orY | N | N | N | N | N |
| GOTPAN | N | N | orY | N | N | N | N | N |
| GOTSK | N | N | N | - | N | N | N | N |
| CNTBL | N | N | N | Y | N | N | N | N |
| GOTSP | N | N | N | N | - | N | N | N |
| CNTRBL | N | N | N | N | Y | N | N | N |
| GOTIN | N | N | N | N | N | Y | N | N |
| GOTIN h=0 | N | Y | N | N | N | N | N | N |
| GOTUSON | N | N | N | N | N | N | Y | N |
| GOTUSOF | N | N | N | N | N | N | N | Y |
| GOTHW | N | N | N | N | N | N | N | N |
| GOTCE ____ | N | N | N | N | N | N | N | N |
| GOTFOJU | N | N | N | N | N | N | N | N |
| GOTTB | N | N | N | N | N | N | N | N |
| GOTSSDS | N | N | N | N | N | N | N | N |
| GOTPE ____ | N | N | N | N | N | N | N | N |
| GOTRHON | N | N | N | N | N | N | N | N |
| GOTRFON | N | N | N | N | N | N | N | N |
| GOTCMDR | N | N | N | N | N | N | N | N |
| CNTINC LT: CURINC | N | N | N | N | N | N | N | N |
| CNTINC GT: CURINC | N | N | N | N | N | N | N | N |
| CNTINC GT: ZERO | - | - | - | - | - | - | - | - |
| GOTEOF | N | N | N | N | N | N | N | N |
| CURBREAK | N | N | N | N | N | N | N | N |
| CURTPAGE | N | N | N | N | N | N | N | N |
| CURUSON | - | - | - | - | - | - | N | Y |

| Output | 1 | 2 | 3 | 4 | 5 | 6 | 7 | 8 |
|---|---|---|---|---|---|---|---|---|
| EUS | . | . | . | . | . | . | . | 1 |
| CRE | 1 | . | . | . | . | . | . | . |
| RCR | . | 1 | . | . | . | . | . | . |
| CREs | . | . | . | 1 | . | . | . | . |
| RSPCREzs | . | . | . | . | 1 | . | . | . |
| CREzRSPs | . | . | . | . | . | . | . | . |
| RPE | . | . | 1 | . | . | . | . | . |
| LFC | . | . | . | . | . | . | . | . |
| ZICR | 2 | . | . | . | . | . | . | . |
| PE, BT | . | . | . | . | . | . | . | . |
| TUP | . | . | . | . | . | . | . | . |
| TUFC,MPMT | . | . | . | . | . | . | . | . |
| ITs | . | . | . | . | . | 1 | . | . |
| SPs ATF | . | . | . | . | . | . | . | . |
| BUS | . | . | . | . | . | . | 1 | . |
| CURHW | . | . | . | . | . | . | . | . |
| S PE BT | . | . | . | . | . | . | . | . |
| EU | . | . | . | . | . | . | . | . |

| New State | 1 | 2 | 3 | 4 | 5 | 6 | 7 | 8 |
|---|---|---|---|---|---|---|---|---|
| CURINC | . | . | . | . | . | 1 | . | . |
| CURHW | N | N | N | N | N | N | N | N |
| CURADJ | . | . | . | . | . | . | . | . |
| CURAL | . | . | . | . | . | . | . | . |
| CURTP | . | . | . | . | . | . | . | . |
| CURSSDS | . | . | . | . | . | . | . | . |
| CURCMDR | . | . | . | . | . | . | . | . |
| CURHANG | . | . | . | . | . | ? | . | . |
| CURBREAK | Y | Y | Y | Y | Y | ? | . | . |
| CURTPAGE | . | . | Y | . | . | . | . | . |
| CURUSON | . | . | . | . | . | . | Y | N |

DECISION TABLE FOR USE AT END OF A SEQUENCE,
ILLUSTRATION FOR ISOLATED CONTROLS, 2

| End State | 9 | 10 | 11 | 14 | 13 | 14 | 15 | 16 | 17 | 18 |
|---|---|---|---|---|---|---|---|---|---|---|
| GOTEOR | N | N | N | N | N | N | N | N | N | N |
| GOTBR | N | N | N | N | N | N | N | N | N | N |
| GOTPA | N | N | N | N | N | N | N | N | N | N |
| GOTPAN | N | N | N | N | N | N | N | N | N | N |
| GOTSK | N | N | N | N | N | N | N | N | N | N |
| CNTBL | N | N | N | N | N | N | N | N | N | N |
| GOTSP | N | N | N | N | N | N | N | N | N | N |
| CNTRBL | N | N | N | N | N | N | N | N | N | N |
| GOTIN | N | N | N | N | N | N | N | N | N | N |
| GOTUSON | N | N | N | N | N | N | N | N | N | N |
| GOTUSOF | N | N | N | N | N | N | N | N | N | N |
| GOTHW | Y | N | N | N | N | N | N | N | N | N |
| GOTCE ___ | N | Y | N | N | N | N | N | N | N | N |
| GOTFOJU | N | N | Y | N | N | N | N | N | N | N |
| GOTTB | N | N | N | N | Y | N | N | N | N | N |
| GOTSSDS | N | N | N | Y | N | Y | N | N | N | N |
| GOTPE ___ | N | N | N | N | N | N | N | N | N | N |
| GOTRHON | N | N | N | N | N | N | Y | N | N | N |
| GOTRFON | N | N | N | N | N | N | N | Y | N | N |
| GOTCMDR | N | N | N | N | N | N | N | N | Y | N |
| CNTINC LT: CURINC | N | N | N | N | N | N | N | N | N | N |
| CNTINC GT: CURINC | N | N | N | N | N | N | N | N | N | N |
| CNTINC GT: ZERO | - | - | - | - | - | - | - | - | - | - |
| GOTEOF | N | N | N | N | N | N | N | N | N | Y |
| CURBREAK | N | N | N | N | N | N | N | N | N | N |
| CURTPAGE | N | N | N | N | N | N | N | N | N | N |
| CURUSON | - | - | - | - | - | - | - | - | - | - |

| Output | 9 | 10 | 11 | 14 | 13 | 14 | 15 | 16 | 17 | 18 |
|---|---|---|---|---|---|---|---|---|---|---|
| EUS | . | . | . | . | . | . | . | . | . | . |
| CRE | . | . | . | . | . | . | . | . | . | . |
| RCR | . | . | . | . | . | . | . | . | . | . |
| CREs | . | . | . | . | . | . | . | . | . | . |
| RSPCREzs | . | . | . | . | . | . | . | . | . | . |
| CREzRSPs | . | . | . | . | . | . | . | . | . | . |
| RPE | . | . | . | . | . | . | . | . | . | . |
| LFC | . | . | 1 | 1 | 1 | 1 | . | . | . | . |
| ZICR | . | . | . | . | . | . | . | . | . | . |
| PE, BT | . | . | . | . | . | . | 1 | 1 | 1 | . |
| TUP | . | . | . | . | . | . | 2 | 2 | 2 | . |
| TUFC,MPMT | . | . | . | . | . | . | 3 | 3 | 3 | . |
| ITs | . | . | . | . | . | . | . | . | . | . |
| SPs ATF | . | 1 | . | . | . | . | . | . | . | . |
| BUS | . | . | . | . | . | . | . | . | . | . |
| CURHW | . | . | . | . | . | . | . | . | . | . |
| S PE BT | . | . | . | . | . | . | . | . | . | . |
| EU | . | . | . | . | . | . | . | . | . | 1 |

| New State | 9 | 10 | 11 | 14 | 13 | 14 | 15 | 16 | 17 | 18 |
|---|---|---|---|---|---|---|---|---|---|---|
| CURINC | . | . | . | . | . | . | . | . | . | . |
| CURHW | 1 | N | N | N | N | N | N | N | N | N |
| CURADJ | . | . | 1 | . | . | . | . | . | . | . |
| CURAL | . | . | 1 | . | . | . | . | . | . | . |
| CURTP | . | . | . | . | 1 | . | . | . | . | . |
| CURSSDS | . | . | . | 1 | . | 1 | . | . | . | . |
| CURCMDR | . | . | . | . | . | . | . | . | 1 | . |
| CURHANG | . | . | . | . | . | . | . | . | . | . |
| CURBREAK | . | . | Y | Y | Y | Y | Y | Y | Y | Y |
| CURTPAGE | . | . | . | . | . | . | . | . | . | . |
| CURUSON | . | . | . | . | . | . | . | . | . | . |

DOWN'S TRANSFORMATION OF A GENERAL SEQUENCE

At the end of a sequence of DCF controls, DOWN's CONT program has accumulated about 27 bits of information telling which DCF items it got in the sequence. For example, the state variable GOTBR is set if it got any of the 52 controls that cause a BREAK. DOWN also has accumulated some non-binary state variables. For examples, if there were nine conditional blank lines specified in the sequence, then CNTBL is equal to nine; and if there was top margin text in the sequence, then the L3 representation of the entire top margin text is in TMT. It is CONT's main function to write out the L3 that corresponds to any possible state of these state variables.

In general, the state variables that tell what CONT got in the sequence that just ended determine which L3 items CONT must write out as the transformation of that sequence. The other state variables merely affect the contents of what CONT writes out. For example, if GOTTB is set to one, and none of the variables that require CONT to write a TUFC first level structure is set to 1, then CONT must write out a STAB multi-byte control, and therefore must write out the full LFC sequence of BLFC, SLP, STAB, and ELFC. The value of VALTP merely affects the contents of the POSITION parameters of the STAB control. Figuring out the contents is easy. The hard part is figuring out which L3 items to write. The job is finite because the number of possible states does not depend on the number of items in the sequence. After a couple of months practice, it takes about ten minutes to deduce what L3 to write for a given combination of values of state variables. The necessary 2 ** 19 columns of decision table could be produced in only a little over 42 person years.

ORDERING OF L3 ITEMS TO BE WRITTEN OUT

The job of deciding what L3 items to write out in response to a general sequence of DCF controls can be shortened significantly by noting that L3 offers a great deal of flexibility in the order of its items. We can make a single ordered list of L3 items with the following properties.

1. Each item that CONT may need to write into the output L3 datastream, as the transformation of a sequence of DCF controls, appears in the list exactly once.

2. If it is ever necessary for item B to follow item A in the L3 output datastream, as the transformation of a sequence of DCF controls, then B follows A in the list.

The items that must appear in this list are all present in the table of transformations of isolated DCF controls, so property 1 is easy to satisfy. There are several restrictions on the order of L3 items that property 2 requires. They happen to allow a simple ordering of the set. The order restrictions are given in the following decision table.

DECISION TABLE FOR ITEM ORDERING, 1

| Output | 1 | 2 | 3 | 4 | 5 | 6 | 7 | 8 |
|---|---|---|---|---|---|---|---|---|
| EUS | . | . | . | . | . | . | . | . |
| CRE | 1 | . | . | . | . | . | . | . |
| RCR | . | . | . | . | . | . | . | . |
| CREs | . | 1 | . | . | . | . | . | . |
| RSPCREzs | . | 1 | . | . | . | . | . | . |
| CREzRSPs | . | 1 | . | . | . | . | . | . |
| RPE | . | 2 | 1 | . | . | . | . | . |
| LFC | 1 | . | . | . | . | . | . | . |
| ZICR | 2 | . | . | . | . | . | . | . |
| PE, BT | . | 2 | 2 | 1 | . | . | . | . |
| TUP | . | . | . | 2 | 1 | . | . | . |
| TUFC,MPMT | . | . | . | . | 2 | 1 | . | . |
| ITs | . | . | . | . | . | . | . | . |
| SPs ATF | . | . | . | . | . | . | . | . |
| BUS | . | . | . | . | . | . | . | . |
| CURHW | . | . | . | . | . | . | . | . |
| S PE BT | . | . | . | . | . | . | . | . |
| EU | . | . | . | . | . | . | . | . |

DECISION TABLE FOR ITEM ORDERING, 2

| Output | 9 | 10 | 11 | 12 | 13 | 14 | 15 | 16 |
|---|---|---|---|---|---|---|---|---|
| EUS | . | . | . | . | . | . | . | . |
| CRE | . | . | . | . | . | . | . | . |
| RCR | . | . | . | . | 1 | . | . | . |
| CREs | . | . | . | . | . | . | . | . |
| RSPCREzs | . | . | . | . | . | . | . | . |
| CREzRSPs | . | . | . | . | . | . | . | . |
| RPE | . | . | . | . | 1 | . | . | . |
| LFC | . | . | . | . | 1 | . | . | . |
| ZICR | . | . | . | . | . | . | . | . |
| PE, BT | . | . | . | . | . | . | 1 | . |
| TUP | . | . | . | . | . | . | . | . |
| TUFC,MPMT | . | . | . | . | . | . | . | . |
| ITs | . | . | . | . | . | 1 | . | . |
| SPs ATF | 2 | . | 1 | . | . | 2 | . | . |
| BUS | . | . | 2 | 2 | . | . | . | . |
| CURHW | . | . | . | . | . | . | . | . |
| S PE BT | . | . | . | . | . | . | . | . |
| EU | . | . | . | . | . | . | 2 | . |

DECISION TABLE FOR ITEM ORDERING, 3

| Output | 17 | 18 | 19 | 20 | 21 | 22 | 23 | 24 |
|---|---|---|---|---|---|---|---|---|
| EUS | . | . | . | . | 1 | . | . | . |
| CRE | . | . | . | . | . | . | . | . |
| RCR | 1 | . | . | . | . | . | . | . |
| CREs | . | . | . | . | . | . | . | . |
| RSPCREzs | 2 | . | . | . | 2 | . | . | . |
| CREzRSPs | 2 | . | . | . | 2 | . | . | . |
| RPE | . | 1 | . | . | . | . | . | . |
| LFC | . | 2 | . | . | . | . | . | . |
| ZICR | . | . | . | . | . | . | . | . |
| PE, BT | . | . | 1 | . | . | . | . | . |
| TUP | . | . | . | . | . | . | . | . |
| TUFC,MPMT | . | . | . | . | . | . | . | . |
| ITs | . | . | . | . | 2 | . | . | . |
| SPs ATF | . | . | . | . | 2 | . | . | . |
| BUS | . | . | . | . | . | . | . | . |
| CURHW | . | . | . | . | . | . | . | . |
| S PE BT | . | . | 2 | 1 | . | . | . | . |
| EU | . | . | . | 2 | . | . | . | . |

EXPLANATION OF
DECISION TABLES FOR ITEM ORDERING

RULE
NUMBER

1 A ZICR is used only with CRE (to end a paragraph, i. e. to break line adjusting and to inhibit prior line justification) or with LFC (to force the changes to take effect immediately rather than on the next line). Hence, if CRE and ZICR or LFC and ZICR are both present, then they are in that order. A ZICR is never necessary for both purposes because an LFC ends a paragraph.

2 Blank lines, generated as part of the transformation of a sequence of DCF controls that contains a page end, always go on the prior page. Any blank lines on the following page have to end the sequence of controls because then a single count of blank lines fails to tell the whole semantics of the sequence.

3 A given sequence may generate both an RPE and a PE (from a ".PA control" and a PE byte, respectively), but only in that order. The other order implies a blank page and would end the sequence of DCF controls before the ".PA" control.

4 L3 syntax rules require a TUP to follow a PE.

5 L3 syntax rules require a TUFC to follow a TUP.

6 L3 syntax rules require a MP to follow a TUFC.

Rules 7 and 8 have been removed as a result of two changes in the design as follows.

7 In an earlier edition, there were separate decision tables for TUFC, MP, and MT. If these occur, they must appear in that order. Moreover, either or both of top and bottom margin text can appear in a given sequence of controls. If both appear, then the top (header) margin text's MP and MT must come before the bottom (footer) margin text's MP and MT. An even MT and an odd MT can both follow one MP.

In the final design, we have noted, first, anything that requires a TUFC requires margin text to avoid cancelation of the margin text already in effect and, second, anything that changes margin text requires a TUFC for the MP and MT vectors to follow. Hence, TUFC, MP top, MT top even, MT top odd, MP bottom, MT bottom even, and MT bottom odd are all written if any is written and the separate decision tables were unnecessary.

8 No separate decision table is required to decide when to write out a BT. Whenever we write a PE into the buffer used to save BT, we know that we have ended that BT vector. For the first time, we then know the length of the BT vector and can fill in the length and write the complete BT from the buffer to the output data stream.

9 An End UnderScore, if any, must precede the spaces that position an Align Text Field to avoid underscoring of those spaces.

10 Any End UnderScore must precede spaces present in the datastream generated by INDENT TAB, to avoid underscoring those spaces.

11 Any Begin UnderScore must follow the 33 spaces that position an Align Text Field (and for simplicity must therefore follow the ATF itself) to avoid underscoring those spaces.

12 Any Begin UnderScore must follow spaces present in the datastream generated by INDENT TAB, to avoid underscoring those spaces.

13 Any Indent Tab, which is used to increase the indentation by moving the temporary left margin to the right, must follow any of the L3 controls that reset the temporary left margin back to the permanent left margin.

14 When a sequence of DCF controls specifies both centering (spaces followed by ATFin L3) and indenting (one or more ITs in L3), the ITs must be written out before the ATF. This is because an IT is a delimiter (ender) of the field that ATF centers. The sequence " ATF IT IT text" centers nothing, whereas "IT IT ATF text" centers "text".

15 In response to an End Of File in the DCF document, it is necessary to end the current BT with a PE and write out an End Unit, i. e. End Unit Prefix and a new Body Text containing only a Page End.

16 This rule unintentionally left blank.

17 When RCR overrides CRE, the RCR must precede the first RSP in a sequence of one or more pairs of RSP CRE that give one or more required blank lines. Otherwise, that first RSP would go at the end of a text line rather than at the start of its own required blank line.

18 When RCR overrides CRE, the RCR must precede the an LFC, if any, so that the LFC follows a valid single-byte line ending control.

19 A special PE byte and its accompanying writing out of the buffered BT vector must follow the initialization of the BT vector. In this case, that BT vector has nothing in it other than this PE.

21 EUS must precede anything that generates white space in order to turn off underscoring. This is because, although DCF refrains from underscoring most white space between ".US ON" and ".US OFF", L3 underscores most white space between a BUS and an EUS. To match DCF's presentation, the transform must turn underscoring off early in any sequence that generates any white space. Then, if and only if underscoring is still in effect, the transform must turn underscoring back on after writing out the controls that generated the white space. The controls that generate white space are RSPs (either before or after CRE ZICR), IT, and the SPs that precede an ATF.

DECISION TABLE FOR MUTUALLY EXCLUSIVE ITEMS

| Output | 1 | 2 | 3 | 4 | 5 | 6 | 7 | 8 |
|---|---|---|---|---|---|---|---|---|
| EUS | . | . | . | . | . | . | . | . |
| CRE | . | . | . | . | . | . | . | . |
| RCR | . | . | . | . | . | . | . | . |
| CREs | . | . | . | . | . | . | . | . |
| RSPCREzs | . | M | . | . | . | . | . | . |
| CREzRSPs | . | M | . | . | . | . | . | . |
| RPE | . | . | . | . | . | . | . | . |
| LFC | M | . | . | . | . | . | . | . |
| ZICR | . | . | . | . | . | . | . | . |
| PE, BT | . | . | . | . | . | . | . | . |
| TUP | . | . | . | . | . | . | . | . |
| TUFC,MPMT | M | . | . | . | . | . | . | . |
| ITs | . | . | . | . | . | . | . | . |
| SPs ATF | . | . | . | . | . | . | . | . |
| BUS | . | . | . | . | . | . | . | . |
| CURHW | . | . | . | . | . | . | . | . |
| S PE BT | . | . | . | . | . | . | . | . |
| EU | . | . | . | . | . | . | . | . |

EXPLANATION OF
DECISION TABLE FOR MUTUALLY EXCLUSIVE ITEMS

RULE
NUMBER

1 A TUFC can do everything an LFC can, and more, so these are never both necessary in the transform of one sequence.

2 The two types of required blank lines are one or more pairs of CRE RSP and one or more pairs of RSP CRE. No sequence of DCF controls ever generates both types.

DECISION TABLE FOR IMPLICATIONS AMONG ITEMS

| Output | 1 | 2 | 3 | 4 | 5 | 6 | 7 | 8 |
|---|---|---|---|---|---|---|---|---|
| EUS | . | . | . | . | . | . | . | . |
| CRE | . | . | . | . | . | . | . | . |
| RCR | . | . | . | . | . | . | . | . |
| CREs | . | . | . | . | . | . | . | . |
| RSPCREs | . | . | . | . | . | . | . | . |
| CRERSPs | . | . | . | . | . | . | . | . |
| RPE | . | . | . | . | . | . | . | . |
| LFC | . | . | . | . | . | . | . | . |
| ZICR | . | . | . | . | . | . | . | . |
| PE | -Y | -Y | . | . | . | . | . | . |
| TUP | -Y | -Y | . | . | . | . | . | . |
| TUFC | Y | -Y | . | . | . | . | . | . |
| MP | . | Y | . | . | . | . | . | . |
| MT | . | -Y | . | . | . | . | . | . |
| BT | -Y | -Y | . | . | . | . | . | . |
| ITs | . | . | . | . | . | . | . | . |
| SPs ATF | . | . | . | . | . | . | . | . |
| BUS | . | . | . | . | . | . | . | . |
| CURHW | . | . | . | . | . | . | . | . |
| EU | . | . | . | . | . | . | . | . |

EXPLANATION OF DECISION TABLE FOR IMPLICATIONS AMONG ITEMS

RULE
NUMBER

1 A Text Unit Format Change can appear only at the start of a new logical page, so TUFC implies Page End, Text Unit Prefix, and Body Text 2 Margin Text can change only at the start of a new logical page at which there is a Text Unit Format Change, so Margin text Parameters implies Page End, Text Unit Prefix, Margin Text (which could equally well be said to imply Margin text Parameters and the rest) TUFC, and BT. Note that presence of top and bottom margin texts are independent decisions.

NOTE In the ordered list, PE precedes TUFC and MP, but either TUFC or MP implies a need for PE. Moreover, TUFC precedes MP, but MP implies a need for TUFC.

NOTE Each rule in the table of "Mutually Exclusive Items" specifies two negative implications. Either M in a column could be replaced by a Y, if the other M in that column were replaced by -N.

PROCESSING OF INDIVIDUAL OUTPUT DECISION TABLES

Decision Tables for use at the end of a sequence of DCF controls follow. DOWN works through the Decision Tables in the order given. For each Decision Table, DOWN writes out the L3 item given at the top if and only if one or more rules (columns) are satisfied by the End State that exists at the end of this sequence. DOWN also makes any changes to state variables specified in the accompanying descriptions and explanations.

DECISION TABLE FOR OUTPUT EUS

| End State | 1 | 2 | 3 | 4 | 5 | 6 | 7 | 8 |
|---|---|---|---|---|---|---|---|---|
| GOTEOR | . | . | . | . | . | . | . | . |
| GOTBR | . | . | . | . | . | . | . | . |
| GOTPA | . | . | . | . | . | . | . | . |
| GOTPAN | . | . | . | . | . | . | . | . |
| GOTSK | . | . | . | . | . | . | . | . |
| CNTBL | . | . | . | . | . | . | . | . |
| GOTSP | . | . | . | . | . | . | . | . |
| CNTRBL | . | . | . | Y | . | . | . | . |
| GOTIN | . | . | . | . | . | . | . | . |
| GOTUSON | . | . | . | . | . | . | . | . |
| GOTUSOF | Y | . | . | . | . | . | . | . |
| GOTHW | . | . | . | . | . | . | . | . |
| GOTCE _ | . | . | Y | . | . | . | . | . |
| GOTFOJU | . | . | . | . | . | . | . | . |
| GOTTB | . | . | . | . | . | . | . | . |
| GOTSSDS _ | . | . | . | . | . | . | . | . |
| GOTPE _ | . | . | . | . | . | . | . | . |
| GOTRHON | . | . | . | . | . | . | . | . |
| GOTRFON | . | . | . | . | . | . | . | . |
| GOTCMDR _ | . | . | . | . | . | . | . | . |
| CNTINC LT: CURINC | . | . | . | . | . | . | . | . |
| CNTINC GT: CURINC | . | . | . | . | Y | . | . | . |
| CNTINC GT: ZERO | . | . | . | . | . | . | . | . |
| GOTEOF | . | Y | . | . | . | . | . | . |
| CURBREAK | . | . | . | . | . | . | . | . |
| CURTPAGE | . | . | . | . | . | . | . | . |
| CURUSON | Y | Y | Y | Y | Y | . | . | . |

Rule 1:
DOWN writes an End Underscore (EUS) multi-byte control into the L3 datastream as part of the transformation of a DCF sequence that contains a .US OFF control, if underscoring is currently in effect. It is an L3 violation to write an EUS if underscoring is not currently in effect, even though it is not a DCF violation to have any number of successive .US OFF controls.

Rule 2:
DOWN writes an EUS into the L3 datastream as part of the transformation of a DCF sequence that contains an End Of File, if underscoring is currently in effect. It is an L3 violation to leave underscoring in effect at the end of a document.

Rules 3, 4, and 5:
DOWN writes an EUS into the L3 datastream as part of the transformation of a DCF sequence that contains any control that transforms into an L3 control that causes white space in the resulting formatted document, if underscoring is currently in effect. Phew! The EUS prevents the white space from being underscored. This is new in the 11/30/82 edition of the specification. This required moving the EUS decision table up so it will be used before the decision tables for the L3 controls that cause white space.

The DCF controls that transform into L3 controls that cause white space are ".CE" (which transforms into an ATF that must be preceded by spaces to position it near the center of the page), ".SP" (which transforms into, among other things, RSPs to make blank lines even at the top of a page), and ".IN" (which transforms into, among other things, zero or more ITs). In each case, DW would underscore the white space, even though DCF does not, if underscoring were left in effect.

In cases in which one or more of rules 3, 4, or 5 are satisfied, DOWN must decide whether or not to turn underscoring back on again after writing out the controls that cause white space. DOWN must turn underscoring back on if and only if DOWN writes an EUS and the sequence of DCF controls that DOWN is currently transforming does not call for turning off underscoring. That is, if any of rules 3, 4, and 5 are satisfied, and GOTUSOFF is zero, then DOWN sets the state bit GOTUSON. This causes DOWN to write out a BUS at the normal time.

Note that a sequence of DCF controls can have any number of ".US ON" and ".US OFF" controls. The DCF formatter obeys only the last one. To go along with this, DOWN resets GOTUSON whenever it reads a ".US OFF" and DOWN resets GOTUSOFF whenever it reads a ".US ON", so at most one of GOTUSON and GOTUSOFF will ever be on at the end of reading a sequence of DCF controls.

DECISION TABLE FOR OUTPUT CRE

| End State: | 1 | 2 | 3 | 4 | 5 | 6 | 7 | 8 |
|---|---|---|---|---|---|---|---|---|
| GOTEOR : | . | . | . | . | . | . | . | . |
| GOTBR : | . | Y | . | . | . | . | . | . |
| GOTPA : | . | N | . | N | N | N | . | . |
| GOTPAN : | . | N | . | N | N | N | . | . |
| GOTSK : | . | . | . | . | . | . | . | . |
| CNTBL : | . | . | . | . | . | . | . | . |
| GOTSP : | . | . | . | . | . | . | . | . |
| CNTRBL : | . | . | . | . | . | . | . | . |
| GOTIN : | . | . | . | . | . | . | . | . |
| GOTUSON : | . | . | . | . | . | . | . | . |
| GOTUSOF : | . | . | . | . | . | . | . | . |
| GOTHW : | . | . | . | . | . | . | . | . |
| GOTCE _: | . | . | . | . | . | . | . | . |
| GOTFOJU : | . | . | . | Y | . | . | . | . |
| GOTTB : | . | . | . | . | Y | . | . | . |
| GOTSSDS _: | . | . | . | . | . | Y | . | . |
| GOTPE _: | . | . | . | . | . | . | . | . |
| GOTRHON : | . | N | . | . | . | . | . | . |

| | | | | | | | | |
|---|---|---|---|---|---|---|---|---|
| GOTRFON : | . | N | . | . | . | . | . | . |
| GOTCMDR _: | . | N | . | . | . | . | . | . |
| CNTINC LT: CURINC: | . | N | . | . | . | . | . | . |
| CNTINC GT: CURINC: | . | . | . | . | . | . | . | . |
| CNTINC GT: ZERO : | . | . | . | . | . | . | . | . |
| GOTEOF : | . | N | . | . | . | . | . | . |
| CURBREAK : | . | N | . | . | . | . | . | . |
| CURTPAGE : | . | . | . | . | . | . | . | . |
| CURUSON : | . | . | . | . | . | . | . | . |
| DOC_BEGUN: | . | Y | . | Y | Y | Y | . | . |

This Carrier REturn is to move the current position to the temporary left margin of the next line. There are many things that can be in a sequence of DCF controls that require DOWN to write a CRE into the L3 datastream, as DOWN starts to transform an ended sequence of DCF controls. The hierarchy of such DCF things is as follows.

- o One DCF thing transforms directly into a CRE (unless overridden by a RCR or RPE):
  - EOR EOR does not require a rule. It is handled by the SCAN routine because it depends on whether a control that happens to be at the end of a line is or is not followed by a semicolon.

- o One DCF thing transforms directly into a combination CRE ZICR that starts with a CRE (unless the combination is overridden by a RCR or RPE):
  - Any control that causes a break

- o Some DCF things transform to L3 things that must follow a line ender (and hence must follow a CRE unless the CRE is overridden by a RCR or RPE):
  - .FO, .JU, .TB, .SS, or .DS (which transform to a LFC unless something else needs a TUFC)
  - PE byte (which transforms to a PE control)

A major change to the CRE decision table appears in this 11/30/82 edition. It is entirely caused by the decision to not put a CRE before every PE.

That decision seemed to solve a problem of DW's wrongly justifying the last line of text on a page, when the line was also the last line of a paragraph. There is no reason why that decision should have solved the stated problem. However, the code was changed according to that decision and this documentation reflects the code change.

Everyone knows that it is good practice to put a CRE before a PE, and for a while it seemed that DW refused to paginate a document correctly unless every PE was preceded by a CRE. DW left in a PE that neither was required by a RPE nor was at the end of space on a page. This was not repeatable, but might reappear. However, there is no specification of either L3 or L3P that requires a CRE before a PE.

```
            if it is ever desired to  put a CRE before every
            PE, just reinstate rules 3, 7, 8, 9, and 10 from
            the 09/30/82 edition of  this specification.  As
            the code  now stands, the  lines below  that are
            set off by asterisks are obsolete.

******OBSOLETE***********************************
*     o  Some DCF things transform to L3 things that must
*          follow a PE which, in turn, must follow a line
*          ender and hence must follow a CRE (unless the  CRE
*          is overridden by a RCR or RPE):
*             -  .RH         which transforms to TUFC
*             -  .RF         which transforms TO TUFC
*             -  .CM DRAWER which transforms to TUFCo
*             -  .EOF        which transforms to EU
******OBSOLETE***********************************



Restating that, the following things  in DCF transform to L3
that starts  with CRE  (unless a RCR  from .IN  h with  h LT
CURINC or RPE from .PA overrides the CRE):

Rule 1          Left blank because an EOR does not always
                  cause a CRE.


Rule 2          Any Control that causes a break transforms
                  into CRE ZICR if there is nothing
                  else in the required L3 that would cause
                  a break in adjustment of text and if
                  this sequence of DCF controls does not
                  immediately follow another sequence of
                  controls, with no text in between, and
                  the preceding sequence did not already
                  cause a break in concatenation.
                  In practice, most DCF controls,
                  other than ".BR" itself,
                  do transform into something else that
                  causes a break in adjustment, so this
                  rule applies mainly to a solitary ".BR".

******OBSOLETE***********************************
*  Rule 3          PE Byte transforms to CRE PE
******OBSOLETE***********************************

Rules 4; 5; 6   .FO, .JU; .TB; .SS, .DS
                  transform to CRE LFC
                  or else transform to
                  CRE PE TUP TUFC (maybe MP MT) BT

******OBSOLETE***********************************
*  Rules 7; 8; 9    .RH; .RF; CM DRAWER
*                 transform to
*                 CRE PE TUP TUFC (maybe MP MT) BT
*
*  Rule 10         EOF transforms to CRE PE EU
*                  that is, to CRE PE EUP CRE PE
******OBSOLETE***********************************
```

The above rules seem to leave out several controls, namely .SK, .SP, and .CE, that clearly do need to be set up by a CRE. In fact, these are all included in Rule 2 because each of them causes a BREAK and therefore sets GOTBR and causes a CRE.

Note on Rules 4 through 6:
These Rules do not have "N" in the "CNTINC LT CURINC" row. An "N" in that row would say that a CRE is unnecessary in these cases because a RCR is going to be used to unindent and that RCR makes the CRE unnecessary. However, the RCR decision table shows that, in these cases, an RCR is made unnecessary by the fact that a LFC or a TUFC is going to be used, either of these unindents, and therefore the LFC or TUFC makes the RCR unnecessary. Yet a LFC or a TUFC itself requires a preceding valid single-byte line ending control. Since no RCR is going to be written, a CRE must be written in these cases.

Note that the 4 rules for writing out a CRE are by no means mutually exclusive. A CRE is required if any 1, 2, 3, or 4 of the rules are satisfied. All combinations are possible. The number of possible situations that require a CRE is therefore 15. These 15 situations would have to have been stated as 15 separate rules if the classical form of decision table had been used, because only one rule of a classical decision table may ever be satisfied at one time. The form of decision table used here says to write out a CRE if at least one of the rules is satisfied, and to not worry if more than one are satisfied. The 4 such rules are far clearer than the corresponding 15 mutually exclusive rules would have been. This remark applies to all of the decision tables that DOWN uses to decide whether or not to write out L3 items in the transformation of a given sequence of DCF controls. Note on Rule 2:
Transforming ".BR" into "CRE ZICR" has a drawback: it leaves an extra blank line on the DW screen when the resulting document is brought up for revision. This line displays only the ZICR control. There is no such extra line when DW prints the document, but the extra line on the screen interferes with goal of "What You See Is What You Get". An alternative transformation for ".BR" is an RCR and also zero or more ITs to restore the indent level (which .BR does not reset but which "RCR" does reset). This would restore "WYSIWYG" but it would interfere with the primary goal of edibility. With the "CRE ZICR" transformation, a DW user can insert an "IT" to indent an entire group of text. With the "RCR IT ... IT" transformation, a DW user would have to put an extra "IT" at each point where a ".BR" had appeared in the text.

DECISION TABLE FOR OUTPUT RCR

| End State | 1 | 2 | 3 | 4 | 5 | 6 | 7 | 8 |
|---|---|---|---|---|---|---|---|---|
| GOTEOR | . | . | . | . | . | . | . | . |
| GOTBR | . | . | . | . | . | . | . | . |
| GOTPA | N | . | . | . | . | . | . | . |
| GOTPAN | N | . | . | . | . | . | . | . |
| GOTSK | . | . | . | . | . | . | . | . |
| CNTBL | . | . | . | . | . | . | . | . |
| GOTSP | . | . | . | . | . | . | . | . |
| CNTRBL | . | . | . | . | . | . | . | . |
| GOTIN | . | . | . | . | . | . | . | . |
| GOTUSON | . | . | . | . | . | . | . | . |
| GOTUSOF | . | . | . | . | . | . | . | . |
| GOTHW | . | . | . | . | . | . | . | . |
| GOTCE | . | . | . | . | . | . | . | . |
| GOTFOJU | N | . | . | . | . | . | . | . |

| | | | | | | | | | |
|---|---|---|---|---|---|---|---|---|---|
| GOTTB : | N | . | . | . | . | . | . | . |
| GOTSSDS _: | N | . | . | . | . | . | . | . |
| GOTPE _: | . | . | . | . | . | . | . | . |
| GOTRHON : | N | . | . | . | . | . | . | . |
| GOTRFON : | N | . | . | . | . | . | . | . |
| GOTCMDR _: | N | . | . | . | . | . | . | . |
| CNTINC LT: | | | | | | | | |
| CURINC: | Y | . | . | . | . | . | . | . |
| CNTINC GT: | | | | | | | | |
| CURINC: | . | . | . | . | . | . | . | . |
| CNTINC GT: | | | | | | | | |
| ZERO : | . | . | . | . | . | . | . | . |
| GOTEOF : | . | . | . | . | . | . | . | . |
| CURBREAK : | . | . | . | . | . | . | . | . |
| CURTPAGE : | . | . | . | . | . | . | . | . |
| CURUSON : | . | . | . | . | . | . | . | . |

A Required Carrier Return is used to unindent, that is, to move the temporary left margin back to the permanent left margin, in two cases. The first case occurs when the last .IN h control in the sequence has h equal to zero, which specifies an unindent, that is, when CNTINC is zero. The second case occurs when the last .IN h control in the sequence has h less than the current temporary left margin, that is, when CNTINC is less than (abbreviated "LT") CURINC.

The latter case is a necessary preliminary step in transforming a DCF control that moves the temporary left margin to the left but does not move the temporary left margin all the way back to the permanent left margin. The preliminary RCR moves it all the way back and then one or more Indent Tabs move it to the desired position. To put it another way, L3 has no Unindent Tab control so the sequence RCR ITs is used instead.

Note that the first case is a subset of the second case. Therefore the condition CNTINC LT CURINC implies a need to unindent for either case.

However, in L3, an RCR is not the only thing that unindents. The others are:

| | |
|---|---|
| IRT | Which is equivalent to RCR and which DOWN never writes |
| RPE | Which DOWN writes in response to a .PA control |
| LFC | Which DOWN sometimes writes in response to .FO, .JU, .SS, .DS, or .TB |
| RMLF, APM, AAM, and RTMF | Which DOWN never writes because that would require complex pattern recognition |
| TUFC | Which DOWN writes in response to .CM DRAWER, .RH ON, and .RF ON, which can also handle .FO, .JU, .SS, .DS, or .TB |

When a sequence of DCF controls contains controls that transform into something else that unindents, DOWN refrains from writing an RCR. This is particularly necessary in the case where a sequence contains a .IN 0 and a .PA. If DOWN wrote both an RCR and an RPE, it would incorrectly leave an extra blank line. Neither DCF control ever creates a blank line. Either of the corresponding L3 controls does create a blank line if it occurs after a line ending control. Therefore, even one of the L3 controls must override the initial CRE. Writing all three of CRE, RCR, and RPE would leave two incorrect blank lines.

Similarly, DOWN does not write an RCR when it is transforming a sequence of DCF controls that requires generation of either a LFC or a TUFC. In these cases, writing a RCR (instead of the single CRE at the start) would be merely redundant, not incorrect.

The one rule in the decision table for RCR therefore says that DOWN writes an RCR if a sequence of DCF controls says to move the temporary left margin to the left and does not say to do any other things that happen to unindent.

DECISION TABLE FOR OUTPUT CRES

| End State: | 1 | 2 | 3 | 4 | 5 | 6 | 7 | 8 |
|---|---|---|---|---|---|---|---|---|
| GOTEOR : | . | . | . | . | . | . | . | . |
| GOTBR : | . | . | . | . | . | . | . | . |
| GOTPA : | . | . | . | . | . | . | . | . |
| GOTPAN : | . | . | . | . | . | . | . | . |
| GOTSK : | . | . | . | . | . | . | . | . |
| CNTBL : | Y | . | . | . | . | . | . | . |
| GOTSP : | . | . | . | . | . | . | . | . |
| CNTRBL : | . | . | . | . | . | . | . | . |
| GOTIN : | . | . | . | . | . | . | . | . |
| GOTUSON : | . | . | . | . | . | . | . | . |
| GOTUSOF : | . | . | . | . | . | . | . | . |
| GOTHW : | . | . | . | . | . | . | . | . |
| GOTCE _: | . | . | . | . | . | . | . | . |
| GOTFOJU : | . | . | . | . | . | . | . | . |
| GOTTB : | . | . | . | . | . | . | . | . |
| GOTSSDS _: | . | . | . | . | . | . | . | . |
| GOTPE _: | . | . | . | . | . | . | . | . |
| GOTRHON : | . | . | . | . | . | . | . | . |
| GOTRFON : | . | . | . | . | . | . | . | . |
| GOTCMDR _: | . | . | . | . | . | . | . | . |
| CNTINC LT: CURINC: | . | . | . | . | . | . | . | . |
| CNTINC GT: CURINC: | . | . | . | . | . | . | . | . |
| CNTINC GT: ZERO : | . | . | . | . | . | . | . | . |
| GOTEOF : | . | . | . | . | . | . | . | . |
| CURBREAK : | . | . | . | . | . | . | . | . |
| CURTPAGE : | N | . | . | . | . | . | . | . |
| CURUSON : | . | . | . | . | . | . | . | . |

CREs means one or more Carrier REturn single-byte controls used to transform .SK v controls in DCF into blank lines in L3. The number of CREs is CNTBL, which is the total of the parameters (v) in all of the .SK v controls in the sequence that has just ended. If CNTBL is zero, the number of CRE controls to be written out is zero and the above decision table is not satisfied. That is the meaning of "Y" in the row containing the name of a count-class transient state variable. No special transformation is needed in order to make the blank lines specified by ".SK" be conditional on not being at the top of a page. This is because all of DW's blank lines are conditional. Blank lines are compressed out if they happen to fall at the top of a DW page, when the document is paginated or printed.

However, DOWN must not transform ".SK v" into CREs at the top of a page anyway. Any L3 document that DOWN writes may be subsequently read by UP and transformed back to DCF form. UP transforms CREs into blank lines in DCF. The DCF formatter (unlike the DW formatter) treats blank lines as being unconditional. That is, the DCF formatter assumes the author did intend blank lines, even if they happen to fall at the top of a page. Therefore, if DOWN wrote "CREs" at the top of a page and the document were run through the UP transformation, the original ".SK v"'s conditional blank lines would have been turned into unconditional blank lines. DOWN prevents this by refraining from writing out "CREs" if it sees that the current position is at the top of a page, as indicated by the "CURTPAGE" state bit.

Note that just a .SK 0 control leaves no blank lines but does cause a break. Moreover, if it follows a .PA NOSTART control, a .SK 0 control does start a new page. This is because of other bits set when .SK is encountered in a sequence.

The CNTBL variable must be reset to zero by the end of processing the sequence of controls.

Note that having a .PE in the sequence requires an RPE which overrides writing out the single CRE. For example, the DCF sequence

```
TEXT1  EOR
.SK 3 EOR
.PA EOR
TEXT 2
```

Transforms into L3 as

```
TEXT 1 CRE CRE CRE RPE TEXT 2
```

where all three CREs come from the .SK 3. The first CRE merely ends the line consisting of TEXT1. The next two CREs leave blank lines. The RPE leaves the third blank line.

Note that DOWN ignores null DCF records, that is, successive EORs. DOWN does not detect a null record and increment the count of blank lines. If editors leave blank screen lines as null records, then this function will have to be added to DOWN.

<u>DECISION TABLE FOR OUTPUT (RSP CRE ZICR) S</u>

| End State | 1 | 2 | 3 | 4 | 5 | 6 | 7 | 8 |
|---|---|---|---|---|---|---|---|---|
| GOTEOR | . | . | . | . | . | . | . | . |
| GOTBR | . | . | . | . | . | . | . | . |
| GOTPA | N | . | . | . | . | . | . | . |
| GOTPAN | N | . | . | . | . | . | . | . |
| GOTSK | . | . | . | . | . | . | . | . |
| CNTBL | . | . | . | . | . | . | . | . |
| GOTSP | . | . | . | . | . | . | . | . |
| CNTRBL | Y | . | . | . | . | . | . | . |
| GOTIN | . | . | . | . | . | . | . | . |
| GOTUSON | . | . | . | . | . | . | . | . |
| GOTUSOF | . | . | . | . | . | . | . | . |
| GOTHW | . | . | . | . | . | . | . | . |
| GOTCE _ | . | . | . | . | . | . | . | . |
| GOTFOJU | . | . | . | . | . | . | . | . |
| GOTTB | . | . | . | . | . | . | . | . |
| GOTSSDS _ | . | . | . | . | . | . | . | . |
| GOTPE _ | . | . | . | . | . | . | . | . |
| GOTRHON | . | . | . | . | . | . | . | . |
| GOTRFON | . | . | . | . | . | . | . | . |

| | 1 | 2 | 3 | 4 | 5 | 6 | 7 | 8 |
|---|---|---|---|---|---|---|---|---|
| GOTCMDR _: | . | . | . | . | . | . | . | . |
| CNTINC LT: CURINC: | . | . | . | . | . | . | . | . |
| CNTINC GT: CURINC: | . | . | . | . | . | . | . | . |
| CNTINC GT: ZERO : | . | . | . | . | . | . | . | . |
| GOTEOF : | . | . | . | . | . | . | . | . |
| CURBREAK : | . | . | . | . | . | . | . | . |
| CURTPAGE : | . | . | . | . | . | . | . | . |
| CURUSON : | . | . | . | . | . | . | . | . |

(RSP CRE ZICR)s means one or more triads of Required Space, Carrier Return, and Zero Index Carrier Return, used to transform .SP v controls into "unconditional" blank lines that can not be deleted at the top or bottom of a page. (Contrast this to the "conditional" blank lines specified by the .SK v control.) The number of RSP CRE ZICR triads is CNTRBL, which is the total of the the parameters (v) in all of the .SP v controls in the sequence that has just ended. If this is zero, no triads are written, but the other functions of .SP 0 are performed as described for CREs.

Note that it is surprisingly difficult to force DW to insert unconditional blank lines, which are not compressed out at the top of a page. Neither "RSP CRE" nor "CRE ZICR" does the trick. However, "RSP CRE ZICR" does it.

The CNTRBL transient state variable must be reset to zero by the end of processing of the sequence of DCF controls to L3.

DECISION TABLE FOR OUTPUT (CRE ZICR RSP) S

| End State: | 1 | 2 | 3 | 4 | 5 | 6 | 7 | 8 |
|---|---|---|---|---|---|---|---|---|
| GOTEOR : | . | . | . | . | . | . | . | . |
| GOTBR : | . | . | . | . | . | . | . | . |
| GOTPA : | Y | . | . | . | . | . | . | . |
| GOTPAN : | . | Y | . | . | . | . | . | . |
| GOTSK : | . | . | . | . | . | . | . | . |
| CNTBL : | . | . | . | . | . | . | . | . |
| GOTSP : | . | . | . | . | . | . | . | . |
| CNTRBL : | Y | Y | . | . | . | . | . | . |
| GOTIN : | . | . | . | . | . | . | . | . |
| GOTUSON : | . | . | . | . | . | . | . | . |
| GOTUSOF : | . | . | . | . | . | . | . | . |
| GOTHW : | . | . | . | . | . | . | . | . |
| GOTCE _: | . | . | . | . | . | . | . | . |
| GOTFOJU : | . | . | . | . | . | . | . | . |
| GOTTB : | . | . | . | . | . | . | . | . |
| GOTSSDS _: | . | . | . | . | . | . | . | . |
| GOTPE _: | . | . | . | . | . | . | . | . |
| GOTRHON : | . | . | . | . | . | . | . | . |
| GOTRFON : | . | . | . | . | . | . | . | . |
| GOTCMDR _: | . | . | . | . | . | . | . | . |
| CNTINC LT: CURINC: | . | . | . | . | . | . | . | . |
| CNTINC GT: CURINC: | . | . | . | . | . | . | . | . |
| CNTINC GT: ZERO : | . | . | . | . | . | . | . | . |
| GOTEOF : | . | . | . | . | . | . | . | . |
| CURBREAK : | . | . | . | . | . | . | . | . |
| CURTPAGE : | . | . | . | . | . | . | . | . |
| CURUSON : | . | . | . | . | . | . | . | . |

(CRE ZICR RSP)s means the same sort of triads of controls as the previous output, but in a different order. As we have seen, there are situations where the first single CRE is not written because a .PA in the DCF sequence requires writing a RPE into the L3 datastream. In such a situation, it is wrong to write CNTRBL triads of RSP CRE ZICR. The first RSP would go at the end of a text line rather than at the start of a blank line. For example, the DCF sequence

```
      text1 EOR
      .SP 3 EOR
      .PA EOR
      text2 EOR
```

would transform into L3 as

```
      text1 RSP CRE ZICR RSP CRE ZICR RSP CRE ZICR RPE text2
```

which misses a blank line and extends a text line.
Yet it would also be wrong to put the RPE before the RSP, because that would put the blank lines on the following page. Therefore it is necessary to test whether either (or both) of GOTPA or GOTPAN is set to one and, if so, to write the first CRE before the first RSP. That is, in this case, DOWN writes CRE ZICR RSP triads instead of RSP CRE ZICR triads. The number of triads is CNTRBL, as for the previous output; only the order differs. Note that the RPE after an RSP leaves the last required blank line.

DECISION TABLE FOR OUTPUT RPE

| End State | 1 | 2 | 3 | 4 | 5 | 6 | 7 | 8 |
|---|---|---|---|---|---|---|---|---|
| GOTEOR | . | . | . | . | . | . | . | . |
| GOTBR | . | . | . | . | . | . | . | . |
| GOTPA | Y | . | . | . | . | . | . | . |
| GOTPAN | . | Y | . | . | . | . | . | . |
| GOTSK | . | . | . | . | . | . | . | . |
| CNTBL | . | . | . | . | . | . | . | . |
| GOTSP | . | . | . | . | . | . | . | . |
| CNTRBL | . | . | . | . | . | . | . | . |
| GOTIN | . | . | . | . | . | . | . | . |
| GOTUSON | . | . | . | . | . | . | . | . |
| GOTUSOF | . | . | . | . | . | . | . | . |
| GOTHW | . | . | . | . | . | . | . | . |
| GOTCE _ | . | . | . | . | . | . | . | . |
| GOTFOJU | . | . | . | . | . | . | . | . |
| GOTTB | . | . | . | . | . | . | . | . |
| GOTSSDS _ | . | . | . | . | . | . | . | . |
| GOTPE _ | . | . | . | . | . | . | . | . |
| GOTRHON | . | . | . | . | . | . | . | . |
| GOTRFON | . | . | . | . | . | . | . | . |
| GOTCMDR _ | . | . | . | . | . | . | . | . |
| CNTINC LT: CURINC | . | . | . | . | . | . | . | . |
| CNTINC GT: CURINC | . | . | . | . | . | . | . | . |
| CNTINC GT: ZERO | . | . | . | . | . | . | . | . |
| GOTEOF | . | . | . | . | . | . | . | . |
| CURBREAK | . | . | . | . | . | . | . | . |
| CURTPAGE | . | . | . | . | . | . | . | . |
| CURUSON | . | . | . | . | . | . | . | . |

DOWN writes a Required Page End single-byte control as part of the transformation to L3 of any DCF sequence that contains a .PA control. Depending on whether this control does or does not contain the NOBREAK parameter, its presence can be signified by either GOTPA or GOTPAN.

It is never necessary to write more than one RPE single-byte control when transforming a sequence of DCF controls to L3. A second .PA control always starts a new sequence.

DECISION TABLE FOR OUTPUT LFC

| End State | 1 | 2 | 3 | 4 | 5 | 6 | 7 | 8 |
|---|---|---|---|---|---|---|---|---|
| GOTEOR | . | . | . | . | . | . | . | . |
| GOTBR | . | . | . | . | . | . | . | . |
| GOTPA | . | . | . | . | . | . | . | . |
| GOTPAN | . | . | . | . | . | . | . | . |
| GOTSK | . | . | . | . | . | . | . | . |
| CNTBL | . | . | . | . | . | . | . | . |
| GOTSP | . | . | . | . | . | . | . | . |
| CNTRBL | . | . | . | . | . | . | . | . |
| GOTIN | . | . | . | . | . | . | . | . |
| GOTUSON | . | . | . | . | . | . | . | . |
| GOTUSOF | . | . | . | . | . | . | . | . |
| GOTHW | . | . | . | . | . | . | . | . |
| GOTCE _ | . | . | . | . | . | . | . | . |
| GOTFOJU | Y | . | . | . | . | . | . | . |
| GOTTB | . | Y | . | . | . | . | . | . |
| GOTSSDS _ | . | . | Y | . | . | . | . | . |
| GOTPE _ | . | . | . | . | . | . | . | . |
| GOTRHON | N | N | N | . | . | . | . | . |
| GOTRFON | N | N | N | . | . | . | . | . |
| GOTCMDR _ | N | N | N | . | . | . | . | . |
| CNTINC LT CURINC | . | . | . | . | . | . | . | . |
| CNTINC GT CURINC | . | . | . | . | . | . | . | . |
| CNTINC GT ZERO | . | . | . | . | . | . | . | . |
| GOTEOF | . | . | . | . | . | . | . | . |
| CURBREAK | . | . | . | . | . | . | . | . |
| CURTPAGE | . | . | . | . | . | . | . | . |
| CURUSON | . | . | . | . | . | . | . | . |

The Line Format Change sequence of multi-byte controls (namely the multi-byte controls BLFC, SLP, STAB, and ELFC) is written into the L3 datastream as part of the transformation of a sequence of DCF controls that does contain any of the controls that can transform into either a LFC or a TUFC, namely

.FO
.JU
.TB
.SS
.DS but does not contain any of the DCF controls that can transform only into a TUFC, namely

.RH
.RF
.CM DRAWER

This is because a TUFC can contain any information that a LFC can contain, so it is never necessary to write both an LFC and a TUFC.

Most of the output L3 items are very easy for DOWN to write once a decision table has told DOWN whether or not to write them. A LFC is not so easy. It has parameters that depend on information gleaned from DCF controls in the sequence that just ended or unchanged information held over from the previous state. In particular, it must use information in VALADJ, VALAL, VALTP, and VALSSDS. Moreover, DOWN must set the new values into the corresponding persistent state variables CURADJ, CURAL, CURTP, and CURSSDS.

DECISION TABLE FOR OUTPUT ZICR

| End State | 1 | 2 | 3 | 4 | 5 | 6 | 7 | 8 |
|---|---|---|---|---|---|---|---|---|
| GOTEOR | . | . | . | . | . | . | . | . |
| GOTBR | Y | . | . | . | . | . | . | . |
| GOTPA | N | . | . | . | . | . | . | . |
| GOTPAN | N | . | . | . | . | . | . | . |
| GOTSK | . | . | . | . | . | . | . | . |
| CNTBL | N | . | . | . | . | . | . | . |
| GOTSP | . | . | . | . | . | . | . | . |
| CNTRBL | N | . | . | . | . | . | . | . |
| GOTIN | . | . | . | . | . | . | . | . |
| GOTUSON | . | . | . | . | . | . | . | . |
| GOTUSOF | . | . | . | . | . | . | . | . |
| GOTHW | . | . | . | . | . | . | . | . |
| GOTCE _ | . | . | . | . | . | . | . | . |
| GOTFOJU | N | Y | . | . | . | . | . | . |
| GOTTB | N | . | Y | . | . | . | . | . |
| GOTSSDS _ | N | . | . | Y | . | . | . | . |
| GOTPE _ | . | . | . | . | . | . | . | . |
| GOTRHON | N | N | N | N | . | . | . | . |
| GOTRFON | N | N | N | N | . | . | . | . |
| GOTCMDR _ | N | N | N | N | . | . | . | . |
| CNTINC LT: CURINC | N | . | . | . | . | . | . | . |
| CNTINC GT: CURINC | . | . | . | . | . | . | . | . |
| CNTINC GT: ZERO | . | . | . | . | . | . | . | . |
| GOTEOF | . | . | . | . | . | . | . | . |
| CURBREAK | N | . | . | . | . | . | . | . |
| CURTPAGE | . | . | . | . | . | . | . | . |
| CURUSON | . | . | . | . | . | . | . | . |

DOWN writes a Zero Index Carrier Return single-byte control for two purposes. First (Rule 1), after a CRE, a ZICR ends a paragraph without unindenting. This pair is the transformation of DCF's BREAK. This pair is not written if this sequence immediately followed another sequence (with no intervening text) and that preceding sequence already caused a break, as signified by CURBREAK.

Second (Rules 2,3,4), after a LFC, a ZICR insures that the changes specified by the LFC take effect immediately.

In each purpose, the ZICR is written after a line ending control. Therefore it does not move the current position at all. Its function is one of convention, not one of motion, when it follows a line ender.

The first purpose does not apply to all sequences that include a BREAK (that is, either a .BR control of any of the other 51 controls that cause a BREAK in the concatenation of lines). The L3 concept "end of paragraph" corresponds to the DCF concept of BREAK. A sequence of DCF controls can contain other controls that transform into L3 items that end a paragraph. The L3 items that end a paragraph, and the DCF controls that DOWN transforms into these L3 items, are as follows:

| L3 | DCF |
|---|---|
| RCR | .IN h BREAK, h LT CURINC |
| RPE | .PA |
| LFC | .FO, .JU, .TB, .SS, .DS |
| TUFC | .RH, .RF, .CM DRAWER |
| CRE s | .SK v, v GT 0 |
| RSP CRE s | .SP v, v GT 0 |
| CRE RSP s | .SP v, v GT 0 |
| RMLF | None |
| APM | None |
| AAM | None |
| RTMF | None |

DOWN Need not write a ZICR to end a paragraph, when DOWN is transforming a sequence of DCF controls that includes any control on the right side of the above table, because the corresponding L3 item will end the paragraph. Each supported DCF control that causes a break is in the above table except for .BR itself. Hence, the first purpose of ZICR applies only to transformation of .BR and of unsupported controls that cause a break.

Note that any of about 8 single-byte controls in L3 ends a paragraph if and only if it follows a CRE or a PE. DOWN makes no attempt to look ahead of a sequence of DCF controls to see if the next line starts with one of these single byte controls, such as SP, RSP, BS, or even IT. As a result, DOWN occasionally writes a ZICR that is not strictly necessary. The extra ZICR does no harm and it insures that a break continues to take effect even if subsequent editing removes the subsequent single-byte control that made ZICR unnecessary.

Note that CRE and ZICR interact with each other and with other things that DOWN may have to write into the L3 datastream, in a fairly complex way, relative to ending a paragraph. See Rule 2 for CRE and Rule 1 for ZICR. Rule 2 for CRE says that either of GOTPA (which signifies that a .PA control is present in the sequence and will transform to

Having thus described our invention, what we claim as new and desire to secure by Letters Patent, is as follows:

1. A method of transforming a source document, cast in a first editable form which includes a plurality of input items therein, to a target document of a second editable form which includes output items compatible therewith, said method comprising the steps of:

(a) determining a set of key state variables, from amongst all possible key state variables, that refers to and collectively identifies the status of said source document as represented by its data stream at any given point in said transformation;

(b) determining the actual number of possible key state combinations that can occur in any possible transformation;

(c) defining for each of said possible key states combination, in combination with each of said input items, and explicit set of output items compatible with said second editable document form to be placed in said second document; and (d) defining, after each explicit set of output items has been placed in said second document, the next state of said source document.

2. The method according to claim 1 which comprises the additional step of determining the actual starting state of said source document prior to enabling said transformation thereof.

3. The method according to claim 1 which comprises the additional step of determining the the presence of sub-documents within said source document and thereafter preserving the same for use after transformation has occurred.

4. The method according to claim 1 which comprises the additional step of limiting the number of possible combinations of said key state variables to which there will be a transformation reaction.

5. The method according to claim 4 which comprises the additional step of determining an ordered set of implications concerning the relationships among the key state variables in any permissible set thereof.

* * * * *